(12) United States Patent
Nakai et al.

(10) Patent No.: US 11,475,472 B2
(45) Date of Patent: Oct. 18, 2022

(54) MANAGEMENT DEVICE, MANAGEMENT METHOD, TERMINAL DEVICE, CONTROL METHOD, AND PROGRAM

(71) Applicant: KONAMI DIGITAL ENTERTAINMENT CO., LTD., Tokyo (JP)

(72) Inventors: Yoko Nakai, Tokyo (JP); Daisuke Sato, Tokyo (JP); Shinsaku Inukai, Kawasaki (JP); Masato Miyazaki, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 1533 days.

(21) Appl. No.: 14/861,037

(22) Filed: Sep. 22, 2015

(65) Prior Publication Data

US 2016/0012467 A1    Jan. 14, 2016

Related U.S. Application Data

(63) Continuation-in-part of application No. PCT/JP2014/059020, filed on Mar. 27, 2014.

(30) Foreign Application Priority Data

Mar. 28, 2013  (JP) .............................. JP2013-070546
Mar. 28, 2013  (JP) .............................. JP2013-070547

(Continued)

(51) Int. Cl.
    *G06Q 30/02*    (2012.01)
(52) U.S. Cl.
    CPC ............................. *G06Q 30/0217* (2013.01)

(58) Field of Classification Search
    CPC .................................................. G06Q 30/0217
    See application file for complete search history.

(56) References Cited

U.S. PATENT DOCUMENTS

2010/0094709 A1    4/2010  Kuroda
2012/0035990 A1*   2/2012  Lewis ................ G06Q 30/0239
                                                   705/14.1
(Continued)

FOREIGN PATENT DOCUMENTS

JP    2001-312607 A    11/2001
JP    2002-239237 A     8/2002
(Continued)

OTHER PUBLICATIONS

Towards Effective Third-Party Application Dialogs: Solutions for Improved Attention and Comprehension, by Yousra Javed, p. 76 (Year: 2017).*

(Continued)

*Primary Examiner* — Abhishek Vyas
*Assistant Examiner* — Darnell A Pouncil
(74) *Attorney, Agent, or Firm* — Sughrue Mion, PLLC

(57) ABSTRACT

A management device includes: an application manager that manages a set of application-related information related to target applications subject to management. A first information acquisitor acquires a first information transmitted from a terminal in response to that any target application included in the target applications executed by the terminal. A first information notifier transmits, to the terminal, a second information upon receipt of a request based on a first target application executed by the terminal. A second information indicates at least one target application for which the first information has not been acquired from the terminal by the first information acquisitor. A reward processor performs a reward-granting process, based on that a second target application, included in the at least one target application (Continued)

which is indicated by the second information transmitted by the first information notifier, has been executed by the terminal or has become executable by the terminal.

52 Claims, 35 Drawing Sheets

(30) Foreign Application Priority Data

| Mar. 28, 2013 | (JP) | JP2013-070548 |
|---|---|---|
| Jun. 28, 2013 | (JP) | JP2013-137169 |
| Nov. 15, 2013 | (JP) | JP2013-236853 |
| Nov. 15, 2013 | (JP) | JP2013-236854 |
| Nov. 15, 2013 | (JP) | JP2013-236855 |
| Mar. 24, 2014 | (JP) | JP2014-060594 |

(56) References Cited

U.S. PATENT DOCUMENTS

| 2012/0278185 A1* | 11/2012 | Ramachandran | G06Q 30/02 |
| | | | 705/14.73 |
| 2013/0024268 A1* | 1/2013 | Manickavelu | G06Q 30/0601 |
| | | | 705/14.39 |
| 2013/0159459 A1 | 6/2013 | Shinkai | |
| 2014/0236742 A1* | 8/2014 | Sakuma | G06Q 30/0241 |
| | | | 705/14.73 |
| 2015/0058115 A1 | 2/2015 | Iwaki et al. | |
| 2016/0275560 A1* | 9/2016 | Ito | G06Q 30/0209 |

FOREIGN PATENT DOCUMENTS

| JP | 2005-129042 A | | 5/2005 |
| JP | 2005129042 | * | 12/2005 |
| JP | 2006-11592 A | | 1/2006 |
| JP | 2006-221373 A | | 8/2006 |
| JP | 2006301866 A | | 11/2006 |
| JP | 2007-66187 A | | 3/2007 |
| JP | 2007-317177 A | | 12/2007 |
| JP | 2011-83597 A | | 4/2011 |
| JP | 2011155659 A | | 8/2011 |
| JP | 2012-93805 A | | 5/2012 |
| JP | 2012-174174 A | | 9/2012 |
| JP | 2012-234279 A | | 11/2012 |
| JP | 5107455 B1 | | 12/2012 |
| JP | 2013-8233 A | | 1/2013 |
| JP | 2013-77152 A | | 4/2013 |
| JP | 2013-125375 A | | 6/2013 |
| JP | 2013-196044 A | | 9/2013 |
| JP | 2014-99111 A | | 5/2014 |
| JP | 2018-32448 A | | 3/2018 |
| JP | 2018-55711 A | | 4/2018 |
| KR | 10-2006-0099489 | | 9/2006 |
| KR | 10-2012-0087607 | | 8/2012 |
| WO | 2008/107968 A1 | | 9/2008 |

OTHER PUBLICATIONS

A Smart Android Application with Machine Learning Extension to Operate Computerand IoT Devices, p. 2 , Meet Marakana (Year: 2021).*
Communication dated Feb. 6, 2018 from the Japanese Patent Office in counterpart Japanese application No. 2014-097895.
Decision to Grant a Patent dated Nov. 6, 2018 from the Japanese Patent Office in counterpart Japanese application No. 2018-131480.
Decision to Grant a Patent dated Feb. 12, 2019 issued by the Japanese Patent Office in Application No. 2017-231239.
Decision to Grant a Patent dated Feb. 19, 2019 issued by the Japanese Patent Office in Application No. 2017-231236.
Communication dated Jul. 3, 2018, from the Japanese Patent Office in counterpart application No. 2017-231239.
Communication dated Jun. 26, 2018, from the Japanese Patent Office in counterpart application No. 2017-231236.
Communication dated May 8, 2018, issued by the Japan Patent Office in corresponding Japanese Application No. 2017-167879.
Decision to Grant a Patent dated Jun. 12, 2018 issued by the Japanese Patent Office in counterpart Japanese application No. 2015-220576.
Communication dated Dec. 12, 2017 from the Japanese Patent Office in counterpart Japanese application No. 2015-220576.
Communication dated Dec. 22, 2017 from the Japanese Patent Office in counterpart Japanese application No. 2017-167879.
Decision to Grant a Patent dated Aug. 7, 2018 from the Japanese Patent Office in counterpart Japanese application No. 2014-097895.
Office action issued in corresponding Korean Patent Application No. 10-2015-7025180 dated Dec. 16, 2016.
Communication dated Mar. 6, 2018, from the Japanese Patent Office in counterpart application No. 2017-231239.
Communication dated Feb. 27, 2018, from the Japanese Patent Office in counterpart application No. 2017-231236.
Decision to Grant a Patent dated Oct. 2, 2018 from the Japanese Patent Office in counterpart Japanese application No. 2017-167879.
Communication dated Dec. 21, 2018 from Japanese Patent Office in counterpart JP Application No. 2017-231236.
Communication dated Dec. 21, 2018 from Japanese Patent Office in counterpart JP Application No. 2017-231239.

* cited by examiner

FIG. 7

| APPLICATION ID (ApID) | NOTIFICATION DESTINATION URL (NoticeURL) | STORE URL (ApStoreURL) | APPLICATION NAME (ApNAME) | APPLICATION DESCRIPTION (ApDOC) | APPLICATION ICON IMAGE (ApICO) | APPLICATION PRICE (ApPRICE) |
|---|---|---|---|---|---|---|
| | | | | | | |
| | | | | | | |

FIG. 8

| ITEM ID (ItemID) | APPLICATION ID (ApID) | MINIMUM PRICE (min_price) | REWARD ITEM NAME (ItemName) | NUMBER OF REWARD ITEMS (ItemNum) |
|---|---|---|---|---|
| | | | | |
| | | | | |

FIG. 9

| CAMPAIGN ID (CpID) | CAMPAIGN NAME (CpNAME) | CAMPAIGN STARTING DAY/TIME (CpStartDATE) | CAMPAIGN ENDING DAY/TIME (CpEndDATE) | REWARD GRANTING STARTING DAY/TIME (RewardStartDATE) | REWARD GRANTING ENDING DAY/TIME (RewardEndDATE) |
|---|---|---|---|---|---|
| | | | | | |
| | | | | | |

FIG. 10

| CAMPAIGN ID (CpID) | APPLICATION ID (ApID) | CAMPAIGN PAGE URL (CpPageURL) |
|---|---|---|
| | | |
| | | |

FIG. 11

| REWARD USER ID (RewardUID) | APPLICATION ID (ApID) | APPLICATION USER ID (ApUID) |
|---|---|---|
| | | |
| | | |

FIG. 12

| REWARD MANAGEMENT ID (RewardID) | REWARD USER ID (RewardUID) | CUSTOMER TRANSFER SOURCE APPLICATION ID (ApIDfrom) | CUSTOMER TRANSFER DESTINATION APPLICATION ID (ApIDto) | CAMPAIGN ID (CpID) |
|---|---|---|---|---|
| | | | | |
| | | | | |

FIG. 13

| REWARD MANAGEMENT ID (RewardID) | ACHIEVEMENT POINT ID (RewardSpotID) | REWARD STATUS (RewardStatus) |
|---|---|---|
| | | |
| | | |

FIG. 16

| FILTER ID | BLOCKING APPLICATION ID | BLOCKED APPLICATION ID |
|---|---|---|
| (FilterID) | (ApIDfrom) | (ApIDto) |
| | | |
| | | |

FIG. 21

| APPLICATION ID | NOTIFICATION DESTINATION URL | STORE URL | APPLICATION URL SCHEME | APPLICATION NAME | APPLICATION DESCRIPTION | APPLICATION ICON IMAGE | APPLICATION PRICE |
|---|---|---|---|---|---|---|---|
| (ApID) | (NoticeURL) | (ApStoreURL) | (ApURI) | (ApNAME) | (ApDOC) | (ApICO) | (ApPRICE) |
| | | | | | | | |
| | | | | | | | |

FIG. 22

| REWARD USER ID | APPLICATION ID | APPLICATION USER ID | NOTIFICATION TYPE |
|---|---|---|---|
| (RewardUID) | (ApID) | (ApUID) | (Ttype) |
| 09634565 | 001 | 5288 | 0 |
| 09634565 | 002 | null | 1 |
| ... | ... | ... | ... |

FIG. 33

| REWARD USER ID (RewardUID) | APPLICATION ID (ApID) | APPLICATION USER ID (ApUID) | ... |
|---|---|---|---|
| 09634565 | 001 | 5288 | ... |
| 09634565 | 002 | pxs1 | ... |
| 09634565 | 003 | abde | ... |
| 24957234 | 001 | 5288 | ... |
| 24957234 | 004 | 1992 | ... |
| ... | ... | ... | ... |

| INSTALLATION ID (InstID) | REWARD USER ID (RewardUID) | APPLICATION ID (ApID) | NOTIFICATION TYPE (Ttype) |
|---|---|---|---|
| | | | |
| | | | |

| INSTALLATION ID (InstID) | APPLICATION ID (ApID) | APPLICATION USER ID (ApUID) |
|---|---|---|
| | | |
| | | |

MANAGEMENT DEVICE, MANAGEMENT METHOD, TERMINAL DEVICE, CONTROL METHOD, AND PROGRAM

TECHNICAL FIELD

The disclosure relates to a management device, a management method, a terminal device, a control method, and a program.

RELATED ART

The content of an application can be enjoyed by installing the application into user terminal, such as a smartphone. Applications such as these are registered so that they can be downloaded them from a store site that sells applications or from a dedicated site for each individual application. A user can download a desired application from these sites and install the application into his or her own user terminal.

An advertisement (banner) for an application not yet installed in the user terminal is displayed on the display screen displayed during use of an application installed in the user terminal. When the advertisement (banner) is selected, the user is guided to a store site or dedicated site as noted above. If the selected application is downloaded and installed into the user terminal, a reward is granted either to a provider (advertiser) of the original application displayed the advertisement (banner) that was the trigger for downloading or to this use by the user of the original application himself or herself, in a reward advertisement system. This is disclosed in Japanese Patent No. 5107455.

According to a reward advertisement system as described above, the granting of rewards provides an incentive to send customers between applications, and can lead to promotion of the sales of applications. For this reason, there has been a desire for a system that sends customers between applications more conveniently.

SUMMARY

In one aspect of the present invention, a management device includes: an application manager, a first information acquisitor, a first information notifier, and a reward processor. The application manager is configured to manage a set of application-related information which is related to a plurality of target applications which are subject to management. The first information acquisitor is configured to acquire a first information which has been transmitted from a terminal in response to that any target application included in the plurality of target applications has been executed by the terminal. The first information notifier is configured to transmit, to the terminal, a second information upon receipt of a request based on a first target application which has been executed by the terminal. The first target application is included in the plurality of target applications. The second information indicates at least one target application for which the first information has not been acquired from the terminal by the first information acquisitor. The reward processor is configured to perform a reward-granting process, based on that a second target application has been executed by the terminal or has become executable by the terminal. The second target application is included in the at least one target application which is indicated by the second information. The second information has been transmitted by the first information notifier.

BRIEF DESCRIPTION OF THE DRAWINGS

FIG. 7 shows an example of information stored in a target application information storage.

FIG. 8 shows an example of information stored in a normal reward information storage.

FIG. 9 shows an example of information stored in a campaign information storage.

FIG. 10 shows an example of information stored in a campaign participant application information storage.

FIG. 11 drawing an example of information stored in an installation information storage.

FIG. 12 shows an example of information stored in a customer transfer information storage.

FIG. 13 shows an example of information stored in a reward establishment information storage.

FIG. 16 shows an example of information stored in an inter-application filter storage.

FIG. 21 shows an example of information stored in a target application information storage according to the third embodiment.

FIG. 22 shows an example of information stored in an installation information storage according to the third embodiment.

FIG. 33 shows an example of information stored in an installation information storage according to the seventh embodiment.

FIG. 35 describes another example of information stored in an installation information storage according to the seventh embodiment.

DETAILED DESCRIPTIONS

Figure 1:
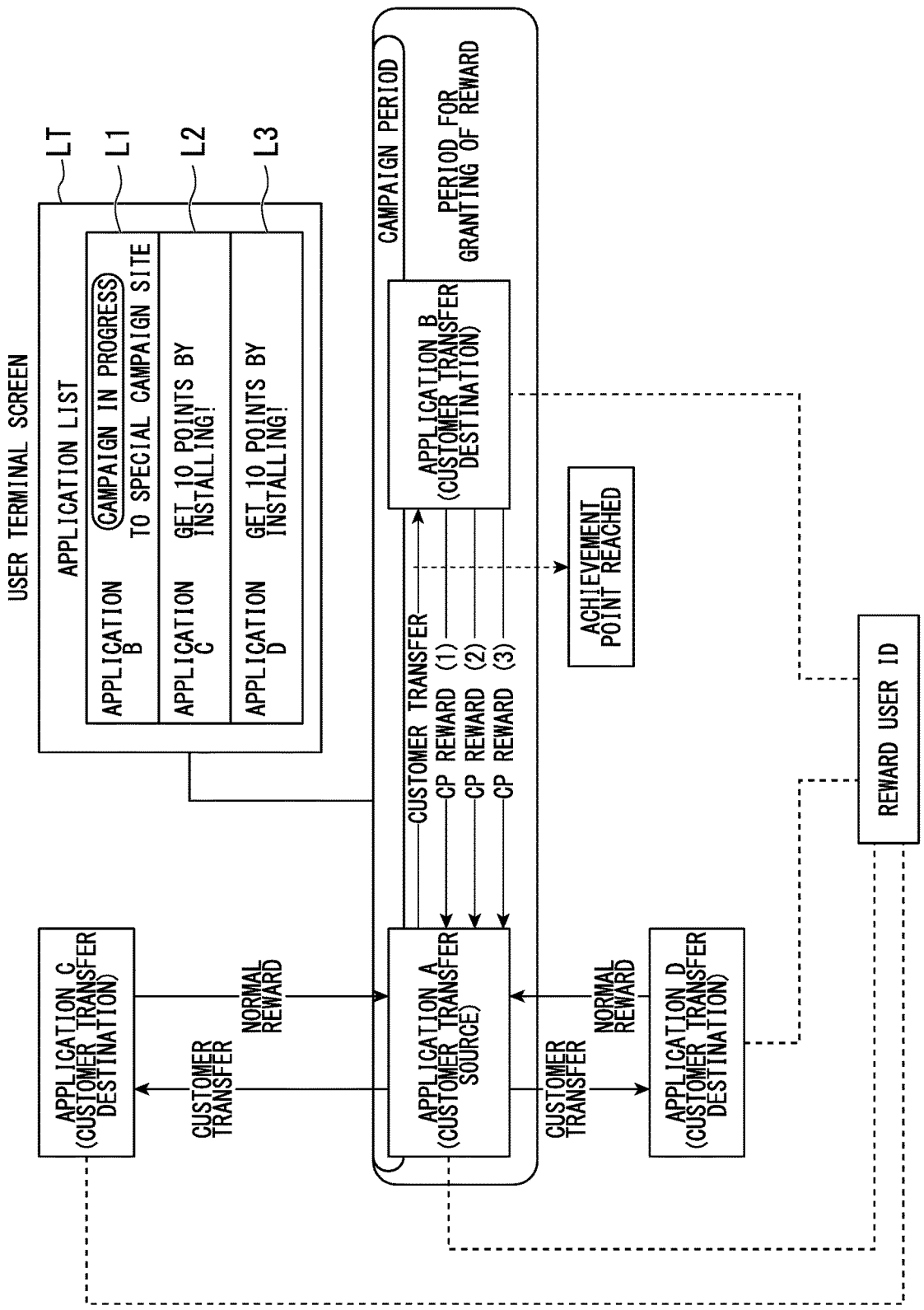
FIG. 1 is a simplified drawing describing a reciprocal customer transfer system of a first embodiment.

In one aspect of the present invention, a management device includes: an application manager, a first information acquisitor, a first information notifier, and a reward processor. The application manager is configured to manage a set of application-related information which is related to a plurality of target applications which are subject to management. The first information acquisitor is configured to acquire a first information which has been transmitted from a terminal in response to that any target application included in the plurality of target applications has been executed by the terminal. The first information notifier is configured to transmit, to the terminal, a second information upon receipt of a request based on a first target application which has been executed by the terminal. The first target application is included in the plurality of target applications. The second information indicates at least one target application for which the first information has not been acquired from the terminal by the first information acquisitor. The reward processor is configured to perform a reward-granting process, based on that a second target application has been executed by the terminal or has become executable by the terminal. The second target application is included in the at least one target application which is indicated by the second information. The second information has been transmitted by the first information notifier.

In some cases, the reward processor is configured to perform the reward-granting process, based on that the second target application has been executed by the terminal or has become executable by the terminal.

In some cases, the reward processor is configured to perform the reward-granting process, based on that the second target application has been executed by the terminal or has become executable by the terminal, and further based on that a reward-granting condition, which is set on the second target application, has been satisfied.

In some cases, the reward processor is configured to determine that the second target application has been executed by the terminal, based on that the first information acquisitor has acquired the first information which is associated with the second target application.

In some cases, the application manager is configured to manage information related to a first time period which is set on at least one of the plurality of target applications. The first information notifier is configured to transmit, to the terminal, the second information upon receipt of the request based on the first target application which has been executed by the terminal. The first target application is included in the at least one target application on which the first time period is set. The second information indicates the at least one target application, for which the first information has not been acquired from the terminal by the first information acquisitor. The reward processor is configured to perform the reward-granting process, based on that the second target application has been executed by the terminal or has become executable by the terminal in the first time period. The second target application is indicated by the second information which has been transmitted by the first information notifier.

In some cases, the reward processor is configured to perform the reward-granting process, based on that the second target application has been executed by the terminal or has become executable by the terminal in the first time period.

In some cases, the reward processor is configured to perform the reward-granting process, based on that the second target application has been executed by the terminal or has become executable by the terminal in the first time period, and further based on that a reward-granting condition, which is set on the second target application, has been satisfied.

In some cases, the reward processor is configured to determine that the second target application has been executed by the terminal in the first time period, based on that the first information acquisitor acquired the first information at a timing in the first time period, the first information is associated with the second target application.

In some cases, the reward processor is configured to perform the reward-granting process based on a reward-granting notification information indicating that the reward-granting condition set on the second target application has been satisfied, in a case that the reward processor has acquired the reward-granting notification information either from the second target application which has been executed by the terminal or from a server which is adaptable to execute the second target application.

In some cases, the first information acquisitor is configured to acquire the first information associated with a unique terminal identifier and with an application identifier, the unique terminal identifier identifies the terminal, and the application identifier identifies, amongst the plurality of target applications, any target application for which the first information has been transmitted. The management device further includes: a first information manager configured to manage a management information which is associated with the unique terminal identifier associated with the first information and the application identifier identifying the target application.

In some cases, the management device may, in some cases, further include: an application user information acquisitor configured to acquire an user information of any target application included in the plurality of target applications. The first information manager is configured to manage the user information in association with the management information.

In some cases, the management device may, in some cases, further include: an application user information acquisitor configured to acquire an user information of any target application included in the plurality of target applications. The reward processor is configured to transmit, to the first target application or to a server, a reward-granting information, based on that the reward-granting condition set on the second target application has been satisfied. The reward-granting information is associated with the user information of the first target application. The first target application has been executed by the terminal. The server is adaptable to the first target application.

In some cases, the management device may, in some cases, further include: a customer transfer information acquisitor and a customer transfer information manager. The customer transfer information acquisitor is configured to acquire a customer transfer information indicating a customer transfer to the second target application. The customer transfer information manager is configured to manage the customer transfer information acquired by the customer transfer information acquisitor. The reward processor is configured to perform the reward-granting process, under a condition that the customer transfer information associated with the second target application is managed by the customer transfer information manager, in case that the second target application has been executed by the terminal or has become executable by the terminal.

In some cases, the management device may, in some cases, further include: a customer transfer information acquisitor and a customer transfer information manager. The customer transfer information acquisitor is configured to acquire a customer transfer information indicating a customer transfer to the second target application. The customer transfer information manager is configured to manage the customer transfer information acquired by the customer transfer information acquisitor. The reward processor is configured to perform the reward-granting process, under a condition that the customer transfer information associated with the second target application is managed by the customer transfer information manager, in case that a reward-granting condition, which is set on the second target application, has been satisfied.

In some cases, the customer transfer information manager is configured to manage, as a record of the customer transfer information, an identification information of the second target application associated with a unique terminal identifier identifying the terminal.

In some cases, the customer transfer information manager is configured to manage, as a record of the customer transfer information, an identification information of the second target application associated with an application identifier identifying the first target application.

In some cases, the customer transfer information acquisitor is configured to acquire the customer transfer information associated with a unique terminal identifier identifying the terminal, associated with a first application identifier identifying the first target application, and associated with a second application identifier identifying the second target application. The customer transfer information manager is configured to manage the unique terminal identifier, the first application identifier and the second application identifier as a record of the customer transfer information.

In some cases, the management device may, in some cases, further include: a screen information notifier configured to transmit, to the terminal, a screen information which can be used for the terminal to display a screen, the screen allowing installation of the second target application.

In some cases, the reward processor is configured to be prohibited from performing the reward-granting process in another time period which does not overlap the first time period, the other time period having been set on at least a part of the target applications on which the first time period has been set, under a condition that that the at least part of the target applications has been executed by the terminal in the first time period.

In some cases, the application manager is configured to manage information related to at least an end of a second time period, the second time period ends after the first time period ends, and the second time period includes a part or all of the first time period. The reward processor is configured to perform the reward-granting process, based on that the reward-granting condition was satisfied in the second time period.

In some cases, the application manager is configured to manage information related to at least an end of a second time period, the second time period ends after the first time period ends, and the second time period includes a part or all of the first time period. The reward processor is configured to perform the reward-granting process, based on a reward-granting notification information indicating that the reward-granting condition has been satisfied, in case that the reward processor acquired the reward-granting notification information from the second target application in the second time period.

In some cases, a plurality of reward-granting conditions is set on the second target application. The reward processor is configured to perform the reward-granting process, based on that any one of the plurality of reward-granting conditions was satisfied in the second time period.

In some cases, a plurality of reward-granting conditions is set on the second target application. The reward processor is configured to perform the reward-granting process based on the reward-granting notification information, in case that the reward processor has acquired, in the second time period from the second target application, the reward-granting notification information based on that any one of the plurality of reward-granting conditions was satisfied.

In some cases, the plurality of reward-granting conditions includes respective timings of reaching to a plurality of achievement points during the processes of the second target application. The reward processor is configured to acquire, from the second target application, the reward-granting notification information associated with an achievement point information which indicates a reached achievement point included in the plurality of achievement points, based on that the reward-granting condition was satisfied. The reward processor is configured to transmit, to the first application executed by the terminal or a server adaptable to the first application, the reward-granting notification information associated with the achievement point information.

In some cases, the plurality of reward-granting conditions include respective timings of reaching to a plurality of achievement points during the processes of the second target application. The reward processor is configured to acquire, from the second target application, the reward-granting notification information associated with a reach information which indicates that a reach is made to any one of the plurality of achievement points, based on that the reward-granting condition was satisfied. The reward processor is configured to transmit, to the first application executed by the terminal or a server adaptable to the first application, a reward-granting information every time the reward processor acquires the reward-granting notification information associated with the reach information. The reward-granting information is related to the number of acquisition times that the reward processor has acquired the reward-granting notification information associated with the reach information.

In some cases, the plurality of reward-granting conditions include respective timings of reaching to a plurality of achievement points during the processes of the second target application. The reward processor is configured to acquire, from the second target application, the reward-granting notification information associated with a reach information which indicates that a reach is made to any one of the plurality of achievement points, based on that the reward-granting condition was satisfied. The reward processor is configured to transmit, to the first application executed by the terminal or a server adaptable to the first application, the reward-granting notification information associated with the achievement point information.

In some cases, the terminal is identified by a unique terminal identifier. The unique terminal identifier is acquired by the terminal upon execution by the terminal of a first-installed target application which had first been installed in the terminal. The first-installed target application is included in the plurality of target applications. The unique terminal identifier is stored in the terminal where the unique terminal identifier is browsable to every target application which has been executed by the terminal.

In some cases, the management device may, in some cases, further include: a transceiver configured to transmit and receive at least one of the first information and the second information to and from the terminal directly or through a server adaptable to the first target application or another server adaptable to the second target application.

In some cases, the transceiver is configured to communicate directly with the terminal after the transceiver has established a communication session to the first target application or the second target application through the server.

In another aspect of the present invention, a management device may include, but is not limited to, an application manager, a first information acquisitor, a first information manager, a first information notifier, a customer transfer information acquisitor, a screen information notifier, and a reward processor. The application manager is configured to manage information related to a first time period which is set on at least a specific target application which is included in a plurality of target applications which are subject to management. The first information acquisitor is configured to acquire, from a terminal, a first information associated with a unique terminal identifier and with an application identifier, the first information having been transmitted from the terminal in response to that any target application included in the plurality of target applications has been executed by the terminal, the unique terminal identifier identifying the terminal, and the application identifier identifying the target application executed. The first information manager is configured to manage the unique terminal identifier associated with the first information and the application identifier identifying the target application in association with the unique terminal identifier. The first information notifier is configured to refer to the application manager and the first information manager, the first information notifier being configured to transmit, to the terminal, a second information upon receipt of a request based on a first target application which has been executed by the terminal. The first target application is included in the at least one specific target application. The second information indicates at least one specific target application for which the first information has not been acquired from the terminal by the first information acquisitor. The customer transfer information acquisitor is configured to acquire, from the terminal, a customer transfer information indicating a customer transfer from the first target application to a second target application. The customer transfer information includes a first application identifier, a second application identifier and the unique terminal identifier which are associated with each other. The first application identifier identifies the first target application. The second application identifier identifies the second target application included in the at least one specific target application indicated by the second information. The unique terminal identifier identifies the terminal. The screen information notifier is configured to transmit, to the terminal, a screen information which can be used for the terminal to display a screen. The screen allows installation of the second target application based on the second application identifier which is associated with the customer transfer information acquired by the customer transfer information acquisitor. The reward processor is configured to transmit, to the first target application executed by the terminal or to a server adaptable to the first target application, a reward-granting information, based on a reward-granting notification information which has been acquired from the second target application executed by the terminal or to a server adaptable to the second target application. The reward-granting information is associated with a user information of the first target application associated with the first application identifier. The reward-granting notification information is associated with the unique terminal identifier identifying the terminal and with the second application identifier identifying the second target application. The reward-granting notification information has been acquired based on that the second target application was executed or became executable by the terminal in the first time period and based on that a reward-granting condition set on the second target application has been satisfied.

In some cases, the management device may, in some cases, further include: a transceiver configured to transmit and receive at least one of the first information, the second information, the customer transfer information, the screen information, and the reward-granting notification information, to and from the terminal directly or through a server adaptable to the first target application or another server adaptable to the second target application.

In some cases, the transceiver is configured to communicate directly with the terminal after the transceiver has established a communication session to the first target application or the second target application through the server.

In still another aspect of the present invention, a management method may include, but is not limited to, managing a set of application-related information which is related to a plurality of target applications which are subject to management; acquiring a first information which has been transmitted from a terminal in response to that any target application included in the plurality of target applications has been executed by the terminal; transmitting, to the terminal, a second information upon receipt of a request based on a first target application which has been executed by the terminal, the first target application being included in the plurality of target applications, the second information indicating at least one target application for which the first information has not been acquired from the terminal; and performing a reward-granting process, based on that a second target application has been executed by the terminal or has become executable by the terminal, the second target application being included in the at least one target application which is indicated by the second information, the second information having been transmitted.

In still another aspect of the present invention, a management method may include, but is not limited to, managing information related to a first time period which is set on at least a specific target application which is included in a plurality of target applications which are subject to management; acquiring, from a terminal, a first information associated with a unique terminal identifier and with an application identifier, the first information having been transmitted from the terminal in response to that any target application included in the plurality of target applications has been executed by the terminal, the unique terminal identifier identifying the terminal, and the application identifier identifying the target application executed; managing the unique terminal identifier associated with the first information and the application identifier identifying the target application in association with the unique terminal identifier; transmitting, to the terminal, a second information upon receipt of a request based on a first target application which has been executed by the terminal, the first target application being included in the at least one specific target application, the second information indicating at least one specific target application for which the first information has not been acquired from the terminal; acquiring, from the terminal, a customer transfer information indicating a customer transfer from the first target application to a second target application, the customer transfer information including a first application identifier, a second application identifier and the unique terminal identifier which are associated with each other, the first application identifier identifying the first target application, the second application identifier identifying the second target application included in the at least one specific target application indicated by the second information; transmitting, to the terminal, a screen information which can be used for the terminal to display a screen, the screen allowing installation of the second target application based on the second application identifier which is associated with the customer transfer information acquired; and transmitting, to the first target application executed by the terminal or to a server adaptable to the first target application, a reward-granting information, based on a reward-granting notification information which has been acquired from the second target application executed by the terminal or to a server adaptable to the second target application, wherein the reward-granting information is associated with a user information of the first target application associated with the first application identifier, the reward-granting notification information is associated with the unique terminal identifier identifying the terminal and with the second application identifier identifying the second target application, the reward-granting notification information has been acquired based on that the second target application was executed or became executable by the terminal in the first time period and based on that a reward-granting condition set on the second target application has been satisfied.

In still another aspect of the present invention, a non-transitory computer readable storage medium stores a computer program to be executed by a computer to perform a management method may include, but is not limited to, managing a set of application-related information which is related to a plurality of target applications which are subject to management; acquiring a first information which has been transmitted from a terminal in response to that any target application included in the plurality of target applications has been executed by the terminal; transmitting, to the terminal, a second information upon receipt of a request based on a first target application which has been executed by the terminal, the first target application being included in the plurality of target applications, the second information indicating at least one target application for which the first information has not been acquired from the terminal; and performing a reward-granting process, based on that a second target application has been executed by the terminal or has become executable by the terminal, the second target application being included in the at least one target application which is indicated by the second information. The second information has been transmitted.

In still another aspect of the present invention, a non-transitory computer readable storage medium stores a computer program to be executed by a computer to perform a management method may include, but is not limited to, managing information related to a first time period which is set on at least a specific target application which is included in a plurality of target applications which are subject to management; acquiring, from a terminal, a first information associated with a unique terminal identifier and with an application identifier, the first information having been transmitted from the terminal in response to that any target application included in the plurality of target applications has been executed by the terminal, the unique terminal identifier identifying the terminal, and the application identifier identifying the target application executed; managing the unique terminal identifier associated with the first information and the application identifier identifying the target application in association with the unique terminal identifier; transmitting, to the terminal, a second information upon receipt of a request based on a first target application which has been executed by the terminal, the first target application being included in the at least one specific target application, the second information indicating at least one specific target application for which the first information has not been acquired from the terminal; acquiring, from the terminal, a customer transfer information indicating a customer transfer from the first target application to a second target application, the customer transfer information including a first application identifier, a second application identifier and the unique terminal identifier which are associated with each other, the first application identifier identifying the first target application, the second application identifier identifying the second target application included in the at least one specific target application indicated by the second information; transmitting, to the terminal, a screen information which can be used for the terminal to display a screen, the screen allowing installation of the second target application based on the second application identifier which is associated with the customer transfer information acquired; and transmitting, to the first target application executed by the terminal or to a server adaptable to the first target application, a reward-granting information, based on a reward-granting notification information which has been acquired from the second target application executed by the terminal or to a server adaptable to the second target application, wherein the reward-granting information is associated with a user information of the first target application associated with the first application identifier, the reward-granting notification information is associated with the unique terminal identifier identifying the terminal and with the second application identifier identifying the second target application, the reward-granting notification information has been acquired based on that the second target application was executed or became executable by the terminal in the first time period and based on that a reward-granting condition set on the second target application has been satisfied.

In yet another aspect of the present invention, a management device may include, but is not limited to, an application manager configured to manage a set of application-related information which is related to a plurality of target applications which are subject to management; a first information acquisitor configured to acquire a first information which has been transmitted from a terminal in response to that any target application included in the plurality of target applications has been executed by the terminal; a first information notifier configured to transmit, to the terminal, a second information upon receipt of a request based on a first target application which has been executed by the terminal, the first target application being included in the plurality of target applications, the second information indicating at least one target application for which the first information has not been acquired from the terminal by the first information acquisitor; and a reward processor configured to perform a reward-granting process, based on that a second target application has been executed by the terminal, the second target application being included in the at least one target application which is indicated by the second information, the second information having been transmitted by the first information notifier.

In an additional aspect of the present invention, a management device may include, but is not limited to, an application manager configured to manage a set of application-related information which is related to a plurality of target applications which are subject to management; a first information acquisitor configured to acquire a first information which has been transmitted from a terminal in response to that any target application included in the plurality of target applications has been executed by the terminal; a first information notifier configured to transmit, to the terminal, a second information upon receipt of a request based on a first target application which has been executed by the terminal, the first target application being included in the plurality of target applications, the second information allowing for determining at least one target application for which the first information has not been acquired from the terminal by the first information acquisitor; and a reward processor configured to perform a reward-granting process, based on that a second target application has been executed by the terminal, the second target application being included in the at least one target application which is indicated by the second information, the second information having been transmitted by the first information notifier.

In some cases, the first information acquisitor is configured to acquire the first information which has been transmitted from any target application included in the plurality of target applications, in case that the target application has been executed by the terminal. The reward processor is configured to perform a reward-granting process, based on that the first information acquisitor has acquired the first information which had been transmitted from the second target application in the terminal.

In an additional aspect of the present invention, a management device may include, but is not limited to, an application manager configured to manage a set of application-related information which is related to a plurality of target applications which are subject to management; a first information acquisitor configured to acquire a first information which has been transmitted from any target application included in the plurality of target applications in response to that the target application has been executed by a terminal; a first information notifier configured to transmit, to the terminal, a second information upon receipt of a request based on a first target application which has been executed by the terminal, the first target application being included in the plurality of target applications, the second information indicating at least one target application for which the first information has not been acquired from the terminal by the first information acquisitor; and a reward processor configured to perform a reward-granting process, based on that the first information acquisitor has acquired the first information which had been transmitted from the second target application being included in the at least one target application, the at least one target application being indicated by the second information, the second information having been transmitted by the first information notifier.

In an additional aspect of the present invention, a management device may include, but is not limited to, an application manager configured to manage a set of application-related information which is related to a plurality of target applications which are subject to management; a first information acquisitor configured to acquire, from a terminal, a first information associated with a unique terminal identifier and with an application identifier, the first information having been transmitted from the terminal in response to that any target application included in the plurality of target applications has transmitted the first information, the unique terminal identifier identifying the terminal, and the application identifier identifying the target application having transmitted the first information; an application user information acquisitor configured to acquire a user information of the target application which has transmitted the first information; a first information manager configured to manage a management information, the management information including the unique terminal identifier associated with the first information, an application identifier identifying the target application which has transmitted the first information, and a user information of the target application which has transmitted the first information, and the unique terminal identifier, the application identifier and the user information being associated with each other; a first information notifier configured to transmit, to the terminal, a second information upon receipt of a request based on a first target application which has been executed by the terminal, the first target application being included in the plurality of target applications, the second information indicating at least one target application for which the first information has not been acquired from the terminal by the first information acquisitor; a customer transfer information acquisitor configured to acquire a customer transfer information indicating a customer transfer from the first target application to the second target application, the customer transfer information including a first application identifier, a second application identifier and the unique terminal identifier which are associated with each other, the first application identifier identifying the first target application, the second application identifier identifying the second target application included in the at least one specific target application indicated by the second information; a customer transfer information manager configured to manage the customer transfer information acquired by the customer transfer information acquisitor; and a reward processor configured to perform a reward-granting process, based on the management information managed by the first information manager, under a condition that the customer transfer information regarding the second target application is managed by the customer transfer information manager, in case that the second target application has been executed by the terminal.

In an additional aspect of the present invention, a management device may include, but is not limited to, an application manager configured to manage a set of application-related information which is related to a plurality of target applications which are subject to management; a first information acquisitor configured to acquire, from a terminal, a first information associated with a unique terminal identifier and with an application identifier, the first information having been transmitted from the terminal in response to that any target application included in the plurality of target applications has transmitted the first information, the unique terminal identifier identifying the terminal, and the application identifier identifying the target application having transmitted the first information; an application user information acquisitor configured to acquire a user information of the target application which has transmitted the first information; a first information manager configured to manage a management information, the management information including the unique terminal identifier associated with the first information, an application identifier identifying the target application which has transmitted the first information, and a user information of the target application which has transmitted the first information, and the unique terminal identifier, the application identifier and the user information being associated with each other; a first information notifier configured to transmit, to the terminal, a second information upon receipt of a request based on a first target application which has been executed by the terminal, the first target application being included in the plurality of target applications, the second information indicating at least one target application being included in the plurality of target applications; a customer transfer information acquisitor configured to acquire a customer transfer information indicating a customer transfer to the second target application, the customer transfer information including a first application identifier, a second application identifier and the unique terminal identifier which are associated with each other, the first application identifier identifying the first target application, the second application identifier identifying the second target application included in the at least one specific target application indicated by the second information; a customer transfer information manager configured to manage the customer transfer information acquired by the customer transfer information acquisitor; and a reward processor configured to perform a reward-granting process, based on the management information managed by the first information manager, under a condition that the customer transfer information regarding the second target application is managed by the customer transfer information manager, in case that the second target application has been executed by the terminal.

In some cases, the reward processor is configured to transmit, to the first target application executed by the terminal or to a server adaptable to the first target application, a reward-granting information, based on the management information managed by the first information manager, wherein the reward-granting information is associated with a user information of the first target application.

In some cases, the reward processor is configured to perform the reward-granting process, under a condition that the customer transfer information regarding the second target application is managed by the customer transfer information manager, in case that the second target application has been executed by the terminal, and that a reward-granting condition, which is set on the second target application, has been satisfied.

In an additional aspect of the present invention, a management device may include, but is not limited to, an application manager configured to manage a set of application-related information which is related to a plurality of target applications which are subject to management; a first information acquisitor configured to acquire a first information which has been transmitted from a terminal in response to that any target application included in the plurality of target applications has been executed by the terminal; a first information notifier configured to extract, based on the first information from the plurality of target applications, at least one target application for which the first information has not been acquired by the first information acquisitor from the terminal, upon receipt of a request based on a first target application which has been executed by the terminal and which is included in the plurality of target applications, the first information notifier being configured to transmit, to the terminal, a second information indicating the at least one target application extracted; and a reward processor configured to perform a reward-granting process, based on that a second target application has been executed by the terminal, the second target application being included in the at least one target application which is indicated by the second information, the second information having been transmitted by the first information notifier.

In some cases, the first information is associated with an application identification information identifying the at least one target application in the terminal.

In some cases, the management device may, in some cases, further include: a first information manager configured to manage the first information that the first information acquisitor has acquired. The first information notifier is configured to extract the at least one target application for which the first information has not been acquired by the first information acquisitor from the terminal, based on the first information managed by the first information manager, the first information notifier being configured to transmit, to the terminal, the second information indicating the at least one target application extracted.

In an additional aspect of the present invention, a management device may include, but is not limited to, an application manager configured to manage a set of application-related information which is related to a plurality of target applications which are subject to management; a first information acquisitor configured to acquire a first information which has been transmitted from a terminal in response to that any target application included in the plurality of target applications has been executed by the terminal; a first information manager configured to manage the first information that the first information acquisitor has acquired; a first information notifier configured to transmit, to the terminal, a second information, based on the first information managed by the first information manager, upon receipt of a request based on a first target application which has been executed by the terminal, the first target application being included in the plurality of target applications, the second information indicating at least one target application for which the first information has not been acquired from the terminal by the first information acquisitor; and a reward processor configured to perform a reward-granting process, based on that a second target application has been executed by the terminal, the second target application being included in the at least one target application which is indicated by the second information, the second information having been transmitted by the first information notifier.

In some cases, the first information notifier is configured to extract, from the plurality of target applications, the at least one target application for which the first information has not been acquired by the first information acquisitor from the terminal, based on the first information managed by the first information manager, the first information is being configured to transmit, to the terminal, the second information indicating the at least one target application extracted.

In an additional aspect of the present invention, a management device may include, but is not limited to, an application manager configured to manage information related to a first time period which is set on at least one target application of the plurality of target applications which are subject to management; a first information acquisitor configured to acquire a first information which has been transmitted from a terminal in response to that any target application included in the plurality of target applications has been executed by the terminal; a first information notifier configured to transmit, to the terminal, a second information upon receipt of a request based on a first target application which has been executed by the terminal, the first target application being included in the at least one target application on which the first time period is set, the second information indicating the at least one target application, for which the first information has not been acquired from the terminal by the first information acquisitor; and a reward processor configured to perform a reward-granting process, based on that a second target application has been executed by the terminal in the first time period, the second target application being included in the at least one target application indicated by the second information which has been transmitted by the first information notifier.

In some cases, the reward processor is configured to determine whether the second target application, which is included in the at least one target application indicated by the second information which has been transmitted by the first information notifier, has been executed by the terminal in the first time period. The reward processor is configured to perform the reward-granting process in case that the reward processor is configured to determine that the second target application has been executed by the terminal in the first time period.

In some cases, the reward processor is configured to determine whether the second target application, which is included in the at least one target application indicated by the second information which has been transmitted by the first information notifier, has been executed by the terminal in the first time period. The reward processor is configured to perform the reward-granting process in case that the reward processor is configured to determine that the second target application has been executed by the terminal in the first time period, and that a reward-granting condition, which is set on the second target application, has been satisfied.

In some cases, the reward processor is configured to refer information related to the first time period which has been set on the second target application managed by the application manager, in case that the first information acquisitor has acquired the first information which was transmitted from the terminal in response to that the second target application has been executed by the terminal. The reward processor is configured to determine, based on the information related to the first time period, whether or not a timing that the first information acquisitor has acquired the first information is in the first time period set on the second target application, to determine whether or not the second target application has been executed by the terminal in the first time period.

In some cases, the reward processor is configured to refer information related to the first time period which has been set on at least a part of the plurality of target applications managed by the application manager, in case that the first information acquisitor has acquired the first information which was transmitted from the terminal in response to that the second target application has been executed by the terminal. The reward processor is configured to determine, based on the information related to the first time period, whether or not the first time period is set on each of the first target application and the second target application. The reward processor is configured to determine whether a timing that the first information acquisitor has acquired the first information is in the first time period, to determine whether or not the second target application has been executed by the terminal in the first time period, in case that the reward processor has determined that the first time period is set on each of the first target application and the second target application.

In some cases, the management device may, in some cases, further include: a customer transfer information acquisitor configured to acquire a customer transfer information indicating a customer transfer from the first target application to the second target application; and a customer transfer information manager configured to manage the customer transfer information acquired by the customer transfer information acquisitor. The reward processor is configured to perform the reward-granting process, under a condition that the customer transfer information manager manages the customer transfer information, which is associated with the second target application and associated with information indicating that the first time period is set.

In some cases, the customer transfer information acquisitor is configured to acquire the customer transfer information associated with information indicating that the first time period is set. The customer transfer information manager is configured to manage the customer transfer information acquired by the customer transfer information acquisitor, the customer transfer information is associated with the information indicating that the first time period is set.

In some cases, the customer transfer information manager is configured to manage the customer transfer information acquired by the customer transfer information acquisitor, the customer transfer information is associated with the information indicating that the first time period is set on the first target application.

In some cases, the first information notifier is configured to transmit, to the terminal, the second information upon receipt of the request based on the first target application on which the first time period is set, the second information which includes only information indicating at least one target application, for which the first information has not been acquired from the terminal by the first information acquisitor, the first time period is set on the at least one target application.

In some cases, the customer transfer information manager is configured to refer information related to the first time period which has been set on at least a part of the plurality of target applications managed by the application manager. The customer transfer information manager is configured to determine, based on the information related to the first time period, whether or not the first time period is set on each of the first target application and the second target application which are both indicated by the customer transfer information that the customer transfer information acquisitor has acquired. The customer transfer information manager is configured to manage the customer transfer information associated with the information indicating that the first time period, in case that the customer transfer information manager has determined that the first time period is set on each of the first target application and the second target application.

In some cases, the management device may, in some cases, further include: a customer transfer information acquisitor configured to acquire a customer transfer information indicating a customer transfer from the first target application to the second target application; and a customer transfer information manager configured to manage the customer transfer information acquired by the customer transfer information acquisitor. The reward processor is configured to perform the reward-granting process, under conditions that the customer transfer information manager manages the customer transfer information, which is associated with the second target application and that the first time period is set on the second target application and the first target application that the customer transfer information indicates, in case that the second target application was executed by the terminal in the first time period.

In some cases, the reward processor is configured to refer information related to the first time period which has been set on at least a part of the plurality of target applications managed by the application manager, to determine whether or not the first time period is set on each of the first target application and the second target application. In an additional aspect of the present invention, a management device may include, but is not limited to, an application manager configured to manage information related to a first time period which is set on at least one target application of the plurality of target applications which are subject to management; a first information acquisitor configured to acquire a first information which has been transmitted from a terminal in response to that any target application included in the plurality of target applications has been executed by the terminal; a first information notifier configured to transmit, to the terminal, a second information and information related to a first time period, upon receipt of a request based on a first target application which has been executed by the terminal, the first target application being included in at least one target application on which the first time period is set, the second information indicating the at least one target application, for which the first information has not been acquired from the terminal by the first information acquisitor, and the information related to the first time period being managed by the application manager; and a reward processor configured to perform a reward-granting process, based on that a second target application has been executed by the terminal in the first time period, the second target application being included in the at least one target application indicated by the second information which has been transmitted by the first information notifier.

In an additional aspect of the present invention, a management device may include, but is not limited to, an application manager configured to manage information related to a first time period which is set on a plurality of specific target applications which are included in a plurality of target applications which are subject to management; a first information acquisitor configured to acquire a first information which has been transmitted from a terminal in response to that any target application included in the plurality of target applications has been executed by the terminal; a first information notifier configured to transmit, to the terminal, a second information, upon receipt of a request based on a first target application which has been executed by the terminal, the first target application being included in at least one target application, the second information indicating the at least one target application, for which the first information has not been acquired from the terminal by the first information acquisitor; and a reward processor configured to perform a reward-granting process, based on that, in the first time period, a second target application has been executed by the terminal or has become executable by the terminal, in case that the first time period has been set on the second target application being included in the at least one target application which is indicated by the second information, the second information having been transmitted by the first information notifier, the reward processor being configured to perform the reward-granting process, based on that the second target application has been executed by the terminal or has become executable by the terminal, in case that the first time period has not been set on the second target application.

In some cases, the reward processor is configured to perform a first reward-granting process as the reward-granting process, based on that, in the first time period, the second target application has been executed by the terminal or has become executable by the terminal, in case that the first time period has been set on the second target application.

In some cases, the reward processor is configured to perform a first reward-granting process as the reward-granting process, based on that, in the first time period, the second target application has been executed by the terminal or has become executable by the terminal, and based on that a reward-granting condition set on the second target application has been satisfied, in case that the first time period has been set on the second target application.

In some cases, the reward processor is configured to perform a second reward-granting process as the reward-granting process, based on that the second target application has been executed by the terminal or has become executable by the terminal, in case that the first time period has not been set on the second target application.

In some cases, the reward processor is configured to perform a second reward-granting process as the reward-granting process, based on that the second target application has been executed by the terminal or has become executable by the terminal, and based on that a reward-granting condition set on the second target application has been satisfied, in case that the first time period has not been set on the second target application.

In some cases, the reward processor is configured to perform the reward-granting process based on a reward-granting notification information indicating that the reward-granting condition set on the second target application was satisfied, in case that the reward processor has acquired the reward-granting notification information from the second target application which has been executed by the terminal or from a server adaptable to the second target application.

In some cases, the reward processor is configured to perform the second reward-granting process in case that the second target application was executed or become executable out of the first time period even the first time period is set on the second target application.

In some cases, the reward processor is configured to determine that the second target application was executed by the terminal, in case that the first information acquisitor has acquired the first information regarding the second target application.

In some cases, the reward processor is configured to determine whether the second target application was executed by the terminal in the first time period or out of the first time period, based on whether the timing that the first information acquisitor acquired the first information regarding the second target application is in the first time period or out of the first time period.

In some cases, the application manager is configured to manage a first listing-prohibition information which is associated with a listing-prohibited-application and a listed-prohibited-application, where the listing-prohibited-application is an application which is set to prohibit listing of the listed-prohibited-application based on the second information, and the listed-prohibited-application is an application which is subject to prohibition from being listed on the listing-prohibited-application. The first information notifier is configured to transmit, to the terminal, a remainder information obtained by excluding an information identifying the listing-prohibited-application from the second information, in case that the first information notifier referred to the first listing-prohibition information managed by the application manager and determined that there is the listing-prohibition information indicating that the first target application is set to be the listed-prohibited-application.

In some cases, the first information notifier is configured to transmit, to the terminal, a remainder information obtained by excluding an information identifying the listed-prohibited-application from the second information, in case that the first information notifier referred to the first listing-prohibition information managed by the application manager and determined that there is the listing-prohibition information indicating that the first target application is set to be the listing-prohibited-application.

In some cases, the application manager is configured to manage a second listing-prohibition information indicating a listed-prohibited-application, where the listed-prohibited-application is an application which is subject to prohibition from being listed based on the second information. The first information notifier is configured to transmit, to the terminal, a remainder information obtained by excluding an information identifying the listed-prohibited-application from the second information, in case that the first information notifier referred to the second listing-prohibition information managed by the application manager and determined that the first time period is not set on the listed-prohibited-application indicated by the second listing-prohibition information and on the first target application.

In some cases, the management device may, in some cases, further include: a first reward information manager configured to manage a first reward information indicating a link destination of a list location of a first reward which is to be granted by a first reward-granting process as the reward-granting process in case that a first time period is set on the second target application; a second reward information manager configured to manage a second reward information in which each of the plurality of target applications is associated with information of a second reward which is to be granted by a second reward-granting process as the reward-granting process in case that the first time period is set on each of the plurality of target applications, wherein the first information notifier is configured to transmit, to the terminal, the second information in which information indicating the second reward is associated with information indicating any target application which is not set with the first time period with the first target application included in the plurality of target applications, and wherein the first information notifier is configured to transmit, to the terminal, the second information in which information indicating the link destination is associated with information indicating any target application which is set with the first time period with the first target application included in the plurality of target applications.

In some cases, the management device may, in some cases, further include: a customer transfer information acquisitor configured to acquire a customer transfer information indicating a customer transfer to the second target application; and a customer transfer information manager configured to manage the customer transfer information acquired by the customer transfer information acquisitor. The reward processor is configured to perform the reward-granting process, under conditions that the customer transfer information manager manages the customer transfer information, which is associated with the second target application, in case that the second target application was executed by the terminal.

In some cases, the management device may, in some cases, further include: a customer transfer information acquisitor configured to acquire a customer transfer information indicating a customer transfer to the second target application; and a customer transfer information manager configured to manage the customer transfer information acquired by the customer transfer information acquisitor. The reward processor is configured to perform the reward-granting process, under conditions that the customer transfer information manager manages the customer transfer information, which is associated with the second target application, in case that the reward-granting condition set on the second target application has been satisfied.

In some cases, the customer transfer information manager is configured to manage a second-application identifier associated with a unique terminal identifier as a record of the customer transfer information, where the second-application identifier identifies the second target application, and the unique terminal identifier identifies the terminal.

In some cases, the customer transfer information manager is configured to manage a second-application identifier associated with a first-application identifier as a record of the customer transfer information, where the first-application identifier identifies the first target application, and the second-application identifier identifies the second target application.

In some cases, the customer transfer information acquisitor is configured to acquire, as the customer transfer information, a unique terminal identifier, a first-application identifier and a second-application identifier in association with each other, the unique terminal identifier identifies the terminal, the first-application identifier identifies the first target application, and the second-application identifier identifies the second target application. The customer transfer information manager is configured to manage as the customer transfer information, the unique terminal identifier, the first-application identifier and the second-application identifier in association with each other.

In some cases, the management device may, in some cases, further include: a screen information notifier configured to transmit, to the terminal, a screen information which can be used for the terminal to display a screen, the screen allowing installation of the second target application, based on the second-application identifier associated with the customer transfer information that the customer transfer information acquisitor has acquired.

In some cases, the reward processor is configured to be prohibited from performing the reward-granting process in another time period which does not overlap the first time period, the other time period having been set on at least a part of the plurality of target applications on which the first time period has been set, under a condition that that the reward-granting process in the first time period set on the second target application has been performed by the terminal.

In some cases, the reward processor is configured to be prohibited from performing a first one of first and second reward-granting processes in case that the reward processor has performed the second one of the first and second reward-granting processes, the first reward-granting process is to be performed as the reward-granting process in case that the first time period is set on the second target application, and the second reward-granting process is to be performed as the reward-granting process in case that the first time period is not set on the second target application.

In an additional aspect of the present invention, a management device may include, but is not limited to, an application manager configured to manage information related to a first time period which is set on a plurality of specific target applications which are included in a plurality of target applications which are subject to management; a first information acquisitor configured to acquire, from a terminal, a first information associated with a unique terminal identifier and with an application identifier, the first information having been transmitted from the terminal in response to that any target application included in the plurality of target applications has been executed by the terminal, the unique terminal identifier identifying the terminal, and the application identifier identifying the target application executed; a first information manager configured to manage the unique terminal identifier and the application identifier in association with each other, the unique terminal identifier being associated with the first information that the first information acquisitor has acquired, the application identifier identifying the target application; a first information notifier configured to refer to the application manager and the first information manager, the first information notifier being configured to transmit, to the terminal, a second information upon receipt of a request based on a first target application which has been executed by the terminal, the first target application being included in the plurality of target applications, the second information indicating at least one specific target application for which the first information has not been acquired from the terminal by the first information acquisitor; a customer transfer information acquisitor configured to acquire, from the terminal, a customer transfer information indicating a customer transfer from the first target application to a second target application, the customer transfer information including a first application identifier, a second application identifier and a unique terminal identifier which are associated with each other, the first application identifier identifying the first target application, the second application identifier identifying the second target application included in the at least one specific target application indicated by the second information, the unique terminal identifier identifying the terminal; a screen information notifier configured to transmit, to the terminal, a screen information which can be used for the terminal to display a screen, the screen allowing installation of the second target application based on the second application identifier which is associated with the customer transfer information acquired by the customer transfer information acquisitor; and a reward processor configured to transmit, to the first target application executed by the terminal or to a server adaptable to the first target application, a reward-granting information, based on a reward-granting notification information, under conditions that the second target application was executed or became executable by the terminal in the first time period and that a reward-granting condition set on the second target application has been satisfied in case that the first time period has been set on the second target application which was selected by the second terminal, wherein the reward-granting information is associated with a user information of the first target application associated with the unite terminal identifier, the reward-granting notification information is associated with the unique terminal identifier and the second-application identifier, and the unique terminal identifier and the second-application identifier have been acquired from the second target application which had been executed by the terminal or to a server adaptable to the second target application. The reward processor is configured to perform the reward-granting process, under a condition that the second target application has been executed or became executable by the terminal in case that the first time period has been set on the second target application which was selected by the second terminal.

In an additional aspect of the present invention, a management method may include, but is not limited to, managing information related to a first time period which is set on a plurality of specific target applications which are included in a plurality of target applications which are subject to management; acquiring a first information which has been transmitted from a terminal in response to that any target application included in the plurality of target applications has been executed by the terminal; transmitting, to the terminal, a second information, upon receipt of a request based on a first target application which has been executed by the terminal, the first target application being included in at least one target application, the second information indicating the at least one target application, for which the first information has not been acquired from the terminal; and performing a reward-granting process, based on that, in the first time period, a second target application has been executed by the terminal or has become executable by the terminal, in case that the first time period has been set on the second target application being included in the at least one target application which is indicated by the second information, the second information having been transmitted by the first information notifier; wherein the reward-granting process is performed based on that the second target application has been executed by the terminal or has become executable by the terminal, in case that the first time period has not been set on the second target application.

In an additional aspect of the present invention, a management method may include, but is not limited to, managing information related to a first time period which is set on a plurality of specific target applications which are included in a plurality of target applications which are subject to management; acquiring, from a terminal, a first information associated with a unique terminal identifier and with an application identifier, the first information having been transmitted from the terminal in response to that any target application included in the plurality of target applications has been executed by the terminal, the unique terminal identifier identifying the terminal, and the application identifier identifying the target application executed; managing the unique terminal identifier and the application identifier in association with each other, the unique terminal identifier being associated with the first information that the first information acquisitor has acquired, the application identifier identifying the target application; transmitting, to the terminal, a second information upon receipt of a request based on a first target application which has been executed by the terminal, the first target application being included in the plurality of target applications, the second information indicating at least one specific target application for which the first information has not been acquired from the terminal; acquiring, from the terminal, a customer transfer information indicating a customer transfer from the first target application to a second target application, the customer transfer information including a first application identifier, a second application identifier and a unique terminal identifier which are associated with each other, the first application identifier identifying the first target application, the second application identifier identifying the second target application included in the at least one specific target application indicated by the second information, the unique terminal identifier identifying the terminal; transmitting, to the terminal, a screen information which can be used for the terminal to display a screen, the screen allowing installation of the second target application based on the second application identifier which is associated with the customer transfer information acquired; and transmitting, to the first target application executed by the terminal or to a server adaptable to the first target application, a reward-granting information, based on a reward-granting notification information, under conditions that the second target application was executed or became executable by the terminal in the first time period and that a reward-granting condition set on the second target application has been satisfied in case that the first time period has been set on the second target application which was selected by the second terminal, wherein the reward-granting information is associated with a user information of the first target application associated with the unite terminal identifier, the reward-granting notification information is associated with the unique terminal identifier and the second-application identifier, and the unique terminal identifier and the second-application identifier have been acquired from the second target application which had been executed by the terminal or to a server adaptable to the second target application; and performing the reward-granting process, under a condition that the second target application has been executed or became executable by the terminal in case that the first time period has been set on the second target application which was selected by the second terminal.

In an additional aspect of the present invention, a non-transitory computer readable storage medium stores a computer program to be executed by a computer to perform a management method. The method may include, but is not limited to, managing information related to a first time period which is set on a plurality of specific target applications which are included in a plurality of target applications which are subject to management; acquiring a first information which has been transmitted from a terminal in response to that any target application included in the plurality of target applications has been executed by the terminal; transmitting, to the terminal, a second information, upon receipt of a request based on a first target application which has been executed by the terminal, the first target application being included in at least one target application, the second information indicating the at least one target application, for which the first information has not been acquired from the terminal; and performing a reward-granting process, based on that, in the first time period, a second target application has been executed by the terminal or has become executable by the terminal, in case that the first time period has been set on the second target application being included in the at least one target application which is indicated by the second information, the second information having been transmitted by the first information notifier; wherein the reward-granting process is performed based on that the second target application has been executed by the terminal or has become executable by the terminal, in case that the first time period has not been set on the second target application.

In an additional aspect of the present invention, a non-transitory computer readable storage medium stores a computer program to be executed by a computer to perform a management method. The method may include, but is not limited to, managing information related to a first time period which is set on a plurality of specific target applications which are included in a plurality of target applications which are subject to management; acquiring, from a terminal, a first information associated with a unique terminal identifier and with an application identifier, the first information having been transmitted from the terminal in response to that any target application included in the plurality of target applications has been executed by the terminal, the unique terminal identifier identifying the terminal, and the application identifier identifying the target application executed; managing the unique terminal identifier and the application identifier in association with each other, the unique terminal identifier being associated with the first information that the first information acquisitor has acquired, the application identifier identifying the target application; transmitting, to the terminal, a second information upon receipt of a request based on a first target application which has been executed by the terminal, the first target application being included in the plurality of target applications, the second information indicating at least one specific target application for which the first information has not been acquired from the terminal; acquiring, from the terminal, a customer transfer information indicating a customer transfer from the first target application to a second target application, the customer transfer information including a first application identifier, a second application identifier and a unique terminal identifier which are associated with each other, the first application identifier identifying the first target application, the second application identifier identifying the second target application included in the at least one specific target application indicated by the second information, the unique terminal identifier identifying the terminal; transmitting, to the terminal, a screen information which can be used for the terminal to display a screen, the screen allowing installation of the second target application based on the second application identifier which is associated with the customer transfer information acquired; and transmitting, to the first target application executed by the terminal or to a server adaptable to the first target application, a reward-granting information, based on a reward-granting notification information, under conditions that the second target application was executed or became executable by the terminal in the first time period and that a reward-granting condition set on the second target application has been satisfied in case that the first time period has been set on the second target application which was selected by the second terminal, wherein the reward-granting information is associated with a user information of the first target application associated with the unite terminal identifier, the reward-granting notification information is associated with the unique terminal identifier and the second-application identifier, and the unique terminal identifier and the second-application identifier have been acquired from the second target application which had been executed by the terminal or to a server adaptable to the second target application; and performing the reward-granting process, under a condition that the second target application has been executed or became executable by the terminal in case that the first time period has been set on the second target application which was selected by the second terminal.

In an additional aspect of the present invention, a management device may include, but is not limited to, an installation notifier configured to transmit, to a management device, an installation notification information which indicates that a target application has been installed in the terminal device; a requester configured to transmit, to the management device, a customer transfer source information, for requesting the management device for an information that indicates at least one target application included in a plurality of target applications upon a first operation on the target application as installed in the terminal device; and a customer transfer information notifier configured to transmit, to the management device, a customer transfer destination information which indicates another target application selected upon a second operation from the at least one target application. The management device is configured to manage the customer transfer source information and the customer transfer destination information as a customer transfer information, and to determine whether a customer transfer destination application has been installed in the terminal device, where the customer transfer information indicates a customer transfer from a customer transfer source application to a customer transfer destination application.

In some cases, the management device is configured to manage a first time period which is set on one or more specific target applications included in the plurality of target applications. The requester is configured to transmit, to the management device, as the customer transfer source information, information indicating the specific target application included in the at least one specific target application, for requesting the management device for a specific target application information indicating at least one specific target application included in the plurality of target applications upon a first operation on one specific target application installed in the terminal device. The customer transfer information notifier is configured to transmit, to the management device, as the customer transfer destination information, information indicating a selected specific application which has been selected by a second operation in the first time period from specific target applications indicated by the specific target application information that the requester acquired from the management device in accordance with the request.

In some cases, the customer transfer information notifier is configured to transmit, to the management device, the customer transfer destination information associated with the customer transfer source information.

In some cases, the customer transfer information notifier is configured to transmit, to the management device, the customer transfer destination information associated with a unique terminal identifier identifying the terminal device.

In some cases, the installation notifier is configured to transmit, to the management device, the installation notification information associated with an application identifier identifying the target application and with a unique terminal identifier identifying the terminal device.

In some cases, the terminal device may, in some cases, further include: a unique identifier information acquisitor configured to acquire a unique identifier information identifying the terminal device in case that the target application is a first-installed target application which has first been installed in the terminal device among the plurality of target applications. The unique identifier information acquisitor is configured to store into a storage the unique identifier information to allow the unique identifier information to be referable from a subsequently installed target application which is be installed in the terminal device after the first-installed target application was installed.

In some cases, the unique identifier information acquisitor is configured to determine whether the unique identifier information is stored in the storage. The unique identifier information acquisitor is configured to acquire the unique identifier information in case that the unique identifier information acquisitor determined that the unique identifier information is not stored in the storage.

In some cases, the terminal device may, in some cases, further include: a reward-granting notifier configured to transmit, to the management device, a reward-granting notification information associated with the customer transfer destination information indicating the target application and with the unique identifier information in case that a reward-granting condition set on the target application has been satisfied.

In some cases, the terminal device may, in some cases, further include: an application user information notifier configured to transmit, to the management device, a user information of the target application associated with the unique identifier information. The reward-granting notifier is configured to transmit the reward-granting notification information to the management device which transmits, to the target application installed in the terminal or to a server adaptable to the target application, a reward-granting information associated with a user information of the target application associated with the unique identifier information associated with the reward-granting notification information.

In some cases, the management device is configured to manage information related to a first time period which has been set on one or more specific target applications included in the plurality of target applications, and information related to at least an end of a second time period, the second time period ends after the first time period ends, and the second time period includes a part or all of the first time period. The reward-granting notifier is configured to transmit the reward-granting notification information to the management device which transmits a reward-granting information based on the reward-granting notification information that the reward-granting notifier acquired in the second time period.

In some cases, a plurality of reward-granting conditions is set on the target application. The reward-granting notifier is configured to transmit, to the management device, the reward-granting notification information indicating that each of the plurality of reward-granting conditions has been satisfied, based on each of the plurality of reward-granting conditions has been satisfied.

In some cases, the plurality of reward-granting conditions are respective conditions that respective reaches are made to respective achievement points previously set in processing of the target application. The reward-granting notifier is configured to transmit, to the management device, the reward-granting notification information associated with a respective achievement point information indicating a respectively reached achievement point of the respective achievement points, based on a respective one of the plurality of reward-granting conditions has been satisfied.

In some cases, the plurality of reward-granting conditions are respective conditions that respective reaches are made to respective achievement points previously set in processing of the target application. The reward-granting notifier is configured to transmit, to the management device, the reward-granting notification information associated with a reach information indicating that a reach is made to any one of the respective achievement points, based on a respective one of the plurality of reward-granting conditions has been satisfied.

In some cases, the terminal device may, in some cases, further include: a transceiver configured to transmit and receive at least one of the installation notification information, the customer transfer source information, information indicating the at least one target application, and the customer transfer information, to and from the management device directly or through a first server adaptable to the target application which has been installed in the terminal device or a second server adaptable to the target application which has been selected.

In some cases, the transceiver is configured to communicate directly with the management device after the transceiver has established a communication session through the first server to the target application which has been installed or through the second server to the target application which has been selected.

In some cases, the installation notifier, the requester, and the customer transfer information notifier are implemented by execution by a computer of software programs which are incorporated in each of the plurality of target applications.

In an additional aspect of the present invention, a method for controlling a terminal device may include, but is not limited to, transmitting, to a management device, an installation notification information which indicates that a target application has been installed in the terminal device; transmitting, to the management device, a customer transfer source information, for requesting the management device for an information that indicates at least one target application included in a plurality of target applications upon a first operation on the target application as installed in the terminal device; and transmitting, to the management device, a customer transfer destination information which indicates another target application selected upon a second operation from the at least one target application. The management device is configured to manage the customer transfer source information and the customer transfer destination information as a customer transfer information, and to determine whether a customer transfer destination application has been installed in the terminal device, where the customer transfer information indicates a customer transfer from a customer transfer source application to a customer transfer destination application.

In an additional aspect of the present invention, a non-transitory computer readable storage medium stores a computer program to be executed by a computer of a terminal device to perform a method for control the terminal device. The method may include, but is not limited to, transmitting, to a management device, an installation notification information which indicates that a target application has been installed in the terminal device; transmitting, to the management device, a customer transfer source information, for requesting the management device for an information that indicates at least one target application included in a plurality of target applications upon a first operation on the target application as installed in the terminal device; and transmitting, to the management device, a customer transfer destination information which indicates another target application selected upon a second operation from the at least one target application. The management device is configured to manage the customer transfer source information and the customer transfer destination information as a customer transfer information, and to determine whether a customer transfer destination application has been installed in the terminal device, where the customer transfer information indicates a customer transfer from a customer transfer source application to a customer transfer destination application.

In an additional aspect of the present invention, a non-transitory computer readable storage medium that stores a set of computer program codes which is to be incorporated into an application program, the application program being to be executed by a computer of a terminal device to perform a method for controlling the terminal device. The computer program may include, but is not limited to, codes for transmitting, to a management device, an installation notification information which indicates that a target application has been installed in the terminal device; codes for transmitting, to the management device, a customer transfer source information, for requesting the management device for an information that indicates at least one target application included in a plurality of target applications upon a first operation on the target application as installed in the terminal device; and codes for transmitting, to the management device, a customer transfer destination information which indicates another target application selected upon a second operation from the at least one target application. The management device is configured to manage the customer transfer source information and the customer transfer destination information as a customer transfer information, and to determine whether a customer transfer destination application has been installed in the terminal device, where the customer transfer information indicates a customer transfer from a customer transfer source application to a customer transfer destination application.

EMBODIMENTS

Embodiments of the present invention will be described below, with references made to the drawings.

First Embodiment (Reciprocal Customer Transfer System Overview)

The overview of the reciprocal customer transfer system according to the present embodiment will first be described. This reciprocal customer transfer system performs reciprocal customer transfer so as to send from a source application already installed in a user terminal (hereinafter, referred to as "customer transfer source application") to an application which is not yet installed in that user terminal (hereinafter, "customer transfer destination application"). However, because there are cases in which the user information of the registered user himself/herself differs between applications, the user information cannot be matched between applications, and it is not easy to determine whether customer transfer has been done between a customer transfer source application and a customer transfer destination application of the user terminal of the same user. Given this, for the purpose of providing a reciprocal customer transfer system enabling reciprocal customer transfer even between applications that manage different user information of the same user, the present embodiment adopts a configuration in which it is easy to perform reciprocal customer transfer between applications even if the user information differs.

In this case, the sending of a customer between a customer transfer source application and a customer transfer destination application refers to the sending to the customer transfer destination application of a user so that the user, who is not yet using the customer transfer source application, uses the customer transfer destination application. Reciprocal customer transfer indicates the ability to send customers reciprocally between applications, so that each application can be either the customer transfer source application or the customer transfer destination application. For example, when sending a customer from a customer transfer source application to a customer transfer destination application, the customer transfer destination application can be a customer transfer source application that sends a customer to another customer transfer destination application in which the application is not yet installed in the user terminal.

In a reciprocal customer transfer system in which a reward is granted when the customer transfer destination application is installed, there is a possibility that the customer transfer destination application is not used only with the purpose of getting a reward. Given this, in the embodiments, a reward is given when a prescribed achievement point is reached by the customer transfer destination application. Additionally, if a plurality of different achievement points are provided, rewards are obtained for each of the achievement points that are reached. By such achievement point type rewards, it is possible to increase the use of the customer transfer destination application.

In the present embodiment, the granting of a reward in the case of installing customer transfer destination application based on the customer transfer source application is processed by reward processing that is different between the normal period and a specially provided period (hereinafter "campaign time period"). A campaign is a program to increase the reciprocal customer transfer during only a specified time period (an event having a specific time period).

Specifically, in the reciprocal customer transfer system of the present embodiment, at a normal time (that is, a time other than a campaign time period), a system is provided enabling reciprocal customer transfer between a plurality of applications, so that a reward is granted when the customer transfer destination application is installed, and in a campaign time period a reward is granted when an achievement point is reached in the customer transfer destination application. In the following, the reward given at a normal time will be called a "normal reward," and the reward given in a campaign time period will be called a "campaign reward" (CP reward).

The CP reward is with respect to reciprocal customer transfer between specified applications participating in a campaign during a campaign time period, and the normal reward is for reciprocal customer transfer between arbitrary applications, with all applications accommodating the same system being eligible.

FIG. 1 generally describes a reciprocal customer transfer system according to the present embodiment. In this drawing, the applications shown as four examples that accommodate the reciprocal customer transfer system of the present embodiment are the application A, application B, application C, and application D. Application A is a customer transfer source application installed in a user terminal. Application B, application C, and application D are applications not installed in the user terminal and can be the customer transfer destination application with respect to application A (customer transfer source application). Application B is in a campaign time period with application A, and application C and application D are in a normal time, which is not in a campaign time period, with application A.

The user terminal displays on its display screen a target application list LT of customer transfer source applications that can be selected with respect to application A, which is the customer transfer source application. In this case, application B, application C, and application D are displayed as an arrangement of selectable operator items, with the respective application names and details of rewards as shown by the labels L1, L2, and L3. The label L1 displays the application name "Application B", information indicating that a campaign is in progress, and the link destination of a site having the CP reward details. The label L2 displays the application name "Application C" and the normal reward details. The label L3 displays the application name "Application D" and the normal reward details.

In the case of a normal reward, in the customer transfer source application, the number of granted points usable by the user himself/herself is displayed as the reward details. In contrast, in the case of a CP reward, for example, because the achievement point as a condition for granting the reward in the game and the reward details (for example, number of points or items granted) are managed at the application side, these are indicated at the site of the link destination. The achievement point can be set at the application side to be, for example, the completion of a game tutorial, the completion of a prescribed stage in the game progress, or the achievement of a prescribed score.

If application C or application D is selected as the customer transfer destination application, when application C or application D is installed and can be executed or is executed (launched) a normal reward is granted to application A, which is the customer transfer source application. In contrast, if application B is selected as the customer transfer destination application, under the condition that application B is installed in the user terminal during the campaign time period, after application B is launched, if the achievement point set beforehand corresponding to that campaign is reached (thereby fulfilling the reward granting condition), a CP reward is granted to application A. If, for example, reward granting time period is set to start at the beginning or during a campaign time period and end after the end of the campaign time period, if the achievement point is reached within this reward granting time period, a CP reward is granted and a CP reward is not granted even if the achievement point is reached after the reward granting time period has passed. If a plurality of achievement points are established, a CP reward is granted each time an achievement point is reached. By the ending time of the reward granting time period being set to be after the end of the campaign time period in this manner, consideration is given to a user who reaches the achievement point and who did installation after the campaign time period.

Even if the user of a plurality of applications installed in the user terminal is the same, there are cases in which the user information (for example, the user ID that is identification information that uniquely identifies the user) registered in each application is different. Given this, in the reciprocal customer transfer system of the present embodiment, management is done of unique identification information (hereinafter "reward user ID") that uniquely identifies for each user terminal and that can be specified for each user terminal (that can be specified by a user using a user terminal). This enables the specification of a user terminal using a reward user ID even if the user IDs are different between applications, thereby facilitating reciprocal customer transfer between applications.

Additionally, in the reciprocal customer transfer system of the present embodiment, the reward user ID and the user IDs registered in each application (hereinafter "application user IDs") are managed in association with each other. Because the application user IDs between applications are associated via the reward user ID, even if the user IDs are different between applications, this enables the easy identification of a customer transfer source application user and granting of the specified reward. In the description to follow, the identification information uniquely identifying an application will be called the "application ID."

When a customer is sent from a customer transfer source application to a customer transfer destination application, the customer transfer destination application can become a customer transfer source application. For example, when a customer is sent from application A to application B, application B can become the customer transfer source application to send a customer to application C or application D as customer transfer destination applications to which they have not yet been sent. When this is done, application C or application D are the subjects of a normal reward if a campaign is not in progress between application C or application D and application B, and is subject to a CP reward if there is a campaign in progress between application C or application D and application B. Also, for example, in the same manner in the case in which customer transfer is done from application A to application C, application C that sends a customer can become a customer transfer source application that send a customer to application B or application D to which the customer had not yet been sent.

Examples of the operating states of an application include the non-operating state (not running), the running state (active) in which some processing is being executed, the background state (background) in which some processing is being executed but not displayed on the screen, and the suspended state (suspended) in which all processing is interrupted and not being executed. In this case, the "launching of a target application" refers to transitioning from the not running or suspended state to the active state. The ending of a target application refers to transitioning from the active state to the not running or suspended state. Also, if a plurality of applications can be in the normal operating state simultaneously, the launching of an application is, for example, the transition of the application being displayed on the frontmost layer of the screen to a state enabling operation by a user.

The installation of an application includes not only the new introduction of a program of an application that had not been introduced into a user terminal, but also the updating of a program so as to accommodate the reciprocal customer transfer system. That is, this includes the downloading of an updated program for an application installed in a user terminal for the purpose of accommodating the reciprocal customer transfer system.

(Network System Configuration)

Figure 2:
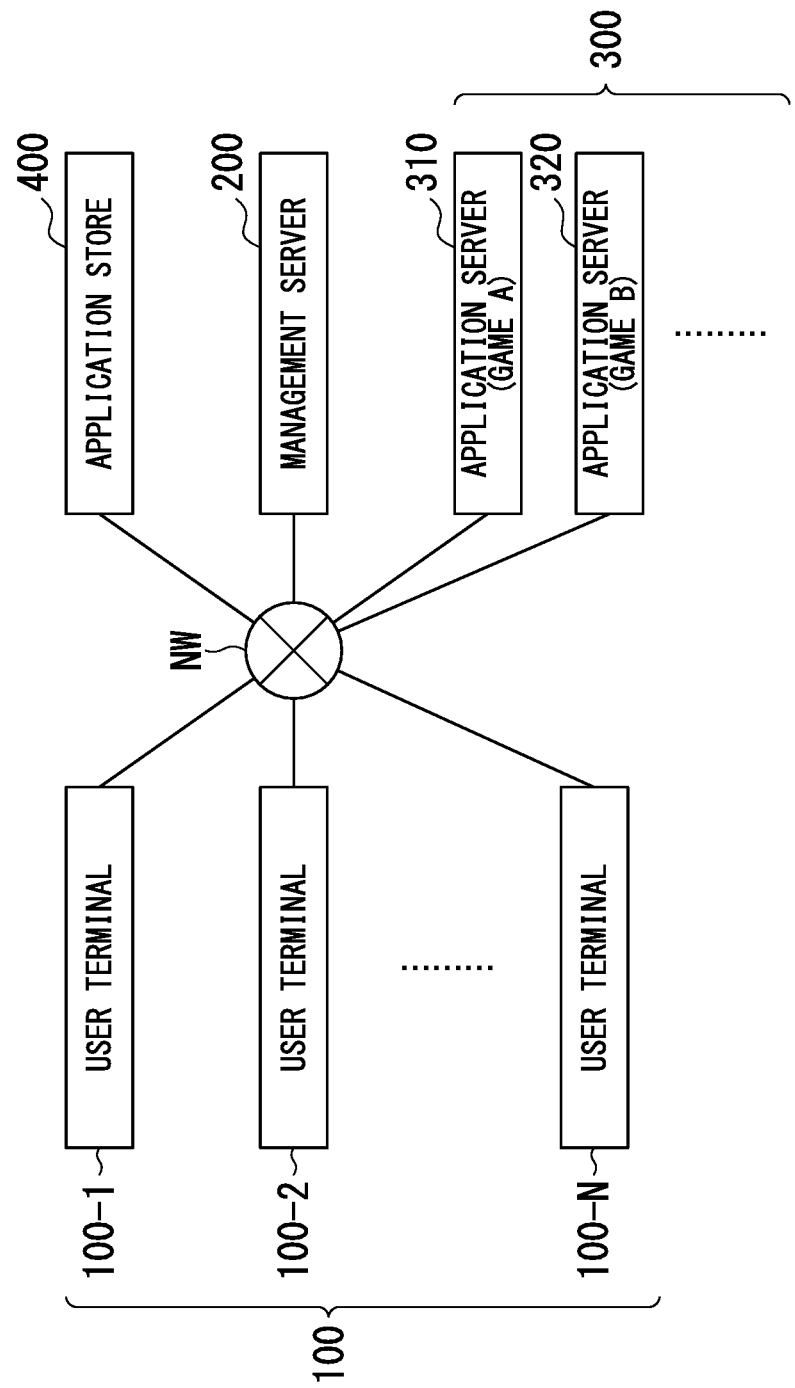
FIG. 2 is a simplified drawing showing an example of the configuration of a network system according to the first embodiment.

FIG. 2 is a simplified drawing showing an example of the configuration of a network system 1 according to the first embodiment of the present invention, which implements a reciprocal customer transfer system. The network system 1 has the computers of a plurality of user terminals 100-N (where N is a positive integer) (user terminal 100-1, user terminal 100-2, . . . ), a management server 200, a plurality of application servers 300 (application server 310, application server 320, . . . ), and an application store 400, these computers being connected, via the network NW, to enable communication. In this case, because the plurality of user terminals 100-N have the same configuration, unless specifically indicated, the suffixes -1, -2 and the like will be omitted, and these will be referred to as the user terminal 100.

The application server 300 handles applications that can be installed into the user terminal 100. In this case, taking the example of the application to be installed in the user terminal 100 being a game, the application server 310 handling game A and the application server 320 handling game B are shown connected to the user terminal 100 via the network NW. In the network system 1, the application servers are not restricted to the application server 310 and the application server 320, and a plurality of application servers 300 enabling games to be installed in and played from the user terminal 100 can be provided. In this case, an application to be installed in the user terminal 100 is a so-called native application, having an application program that is installed into the user terminal 100, so that the user terminal 100 performs processing (for example, game processing) related to the application, based on the installed program. The user terminal 100 transmits to the application server 300 user information corresponding to the user playing the game and acquires from the application server 300 information required during the playing of the game.

The application store 400 is a server device that provides a store site (downloading service site) enabling downloading of applications that can be installed into the user terminal 100. By the user connecting the user's own user terminal 100 to the application store 400 via the network NW and purchasing a desired application, either for free or for a fee, the user can download and install the purchased application into the user's own user terminal 100.

In this case, seen from the provider of an application (game) it is desirable to provide a service that has purchase incentives, so as to have users purchase more applications that are provided.

For example, the provision of a service can be envisioned, wherein an advertisement (banner) for an application that is not yet installed is displayed on the display screen of an application that is installed in the user terminal 100 or in the display screen to which a transition is made by a user operation, and when that advertisement (banner) is selected, guiding is done to the above-noted store site, after which, if the selected application is downloaded and installed in user terminal 100 and can be executed or is executed, a reward is granted with respect the use by user of the application that displayed the advertised (banner) that triggered the downloading. In this case, because the reward that can be used in the original application (for example, an item or game points that can be used in a game) is granted to the user himself/herself, there is an incentive to purchase the new application for a user wanting to get the reward. This enables promotion of sales of the application.

The management server 200, in addition to managing information regarding applications accommodating the reciprocal customer transfer system of the present embodiment and information regarding the normal rewards and CP rewards, communicates with the user terminal 100 so as to manage customer transfer information between applications and processing of rewards. Specifically, the management server 200, as customer transfer information with respect to customer transfer from a customer transfer source application to a customer transfer destination application, manages, for example, the application ID of the customer transfer source application, the application ID of the customer transfer destination application, and the reward user ID, in association with each other.

The user terminal 100 is a terminal device used by the user, this being, for example, a mobile telephone, a smartphone, a tablet terminal, a personal computer, or a game machine with a communication function. In this case, the description will be for a smartphone as the user terminal 100.

Figure 3:
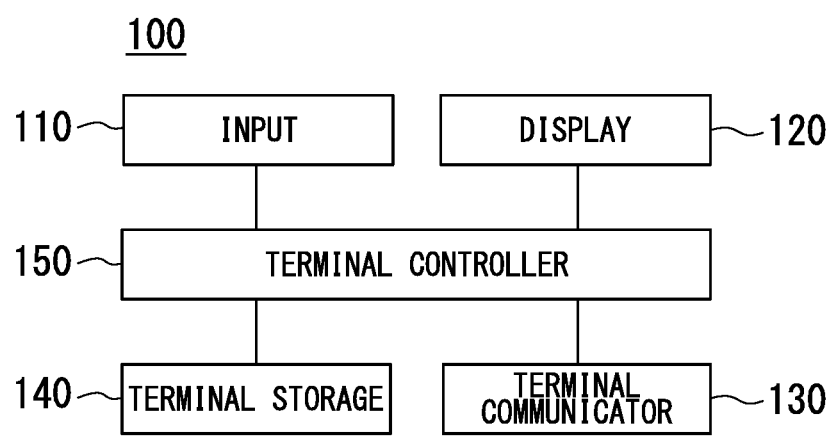
FIG. 3 is a simplified drawing showing an example of the configuration of a user terminal according to the first embodiment.

FIG. 3 is a simplified drawing showing an example of the configuration of the user terminal 100 according to the present embodiment. As shown in this drawing, the user terminal 100 has an input 110, a display 120, a terminal communicator 130, terminal storage 140, and a terminal controller 150.

The input 110 is an input device that accepts instructions from the user in response to operations made by the user and generates input instruction information responsive to the specifics of the instruction. As the input 110, it is possible to use a keyboard or button, a touch panel, a mouse, or a microphone or the like.

The display 120 is a display device that displays information of images, characters, and the like and can be, for example, an LCD (liquid crystal display), an organic EL (electroluminescence) display. The input 110 and the display 120 can be integrated as a touch panel that accepts operation inputs from a user.

The terminal communicator 130 communicates with the management server 200 or the application server 300 via the network NW.

The terminal storage 140 is constituted by a storage medium such as a RAM (random-access memory), a ROM (read-only memory), a flash ROM, a hard disk (hard disk drive), or a combination thereof, and stores programs for controlling various parts of the user terminal 100 (for example, an OS (operating system) for causing the terminal controller 150 to perform basic operation), installed application programs, and various type of information.

The terminal controller 150 has an information processing device such as a CPU (central processor) that functions as the control center of the user terminal 100 and controls the various parts of the user terminal 100. For example, the terminal controller 150, in addition to executing processing of basic operations based on the operating system stored in the terminal storage 140, executes processing based on the application program (game program). The terminal controller 150 also performs processing to execute, via the operating system, functions of various applications that can run in the operating system (web browsers, applications to display a store page of a store site provided by the application store 400, or the like).

The network NW is, for example a mobile telephone network, a PHS (Personal Handy-phone System) network, a VPN (virtual private network), a dedicated communication circuit network, a WAN (wide area network), a LAN (local area network), a PSTN (public switched telephone network), or a combination thereof, serving as an information communication network.

(Configuration of and Processing by the Reciprocal Customer Transfer System)

The configuration of and processing by the reciprocal customer transfer system will be described, with reference made to FIG. 4.

Figure 4:
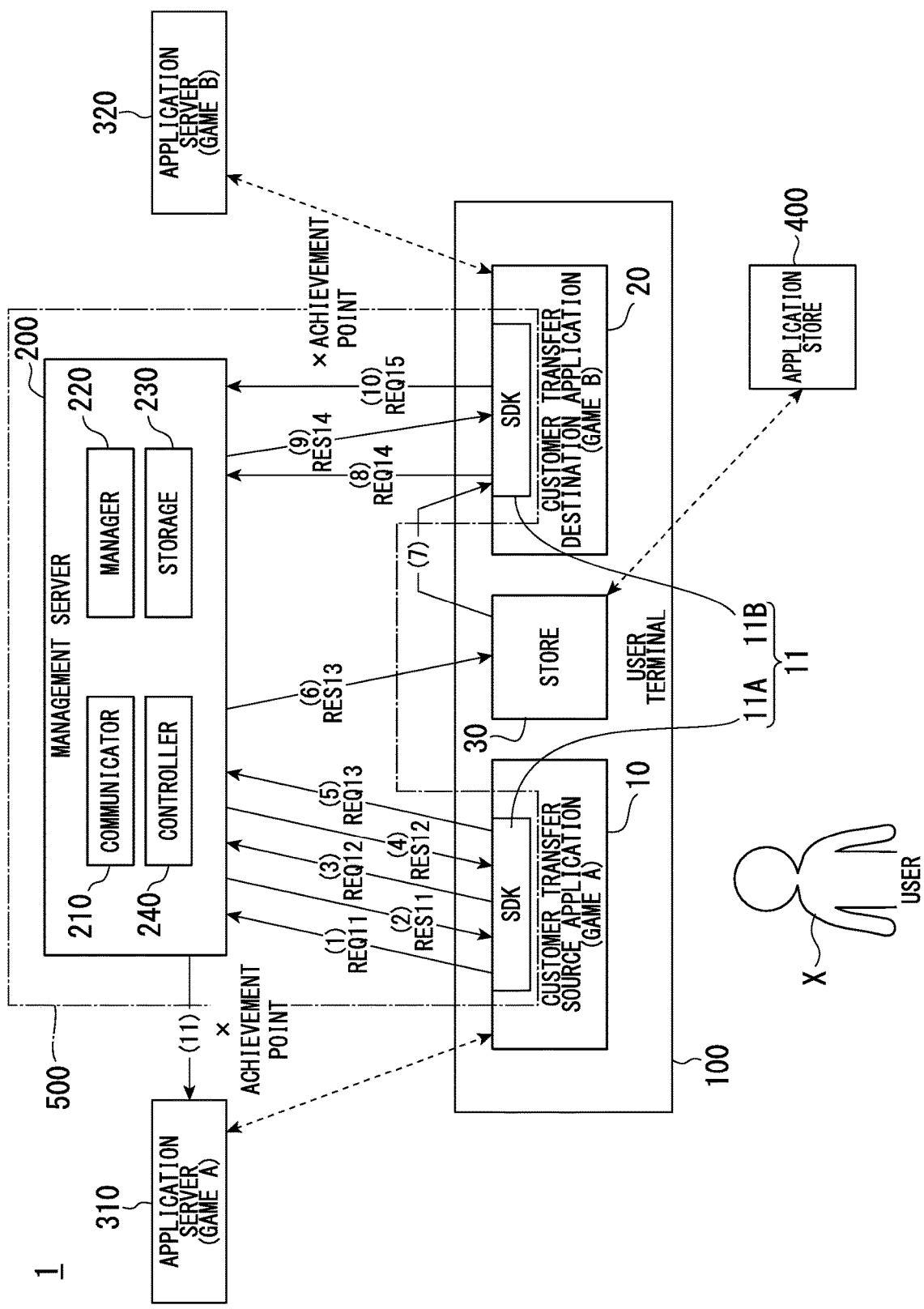
FIG. 4 shows an example of the configuration of and processing by the reciprocal customer transfer system of the present embodiment.

FIG. 4 describes an example of the configuration of and processing by the reciprocal customer transfer system 1 of the present embodiment.

The description will be for the case in which the customer transfer source application 10 (game A) is already installed in the user terminal 100 used by the user X, is executed and, based on an operation by the user X, if the customer transfer destination application 20 (game B) is installed and executed in the user terminal 100, and a reward is granted to the user X in the customer transfer source application (game A). At the point at which the customer transfer source application 10 (game A) is installed, although it is not yet the customer transfer source application, it will be called the customer transfer source application 10 as a convenience.

In this drawing, the user terminal 100 is shown in schematic form, as having a customer transfer source application 10 (game A) that is installed under the control by the terminal controller 150, a store 30 (an application that displays the store page of a store site) that is launched during customer transfer processing, and a customer transfer destination application 20 (game B) that will be installed anew and executed.

The customer transfer source application 10 (game A) transmits the user ID corresponding to the user X playing the game A to the application server 310 (game A) and acquires from the application server 310 (game A) information required during playing of the game A. At the same time, if the customer transfer destination application 20 (game B) was installed in the user terminal 100, the customer transfer destination application 20 (game B) transmits the user ID corresponding to the user X playing the game B to the application server 320 (game B) and acquires from the application server 320 (game B) information required during the playing of the game B. Software for reciprocal customer transfer processing (hereinafter referred to as the SDK (software development kit) 11) is embedded into an application that accommodates the reciprocal customer transfer system of the present embodiment. The SDK 11 is constituted, for example, as a collection of APIs (application programming interfaces) for intermediating between each application accommodating the reciprocal customer transfer system installed in the user terminal 100 and the management server 200. In this drawing, the SDK 11A is embedded into the customer transfer source application 10 (game A) and the SDK 11B is embedded into the customer transfer destination application 20 (game B). The SDK 11A and the SDK 11B each has a configuration that executes a function corresponding to the customer transfer source application 10 and the customer transfer destination application 20, respectively, and executes functions required by each of the applications. Because an application accommodating the reciprocal customer transfer system can be either the customer transfer source application 10 or the 3 destination application 20, the SDK 11 having the configurations of both the SDK 11A and the SDK 11B is embedded.

That is, if the applications are constituted to enable incorporation of the above-described SDK 11, the application can accommodate the reciprocal customer transfer system of the present embodiment. An application into which the above-described SDK 11 is embedded beforehand may be provided in downloadable form, and an SDK 11 that can be embedded into an installed application afterwards may be provided.

There might be applications accommodating the reciprocal customer transfer system that accommodate only the customer transfer destination application 20. In this case, the SDK 11B only may be embedded, or the SDK 11 may be embedded and the SDK 11A may not be caused to function. In the case of an application accommodating only the customer transfer destination application 20, because it is not necessary to provide an application server to handle the application, it is possible, for example, to make an application operating stand-alone in the user terminal 100 be the application accommodating the reciprocal customer transfer system.

There might be applications accommodating the reciprocal customer transfer system that accommodate only the customer transfer destination application 10. In this case, the SDK 11A only may be embedded, or the SDK 11 may be embedded and the SDK 11B may not be caused to function. For example, an application for an application for which service is no longer provided and registration of new users is not accepted, the function as a customer transfer destination application 20 need not be provided.

The above-described SDK 11 (SDK 11A and SDK 11B in the drawing) and the management server 200 are main elements of the reciprocal customer transfer system of the present embodiment (refer to the reference symbol 500), and this will be noted below as the reciprocal customer transfer system 500.

The management server 200 executes reciprocal customer transfer by communicating with the SDK 11 embedded in an application accommodating the reciprocal customer transfer system 500 installed in the user terminal 100. The management server 200 transmits information regarding rewards to the application server 310 (game A) that handles the customer transfer source application 10 (game A). This grants a reward from the application server 310 (game A) to the user X in the customer transfer source application 10 (game A).

As shown in this drawing, the management server 200 has a communicator 210, a manager 220, a storage 230, and a controller 240. The communicator 210 communicates with the user terminal 100, the application server 310 (game A), or the application server 320 (game B) via the network NW. The manager 220 stores into the storage 230 and manages information related to applications accommodating the reciprocal customer transfer system 500, information related to applications participating in campaigns, customer transfer information between applications, and information related to normal and CP rewards and the like. The storage 230 stores various information under control from the management server 220 or the controller 240. The controller 240 performs control of the exchange of information related to reciprocal customer transfer with the user terminal 100 or the application server 310 (game A) and processing related to rewards.

In the description that follows, an application accommodating the reciprocal customer transfer system 500 managed by a management server 220 will be called a target application and, of the target applications, a specified application participating in a campaign will be called a specified application.

Continuing, the general flow of reciprocal customer transfer processing will be described.

In this case, the information of a target application accommodating the reciprocal customer transfer system 500 is assumed to be already managed by the management server 200. Consider the case in which the user terminal 100 has already acquired a reward user ID of the user X, which is unique identification information corresponding to the user terminal 100, and that the acquired reward user ID is stored in a prescribed area (inter-application common area) of the terminal storage 140, so that the acquired reward ID is browsable to an application accommodating the reciprocal customer transfer system 500 installed in the user terminal 100.

(1) If the customer transfer source application 10 (game A) is installed into the user terminal 100, the SDK 11A embedded in the customer transfer source application 10 (game A) transmits to the management server 200 installation notification information indicating that the customer transfer source application (game A) is installed (REQ11). In this case, the installation notification information includes, for example, the application ID of the customer transfer source application 10 (game A) and the reward user ID.

(2) Upon acquisition of the installation notification information transmitted from the user terminal 100 (SDK 11A), the management server 200 transmits to the user terminal 100 (SDK 11A) response information (notification results) indicating the acquisition (RES11). The management server 200 manages application ID of the customer transfer source application 10 (game A) and the reward user ID that are included in the acquired installation notification information in association with each other.

(3) The user terminal 100 (SDK 11A) transmits to the management server 200 list request notification information that requests a target application list (target application that will be candidates for the customer transfer destination application 20) of at least one target application accommodating the reciprocal customer transfer system 500 (REQ12).

(4) The management server 200, upon acquiring the list request notification information from the user terminal 100 (SDK 11A), transmits to the user terminal 100 (SDK 11A) an application list of at least one target application for which installation notification information has not be acquired (that is, that has never been installed), of a plurality of managed target applications (RES12). When this is done, the management server 200 transmits information regarding a campaign, in association with a specified application participating in the campaign.

Upon acquiring the application list from the management server 200, the user terminal 100 (SDK 11A) displays a target application list LT, based on the acquired application list, on the display 120.

(5) When any one of the target application of the application list LT display on the display 120 is selected by the user X, the user terminal 100 (SDK 11A) transmits to the management server 200 customer transfer information indicating customer transfer from the customer transfer source application 10 (game A) to the selected target application (in this case, the customer transfer destination application 20 (game B)) (REQ13). In this case, the customer transfer information includes, for example, the application ID of the customer transfer source application 10 (game A), the application ID of the customer transfer destination application 20 (game B), and the reward user ID.

(6) Upon acquiring the customer transfer information from the user terminal 100 (SDK 11A), the management server 200, based on the acquired customer transfer information, transmits to the user terminal 100 (SDK 11A) instruction information that guides to a screen enabling the installation of the customer transfer destination application 20 (game B) (RES13). The management server 200 manages the customer transfer source application 10 (game A) application ID, the customer transfer destination application 20 (game B) application ID, and the reward user ID included in the acquired customer transfer information, in association with each other.

(7) The user terminal 100, upon acquiring the above-described instruction information from the management server 200, launches the store 30, which is an application that displays a store page of a store site enabling installation (downloading) of the customer transfer destination application 20 (game B). The store 30 acquires and displays on the display 120 a store page enabling installation of the customer transfer source application 20 (game B) from the application store 400. After an operation by the user X downloads and installs the customer transfer destination application 20 (game B) into the user terminal 100, a further operation by the user X launches the installed customer transfer destination application 20 (game B).

(8) The user terminal 100 (SDK 11B) transmits to the management server 200 installation notification information indicating that the customer transfer destination application 20 (game B) was installed (REQ14). In this case, the installation notification information includes, for example, the customer transfer destination application 20 (game B) application ID, and the reward user ID.

(9) Upon acquiring the installation notification information transmitted from the user terminal 100 (SDK 11B), the management server 200 transmits to the user terminal 100 (SDK 11B) response information indicating the acquisition (RES14). The management server, based on the acquired installation notification information and the customer transfer information it manages, determines that the customer transfer destination application 20 (game B) was the subject of customer transfer to the customer transfer source application 10 (game A) in the user terminal 100.

(10) In this case, consider the case in which the customer transfer source application 20 (game B) is the specified application and is participating in a campaign with the customer transfer source application 10 (game A). In this case, in the customer transfer source application 20 (game B), based on satisfying reward granting condition (reaching an achievement point) set beforehand in accordance with the campaign, the user terminal 100 (SDK 11B) transmits to the management server 200 reward granting notification information (information indicating that an achievement point was reached) indicating that the reward granting condition is satisfied (REQ15). If there are a plurality of achievement points, the user terminal 100 (SDK 11B) transmits to the management server 200 reward granting notification information (information indicating that an achievement point was reached) for each thereof, based on the reaching of each achievement point.

(11) Upon acquiring the reward granting notification information from the user terminal 100 (SDK 11B), the management server 200 transmits to the application server 310 (game A) handing the customer transfer source application 10 (game A) reward granting information that is based on the acquired the reward granting notification information and that indicates that an achievement point was reached in the customer transfer destination application 20 (game B). If there are a plurality of achievement points, the management server 200 transmits to the application server 310 (game A) reward granting information based on the reward granting notification information for each thereof.

In this case, the management server 200 acts only as a go-between in transmitting to the application server 310 (game A) handling the customer transfer source application 10 (game A) information indicating that the achievement point was reached in the customer transfer destination application 20 (game B), and is not involved with the settings of the achievement points in the customer transfer destination application 20 (game B) and with the reward to be granted to the customer transfer source application 10 (game A) in the event that each of the achievement points are reached. If the target application list LT is displayed on the display screen of the user terminal 100, that link destinations of a site at which the CP rewards are listed rather than displaying a display screen of the CP rewards is because the management server 200 is not involved in the details of the rewards.

In the case in which the customer transfer destination application 20 (game B) is a target application that is not a specified application (or is a specified application but the time is outside the campaign time period), upon acquiring installation notification information transmitted from the user terminal 100 (SDK 11B) indicating that the customer transfer destination application 20 (game B) has been installed, the management server 200 transmits to the application server 310 (game A) reward granting information indicating the normal reward achievement point has been reached (normal reward processing).

By this processing flow performs customer transfer from the customer transfer source application 10 (game A) to the customer transfer destination application 20 (game B). In this case, in the reciprocal customer transfer system 500, the various information exchanged between the SDK 11A and the SDK 11B and the management server 200 is associated with each other, either directly by the reward user ID corresponding to the user terminal 100 or via some information. This enables easy reciprocal customer transfer processing and reward processing between applications, even if the user IDs are different between the customer transfer source application 10 (game A) and the customer transfer destination application 20 (game B).

The constituent elements of the SDK 11 (SDK 11A and SDK 11B) and the management server 200 of the reciprocal customer transfer system 500 will be described in detail.

(Functional Configuration of the User Terminal 100 (SDK 11))

Figure 5:
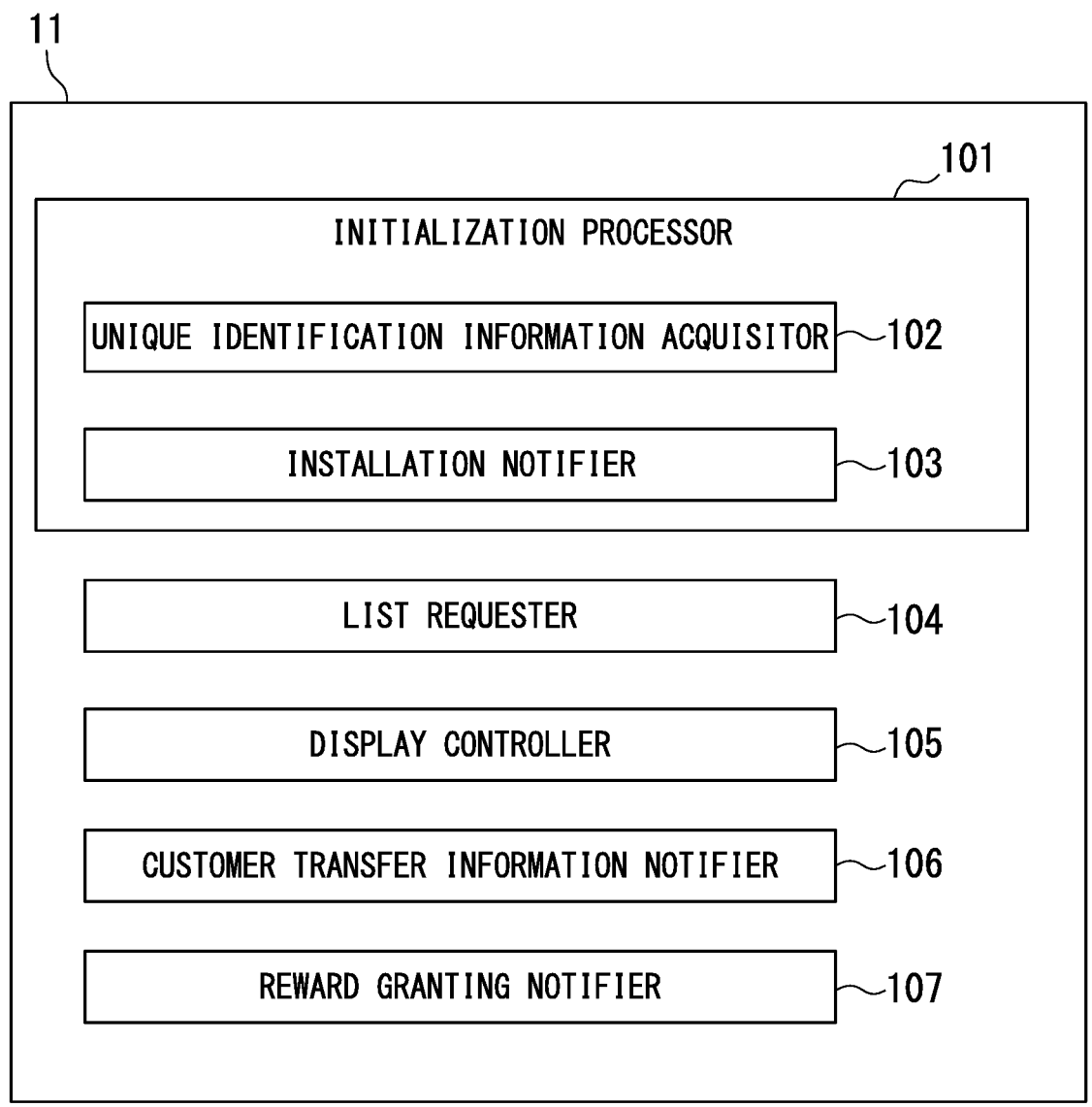
FIG. 5 shows an example of the functional configuration that executes based on an SDK of a user terminal according to the present embodiment.

In the user terminal 100 of the present embodiment, FIG. 5 shows an example of the functional configuration of the reciprocal customer transfer processing that is executed by the terminal controller 150 based on the SDK 11. Referring to FIG. 5, the functional configuration of the customer transfer processing executed by the user terminal 100 (SDK 11) in the reciprocal customer transfer system 500 will be described.

The SDK 11 has an initialization processor 101, a list requester 104, a display controller 105, a customer transfer information notifier 106, and a reward granting notifier 107.

When an application of the embedded destination of the SDK 11 is installed into the user terminal 100, the initialization processor 101, as its initial launch processing, acquires information regarding the application (for example, the application ID and the application user ID). The initialization processor 101 has a unique identification information acquisitor 102 and an installation notifier 103.

The unique identification information acquisitor 102 acquires a reward user ID, which is unique identification information set for each user terminal 100, and which is unique identification information enabling unambiguous identification of a user using that user terminal 100. For example, the unique identification information acquisitor 102 generates a pseudo-random number series and uses the generated pseudorandom number series to generate and to acquire a reward user ID corresponding to a user terminal 100 so that it does overlap with the reward user ID of another user terminal 100. The unique identification information acquisitor 102 stores the acquired reward user ID into the inter-application common area of the terminal storage 140 so that it is browsable to any target application installed in the user terminal 100.

In the case of a target application installed into the user terminal 100 first of a plurality of installed target applications, the unique identification information acquisitor 102 acquires the reward user ID. That is, if the reward user ID is not stored in the inter-application common area of the terminal storage 140, the reward user ID is acquired. Then, the acquired reward user ID is used also in target applications that are subsequently installed.

The installation notifier 103 transmits to the management server 200 installation notification information indicating that a target application installed in the user terminal 100 has been installed. In this case, the above-described installation notification information includes the application ID of the installed target application and the reward user ID corresponding to that user terminal 100. The installation notification information is transmitted from the user terminal 100 both in the case of a target application being installed by a user by downloading from a store site, without going through the customer transfer processing by the reciprocal customer transfer system 500 and in the case of installation via customer transfer processing by the reciprocal customer transfer system 500 (the case in which the target application is simply installed). In the case in which the installed target application is a specified application, the installation notifier 103 transmits to the management server 200 installation notification information indicating that the specified application installed in the user terminal 100 has been installed.

The installation notifier 103 may transmit to the management server 200 installation notification information that includes the application user ID in the target application installed by the user who installed the installed target application. This enables the management server 200 that acquired the installation notification information to manage the application user ID and the reward user ID in the installed target application in association with each other. The timing of transmitting the application user ID may be included, not in this installation notification information, but rather in other information.

In this case, when each of the installed applications is launched, the processing of the installation notifier 103 to transmit to the management server 200 the installation notification information is executed in the same manner, both in the case of the SDK 11A of the customer transfer source application 10 and the case of the SDK 11B of the customer transfer destination application 20.

The list requester 104, based on a prescribed operation (first operation) in the customer transfer source application 10, transmits to the management server 200 list request notification information that requests an application list of at least one target application (or specified application) of a plurality of target application. In this case, the above-described prescribed operation is, for example, a user operation in the customer transfer source application 10 with respect to the input 110 for the purpose of acquiring from the management server 200 a list of target applications (or specified applications). The above-described list request notification information includes, for example, the application ID (customer transfer source information) of the customer transfer source application 10 (the target application (or specified application)) and the reward user ID corresponding to the user terminal 100.

The list requester 104 acquires an application list transmitted from the management server 200, based on the transmitted list request notification information.

The list requester 104 may transmit to the management server 200 list request notification information that requests an application list of target applications, including specified applications set by a campaign with the customer transfer source application 10, or may transmit to the management server 200 list request notification information that requests an application list of target application that does not include the specified applications. The list requester 104 may transmit to the management server 200 list request notification information that requests an application list of only specified applications in which a campaign is set with the customer transfer source application 10.

The display controller 105 causes display on the display 120 of a target application list LT, based on the application list acquired by the list requester 104. For example, the display controller 105 causes display of a target application list, either laid over the display screen that had been displayed on the display 120 by the customer transfer source application 10, or by switching from that display screen.

The customer transfer information notifier 106 transmits to the management server 200 customer transfer information indicating customer transfer from the customer transfer source application 10 to a selected target application (or specified application). In this case, a target application selected from the customer transfer source applications 10 (or specified applications) refers to either one or a plurality of target applications (or specified applications), selected based on a user operation (second operation), which are included in the application in the application list displayed on the display 120.

The above-described customer transfer information includes, for example, the application ID (customer transfer source information) of the customer transfer source application 10, the application ID of the selected target application (or specified application), that is, of the selected customer transfer destination application 20, and the reward user ID corresponding to that user terminal 100.

For example, if, based on the above-described second operation in a campaign time period, a specified application with the campaign in progress is selected from the target application list LT, the customer transfer information notifier 106, for example, transmits to the management server 200 customer transfer information that includes the application ID (customer transfer source information) of the customer transfer source application 10, the application ID of the selected specified application, that is, the customer transfer destination application 20, and the reward user ID corresponding to that user terminal 100.

The reward granting notifier 107, in a specified application with a campaign in progress, based on the satisfying of the reward granting condition set beforehand in accordance with the campaign, transmits to the management server 200 reward granting notification information indicating that the reward granting condition has been satisfied. In this case, the above-described reward granting notification information includes, for example, the application ID (customer transfer destination information) of the specified application with the campaign in progress (customer transfer destination application 20), and the reward user ID corresponding to that user terminal 100.

Of the functional configuration based on the SDK 11 shown in FIG. 5, the functional configuration of, for example, the initialization processor 101 (the unique identification information acquisitor 102 and the installation notifier 103), the list requester 104, the display controller 105, and the customer transfer information notifier 106 correspond to the functional configuration of the SDK 11A of the customer transfer source application 10 (that is, the functional configuration of the customer transfer source). Also, for example, the initialization processor 101 (the unique identification information acquisitor 102 and the installation notifier 103) and the reward granting notifier 107 correspond to the functional configuration of the SDK 11B of the customer transfer destination application 20 (that is, the functional configuration of the customer transfer destination).

(Configuration of Management Service 200)

The configuration of the management server 200 will be described in detail, with reference made to FIG. 6.

Figure 6:
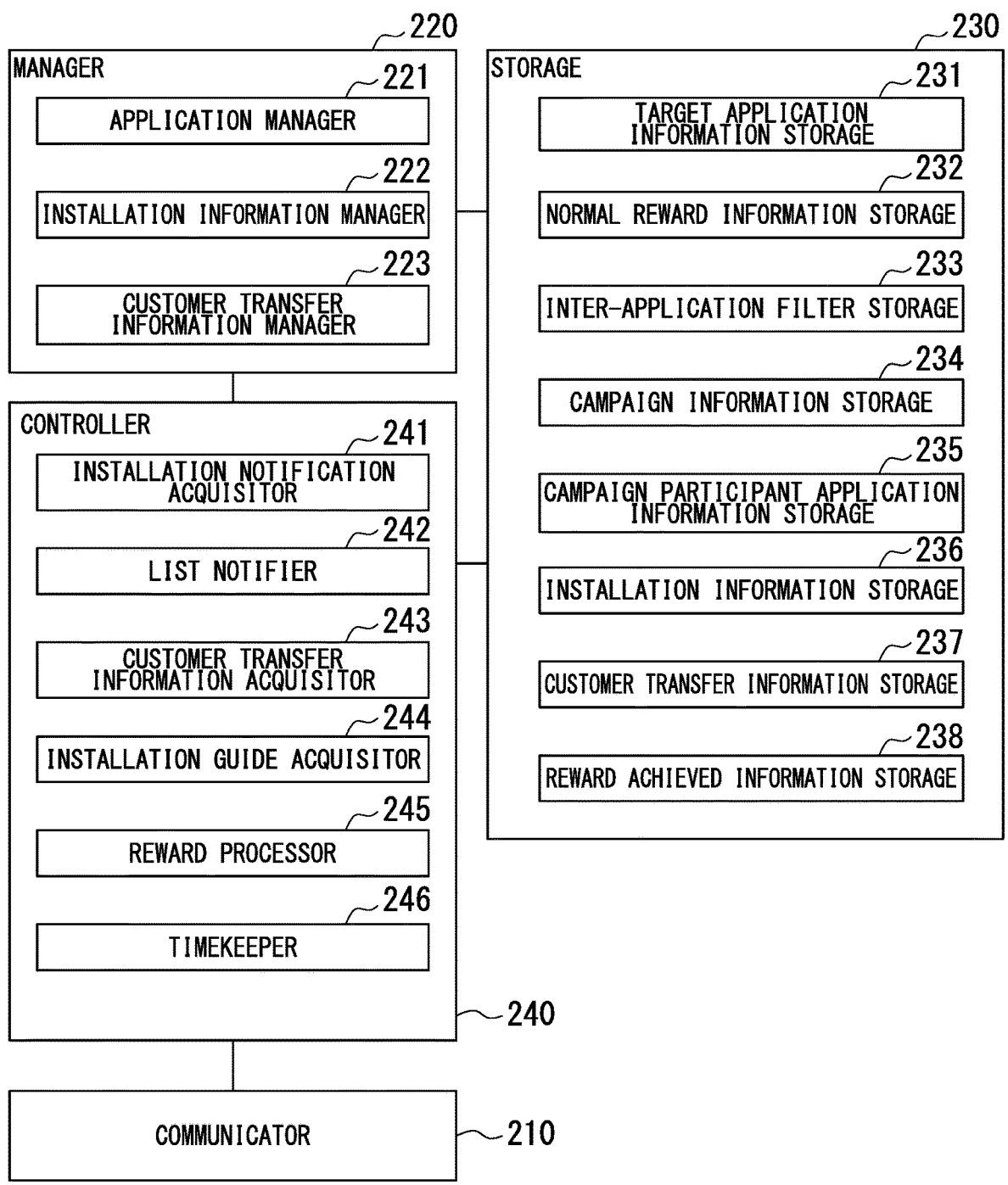
FIG. 6 shows an example of the configuration of a management server according to the present embodiment.

FIG. 6 shows an example of the configuration of the customer transfer of the management server 200 according to the present embodiment. The management server 200 has, as described referring to FIG. 4, a communicator 210, a manager 220, a storage 230, and a controller 240, and at this point, the configurations of the manager 220, the storage 230, and the controller 240 will be described in detail.

The manager 220 has an application manager 221, an installation information manager 222, and a customer transfer information manager 223. The manager 220 stores various information it manages into the storage 230 in association with each other.

The application manager 221 manages information (target application information) regarding a plurality of target applications accommodating the reciprocal customer transfer system 500. The application manager 221 manages information regarding campaigns having a campaign time period (example of the first time period) set in a plurality of specified applications. For example, the application manager 221 manages information indicating a campaign (such as the campaign name) and information regarding the campaign (such as information indicating the campaign time period and a link destination of a location listing information indicating rewards) in association with each other.

The installation information manager 222, based on installation notification information acquired from the user terminal 100, manages a reward user ID and an application ID of a target application that was installed, included in the installation notification information, in association with each other, as installation information.

The installation information manager 222 may manage the reward user ID, the target application ID, and the application user ID of the target application included in the installation notification information, in association with each other.

The customer transfer information manager 223 manages, as a customer transfer record, the reward user ID, the application ID of the customer transfer source application 10, and the application ID of the customer transfer destination application 20, which were transmitted from the user terminal 100 and acquired by the management server 200, in association with each other.

If a campaign is set in the customer transfer source application 10 and the customer transfer destination application 20, the customer transfer information manager 223 further manages associated customer transfer information indicating a campaign.

The storage 230 stores various information managed by the manager 220 or the controller 240.

The storage 230 has a target application information storage 231, a normal reward information storage 232, an inter-application filter storage 233, a campaign information storage 234, a campaign participant application information storage 235, an installation information storage 236, a customer transfer information storage 237, and a reward establishment storage 238. It is sufficient that the various information is stored in a format suitable for the use of the information, such as in a database table format or JSON (JavaScript (registered trademark) object notation).

The target application information storage 231 stores target application information regarding target application accommodating the reciprocal customer transfer system 500. FIG. 7 shows an example of target application information stored in the target application information storage 231. In the target application information, the application ID of the target application (ApID), the notification destination URL (NoticeURL), the store URL (ApStoreURL), the application name indicating the name of the target application (ApNAME), the application description, which is descriptive information regarding the target application (ApDOC), an application icon image which is the image of an icon indicating the target application (ApICO), and an application price (ApPRICE) are associated with each other.

The notification destination (NoticeURL) is the URL (universal resource locator) of the reward notification destination, in which is set, for example, the URL of the application server 300 handling the target application. The store URL (ApStoreURL) is the URL of the page of the sales site (application store 400) at which the target application can be downloaded. The application price (ApPRICE) is the sales price of the target application. The above-noted target application information is used, for example, in the target application list LT displayed on the user terminal 100.

The above-noted application information is, for example, set beforehand before it is possible to download the target application from the application store 400 and is stored in the target application information storage 231 and managed by the target application manager 221.

The normal reward information storage 232 stores information (normal reward information) regarding normal rewards for each target application. FIG. 8 shows an example of the normal reward information stored in the normal reward information storage 232. In the normal reward information, the item ID identifying the item granted as a normal reward in the target application (ItemID), the target application ID (ApID), the minimum price (min_price), the reward item name indicating the name of the item (ItemName), and the number of reward items indicating the number of items granted as a reward (ItemNum) are associated with each other. The minimum price (min_price) is set to the price of the target application that is the subject of a normal reward. The above-noted normal reward information is used, for example, in the target application list LT displayed on the user terminal 100.

The above-noted normal reward information is, for example, set when target application information is stored into the target application information storage 231, stored into the normal reward information storage 232, and managed by the application manager 221.

The inter-application filter storage 233 stores filter information (inter-application filter information) between applications, for the purpose of controlling target application between which reciprocal customer transfer can be done. The processing to control target applications between which reciprocal customer transfer can be done will be described regarding the second embodiment.

The campaign information storage 234 stores information (campaign information) regarding campaigns of specified applications of the target application that participate in campaigns. FIG. 9 shows an example of the campaign information stored in the campaign information storage 234. In the campaign information, the campaign ID (CpID), the campaign name (CpNAME), the campaign starting date/time (CpStartDATE), the campaign ending date/time (CpEndDATE), the reward granting starting date/time (RewardStartDATE), and the reward granting ending date/time (RewardEndDATE) are associated with each other.

The campaign ID (CpID) is identification information that identifies a campaign. The campaign name (CpNAME) is the name of the campaign. The campaign starting date/time (CpStartDATE) and the campaign ending date/time (CpEndDATE) indicate the starting and ending times of the campaign. In this case, if the customer transfer destination application 20 is installed during the campaign time period established by the campaign starting date/time and ending date/time, CP reward granting eligibility is obtained.

In the CP reward, for example, a number of achievement points are set, and the reward granting time period set by the reward granting starting date/time (RewardStartDATE), and the reward granting ending date/time (RewardEndDATE) establishes by what time a user who has started using the customer transfer destination application 20 during the campaign time period needs to reach an achievement point. For example, the reward granting time period (example of the second time period) is set to start either at the beginning of the campaign time period or midway in the campaign time period and to end after the campaign time period. As one example, the campaign starting date/time and the reward granting starting date/time are set to the same date/time and the reward granting ending date/time is set to one week after the campaign ending date/time. The above-noted campaign information is set beforehand before the campaign starting date/time and stored in the campaign information storage 234, and is managed by the application manager 221. The same campaign information is set into the application server 300 handling each specified application conducting a campaign and into the management server 200.

The configuration may be one in which the reward granting time period is not set separately from the campaign time period, and a configuration may be adopted in which the reward granting time period is the same as the campaign time period.

The campaign participant application information storage 235 stores information (campaign participant application information) indicating a specified application participating in a campaign set in the campaign information storage 234. In this case, because this is a campaign with respect reciprocal customer transfer between applications, at least two applications are set in one campaign. FIG. 10 shows an example of the campaign participant application information stored in the campaign participation application information storage 235. In the campaign participant application information, the campaign ID (CpID), the application ID (ApID) of the specified application participating in the campaign, and the campaign page URL (CpPageURL) are associated with each other. The campaign ID (CpID) corresponds to the campaign ID included in the campaign information stored in the campaign information storage 234.

The campaign page URL (CpPageURL) is information indicating the page (website page) at which is listed information regarding a CP reward granted when an application is installed and used during the campaign time period. This page also lists information regarding the application (description and price). For example, if a campaign is set for the customer transfer source application 10 (game A) and the customer transfer destination application 20 (game B), the URLs of a page within the application server 310 (game A) and the application server 320 (game B) handling each of the applications may be set as the campaign page URLs. A dedicated campaign site may be provided, and a singular URL may be set corresponding to a dedicated campaign site for either of the customer transfer source application 10 (game A) and the customer transfer destination application 20 (game B). This dedicated campaign site may be provided within the management server 200.

Because the information regarding CP rewards is listed on the application server 300 or on a dedicated campaign site in this manner, it is not necessary for it to be managed by the management server 200.

The above-described campaign participant application information is set when a target application participates in a campaign as a specified application, is stored in the campaign participant application information storage 235, and is managed by the application manager 231.

The information included in the campaign information and the campaign participant application information, in addition to being managed in the management server 200 as noted above, is managed in the same manner in the application server 300 handling the specified application participating in the campaign. A user terminal 100 that has installed a specified application participating in a campaign can acquire, from the application server 300 handling the specified application, information that includes the application campaign information and the campaign participant application information.

The installation information storage 236 stores installation information managed by the installation information manager 222, based on the installation notification information acquired by the management server 200 that was transmitted from the user terminal 100. FIG. 11 shows an example of the installation information stored in the installation information storage 236. In the installation information, for example, the reward user ID (RewardUID), the application ID (ApID), and the application user ID (ApUID) included in the acquired installation notification information are associated with each other.

In both the case of a target application being installed without the intervention of the customer transfer processing by the reciprocal customer transfer system 500 and the case of installation with the intervention of the customer transfer processing by the reciprocal customer transfer system 500, installation notification information is transmitted from the user terminal 100, and installation information based on the installation notification information acquired by the management server 200 is stored into the installation information storage 236. That is, the installation information storage 236 has stored into it installation information of all target applications that have been installed in the user terminal 100. Thus, once a target application is installed, even if it is installed once again after being uninstalled, because the installation information of that target application is stored in the installation information storage 236, the management server 200 can prevent duplicated granting of rewards.

The customer transfer information storage 237 stores (records) customer transfer information that is managed by the customer transfer information manager 223, based on the customer transfer information acquired by the management server 200 and that was transmitted from the user terminal 100. FIG. 12 shows an example of the customer transfer information stored in the customer transfer information storage 237. In the customer transfer information, the reward management ID (RewardID), the reward user ID (RewardUID), the customer transfer application ID (ApIDfrom), the customer transfer destination application ID (ApIDto), and the campaign ID (CpID) are associated with each other. The reward management ID (RewardID) is management ID that issued in sequence of acquisition of customer transfer information, so that identification is possible of each customer transfer information. The customer transfer source application ID (ApIDfrom) is the application ID of the customer transfer source application 10, and the customer transfer destination application ID (ApIDto) is the application ID of the customer transfer destination application 20. If the customer transfer source application 10 and the customer transfer destination application 20 are both in a campaign time period of the same campaign, the campaign ID of that campaign is stored, and if a campaign is not in progress, the campaign ID is set to "null".

So that the application store does not include target applications already installed in the user terminal 100 or target applications that were once installed therein (and subsequently uninstalled), customer transfer information regarding target applications to be newly installed is stored in the customer transfer information storage 237. Even if customer transfer information is stored in the customer transfer information storage 237, the customer transfer destination application 20 of that customer transfer information is not necessarily installed.

If the customer transfer processing indicated by the customer transfer information stored by the customer transfer information storage 237 satisfies the reward granting condition for a normal reward or a CP reward, the reward establishment information storage 238 stores reward establishment information indicating whether or not there has been notification of reward granting information to the application server 310 (game A) handling the customer transfer source application 10 (game A).

In the case of a normal reward, when, for example, installation information of a target application corresponding to the customer transfer destination application ID is stored in the customer transfer information storage 236, a new record corresponding to that customer transfer information is generated and stored into the reward establishment information storage 238.

In the case of a CP reward, when, for example, reward granting notification information corresponding to the customer transfer destination application ID of the customer transfer information stored in the customer transfer information storage 237 is acquired from the user terminal 100, a new record corresponding to that customer transfer information is generated and this reward and stored into the reward establishment information storage 238.

FIG. 13 shows an example of reward establishment information stored in the reward establishment information storage 238. In the reward establishment information, the reward management ID (RewardID), the achievement point ID (RewardSpotID), and the establishment status (RewardStatus) are associated with each other. The reward management ID (RewardID) corresponds to the reward management ID included in the customer transfer information stored in the customer transfer information storage 237.

The achievement point ID (RewardSpotID) is identification information of an achievement point at which a reward is granted to the customer transfer destination application 20, set based on the reward granting condition.

In the case of a CP reward, the achievement point ID (RewardSpotID) is set to identification information indicating an achievement point (reward granting condition in the customer transfer destination application 20) set beforehand regarding a campaign. If there are a plurality of achievement points, a plurality of records associated with each of the plurality of achievement point IDs for the same reward management ID are generated and stored into the reward establishment information storage 238.

In the case of a normal reward, that is, in the case in which the campaign ID included in the customer transfer information stored in the customer transfer information storage 237 is "null", the achievement point (reward granting condition) is the time of installation of the customer transfer destination application 20, and the achievement point ID is set to "null".

Even in the case of a CP reward, if identification information that makes installation of the customer transfer destination application 20 a condition is set as the achievement point ID, the achievement point is when the customer transfer destination application 20 is installed and can be executed or is executed is the achievement point (reward granting condition), the same as the case of a normal reward.

The establishment status (RewardStatus) is set to flag information indicating the status of whether or not the application server 310 (game A) handling the customer transfer source application 10 (game A) has been notified of reward granting information. That is, when a new record is generated in association with the reward management ID corresponding to the customer transfer information stored in the customer transfer information storage 237, the establishment status (RewardStatus) is set to a flag 0 (not yet notified). Subsequently, if there is notification of reward granting information to the application server 310 (game A), the establishment status (RewardStatus) is updated to a flag 1 (already notified). Alternatively, the flag may be updated to a flag 1 (already notified) when a response is acquired from the application server 310 (game A) to the notification of the reward granting information.

Returning to FIG. 6, the configuration of the controller 240 will be described.

The controller 240 has an installation notification acquisitor 241, a list notifier 242, a customer transfer information acquisitor 243, an installation guide instructor 244, a reward processor 245, and a timekeeper 246.

The installation notification acquisitor 241 acquires, from the target application (the SDK 11 of the target application), installation notification information indicating that, of a plurality of target applications, the target application was installed into the user terminal 100 specified by the reward user ID. This installation notification information includes, as described above, for example, a reward user ID corresponding to that user terminal 100 and an application ID corresponding to that target application. The installation notification information may further include an application user ID of the target application. The installation notification acquisitor 241 supplies the acquired installation notification information to the installation information manager 222.

Upon acquiring the list request notification information transmitted from the customer transfer source application 10 (SDK 11A of the customer transfer source application 10) installed in the user terminal 100, the list notifier 242, based on the acquired list request notification information, references the target application information storage 231 and the installation information storage 236 and transmits to the user terminal 100 an application list of at least one target application (or specified application) for which installation information has not been acquired from the user terminal 100 (that is, which is not installed in the user terminal 100).

The list notifier 242 references the campaign information storage 234 or the campaign participant application information storage 235 and transmits information regarding a campaign for one or a plurality of specified applications included in the application list.

When this is done, the list notifier 242 generates data of a target application list page displayable on the user terminal 100 based on an application list that includes information regarding the target application (application name, description, and price and the like), and information regarding normal reward details or information regarding the CP reward details (for example, the campaign time period or a link destination of the location at which the reward for the campaign is listed) and transmits this information the user terminal 100. For example, the list notifier 242 generates data of an application list page on which the target application list LT is displayed, coded in HTML (Hypertext markup language) to enable display using a browser executable by the SDK 11, and transmits information indicating the link destination of the generated page to the user terminal 100.

The customer transfer information acquisitor 243 acquires from the user terminal 100 customer transfer information regarding customer transfer from the customer transfer source application 10 to the customer transfer destination application 20, and that includes the reward user ID, the application ID of the customer transfer source application 10, and the application ID of the customer transfer destination application 20. The customer transfer information acquisitor 243 supplies the acquired customer transfer information to the customer transfer information manager 223.

The installation guide instructor 244, based on the application ID of the customer transfer destination application 20 included in the customer transfer information acquired by the customer transfer information acquisitor 243, transmits to the user terminal 100 instruction information that provides a guide to a screen enabling installation of the customer transfer destination application 20. For example, the installation guide instructor 244 transmits to the user terminal 100 instruction information that launches the store 30, which is an application that displays a store page of a store site that enables installation (downloading) of the customer transfer destination application 20.

The reward processor 245 executes the first reward granting processing (CP reward processing) regarding a CP reward and the second reward granting processing regarding a normal reward.

If the installation notification acquisitor 241 has acquired installation notification information corresponding to the customer transfer destination application 20, the reward processor 245 determines whether or not the customer transfer information regarding sending from the customer transfer source application 10 to the customer transfer destination application 20 is stored in the customer transfer information storage 237. If that customer transfer information is stored in the customer transfer information storage 237 (that is, under the condition that the record of the customer transfer information with respect to the customer transfer destination application 20 is managed in the customer transfer information manager 223), the reward processor 245 determines that this is a target application which has been sent to the customer transfer source application 10 by the reciprocal customer transfer system 500 and executes CP reward processing or normal reward processing. In this case, in the CP reward or the normal reward processing, the reward processor 245 transmits reward granting information to the application server 310 handling the customer transfer source application 10, so that a reward is granted to the user in the customer transfer source application 10. As described earlier, even in the case in which a target application is installed without the intervention of customer transfer processing by the reciprocal customer transfer system 500, the installation notification information is transmitted to the management server 200. For this reason, by setting the condition of the record of the customer transfer information with respect to the customer transfer destination application 20 being managed in the customer transfer information manager 223, it is possible to prevent the granting of a CP reward or a normal reward for the case in which the customer transfer destination application 20 is simply installed.

Consider the case of a campaign being set between the customer transfer destination application 20 and the customer transfer source application 10. In this case, based on the judgment that the customer transfer destination application 20 was installed during the campaign time period and also the reward granting condition pre-established for the campaign having been satisfied, the reward processor 245 executes CP reward processing based on the acquired reward granting notification information. In contrast, consider the case in which the customer transfer destination application 20 selected at the user terminal 100 is not in a campaign with the customer transfer source application 10. In this case, the reward processor 245, upon judging that the customer transfer destination application 20 was installed, executes normal reward processing.

In the case of a specified application in which a campaign is set between the customer transfer destination application 20 and the customer transfer source application 10, if the timing of the acquisition by the installation notification acquisitor 241 of installation notification information corresponding to the customer transfer destination application 20 is within the campaign time period, the reward processor 245 determines that the customer transfer destination application 20 was installed in the user terminal 100 during the campaign time period. Even if there is a campaign set between the customer transfer destination application 20 and the customer transfer source application 10, if the customer transfer destination application 20 is installed into the user terminal 100 outside of the campaign time period, the reward processor 245 executes not CP reward processing, but rather normal reward processing.

In the normal reward processing, the reward processor 245, based on the installation notification information acquired by the installation notification acquisitor 241 from the customer transfer destination application 20, accesses the installation information storage 236 and acquires the application user ID of the customer transfer source application 10 that is associated with the reward user ID included in the acquired installation notification information. The reward granting information that includes the application user ID is then transmitted to the application server 310 handing the customer transfer source application 10.

In CP reward processing, the reward processor 245 references the installation information storage 236 and acquires the application user ID of the customer transfer source application 10 associated with the reward user ID included in the reward granting notification information acquired from the customer transfer destination application 20. Then, based on the acquired reward granting notification information, reward information including the application user ID is transmitted to the application server 310 handling the customer transfer source application 10. The reward processor 245 may further include in the above-noted reward granting information the campaign ID or achievement point ID or the like included in the acquired reward granting notification information and transmit it to the application server 310 handling the customer transfer source application 10.

In the case of a normal reward, if installation information of the target application corresponding to the customer transfer destination application ID stored in the customer transfer information storage 237 is stored in the installation information storage 236, the reward processor 245 generates a new record of the reward establishment information corresponding to that customer transfer information, and stores the generated record into the reward establishment information storage 238. When this is done, the reward processor 245 sets the establishment status (RewardStatus) included in the reward establishment information to the flag 0 (not yet notified).

In contrast, in the case of a CP reward, when, for example, reward granting notification information corresponding to the customer transfer destination application ID of the customer transfer information stored in the customer transfer information storage 237 has been acquired from the user terminal 100, the reward processor 245 generates a new record of the reward establishment information corresponding to that customer transfer information and stores the generated record into the reward establishment information storage 238. When this is done, the reward processor 245 sets the establishment status (RewardStatus) included in the reward establishment information to the flag 0 (not yet notified).

For example, in the case of a CP reward, if the reward granting notification information corresponding to the customer transfer application ID in the customer transfer information stored in the customer transfer information storage 237 has been acquired by the user terminal 100 during the campaign time period corresponding to that customer transfer information, the reward processor 245 generates a new record of the reward establishment information corresponding to that customer transfer information and stores the generated record into the reward establishment information storage 238. When a reward granting time period is set in a campaign, if the reward granting notification information corresponding to the customer transfer destination application ID of the customer transfer information stored in the customer transfer information storage 237 has been acquired from the customer transfer destination application 20 within the reward granting time period, the reward processor 245 may generate a new record of the reward establishment information corresponding to the customer transfer information and store the generated record into the reward establishment information storage 238.

For both normal reward processing and CP reward processing, the reward processor 245, in response to the transmitting to the application server 310 of notification of the reward granting information corresponding to the reward establishment information, updates the establishment status (RewardStatus) of that reward establishment information to a flag 1 (already notified).

The timekeeper 246 keeps time and acquires the current date/time. The timekeeper 246 may also acquire the current date/time data from a date/time providing server (not shown), via the network NW. For example, the reward processor 245, based on information indicating the date/time kept by the timekeeper 246, determines whether or not the current time is within a campaign time period or whether or it is within the reward granting time period. The various information storages (231 to 238) managed by the storage 230 may store in each record a data registration date/time indicating the date/time that the record was generated and a data updating date/time indicating the date/time that the record was updated. For example, in the data registration date/time stored in the installation information storage 236, the date/time, as kept by the timekeeper 246, that the installation information was acquired from the user terminal 100 is stored, this being data indicating the date/time of installation of the application corresponding to that installation information in the user terminal 100.

(Detailed Operation of the Reciprocal Customer Transfer Processing)

Figure 14:
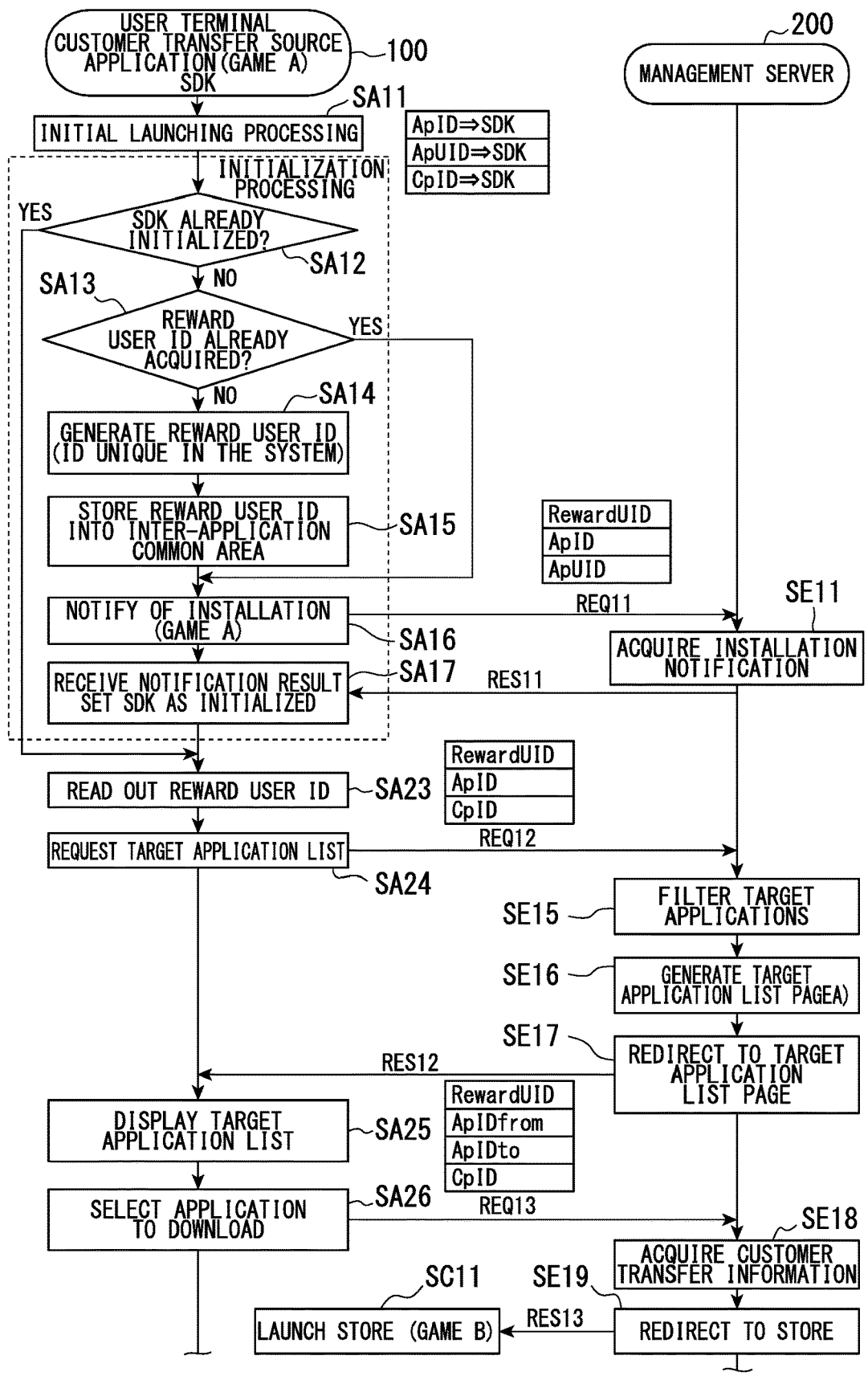
FIG. 14 is a first flowchart showing an example of the operation of reciprocal customer transfer processing according to the present embodiment.
Figure 15:
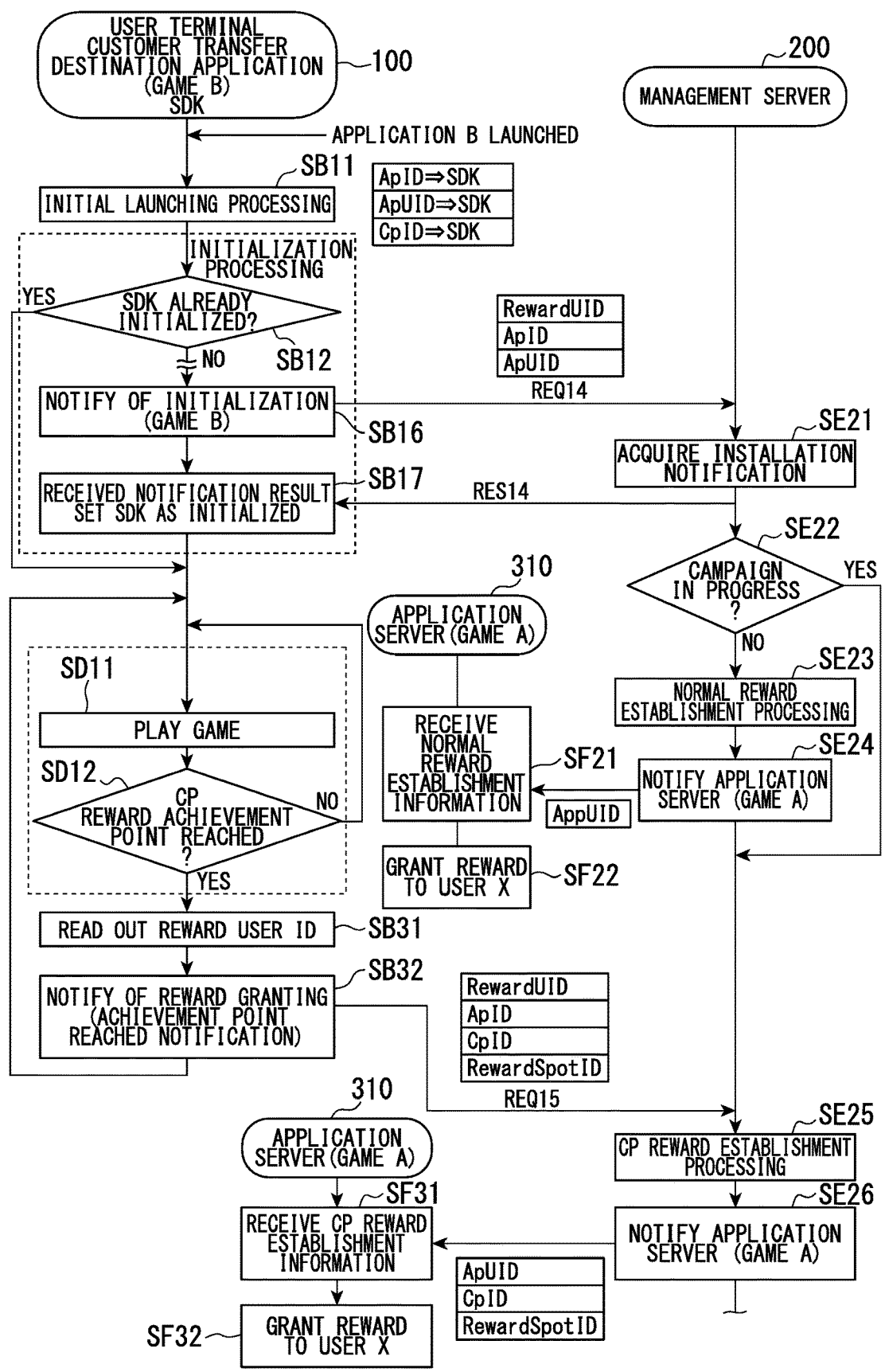
FIG. 15 is a second flowchart showing an example of the operation of reciprocal customer transfer processing according to the present embodiment.

Referring to FIG. 14 and FIG. 15, the operation of reciprocal customer transfer processing in the reciprocal customer transfer system 500 according to the present embodiment will be described in detail. FIG. 14 and FIG. 15 are flowcharts showing an example of the operation of reciprocal customer transfer processing by the present embodiment. The processing shown in FIG. 14 and FIG. 15 is a detailed example of the general flow of processing described with regard to FIG. 4.

First, the processing at the customer transfer source application 10 (game A), which is installed in the user terminal 100 will be described. Specifically, the processing from the processing executed by the SDK 11A after installation of the customer transfer source application 10 (game A) (processing at (1)) up until the processing of the management server 200 transmitting to the user terminal 100 instruction information that guides to a screen enabling installation of the customer transfer destination application 20 (game B) (processing at (6)) shown in FIG. 4 will be described in detail.

If the customer transfer source application 10 (game A) has been installed in the user terminal 100, the initialization processor 101 of the SDK 11A embedded in the customer transfer source application 10 (game A), as the initialization processing executed only the first time, acquires from the customer transfer source application 10 (game A) the application ID of the customer transfer source application 10 (ApID), the application user ID of the user X registered in the customer transfer source application 10 (ApUID), and the campaign ID (CpID) if a campaign is set (step SA11).

The initialization processor 101 of the SDK 11A executes initialization processing of the SDK 11A. First, the initialization processor 101, in the initialization processing, determines whether or not initialization processing has already been done (step SA12). If initialization has already been done, (YES at step SA12), the initialization processor 101 then ends without executing initialization processing and processing proceeds to step SA17. If, however, the judgment is that initialization has not been done (NO at step SA12), the unique identification information acquisitor 102 references the terminal storage 140 and determines whether or not the reward user ID has already been acquired. The judgment of whether or not the reward user ID has already been acquired is made by judging whether or not the reward user ID is stored in the inter-application common area of the terminal storage 140 so that referencing is possible from any target application installed in the user terminal 100.

If the judgment is that the reward user ID has been acquired (YES in step SA13), the unique identification information acquisitor 102 of the SDK 11A reads out the reward user ID from the terminal storage 140, and processing proceeds to step SA16.

If, however, the judgment is that the reward user ID has not already been acquired (NO at SA13), the unique identification information acquisitor 102 generates and acquires a reward user ID (an ID unique in the reciprocal customer transfer system 500) corresponding to the user terminal 100 (step SA14).

The unique identification information acquisitor 102 stores the acquired reward user ID in the inter-application common area of the terminal storage 140 (step SA15).

Continuing, the installation notifier 103 of the SDK 11A transmits to the management server 200 installation notification information indicating that the customer transfer source application 10 (game A) was installed in the user terminal 100 (REQ11, step SA16). In this case, the installation notification information includes the reward user ID corresponding to the user terminal 100 (RewardUID), the application ID of the customer transfer source application 10 (game A) (ApID), and the application user ID of the user X registered in the customer transfer source application 10 (game A) (ApUID).

The installation notification information acquisitor 241 of the management server 200 acquires the installation notification information transmitted from the user terminal 100 (SDK 11A). Then, the installation notification acquisitor 241 transmits to the user terminal 100 (SDK 11A) response information (notification result) indicating that the installation notification information has been acquired (RES11). The installation information manager 222 of the management server 200 stores in the installation information storage 236, as installation information, the reward user ID (RewardUID), the application ID of the customer transfer source application 10 (game A) (ApID), and the application user ID of the user X in the customer transfer source application 10 (game A) (ApUID) that are included in the installation notification information acquired by the installation notification acquisitor 241, in association with each other (step SE11).

Upon acquiring the response information (response result) transmitted from the management server 200, the initialization processor 101 of the SDK 11A sets a flag indicating that initialization has been done and ends the initialization processing (step SA17).

Consider the case in which the user X makes, with respect to the customer transfer source application 10 (game A) operating in the user terminal 100, a prescribed operation (first operation) with respect to the input 110 in order to acquire an application list of target application that can be installed into the user terminal 100.

Based on the prescribed operation (first operation) in the customer transfer source application 10, the list requester 104 of the SDK 11A, in addition to reading out the reward user ID from the inter-application common area of the terminal storage 140 (step SA23), transmits to the management server 200 list request notification information that requests an application list (information of target applications that can be customer transfer destination application 20 candidates) of at least one target application of a plurality of target applications (REQ12, step SA24).

In this case, the list request information includes the user ID corresponding to the user terminal 100 (RewardUID), the application ID of the customer transfer source application 10 (game A) (ApID), and the campaign ID (CpID). If a campaign is not set in the customer transfer source application 10 (game A), the campaign ID (CpID) is set to "null". Even if the campaign ID (CpID) is not included in the list request notification information, it is possible by referencing the campaign participant application information storage 235 and the campaign information storage 234, to acquire, within the management server 200, based on the application ID of the customer transfer source application 10 (game A) (ApID), whether or not a campaign is being conducted by customer transfer source application (game A) and, in the case in which a campaign is being conducted by the customer transfer source application 10 (game A), to acquire the corresponding campaign ID (CpID).

Upon acquiring the list request notification information transmitted from the user terminal 100 (the SDK 11A of the customer transfer source application 10), the list notifier 242 of the management server 200, based on the acquired list request notification information, extracts at least one target application for which installation information has not been acquired from the user terminal 100 (that is, which is not installed in the user terminal 100). Specifically, by excluding (filtering) from the target application IDs managed by the target application information storage 231 application IDs associated with a reward user ID (RewardUID) stored in the installation information storage 236, the list notifier 242 extracts at least one target application that is not installed in the user terminal 100 (step SE15). The list notifier 242 may, based on application ID of the customer transfer source application 10 (game A) (ApID) and the campaign ID (CpID) included in the list request notification information, extract only target applications in which a campaign with the customer transfer source application 10 (game A) is set from the target applications installed in the user terminal 100. It could happen that, there not being any target applications (specified applications) that are not installed in the user terminal 100, extraction is not possible.

In accordance with the acquisition of this list request notification information, the list notifier 242 can perform filtering processing of target application included in the application list transmitted to the user terminal 100, based on a condition (filtering information) stored in the inter-application common storage 233. The filtering processing is described with regard to the second embodiment.

The list notifier 242 generates data of an application list page for the purpose of displaying the target application list LT on the user terminal 100, based on the extracted list of target applications (step SE16), transmits to the user terminal 100 redirect instruction information in accordance with the generated application list page, and causes redirection to the application list page (RES12, step SE17). If there are no target applications (specified applications) that are not installed in the user terminal 100, instead of the target application list LT, an application list page indicating that there are no target applications (specified applications) is generated.

When the user terminal 100 acquires from the management server 200 redirect instruction information corresponding to the application list page, the display controller 105 of the SDK 11A causes display of the application list page on the display 120 by a browser function (step SA25).

In this case, the display controller 105 causes display of this application list page, overlapped onto the display screen of the customer transfer source application 10 (game A) that has been displayed up until that point display on the display 120. This causes the target application list LT of applications selectable as the customer transfer destination application 20 to be displayed on the application list page.

When any one of the target applications in the target application list LT displayed on the display 120 of the user terminal 100, the customer transfer information notifier 106 of the SDK 11A transmits to the management server 200 customer transfer information indicating customer transfer from the customer transfer source application 10 (game A) to the selected customer transfer destination application (in this case the customer transfer destination application 20 (game B)) (REQ13, step SA26). In this case, the customer transfer information includes the application ID of the customer transfer source application 10 (game A) (ApID), the application ID of the customer transfer destination application 20 (game B) (ApID), the reward user ID (RewardUID), and the campaign ID (CpID). If there is no campaign set in the customer transfer source application 10 (game A) and the customer transfer destination application 20 (game B), the campaign ID (CpID) is set to "null". It is possible to acquire the campaign ID (CpID) within the management server 200, based on the customer transfer source application 10 (game A) application ID (ApID), without acquiring it from the user terminal 100.

When a customer transfer destination application 20 (game B) is selected, the display controller 105 of the SDK 11A closes the application list page that was displayed on the display 120 at step SA25 and returns to the display screen of the customer transfer source application 10 (game A).

The customer transfer information acquisitor 243 of the management server 200 acquires customer transfer information from the user terminal 100 (SDK 11A). Then, the customer transfer information manager 223 stores into the customer transfer information storage 237, as customer transfer information, the application ID of the customer transfer source application 10 (game A) (ApID), the application ID of the customer transfer destination application 20 (game B) (ApID), the reward user ID (RewardUID), and the campaign ID (CpID), which were are included in the customer transfer information acquired by the customer transfer information acquisitor 243 (step SE18).

Continuing, the installation guide instructor 244 of the management server 200, based on the application ID of the customer transfer destination application 20 (game B) included in the customer transfer information acquired by the customer transfer information acquisitor 243, transmits to the user terminal 100 instruction information that provides a guide to a screen enabling installation of the customer transfer destination application 20 (game B). For example, the installation guide instructor 244 transmits to the user terminal 100 instruction information that launches the store 30, which is an application that displays a store page of a store site enabling installation (downloading) of the customer transfer destination application 20 (game B) (step SE19).

Upon acquiring from the management server 200 the instruction information that launches the store 30, the user terminal 100 displays on the display 120 the store page of the store site enabling installation (downloading) of the customer transfer destination application 20 (game B) (step SC11). In this case, the user terminal 100 causes display of the store page on the display 120, overlapped with the display screen on the customer transfer source application 10 (game A) that had been up until then displayed on the display 120.

After the customer transfer destination application 20 (game B) is downloaded to and installed in the user terminal 100 by an operation by the user X from the store page displayed by the store 30, a further operation by the user X launches the installed customer transfer destination application 20 (game B).

Referring to FIG. 15, the processing after the launching of the customer transfer destination application 20 (game B) installed in the user terminal 100 will be described. Specifically, the processing from the processing executed by the SDK 11B after installation of the customer transfer destination application 20 (game B) (processing at (8)) up until the processing of transmitting the reward granting information to the application server 310 (game A) handling the customer transfer source application (game A) (processing at (11)) shown in FIG. 4 will be described in detail. If the customer transfer destination application 20 (game B) has been installed in the user terminal 100, processing that is the same as the first-time launching and initialization processing for the case in which the customer transfer source application (game B) is installed, as described in FIG. 14, is performed.

First, the initialization processor 101 of the SDK 11B embedded in the customer transfer destination application 20 (game B), as processing performed only the first time, acquires from the customer transfer destination application 20 (game B) the application ID of the customer transfer destination application 20 (ApID), the application user ID of the user X registered in the customer transfer destination application 20 (ApUID), and the campaign ID (CpID) if a campaign is set (step SB11).

The initialization processor 101 of the SDK 11B executes initialization of the SDK 11B. The initialization processor 101 determines whether or not initialization processing has already been done (step SB12). If initialization has already been done, (YES at step SB12), the initialization processing ends, but if the judgment is that initialization processing had not been done (NO at step SB12), processing proceeds to the processing by the unique identification information acquisitor 102. In this case, because the reward user ID of the user terminal 100 has already been acquired, processing continues with the processing of installation notification at step SB16.

Installation notification information indicating that the customer transfer destination application 20 (game B) has been installed in the user terminal 100 is transmitted by the installation notifier 103 of the SDK 11B to the management server 200. In this case, the installation notification information includes the reward user ID corresponding to the user terminal 100 (RewardUID), the application ID of the customer transfer destination application 20 (game B) (ApID), and the application user ID of the user X registered in the customer transfer destination application 20 (game B) (ApUID).

The installation notification acquisitor 241 of the management server 200, similar to the processing at step SE11, acquires installation notification information transmitted from the user terminal 100 (SDK 11B). Then, the installation notification acquisitor 241 transmits to the user terminal 100 (SDK 11B) response information (response result) indicating that the installation notification information has been acquired (RES14). The installation information manager 222 of the management server 200 stores into the installation information storage 246, as installation information, the reward user ID (RewardUID), the application ID of the customer transfer destination application 20 (game B) (ApID), and the application user ID of the user X in the customer transfer destination application 20 (game B) (ApUID), which were included in the installation notification information acquired by the installation notification acquisitor 241, in association with each other (step SE21).

Upon acquiring the response information (response result) from the management server 200, the user terminal 100 (SDK 11B), similar to the processing at step SA22, sets the flag indicating that initialization has been done and ends the initialization processing (step SB17).

By the installation notification acquisitor 241 acquiring installation notification information corresponding to the customer transfer destination application 20, the reward processor 245 determines whether or not customer transfer information with respect to customer transfer from the customer transfer source application 10 (game A) to the customer transfer destination application 20 (game B) is stored in the customer transfer information storage 237. If this customer transfer information is stored in the customer transfer information storage 237 (that is, the condition in which the record of customer transfer information with respect to the customer transfer destination application 20 is managed in the customer transfer information manager 223), the judgment is made that the customer transfer destination application 20 is a target application sent from the customer transfer source application 10 by the reciprocal customer transfer system 500, and either normal reward processing or CP reward processing is executed. In this case, in the processing at step SE18, by the storing of the customer transfer information stored in the customer transfer information storage 237, the judgment is made that the customer transfer destination application 20 is a target application that has been sent from the customer transfer source application 10 by the reciprocal customer transfer system 500.

Continuing, the reward processor 245 determines whether or not the timing of the acquisition of the installation notification information corresponding to the customer transfer destination application 20 (game B) by the installation notification acquisitor 241 was during a campaign time period (step SE22).

For example, in the case of a specified application for which a campaign is set between the customer transfer destination application 20 (game B) and the customer transfer source application 10 (game A), the reward processor 245 references the campaign information storage 234 and determines whether or not the timing of the acquisition of the installation notification information (the date/time kept by the timekeeper 246 at the time of acquisition of the installation notification information) is during the campaign time period of that campaign.

At step SE22, if the judgment is that the timing of acquisition of the installation notification information was within the campaign time period (YES at step SE22), the reward processor 245 executes CP reward processing, based on the acquisition of the reward granting notification information from the SDK 11B of the customer transfer destination application 20 of the user terminal 100.

If however, the judgment at step SE22 is that the timing of acquisition of the installation notification information was not within the campaign time period (NO at step SE22), the reward processor 245 executes normal reward processing. Even in the case in which the customer transfer destination application 20 (game B) is a target application that does not have a campaign set with the customer transfer source application 10 (game A), the judgment at step SE22 is that the timing of acquisition of the installation notification information was not within the campaign time period (NO at SE22), and the reward processor 245 executes normal reward processing.

First, the operation of normal reward processing will be described. At step SE22, if the judgment is that the timing of acquisition of the installation notification information was not within the campaign time period (NO at step SE22), the reward processor 245, based on the acquisition by the installation notification acquisitor 241 of installation notification information from the customer transfer destination application 20 and also that the customer transfer information with respect to the customer transfer destination application 20 is managed in the customer transfer information manager 223, sets the achievement point ID (RewardSpotID) to "null" in association with this customer transfer information, generates reward establishment information with the reward establishment status (RewardStatus) set to the flag 0 (not yet notified), and stores this into the reward establishment storage 238 (step SE23).

The reward processor 245 references the customer transfer information manager 223 and acquires customer transfer information corresponding to the reward management ID associated with the generated reward establishment information. Then, the reward processor 245 transmits reward granting information (information indicating the establishment of a normal reward) that includes the application user ID (ApUID) of the customer transfer source application 10 (game A) to the application server 310 (game A) handling the customer transfer source application 10 (game A) included in that customer transfer information. The application server 310 (game A) that is the sending destination is indicated by the notification destination URL (NoticeURL) corresponding to the application server 310 (game A) stored in the target application information storage 231.

The reward processor 245 updates the reward establishment status (RewardStatus) corresponding to the transmitted reward granting information to the flag 1 (already notified).

The application server 310 (game A), upon receiving the reward granting information (information indicating establishment of a normal reward) from the management server 200 (step SF21), grants a normal reward established beforehand to the application user ID (application user ID of the user X) included in the reward granting information (step SF22).

The operation of CP reward processing will be described. If the judgment at step SE22 is that the timing of acquisition of the installation notification was within the campaign time period (YES at step SE22), the reward processor 245 executes CP reward processing based on acquisition of the reward granting information from the SDK 11B of the customer transfer destination application 20 of the user terminal 100.

In the user terminal 100, the user X plays the customer transfer destination application 20 (game B) and progresses through the game (step SD11). The customer transfer destination application 20 (game B) determines whether or not the reward granting condition pre-established with respect to the campaign has been satisfied (whether or not the CP reward achievement point has been reached) (step SD12). The processing of step SD11 and step SD12 is not executed by the SDK 11B, but rather by the customer transfer destination application 20 (game B).

Consider the case in which, in accordance with the progress of the game of the customer transfer destination application (game B), it is determined that the reward granting condition pre-established regarding the campaign has been reached (that the CP reward achievement point has been reached).

In this case, the customer transfer destination application (game B) notifies the SDK 11B of the achievement point ID (RewardSpotID) corresponding to the achievement point that was reached. The reward granting notifier 107 of the SDK 11B that has received the notification reads out the reward user ID from the inter-application common area of the terminal storage 140 (step SB31) and transmits to the management server 200 reward granting notification information that includes the read-out reward user ID (RewardUID), the application ID of the customer transfer destination application 20 (game B) (ApID), the campaign ID (CpID), and the achievement point ID (RewardSpotID) acquired from the customer transfer destination application 20 (game B) (REQ15, step SB32). If there are a plurality of achievement points, return is made to steps SD11 and SD12 and, for each achievement point reached, the SDK 11B is notified of the achievement point ID (RewardSpotID) corresponding to the achievement point reached in the customer transfer destination application 20 (game B). The reward granting notifier 107 of the SDK 11B notifies the management server 200 of the reward granting notification information (achievement point reached notification).

The reward processor 245 of the management server 200, based on the acquisition of the reward granting notification information (achievement point reached notification) from the user terminal 100 (SDK 11B) and also on the management of the record of the customer transfer information with respect to the customer transfer destination application 20 by the customer transfer manager 223, sets the achievement point ID (RewardSpotID) included in the acquired reward granting notification information in association with the reward management ID corresponding to the customer transfer information, and generates reward establishment information that sets the reward establishment status (RewardStatus) to the flag 0 (not yet notified), and stores this into the reward establishment information storage 238 (step SE25).

The reward processor 245 references the customer transfer information manager 223 and acquires the customer transfer information corresponding to the reward management ID associated with the generated reward establishment information. Reward granting information (information indicating establishment of a CP reward) that includes the application user ID of the customer transfer source application 10 (game A) (ApUID), the campaign ID (CpID), and the achievement point ID (RewardSpotID) is transmitted to the application server 310 (game A) handling the customer transfer source application 10 (game A) included in the customer transfer information (step SE26).

The reward processor 245 updates the reward establishment status (RewardStatus) corresponding to the transmitted reward granting information to the flag 1 (already notified).

If there are a plurality of achievement points, each time reward granting notification information is received, the reward processor 245 generates reward establishment information in which the establishment status is the flag 0 (not yet notified), in association with the reward management ID corresponding to the customer transfer information stored in the customer transfer information manager 223, and stores this into the reward establishment information storage 238. The reward processor 245 transmits to the application server 310 handling the customer transfer source application (game A) reward granting information (information indicating CP reward establishment) based on each of the reward granting notification information (achievement point reached notifications). The establishment status (RewardStatus) of the reward establishment information corresponding to the transmitted reward granting information is updated to the flag 1 (already notified).

The application server 310 (game A), upon receiving the reward granting information (information indicating CP reward establishment) by the CP reward from the management server 200 (step SF31), grants a CP reward pre-established with respect to the campaign to the application user ID (application user ID of the user X) included in the reward granting information (step SF32).

Summary of the First Embodiment (1) As described above, in the reciprocal customer transfer system 500, the management server 200 (example of the management device) has an application manager 221, an installation notification acquisitor 241, a list requester 242, and a reward processor 245.

The application manager 221 manages a campaign (example of an event) having campaign time period (example of the first time period) set with respect to a plurality of specified applications of a plurality of target applications (applications accommodating this system) that are managed. The installation notification acquisitor 241 acquires, from a target application, installation notification information indicating that the target application, of a plurality of target applications, is installed into the user terminal 100 (example of the terminal device). The list requester 242, based on a request from a target application (example of the first application, customer transfer source application 10), transmits to the user terminal 100 an application list of at least one target application of a plurality of target applications installed in the user terminal 100 for which installation notification information has not been acquired from the user terminal 100.

Consider the case in which there is a campaign set between a target application (example of the second application, customer transfer destination application 20) selected at the user terminal 100 from one or a plurality of target applications included in the notified application list and the customer transfer source application 10 (example of the first application). In this case, when the reward processor 245, based on the judgment that the customer transfer destination application 20 (example of the second application) was installed within the campaign time period and also that the reward granting condition pre-established for the campaign was satisfied, acquires from the customer transfer destination application 20 reward granting notification information indicating that the reward granting condition has been satisfied, it executes CP reward processing (example of the first reward granting processing) based on the acquired reward granting notification information.

In contrast, consider the case in which the customer transfer destination application 20 selected in the user terminal 100 does not have a campaign set with the customer transfer source application 10. In this case, when the reward processor determines that the customer transfer destination application 20 was installed, it executes normal reward processing (example of the second reward granting processing).

The list requester 242 of the management server 200 may, based on a request from a specified application (example of the first application, customer transfer source application 10) installed in the user terminal of a plurality of specified applications, transmit to the user terminal 100 an application list of at least one target application for which installation notification information has not been acquired from the user terminal 100.

The reward processor 245 then, based on the judgment that the specified application (example of the second application, customer transfer destination application 20) selected in the user terminal 100 from one or a plurality of specified applications included in the application list was installed within the campaign time period and also that the reward granting condition pre-established in the campaign was satisfied, may execute CP reward processing based on the acquired reward granting notification information, if reward granting notification information indicating that the reward granting condition has been satisfied is acquired from the customer transfer destination application 20.

The above, in the case in which the customer transfer source application 10 is a specified application, enables the management server 200 to transmit to the user terminal 100 an application list that includes at least a specified application for which a campaign is set with the customer transfer source application 10. The management server 200 may transmit to the user terminal 100 an application list of only specified application for which a campaign is reciprocally set with the customer transfer source application 10. The management server 200 performs CP reward processing if customer transfer from the customer transfer source application 10 to the customer transfer destination application 20, between which a campaign is reciprocally set, is established. In this CP reward processing, because, in contrast to normal reward processing, a reward is granted based on satisfying a pre-established reward granting condition with respect to the campaign, it is possible to grant a reward for not simply installing the customer transfer destination application 20, but also with the condition that the customer transfer destination application 20 is used.

That is, in the reciprocal customer transfer system 500 according to the present embodiment, a plurality of target applications that are being managed may execute only CP reward processing, or a plurality of target applications that are being managed may execute both CP reward processing and normal reward processing. In the case of a reciprocal customer transfer system 500 in which only CP reward processing is executed, what is included in the application list transmitted by the list notifier 242 to the user terminal 100 is one or a plurality of specified applications. In contrast, in a reciprocal customer transfer system 500 that executes both CP reward processing and normal reward processing, what is included in the application list transmitted by the list notifier 242 to the user terminal 100 is one or a plurality of target applications. The target applications include specified applications.

In the reciprocal customer transfer system 500, after once-installed target application is uninstalled, if the target application is installed once again, by managing the installation information from the time of the first installation of the target application in the management server 200, it is possible to identify that it had been installed before. Thus, in the present system, if the target application is installed once again, it is possible to avoid having it become eligible for a normal reward or a CP reward.

(2) In the reciprocal customer transfer system 500 of the present embodiment, the user terminal 100 is a terminal device capable of communicating with the above-described management server 200. In this case, the above-described management server 200 manages a campaign (example of an event) having a campaign time period (example of the first time period) which is set with respect to a plurality of specified applications included in a plurality of target applications being managed. The management server 200 manages customer transfer information, which is customer transfer information with respect to customer transfer from one specified application notified from the user terminal identified by a reward user ID (example of unique identification information) to another specified application, in association with customer transfer source information indicating the one specified application, customer transfer destination information indicating the other specified application, and a reward user ID (example of unique identification information) corresponding to the user terminal 100. The management server 200, based on an application corresponding to the customer transfer information based on the managed customer transfer information being installed and also based on a reward granting condition pre-established with respect to an event being satisfied, transmits reward granting information corresponding to the campaign with respect to the application corresponding to the customer transfer source information if prescribed reward granting notification information is received.

The user terminal 100 has an installation notifier 103, a list requester 104, and a customer transfer information notifier 106.

The installation notifier 103 transmits to the management server 200 installation notification information indicating that a specified application is installed into the user terminal (example of the local terminal device) and including the application ID of the specified application (example of the identification information) and the reward user ID. The list requester 104 transmits to the management server 200 list request notification information that, based on a first operation, requests an application list of at least one specified application of a plurality of specified applications and that includes customer transfer source information indicating the application ID of an operating specified application (example of the customer transfer source application 10) and the reward user ID corresponding to the user terminal 100. The customer transfer information notifier 106, based on a second operation in the campaign time period, transmits to the management server 200 the customer transfer source information indicating the application ID of the operating specified application (example of the customer transfer source application 10), the customer transfer destination information indicating the application ID of the specified application selected in the specified application (example of the customer transfer destination application 20), and the reward user ID corresponding to the user terminal 100.

The user terminal 100 of the present embodiment has a reward granting notifier 107. For example, as described above, the reward granting notifier 107, based on the satisfying of a reward granting condition set with regard to the campaign, transmits to the management server 200 reward granting notification information that includes customer transfer destination information indicating the application ID of the specified application that satisfied the reward granting condition and the reward user ID corresponding to the user terminal 100. The user terminal 100 may have a configuration that does not have the reward granting notifier 107, in which case the application server 300 may, based on the satisfying of a reward granting condition for the campaign, transmit the reward granting notification information to the management server 200. The processing in the case of the application server 300 transmitting reward granting information to the management server 200 will be described in the section on variation example (3).

In the reciprocal customer transfer system 500 of the present embodiment, the management server 200 that manages a campaign that is set in a plurality of specified applications included among the target applications accommodating the reciprocal customer transfer system 500 and the user terminal 100 capable of communicating with the management server 200 can perform customer transfer from one specified application (example of the customer transfer source application 10) to another specified application (example of the customer transfer destination application 20). In the reciprocal customer transfer system 500, by using a reward user ID that uniquely identifies the user terminal 100, it is possible to easily perform reciprocal customer transfer and reward processing between applications, even if the user information (example of the application user ID) registered in a plurality of applications installed in the user terminal 100 is different. Additionally, in the reciprocal customer transfer system 500, when reciprocal customer transfer is established, because either a normal reward or a CP reward is granted, there is an incentive to purchase the new application for a user wanting to get the reward. This can lead to promotion of sales of the application.

According to the present embodiment, therefore, the convenience of reciprocal customer transfer between applications can be improved.

(3) The functions of the installation notifier 103, the list requester 104, the customer transfer information notifier 106, and the reward granting notifier 107, which are described above, are executed based on the SDK 11 (software) embedded in each target application. For example, the SDK 11A embedded in the customer transfer source application 10 executes the functions of the installation information notifier 106, the list requester 104, and the customer transfer information notifier 106, and the SDK 11B embedded in the customer transfer destination application 20 executes the functions of the installation notifier 103 and the reward granting notifier 107. The SDK 11A and the SDK 11B have the same function, and execute functions that depend upon whether they are embedded in the customer transfer source application 10 or the customer transfer destination application 20.

By the above, the embedding of the SDK 11 in the applications enables applications to be target application that accommodate the reciprocal customer transfer system 500 of the present embodiment. Thus, for example, even in existing applications or applications to be developed, if the program of the application is updated or slightly modified to enable embedding of the SDK 11, it is possible to have the applications be target applications that accommodate the reciprocal customer transfer system 500.

(4) Even in the case of a campaign (example of an event) having a campaign time period (example of the first time period) set between one or a plurality of customer transfer destination applications 20 (example of the second application) included in the application list and a customer transfer source application 10 (example of the first application), upon judging that the customer transfer destination application 20 was installed outside of the campaign time period, the reward processor 245 of the management server 200 executes normal reward processing (example of the second reward granting processing).

Even if there is a campaign set in the customer transfer destination application 20 with the customer transfer source application 10, the above enables a normal reward if the installation was done outside the campaign time period of the campaign. That is, if the customer transfer destination application 20 has a campaign with the customer transfer source application 10, if the timing of the installation of the customer transfer destination application 20 is within the campaign time period, the CP reward is possible, but if it was outside the campaign time period, the normal reward is possible.

(5) If the timing of acquisition of the installation notification information corresponding to the customer transfer destination application 20 (example of the second application) in the installation notification acquisitor 241 is within the campaign time period, the reward processor 245 of the management server 200 determines that the customer transfer destination application 20 was installed into the user terminal 100 (example of the terminal device) within the campaign time period.

By the above, the management server 200 can determine, by the timing of the acquisition of the installation notification information of the customer transfer destination application 20, whether or not the timing of the installation into the user terminal of the customer transfer destination application 20 was within the campaign time period.

If the timing of the acquisition of the customer transfer information with respect to the customer transfer destination application 20 from the customer transfer source application 10 (example of the first application) was within the campaign time period, the reward processor 245 of the management server 200 may determine that the customer transfer destination application was installed into the user terminal 100 within the campaign time period. That is, if the customer transfer information is stored within the campaign time period, even if the timing of the installation of the customer transfer destination application 20 into the user terminal 100 is outside the campaign time period, it is treated as being within the campaign time period.

(6) The reward user ID (example of unique identification information) is stored in the user terminal 100. The user terminal 100 has a unique identification information acquisitor 102 that, if an application installed in the user terminal 100 (example of the local terminal device) is the first target application installed in the user terminal 100 among a plurality of target applications, acquires the reward user ID and stores the acquired reward user ID into the terminal storage 140 (example of the storage), so that it is browsable to any target application installed in the user terminal 100.

By the above, according to the reciprocal customer transfer system 500, the user terminal 100 automatically acquires the reward user ID when the application is first installed and, the acquired reward user ID can be used in common by subsequently installed target applications, the reward user ID is acquired and the present system can be used without having the user make any special operation.

(7) Specifically, when an installed target application is installed into the user terminal 100, the unique identification information acquisitor 102 determines whether or not the reward user ID (example of unique identification information) is stored in the terminal storage 140 (example of the storage) and, if the judgment is that the reward user ID is stored in the terminal storage 140, acquires the reward user ID.

This enables the user terminal 100 to acquire the reward user ID when a target application is first installed and launched.

(8) The installation notification information includes the reward user ID associated with the user terminal 100 (example of unique identification information) and the application ID of the target application that transmitted the application notification information.

The installation notifier 103 of the user terminal (SDK 11) transmits to the management server 200 installation notification information indicating that the installed target application has been installed into the user terminal 100 (example of the local terminal device) and including the application ID of the installed target application and the reward user ID.

The installation information manager 222 of the management server 200 manages the reward user ID and application ID of the target application included in the installation notification information acquired from the user terminal 100 (SDK 11), in association with each other.

When a target application is installed into the user terminal 100, the above enables the management server 200 to manage the application ID of the installed target application and the reward user ID associated with the user terminal 100 in association with each other. The management server 200 can therefore identify the target applications installed into each user terminal 100.

Even if a target application is installed without connection with the present system, because the management server 200 manages the application ID of the installed target application and the reward user ID associated with the user terminal 100, the management server 200 can identify a target application installed in the user terminal 100.

(9) The installation notification information may further include the application user ID (example of user information) of the target application sending the installation notification information. That is, the installation notification acquisitor 241 functions as an application user information acquisitor. Specifically, the management server 200 has an application user information acquisitor that acquires the application user ID of the target application in association with the reward user ID (example of unique identification information). For example, the installation notifier 103 of the user terminal 100 (SDK 11) transmits to the management server 200 installation notification information that further includes the application user ID in the installed target application of the user who installed the target application. The management server 200 acquires the application user ID included in the installation information.

Depending on the target application there are cases in which the timing of the storing of the user information is different, not only at the time of the first launching, but also, for example, at the point at which a tutorial is completed. Therefore, the management server 200 may be made to acquire from the user terminal 100 (SDK 11) the application user ID that has been included in the installation notification information. The management server 200 may be made to acquire the application user ID from the application server 300 handling the target application.

The installation information manager 222 of the management server 200 manages the reward user ID, the application ID (example of identification information), and the application user ID of (in) the target application that are included in the installation notification information, in association with each other. In this case, the application user ID managed by the management server 200, as described above, may be included in the installation notification information acquired by the management server 200, or included in information other than the installation notification information.

If a target application in installed into the user terminal 100, the above enables the management server 200 to manage the application ID of the installed target application, the application user ID in the installed target application, and the reward user ID associated with the user terminal 100, in association with each other. That is, the management server 200 can manage the application user ID in association with the reward user ID for each target application installed in the user terminal 100.

(10) The application manager 221 of the management server 200 manages information indicating a campaign (example of an event) in association with information regarding the campaign and stores these into the campaign information storage 234 or the campaign participant information storage 235.

The list notifier 242 of the management server 200 references the above-noted information managed by the application manager 221 and transmits information regarding a campaign corresponding to one or a plurality of target applications included in the application list.

By doing the above, when the target application list LT based on the application list acquired from the management server 200 is displayed on the display 120, information regarding campaign (the campaign name, description, or campaign time period) can be associated with the target application for which a campaign is set and displayed.

(11) The application manager 221 of the management server 200 manages, as information regarding the campaign (example of an event), information indicating the link destination of a location listing information indicating the CP reward (example of a reward).

The list notifier 242 of the management server 200 references the above-noted information managed by the application manager 221 and transmits, as information regarding the campaign, information indicating the above-noted link destination corresponding to one or a plurality of specified applications included in the application list.

By doing the above, when displaying the target application list LT based on the application list acquired from the management server 200 on the display 120, the user terminal 100 can display information indicating the link destination of a location listing information indicating the CP reward for those applications in association with the specified applications in which campaigns are set. The reason the locations listing information indicating CP rewards are made link destinations is to impart a degree of freedom to the method of listing.

(12) Specifically, the application manager 221 (example of the first reward information manager) of the management server 200 stores into the campaign participant application information storage 233 and manages information indicating a CP reward (example of the first reward) set beforehand corresponding to a campaign (example of an event). The application manager 221 (example of the second reward information manager) stores into the normal reward information storage 232 and manages normal reward information with which each of the plurality of target applications and information indicating a normal reward pre-established by normal reward processing (example of the second reward processing) is associated.

The list notifier of the management server 200 then transmits to the user terminal 100 an application list that includes information indicating the normal rewards, so that information regarding normal rewards is associated with target applications for which a campaign is not set with the customer transfer source application 10 (example of the first application) is display. The list notifier transmits to the user terminal 100 an application list that includes information indicating link destinations, so that information indicating the above-noted link destinations is associated with the target application in which a campaign with the customer transfer source application 10 is set is displayed.

By the above, when the user terminal 100 displays on the display 120 the target application list LT based on the application list acquired from the management server 200, information indicating normal rewards is displayed for target application for which a campaign is not set, enabling display of information indicating link destinations of locations listing information indicating a CP reward (example of a reward) of a campaign for specified applications for which a campaign is set.

(13) The customer transfer information acquisitor 243 of the management server acquires customer transfer information of customer transfer from the customer transfer source application 10 (example of the first application) to the customer transfer destination application 20 (example of the second application) that includes the reward user ID (example of unique identification information), the application ID of the customer transfer source application 10 (example of identification information), and the application ID of the customer transfer destination application 20 (example of identification information). When the customer transfer information acquisitor 243 acquires the customer transfer information, the customer transfer information manager 223 of the management server 200 stores into the customer transfer information storage 237, as a record of customer transfer information, the reward user ID, the application ID of the customer transfer source application 10, and the application ID of the customer transfer destination application 20 that are included in the acquired customer transfer information, in association with each other.

If reward granting notification information was acquired from the management server 200, the reward processor 245 of the management server 200, under the condition that a record of the customer transfer information with respect to the customer transfer destination application 20 is stored in the customer transfer information manager 223, executes either normal reward processing or CP reward processing (example of reward granting processing).

By the above, in the case of a target application installed without connection with the present system, because there is no record of customer transfer information, the reciprocal customer transfer system 500 can exclude the application from being eligible for the normal reward and the CP reward.

(14) The installation guide instructor 244 of the management server 200, based on the application ID (example of identification information) of the customer transfer destination application 20 (example of second application) included in the customer transfer information acquired by the customer transfer information acquisitor 243, transmits to the user terminal 100 instruction information that provides a guide to a store page (screen) enabling installation of the customer transfer destination application 20.

By the above, when a target application for customer transfer from the customer transfer source application 10 (example of the first application) is selected, the user terminal 100 can automatically display the store page enabling installation of the selected target application, without having the user make any special operation.

(15) The reward granting notification information includes the reward user ID (example of unique identification information) associated with the user terminal 100, and the application ID (example of identification information) associated with the customer transfer destination application 20 (example of the second application).

The reward granting notifier 107 of the user terminal 100 (SDK 11) transmits the above-noted various information to the management server 200.

The reward processor 245 of the management server 200, based on the reward granting notification information acquired from the customer transfer destination application 20, transmits to the application server 310 (example of the server device) handling the customer transfer source application 10 reward granting information that includes the application user ID (example of user information) of the customer transfer source application 10 (example of the first application) associated with the reward user ID.

By the above, the management server 200, in addition to being able to identify the user terminal 100 that transmitted the reward granting notification information and the customer transfer destination application 20, can transmit to the application server 310 handling the customer transfer source application 10 reward granting information that includes the application user ID in the customer transfer source application 10 of that user (the user X), so that a reward is granted to the user using the customer transfer source application 10 in this user terminal 100 (the user X).

(16) The reward granting notifier 107 of the user terminal 100 (SDK 11) transmits to the management server 200 reward granting notification that further includes campaign ID (example of identification information) of the campaign (example of an event).

The management server 200 references the campaign information storage 234 or the campaign participant application information storage 235 and can, in addition to identifying the campaign set in the customer transfer destination application 20 that transmitted the acquired reward granting notification information, identify information regarding the campaign (for example, the reward granting time period). In particular, when there are a plurality of campaigns set in the customer transfer destination application 20, the inclusion of this campaign ID in the reward granting notification information is effective. For example, it is possible to set a plurality of campaigns having reciprocally different campaign time period for one target application.

(17) Consider the case in which a campaign (example of an event) having a time period that does not overlap with the campaign period (example of the first time period) is set with respect to a plurality of specified applications. When this is done, if CP reward processing (example of reward granting processing) has already been executed regarding a campaign (event) of the campaign time period (example of the first time period) of the customer transfer destination application 20 (example of the second application) in the user terminal 100, the CP reward processing (example of reward granting processing) regarding the above-noted campaign having a different time period is not executed.

By the above, the reciprocal customer transfer system 500, in the CP reward processing with respect to the same customer transfer destination application 20, can avoid re-granting a CP reward to the user who was granted a CP reward for a given campaign in different campaign. That is, the customer transfer destination application 20 for which a CP reward was granted is removed from eligibility for another CP reward.

For example, a user who has installed the customer transfer destination application 20 within the campaign time period of campaign A is granted a reward based on reaching an achievement point set in that campaign. In the case in which each of a plurality of achievement points is reached, rewards are granted based on each reaching of an achievement point. However, even if campaign B, which is different from campaign A starts in a subsequent time period, a reward is not granted even if an achievement point set in campaign B is reached.

In this case, if the campaign time period of campaign B starts and an achievement point set in campaign is reached, reward granting notification information is sent to the management server 200 from the user terminal 100. However, because customer transfer information corresponding to campaign B is not sent from the user terminal 100, the management server 200 does not manage customer transfer information corresponding to campaign B (there is no corresponding record in the customer transfer information storage 237). As a result, because the reward establishment information corresponding to campaign B is not managed, the management server 200 cannot update the reward establishment information even if it acquires reward granting notification information with respect to campaign B, and that reward granting notification information can be treated as being invalid. It is therefore possible to control so as to prevent duplicated reward granting of CP rewards.

(18) If at least one of the CP reward (example of the first reward granting processing) and the normal reward processing (example of the second reward processing) has already been executed, the reward processor 245 of the management server 200 does not execute the other reward granting processing.

For example, the management server 200 has already updated the establishment status included in the reward establishment information of the customer transfer destination application 20 that had performed either normal reward processing or CP reward processing to 1 (established). For this reason, even if the management server 200 again acquires reward granting notification information from that customer transfer destination application 20, there is no reward establishment information for which to update the establishment status to 1 (established), and it is possible to treat the reward granting notification information as being invalid.

By the above, the reciprocal customer transfer system 500 can, with respect to the same customer transfer destination application 20, avoid duplicated granting of a CP reward. That is, a customer transfer destination application 20 to which a normal reward has been granted is removed from eligibility for a CP reward, and a customer transfer destination application 20 to which a CP reward has been granted is removed from eligibility for a normal reward.

(19) In the above-described embodiment, with respect to a campaign (example of an event) a reward granting time period (example of the second time period) is set to start at the start or midway into a campaign time period (example of the first time period) and to end after the end of the campaign time period. The reward granting notifier 107 of the user terminal 100 (SDK 11) transmits reward granting notification information to the management server 200. Then, if reward granting notification information is acquired from the customer transfer destination application 20 (example of the second application) installed in the user terminal 100, the reward processor 245 of the management server 200 executes CP reward processing (example of reward granting processing), based on the acquired reward granting notification information.

By the above, even if a customer transfer destination application 20 is installed in the user terminal 100 just before the end of the campaign time period, the reciprocal customer transfer system 500 can grant to the user a time period for attempting to reach an achievement point at which the CP reward is granted. If reward granting notification information is acquired from the user terminal 100 within the reward granting time period, the management server 200 can be made to grant a CP reward (example of a reward).

(20) If the timing of satisfying the reward granting condition was in the reward granting time period (example of the second time period), the reward granting notifier 107 of the user terminal 100 (SDK 11) may transmit to reward granting notification information to the management server 200. If the timing of satisfying the reward granting condition was in the reward granting time period, the reward processor 245 of the management server 200 may acquire reward granting notification information from the customer transfer destination application 20 (example of the second application) and execute CP reward processing (example of reward granting processing).

In this case, the user terminal 100 transmits to the management server 200 reward granting notification information only in the case in which the timing of satisfying the reward granting condition is in the reward granting time period. Therefore, if the satisfying of the reward granting condition was in the reward granting time period, the management server 200 can be made acquire reward granting notification information from the user terminal 100 and to grant a CP reward (example of a reward).

(21) A plurality of pre-established reward granting conditions may be provided in a campaign (example of an event). The reward granting notifier 107 of the user terminal 100 (SDK 11), based on the satisfying of each of the plurality of reward granting conditions, transmits to the management server 200 reward granting notification information corresponding to each. If reward granting notification information has been acquired from the customer transfer destination application 20 (example of the second application) installed in the user terminal 100 based on satisfying any one of a plurality of reward granting conditions, the reward processor 245 of the management server 200 executes the CP reward processing (example of reward granting processing) based on the acquired reward granting notification information.

By the above, the reciprocal customer transfer system 500, in response to the satisfying of each of a plurality of reward granting conditions set in the customer transfer destination application 20, executes CP reward processing corresponding to each thereof. That is, in order for a user to get as many rewards as possible of a plurality of rewards set in a campaign time period (example of the reward granting time period), the user continues to use the customer transfer destination application 20. For this reason, it is possible to increase the usage of the customer transfer destination application 20.

(22) If, based on satisfying any one of a plurality of reward granting conditions, reward granting notification information is acquired by the customer transfer destination application 20 (example of the second application), the reward processor 245 of the management server 200 executes CP reward processing (example of reward granting processing) based on the reward granting notification information when the timing of acquisition in within the reward granting time period (example of the second time period).

That is, even in the case in which a plurality of reward granting conditions are set in a campaign, only in the case in which the timing of satisfying each of the plurality of reward granting conditions (timing of the management server 200 acquiring the reward granting notification information) is within the reward granting time period can the management server 200 grant a CP reward (example of a reward).

(23) Each of the plurality of reward granting conditions, for example, are timings set in the processing by the customer transfer destination application 20 (example of the second application) at which a plurality of achievement point are reached. The reward granting notifier 107 of the user terminal 100 (SDK 11), based on satisfying each of the plurality of reward granting conditions, transmits to the management server 200 reward granting notification information that includes the achievement point ID indicating the achievement points reached of the plurality of achievement points. Then, the reward processor 245 of the management server 200, based on the satisfying of the individual reward granting conditions of the plurality of reward granting conditions, in addition to acquiring from the customer transfer destination application 20 reward granting notification information that includes achievement point IDs (achievement point information) indicating the achievement points reached of the plurality of achievement points, transmits to the application server 310 (example of the server device) handling the customer transfer source application 10 (example of the first application) reward granting information that includes the acquired achievement point IDs (achievement point information).

That is, the management server 200, in response to reaching the individual achievement points of the plurality of achievement points in the customer transfer destination application 20 in the user terminal 100, transmits to the application server 310 handling the customer transfer source application 10 achievement point IDs indicating the individual achievement points reached.

By doing this, the reciprocal customer transfer system 500, in response to reaching the individual achievement points of the campaign set in the customer transfer destination application 20, can grant a CP reward (example of a reward) in response to each of the achievement point reached.

(24) The reward granting notifier 107 of the user terminal 100 (SDK 11) may, based on the satisfying of each of a plurality of reward granting conditions, transmit to the management server 200 reward granting notification information that includes reaching information indicating the reaching of each of a plurality of achievement points. The reward processor 245 of the management server 200 may, based on the satisfying of each of a plurality of reward granting conditions, in addition to acquiring, from the customer transfer destination application 20 (example of the second application), reward granting notification information that includes reaching information indicating the reaching of each of a plurality of achievement points, transmit to the application server 310 (example of the server device) handling the customer transfer source application 10 (example of the first application) invitation request granting information in response to the number of times reward granting notification information each time acquisition is done.

That is, the management server 200 need not include the achievement point ID in the reward granting information transmitted to the application server 310 handling the customer transfer source application 10 when one of a plurality of achievement points is reached, and may include information indicating the number of times of acquiring the reward granting notification information (that is, information indicating the number of times of reaching an achievement point, indicating the sequence number of the achievement point) therein. In this case, it is sufficient that it is arranged to exchange reward granting information that includes the above-noted number of times between the application server 310 and the management server 200. Therefore, even if information indicating the number of acquisitions of the reward granting notification information is included in the reward granting information, the reciprocal customer transfer system 500 can be made so that a CP reward (example of a reward) corresponding to each of the reached achievement points is granted.

(25) The reward processor 245 of the management server 200 may, based on the satisfying of each of a plurality of reward granting conditions, in addition to acquiring from the customer transfer destination application 20 (example of the second application) reward granting notification information that includes reaching information indicating that any one of a plurality of achievement points was reached, transmits to the application server 310 (example of the server device) handling the customer transfer source application 10 (example of the first application) reward granting information that includes the acquired reaching information.

That is, the management server 200 need not include the achievement point ID in the reward granting information transmitted to the application server 310 handling the customer transfer source application 10 when one of a plurality of achievement points is reached, and may include information indicating that one of achievement point was reached (for example, flag information simply indicating that an achievement point was reached) therein. In this case, it is sufficient that the application server 310 grant a reward in accordance with the result of counting the number of times of acquiring reaching information. The application server 310 may grant a reward in accordance with the result of counting the acquisitions of reaching information. Therefore, even if reaching information is simply included in the reward granting information in place of the achievement point ID, the reciprocal customer transfer system 500 can be made so that a CP reward (example of a reward) corresponding to each of the reached achievement points is granted.

In this manner, it is possible to provide a plurality of CP reward granting conditions. In this case, the reciprocal customer transfer system 500 need not be concerned with the setting content of each of the reward granting conditions or the overall number of reward granting conditions, and each time a reward granting condition is satisfied (each time an achievement point is reached) in the customer transfer destination application 20, it just transmits to the application server 310 the achievement point ID, information indicating the number of acquisitions of the reward granting notification information, and reaching information and the like.

In the present embodiment, because the management server 200 manages information regarding target applications accommodating the reciprocal customer transfer system 500, it is possible to prevent an application that does not accommodate the present system to be a searching target. There is a method of using a URL scheme to identify an application installed in the user terminal 100, in which case it is necessary to adopt a configuration enabling acquisition of the URL scheme from the management server 200. In contrast, in the present embodiment, the installation information of a target application installed in the user terminal 100 is managed by the management server 200. For this reason, in the present embodiment, it is possible to facilitate processing to generate an application list candidates for selection as the customer transfer destination application 20.

The process of downloading and installing a customer transfer destination application 20 from the application store 400 (example of the store site) and the process of launching the customer transfer destination application 20 after completion of installing are left up to the user, and it is unclear what type of operations are made during that time. For example, a user who has been guided to the application store 400 for purchasing the customer transfer destination application 20 might subsequently download another application. In such cases as well, in the reciprocal customer transfer system 500, because customer transfer information regarding customer transfer from the customer transfer source application 10 to the customer transfer destination application 20 is managed, it is possible to perform proper reward processing, based on the facts of customer transfer.

Second Embodiment

A second embodiment of the present invention will be described. Since the configuration of a reciprocal customer transfer system 500 of the present embodiment is the same as in the first embodiment, characteristic processes in the present embodiment will be described. In the first embodiment, the filtering process is described with reference to FIG. 14 which creates an application list excluding the installed target application, and an application list of specific applications each having a campaign that has been set between the customer transfer source application 10 and the specific application, in the process of step SE15, but the present embodiment is not limited thereto. In the present embodiment, a description will be given regarding a process (filtering process) of selecting a target application included in an application list, based on a predetermined condition, based on a condition (filter information) which has been set in an inter-application filter storage 233.

The inter-application filter storage 233 stores inter-application filter information (inter-application filter information) for limiting a target application for which reciprocal customer transfer is possible. The inter-application filter information for limiting a target application for which reciprocal customer transfer is possible is set, for example, as list prohibition information for prohibiting list on a list LT of target applications that can be selected as a customer transfer destination application 20.

In addition, the inter-application filter information is valid in a normal reward, and is information for filtering a target application in which campaign is not set between the customer transfer source application 10 and the target application, and for filtering a specific application in which the campaign is set between the customer transfer source application and the target application but which is not in a campaign period.

FIG. 16 is a diagram illustrating an example of inter-application filter information that is stored in the inter-application filter storage 233. A filter ID (FilterID), a blocking application ID (ApIDfrom) and a blocked application ID (ApIDto) are associated with the inter-application filter information. The filter ID (FilterID) is a management ID that is issued in an order in which each piece of filter information is set to allow identification for each piece of inter-application filter information.

An application ID of a listing-prohibited-application is set in the blocking application ID (ApIDfrom), the setting-side being a side which sets the prohibition of list of target applications on the list LT. Meanwhile, an application ID of a listed-prohibited-application is set in the blocked application ID (ApIDto), the set-side being a side for which list of the target application that is the listing-prohibited-application on the list LT is prohibited. In other words, the inter-application filter storage 233 stores inter-application filter information in which the blocking application ID (the application ID of the listing-prohibited-application) and the blocked application ID (the application ID of the listed-prohibited-application) are combined.

In the case of the customer transfer from the target application that is set in the blocking application ID (the application ID of the listing-prohibited-application), the list notifier 242 excludes the target application that is set in the blocked application ID (the application ID of the listed-prohibited-application), from the application list that can be selected as the customer transfer destination application 20, with reference to the inter-application filter information that is stored in the inter-application filter storage 233.

For example, when the customer transfer from the customer transfer source application 10 (game A) to the customer transfer destination application 20 (game B) is to be prohibited, the application ID of the customer transfer source application 10 (game A) may be set in the blocking application ID, and the application ID of the customer transfer destination application 20 (game B) may be set in the blocked application ID.

In addition, both the blocking application ID (the application ID of the listing-prohibited-application) and the blocked application ID (the application ID of the listed-prohibited-application) of the inter-application filter information, illustrated in FIG. 16, may have a relationship in which bidirectional listing is prohibited. In other words, in the case of the customer transfer from the target application that is set in the blocked application ID (the application ID of the listed-prohibited-application), the list notifier 242 may exclude the target application that is set in the blocking application ID (the application ID of the listing-prohibited-application), from the application list that can be selected as the customer transfer destination application 20, with reference to the inter-application filter information that is stored in the inter-application filter storage 233.

Further, if a target application does not participate in the normal reward but wants to participate only in the CP reward, the application ID of the target application is set in the blocked application ID (ApIDto) and "null" is set in the blocking application ID (ApIDfrom). Thus, it is possible to publish the customer transfer from any target application on the list LT of target applications, only during the campaign period. For example, when a certain application has already performed reciprocal customer transfer due to a normal reward with anther application before participating in the reciprocal customer transfer system 500, the application can correspond to an application that intends to participate only in a CP reward. In addition, information on the target application that does not participate in the normal reward but wants to participate only in the CP reward may be stored in association with the application ID (ApID) of the target application, in the target application information storage 231 which stores the target application information regarding the target application.

Summary of Second Embodiment

As described above, the application manager 221 of the management server 200 stores the inter-application filter information (an example of first listing prohibition information) in the inter-application filter storage 233, and manages the inter-application filter information. The inter-application filter information includes a combination of a listing-prohibited-application and a listed-prohibited-application. The listing-prohibited-application is an application which is set to prohibit listing of the listed-prohibited-application onto the list LT for target applications. The listed-prohibited-application is an application which is subject to prohibition from being listed onto the list LT for target applications in the listing-prohibited-application.

When there is inter-application filter information in which the customer transfer source application 10 (an example of the first application) is set in the listed-prohibited-application, and a campaign (an example of an event) is not set between the customer transfer source application 10 and the listing-prohibited-application indicated by the inter-application filter information, the list notifier 242 of the management server 200 transmits an application list of target applications excluding the listing-prohibited-application to the user terminal 100, with reference to the inter-application filter information managed by the application manager 221.

Thus, in the reciprocal customer transfer system 500, it is possible to set a relationship between target applications which do not intend to perform customer transfer to each other in the normal reward, in the management server 200. For example, if there is a target application in which a rating (an age limit) has been set among the target applications, it is possible to prevent the customer transfer from the customer transfer source application 10 in which the rating has not been set to the customer transfer destination application 20 in which the rating has been set, from being performed.

Further, when there is inter-application filter information in which the customer transfer source application 10 is set in the listing-prohibited-application, and a campaign is not set between the listed-prohibited-application indicated by the first listing prohibition information and the customer transfer source application 10, the list notifier 242 of the management server 200 transmits an application list of target applications, excluding the listed-prohibited-application to the user terminal 100, with reference to the inter-application filter information managed by the application manager 221.

Thus, it is possible to prohibit (block) the listing of the target applications that are respectively set in the listing-prohibited-application and the listed-prohibited-application of the inter-application filter information on the application list with each other (in a bidirectional way).

Further, the application manager 221 of the management server 200 stores inter-application filter information (an example of the second listing prohibition information) in which only the listed-prohibited-application is registered, the set-side being on the side in which listing of target applications based on the application list on the list LT is prohibited, in the inter-application filter information in the inter-application filter storage 233 and manages the inter-application filter information.

When a campaign (an example of an event) is not set between the listed-prohibited-application indicated by the inter-application filter information and the customer transfer source application 10 (an example of the first application), the list notifier 242 of the management server 200 transmits an application list of target applications excluding the listed-prohibited-application to the user terminal 100, with reference to the inter-application filter information managed by the application manager 221.

Further, information corresponding to the inter-application filter information may also be managed by being stored in the target application information storage 231. In other words, the target application for which the information corresponding to the inter-application filter information is stored in the target application information storage 231 is allowed to participate only in CP reward.

Thus, in the case of a target application which intends to participate only in a campaign in the reciprocal customer transfer system 500, it is possible to publish the customer transfer from any target application on the list LT of target applications, only during the campaign period.

Modification Example of First and Second Embodiments

In the above description, embodiments of the invention have been described in detail with reference to the accompanying drawings, but the specific configuration is not limited to the embodiments described above, and a change in the design, and the like without departing from the scope of this embodiment are also included. For example, the functions described in the first embodiment and the second embodiment described above may be combined arbitrarily.

(1) In the above embodiment, an example has been described in which the communicator 210 (transceiver) of the management server 200 directly communicates the installation notification information (an example of the first information), the application list (an example of the second information, for example, information indicating at least one target application among a plurality of target applications), the list request notification information, the customer transfer information (for example, customer transfer source information or customer transfer destination information), the instruction information (an example of information for displaying an installable screen on the user terminal 100), or the reward granting notification information, to the user terminal 100. Similarly, an example has been described in which the terminal communicator 130 (transceiver) of the user terminal 100 directly communicates the installation notification information, the application list, the list request notification information, the customer transfer information, the instruction information, or the reward granting notification information, to the management server 200.

Here, the communicator 210 (transceiver) of the management server 200 may directly perform communication with the user terminal 100, after establishing a communication session through the customer transfer source application 10 (first application) or the customer transfer destination application 20 (second application), and each application server 300 (server device) corresponding thereto. Similarly, the terminal communicator 130 (transceiver) of the user terminal 100 may directly perform communication with the management server 200, after establishing a communication session through the customer transfer source application 10 (installed target application) or the customer transfer destination application 20 (selected target application), and each application server 300 (server device) corresponding thereto.

In addition, when the user terminal 100 directly performs communication with the management server 200, a communication session may be caused to be established as necessary. In other words, there may be both a case of directly communicating with the management server 200 prior to establishing the communication session, and a case of directly communicating with the management server 200 after establishing the communication session.

For example, the installation notification information may directly be communicated to the management server 200 prior to establishing the communication session, and the other information may directly be communicated to the management server 200 after establishing the communication session. By doing so, as the customer transfer destination application 20 which is a target of a normal reward, and an application that does not include the application server 320 corresponding to the customer transfer destination application 20, in other words, an application operating in a stand-alone manner in the user terminal 100 can be treated as a target application. In other words, when transmitting the installation notification information indicating that the application operating in a stand-alone manner is installed, the user terminal 100 can directly perform communication with the management server 200, without performing a process of establishing the communication session through the application server 300 (server device).

Figure 17:
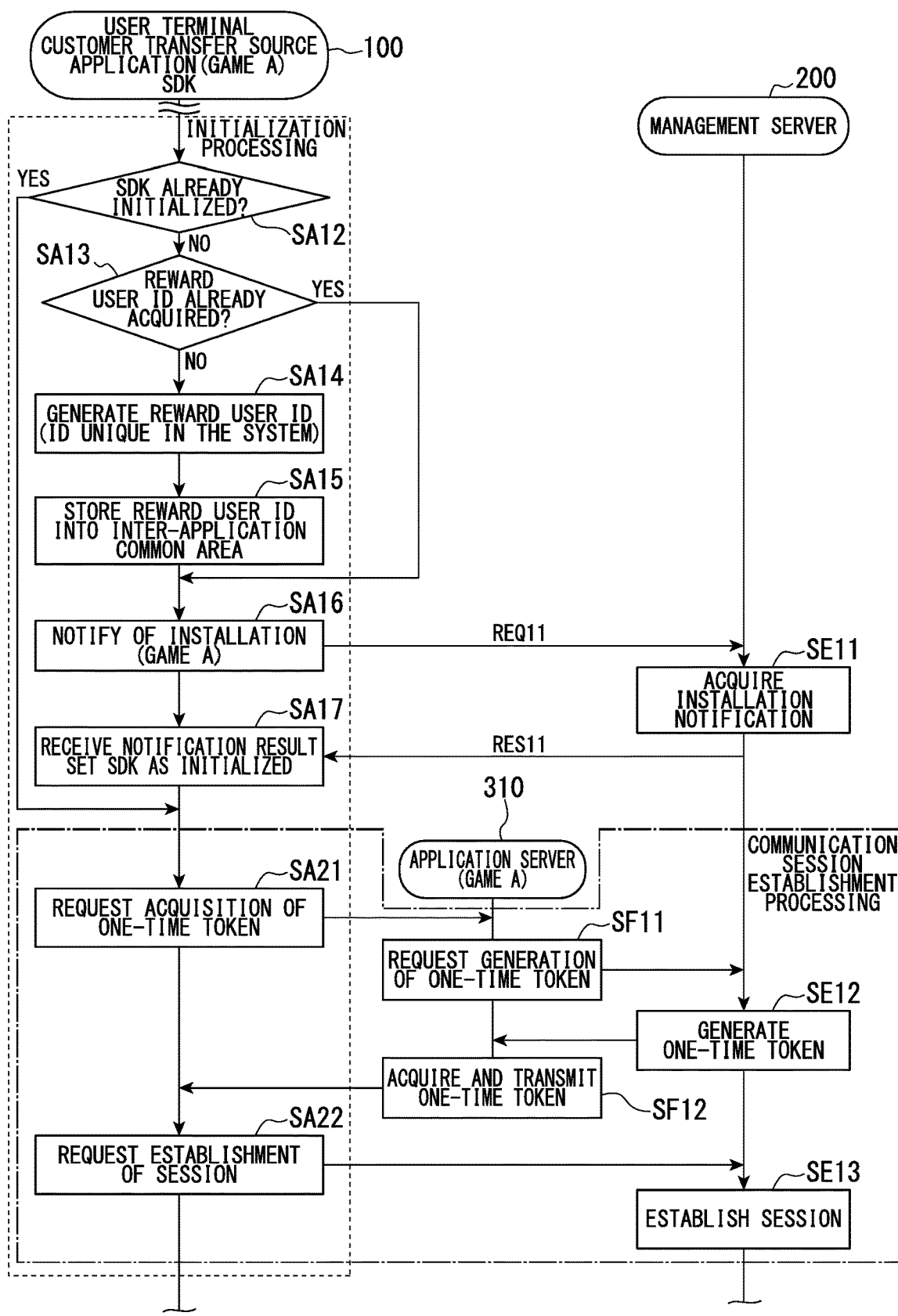
FIG. 17 is a flowchart describing the operation of processing to establish a communication session.

FIG. 17 is a flowchart illustrating an operation of an establishment process of a communication session. The establishment process of the communication session (communication session establishment process) is performed in a case where the customer transfer source application 10 or the customer transfer destination application 20 is launched in the user terminal 100, and the SDK 11A and the SDK 11B first perform communication with the management server 200, for example, during an initialization process described with reference to FIG. 14 and FIG. 15. FIG. 17 illustrates the establishment process of the communication session which is performed during the initialization process illustrated in FIG. 14. In addition, the establishment process of the communication session can also similarly be performed during the initialization process illustrated in FIG. 15. In FIG. 17, the portion corresponding to each process in FIG. 14 is denoted by the same reference numeral, and a description thereof will be omitted. In addition, it is assumed that a communication session is already established between the user terminal 100 and the application server 310.

If the reward user ID is already acquired in the process of steps SA12, SA13, SA14, and SA15 and the installation notification information is already notified in the process of steps SA16 and SA17, the initialization processor 101 of the SDK 11A transmits a one-time token acquisition request information for requesting acquisition of a one-time token to the application server 310 (step SA21). If the one-time token acquisition request information is acquired from the user terminal 100 (SDK 11A), the application server 310 transmits one-time token generation request information based on the acquired one-time token acquisition request information to the management server 200 (step SF11). If the one-time token generation request information is acquired from the application server 310, the management server 200 generates a one-time token, and transmits the generated one-time token to the application server 310 (step SE12). If the one-time token is acquired from the management server 200, the application server 310 transmits the acquired one-time token to the user terminal 100 (SDK 11A) (step SF12). If the one-time token is acquired from the application server 310, the initialization processor 101 of the SDK 11A transmits session establishment request information including the acquired one-time token to the management server 200 (step SA22). If the session establishment request information is acquired from the user terminal 100 (SDK 11A), when the one-time token included in the acquired session establishment request information is correct information (when matching the one-time token that has been transmitted to the user terminal 100 (SDK 11A)), the management server 200 establishes a communication session and thus communication by the reciprocal customer transfer system 500 is allowed (step SE13). The process described with reference to FIG. 14 will be performed later. In addition, when the one-time token included in the session establishment request information, acquired from the user terminal 100 (SDK 11A), is not correct information, the management server 200 regards it as a communication error, and thus communication by the reciprocal customer transfer system 500 is not allowed. Further, when the management server 200 cannot acquire the session establishment request information from the user terminal 100 (SDK 11A), needless to say, communication by the reciprocal customer transfer system 500 is not allowed.

In this manner, since communication is initiated in the reciprocal customer transfer system 500 after the communication session is established, it is possible to improve security in the network system 1 including the reciprocal customer transfer system 500.

In addition, a part of the installation notification information (an example of the first information), the application list (an example of the second information, for example, information indicating at least one target application among a plurality of target applications), the list request notification information, the customer transfer information (for example, customer transfer source information or customer transfer destination information), the instruction information (an example of information for displaying an installable screen on the user terminal 100), or the reward granting notification information may not be directly communicated from the user terminal 100 to the management server 200, but rather may be communicated from the user terminal 100 through the application server 300 (server device) corresponding to the customer transfer source application 10 (first application) or the customer transfer destination application 20 (second application). In other words, the communicator 210 (transceiver) of the management server 200 may communicate the installation notification information, the application list, the list request notification information, the customer transfer information, the instruction information, or the reward granting notification information to the user terminal 100 through the application server 300 (server device) corresponding to the customer transfer source application 10 (first application) or the customer transfer destination application 20 (second application), or may directly communicate it to the user terminal 100.

Further, the communicator 210 (transceiver) of the management server 200 may communicate the installation notification information, the application list, the list request notification information, the customer transfer information, the instruction information, or the reward granting notification information to the user terminal 100, through the application server 300 (server device) corresponding to the customer transfer source application 10 (first application) or the customer transfer destination application 20 (second application). Similarly, the terminal communicator 130 (transceiver) of the user terminal 100 may perform communication with the management server 200 through the application server 300 (server device) corresponding to the customer transfer source application 10 (installed target application) or the customer transfer destination application 20 (selected target application).

In this manner, even if the user terminal 100 and the management server 200 perform communication through the application server 300, the reciprocal customer transfer system 500 can perform the same customer transfer process and reward process as in the first embodiment and the second embodiment, and achieve the same effect.

(2) In the above embodiment, an example has been described in which the installation notification information including the application user ID (ApUID) is transmitted from the user terminal 100 (SDK 11) to the management server 200, but the present embodiment is not limited thereto. For example, the application server 300 may transmit the application user ID in association with the reward user ID to the management server 200, in the communication session establishment process. Specifically, in step SA21, the initialization processor 101 of the SDK 11A notifies the application server 300 of the reward user ID when the one-time token acquisition request information is transmitted to the application server 300. Further, the application server 300 transmits the reward user ID, the application ID and the application user ID to the management server 200. The installation information manager 222 of the management server 200 stores the application user ID acquired from the application server 300, as the application user ID (ApUID) corresponding to the installation information associated with the reward user ID and the application ID, which are acquired among installation information pieces stored in the installation information storage 236. In this manner, since the application user ID is not transmitted from the user terminal 100 (SDK 11) but rather is transmitted from the application server 300, it becomes unnecessary for the user terminal 100 (SDK 11) to manage the application user ID.

As stated above, when the application server 300 transmits the application user ID in association with the reward user ID to the management server 200 in the communication session establishment process, only after the user information is registered in the installed target application, the communication session establishment process can be performed. However, the registration of the user information does not need to be directly involved in the transmission of the installation notification information indicating the installation of the target application installed in the user terminal 100 to the management server 200. Accordingly, the user terminal 100 intends to transmit the installation notification information to the management server 200, regardless of whether or not the user information is registered in the installed target application. Accordingly, when the user terminal 100 transmits the installation notification information, the installation notification information is transmitted before the communication session is establishment.

(3) In the above embodiment, an example has been described in which the reward processor 245 performs the CP reward process, based on the fact that the reward granting notification information is acquired from the SDK 11B of the customer transfer destination application 20 of the user terminal 100, but the present embodiment is not limited thereto. For example, the CP reward process may be performed based on the fact that the reward granting notification information is acquired from application server 320 corresponding to the customer transfer destination application 20. In this case, the reward granting notification information (achievement point reaching notification) may include the application ID and the application user ID of the customer transfer destination application 20, the campaign ID, and the achievement point ID (RewardSpotID).

For example, the reward processor 245 of the management server 200 acquires reward granting notification information (achievement point reaching notification) that has been transmitted from the application server 320. The reward processor 245 specifies installation information corresponding to the application ID and the application user ID of the customer transfer destination application 20, from the identification information stored in the installation information storage 236, and reverses the reward user ID corresponding to the specified installation information. Then, the reward processor 245 sets an achievement point ID (RewardSpotID) that is included in the acquired reward granting notification information, in association with the reward management ID corresponding to the customer transfer information, based on the fact that the storing of the reversed reward user ID and the customer transfer information on the customer transfer destination application 20 is managed by the customer transfer information manager 223, generates reward achieved information having a reward status (RewardStatus) of a flag "0" (not notification), and stores it in the reward achieved information storage 238. The subsequent processes are the same as in the above embodiment. In this manner, since the reward granting notification information (achievement point reaching notification) is transmitted from the application server 320, it is possible to reduce a processing burden of the user terminal 100 (SDK 11B).

(4) In the above embodiment, an example has been described in which when the target application is first installed, the reward user ID is generated as unique identification information (unique identification information which is unique to the reciprocal customer transfer system 500) for enabling unique identification of the user terminal 100 having the target application installed therein, but the present embodiment is not limited thereto. For example, a terminal identification number or a telephone number (for example, in the case of a smart phone) that is set uniquely to the user terminal 100 may be used as the reward user ID. However, generating and using the reward user ID without using personal information such as the terminal identification number or the telephone number as in the present embodiment can increase security properties. Further, since the unique identification information which is unique to the reciprocal customer transfer system 500 is employed as the reward user ID, without using the terminal identification number or the telephone number, even when the user terminal 100 (terminal device) that the user owns is changed through replacement, the reward ID is migrated to the user terminal 100 after the change through a predetermined procedure, and thus it is possible to use the reciprocal customer transfer system 500 while maintaining the state of the user terminal 100 before the change.

Further, a process of displaying an application list page (a list LT of target applications) and a process of transmitting customer transfer information when a target application is selected to be downloaded from the application list of step SA25 and step SA26 in FIG. 14 may be executed by another application (for example, a browser) that has been installed in the user terminal 100 being launched, which is not related to the process of the SDK 11, instead of the process executed by the SDK 11. For example, data of the application list page that is redirected to the user terminal 100 from the management server 200 by the browser is generated and transmitted to the user terminal 100, such that the browser may be launched in the user terminal 100 so as to display the application list page. Further, the application ID (ApID) of the customer transfer source application 10 (game A) included in the list request notification information is transmitted by being included in the data of the application list page, such that the customer transfer information including the application ID (ApID) of the customer transfer destination application 20 (game B), the application ID (ApID) of the customer transfer source application 10 (game A), and the reward user ID (RewardUID), which are selected in the application list page may be transmitted from the above-described browser to the management server 200.

Further, similarly to the normal reward process, the CP reward process may also be performed based on the fact that the customer transfer destination application 20 is installed. In this case, the customer transfer destination application 20 may install the reward granting condition of the customer transfer destination application 20 in the user terminal 100.

Further, if a first achievement point is achieved by the customer transfer destination application 20 being installed, all specific applications which perform a campaign may not perform the sending of the reward granting notification information corresponding to the achievement of the achievement point, from the customer transfer destination application 20. In this case, the management server 200 performs a reward granting process similar to the normal reward and transmits reward granting information including a campaign ID to the application server 310, such that a reward due to the CP reward corresponding to the normal reward is granted from the application server 310. Specifically, the process of steps SE23 to 24 may be performed in either the CP reward or the normal reward, without performing the determination process of step SE22 in the flowchart of FIG. 15.

(5) In the above embodiment, a game has been described as an example of the target application corresponding to the reciprocal customer transfer system 500, but the target application is not limited to the game, and any application other than the game may be used.

Further, the storage 230 of the management server 200 may be provided in a server device different from the management server 200. Each piece of information stored in each unit provided in the storage 230 may be managed, by the manager 220 or the controller 240 of the management server 200 performing communication with the storage 230 provided in a server device different from the management server 200 over a network NW.

Further, the management server 200 and the application server 300 may be integrated so as to constitute a server device.

(6) A program for implementing the function of the manager 220, the controller 240, or the SDK 11, which is described above, is stored in a computer-readable storing medium, and the process of each unit described above may be executed by reading the program stored in this storing medium into a computer system and executing the program. Here, "reading the program stored in this storage medium into a computer system and executing the program" includes installing the program in the computer system. "Computer system" referred to herein is intended to include an OS and hardware such as peripheral devices. Further, "computer system" may include a plurality of computer devices which are connected through a network including a communication line such as the Internet, WAN, LAN, and a dedicated line. Further, "computer-readable storage medium" refers to a portable medium such as a flexible disk, a magneto-optical disk, a ROM, and a CD-ROM, or a storage device such as a hard disk built into the computer system. In this manner, a storage medium storing the program may be a non-transitory storage medium such as a CD-ROM. Further, the storage medium also includes a storage medium which is provided in an inside or an outside of a computer system, which is accessible from the distribution server in order to deliver the program. The program code stored in storage medium of the delivery server may be different from the program code of a form executable by the terminal device. In other words, a format stored in the distribution server is not limited as long as the program code can downloaded from a distribution server and installed in a form executable by the terminal device. In addition, a configuration is possible in which a program is divided into a plurality of programs, and the plurality of programs are combined in a terminal device after being downloaded at different timings, or there may be different distribution servers that respectively distribute the divided programs. Further, it is assumed that "computer-readable storage medium" includes a medium that holds a program for a fixed time, such as a volatile memory (RAM) inside a computer system which is a server or a client when the program is transmitted through a network. Further, the program may implement a part of the above-described functions. Further, the program may be a so-called differential file (a differential program) that can be implemented by combining the above-described functions with a program already stored in a computer system.

Further, a part or all of the above-described functions may be implemented as an integrated circuit such as a large scale integration (LSI). The respective functions described above may be formed into separate processors, or a part or all of the respective functions may be integrated and formed into a processor. Further, a circuit integration method is not limited to the LSI, and may be implemented by a dedicated circuit or a general-purpose processor. Further, if an integrated circuit technology replacing the LSI appears due to advances in semiconductor technology, an integrated circuit according to the technology may be used.

<With Respect to First and Second Embodiments: Part 1>

The first and second embodiments described above can be described as follows, but are not limited to the following description.

(1) In the reciprocal customer transfer system 500 of the present embodiment, the management server 200 (an example of the management device) includes an application manager 221, an installation notification acquisitor 241 (an example of the first information acquisitor), a list notifier 242 (an example of the second information notifier), and a reward processor 245.

The application manager 221 manages information regarding a plurality of target applications which are management targets. Here, the management target refers to, for example, a target which is managed as the target application corresponding to the reciprocal customer transfer system 500.

If any target application of a plurality of target applications has been executed by the user terminal 100 (an example of the terminal device), the installation notification acquisitor 241 (an example of the first information acquisitor) acquires the installation notification information (an example of the first information) that is transmitted from the user terminal 100, in response to the target application being executed by the user terminal 100.

By receiving a request based on the target application (first application, customer transfer source application 10) that is executed by the user terminal 100, among a plurality of target applications, the list notifier 242 (an example of the second information notifier) transmits the application list (an example of the second information) including information indicating at least one target application of which installation notification information is not acquired from the user terminal 100, to the user terminal 100.

The reward processor 245 performs the reward granting process based on the fact that a target application (an example of the second application, or the customer transfer destination application 20) is executed or is in a state executable by the user terminal 100, among target applications indicated by the application list transmitted from the list notifier 242, in response to the list notifier 242 transmitting the application list.

Here, the execution of the target application by the user terminal 100 refers to that, for example, the target application has been installed and launched in the user terminal 100. Further, the target application being in a state executable by the user terminal 100 refers to that, for example, the target application has been installed in the user terminal 100.

In addition, a configuration may be possible in which a part of a program for executing the target application in the user terminal 100 is installed in the user terminal 100, and the remaining part of the program is included in a device other than the user terminal 100. For example, a program for executing the target application installed in the user terminal 100 may be the minimum required program for starting the execution of the target application. Then, a configuration may be possible in which the remaining program is included in a server device (for example, an application server 300) or another terminal device (for example, another user terminal 100), which is capable of communicating with the user terminal 100.

Further, a configuration may be possible in which the entirety of the program of a target application executed by the user terminal 100 is included in a device other than the user terminal 100. In other words, a configuration may be possible in which the program for executing the target application is not installed in the user terminal 100, and is included in a server device (for example, an application server 300) or another terminal device (for example, another user terminal 100), which is capable of communicating with the user terminal 100. In other words, the target application being executed by the user terminal 100 includes a case where the target application is executed in a server device connected to the user terminal 100 through a communication network, in response to an instruction from the user terminal 100. In other words, the target application executed by the user terminal 100 may be a so-called cloud-based or a web-based application. In this case, the target application being in a state executable by the user terminal 100 means, for example, registering the target application for use (for example, user registration) in the server device that mainly executes a target application, and the target application being in an executable state through a communication network in response to an instruction from the user terminal 100.

Further, the first information which has been described as the installation notification information may be information transmitted from the user terminal 100 in response to the target application being executed by the user terminal 100, information indicating that the target application has been installed, or information indicating actions other than installation. The information indicating actions other than installation may be, for example information indicating that the target application is launched, information indicating that the target application has been executed, simple flag information, or the like.

In other words, the management server 200 may recognize a target application that is executed by the user terminal 100, according to the above-described first information that is acquired in response to the target application being executed by the user terminal 100.

In addition, for the operation of the reciprocal customer transfer process described above with reference to FIG. 14, an example has been described in which when the target application is installed and first launched, the first information (in FIG. 14, the installation notification information) is transmitted to the management server 200, but the present embodiment is not limited thereto. For example, every time the target application is launched, the user terminal 100 may transmit the first information (for example, installation notification information) to the management server 200.

Further, as long as information indicating at least one target application of which installation notification information is not acquired from the user terminal 100 is included in the second information described with the application list as an example, a form of the information may be any form. For example, the second information may be data of an application list page that can be displayed in the user terminal 100, or information (for example, redirect instruction information) indicating a link destination of an application list page. In addition, in this application list page, information indicating a plurality of target applications may be arranged and displayed (a so-called list display) in the up-and-down direction (vertical direction), may be arranged and displayed in the left-and-right direction (horizontal direction), or may be arranged and displayed (a so-called grid display) in a square shape (a lattice shape) in the vertical and horizontal direction. Further, the second information may be data in which information indicating the target application (for example, an application name, an application icon image, an application ID, and the like) is simply included, and can be displayed in the user terminal 100.

In addition, the second information may include information indicating at least one target application of which installation notification information is already acquired from the user terminal 100, in addition to information indicating at least one target application of which installation notification information is not acquired from the user terminal 100. In this case, the second information may include information for distinguishing the information indicating at least one target application of which installation notification information is not acquired from the user terminal 100 and the information indicating at least one target application of which the installation notification information is already acquired from the user terminal 100.

Thus, the management server 200 can transmit the information indicating a target application which has not been installed in the user terminal 100 to the user terminal 100, by receiving a request based on the customer transfer source application 10 which is executed by the user terminal 100.

Here, receiving a request based on the customer transfer source application 10 that is executed by the user terminal 100 means, for example, the management server 200 acquiring the list request notification information that is transmitted from the user terminal 100 in response to the user X performing a predetermined operation for acquiring an application list of target applications executable by the user terminal 100. In addition, even without an operation by the user, the user terminal 100 may transmit the list request notification information to the management server 200, for example, in response to the customer transfer source application 10 being launched. In other words, the reception of the request based on the customer transfer source application 10 that is executed by the user terminal 100 may be, for example, the management server 200 acquiring the list request notification information that is transmitted from the user terminal 100, in response to the customer transfer source application 10 being launched.

Further, the management server 200 can perform the reward granting process, based on the fact that the customer transfer destination application 20 has been executed or has been in an executable state by the user terminal 100, among target applications which are not installed in the user terminal 100. For example, the management server 200 determines that the customer transfer from the customer transfer source application 10 to the customer transfer destination application 20 is made, based on the fact that the customer transfer destination application 20 that is selected by the user X is executed or is in a state executable by the user terminal 100, among target applications indicated by the information in the user terminal 100, in response to information indicating a target application which is not yet installed in the user terminal 100 being transmitted to the user terminal 100, and can grant a reward to, for example, the user X using the user terminal 100.

(2) For example, if the customer transfer destination application 20 (an example of the second application) is executed or is in a state executable by the user terminal 100, the reward processor 245 may perform the reward granting process.

Thus, if the customer transfer destination application 20 is executed or is in a state executable by the user terminal 100 (for example, is installed), the management server 200 determines that the customer transfer from the customer transfer source application 10 to the customer transfer destination application 20 is made, and can grant a reward to the user X using, for example, the user terminal 100.

(3) When, for example, the installation notification acquisitor 241 (an example of the first information acquisitor) acquires installation notification information (an example of the first information) corresponding to the customer transfer destination application 20 (an example of the second application), the reward processor 245 may determine that the customer transfer destination application 20 has been executed by the user terminal 100. For example, if the customer transfer destination application 20 is installed in the user terminal 100 and launched (in other words, in response to the execution of the customer transfer destination application 20) and installation notification information is acquired from the user terminal 100, the reward processor 245 may determine that the customer transfer destination application 20 has been executed by the user terminal 100. In addition, when the first information is acquired, without being limited to the installation notification information, the reward processor 245 may determine that the customer transfer destination application 20 has been executed by the user terminal 100.

Further, regardless of the first information, when information indicating that the customer transfer destination application 20 has been installed, is acquired from for example, the target application excluding the customer transfer source application 10 that has been installed in the user terminal 100, or by the function of the OS of the user terminal 100, the reward processor 245 may determine that the customer transfer destination application 20 is in a state executable by the user terminal 100.

Thus, the management server 200 can determine that the customer transfer destination application 20 is performed by the user terminal 100, by acquiring the installation notification information on the customer transfer destination application 20 that has been transmitted from the user terminal 100. In addition, the reward processor 245 may perform the above determination, based on the installation notification information that the installation notification acquisitor 241 has acquired, or the installation notification information that the installation information manager 222 manages, or the installation information manager 222 may perform determination based on the installation information and the reward processor 245 may acquire the determined result.

(4) The reward processor 245 may perform the reward granting process, based on the fact that the customer transfer destination application 20 (an example of the second application) has been executed by the user terminal 100 or has been in an executable state, and the reward granting condition which has been set in the customer transfer destination application 20 is satisfied. For example, the reward processor 245 may perform the reward granting process, while assuming that the customer transfer from the customer transfer source application 10 to the customer transfer destination application 20 is made when the customer transfer destination application 20 is installed in the user terminal 100 and the reward granting condition which has been set in the customer transfer destination application 20 is satisfied.

In this manner, since the reward is to be granted, based on the fact that the reward granting condition which has been set in the customer transfer destination application 20 is satisfied, the management server 200 can grant a reward if the customer transfer destination application 20 is not only installed or executed (for example, launched), but is also used.

(5) The application manager 221 manages information regarding a campaign period (an example of the first period) that has been set for a part or all of a plurality of target applications. Further, the list notifier 242 (an example of the second information notifier) transmits an application list (an example of the second information) including information indicating at least one target application (a specific application) for which a campaign period has been set but the campaign period is not acquired from the user terminal 100, to the user terminal 100, by receiving a request based on the target application (an example of the first application, or the customer transfer source application 10) that is executed by the user terminal 100 (an example of the terminal device), among target applications (in other words, specific applications) for which the campaign period has been set. Then, the reward processor 245 performs the reward granting process, based on the fact that a target application (an example of the second application, or the customer transfer destination application 20), among target applications indicated by the application list that has been transmitted from the list notifier 242, is executed or is in a state executable by the user terminal 100 within the campaign period.

Thus, when a campaign period is set in the customer transfer source application 10 that is executed by the user terminal 100 (in other words, when the customer transfer source application 10 is a specific application), the management server 200 can transmit information indicating at least one target application that is not yet installed in the user terminal 100, among target applications in each of which a campaign period is set, to the user terminal 100, by receiving a request based on the customer transfer source application 10. In addition, the management server 200 may transmit the information indicating at least one target application that is not yet installed in the user terminal 100, among target applications in each of which a campaign period is set between the customer transfer source application 10 and the target application, to the user terminal 100.

Further, the management server 200 can determine that the customer transfer from the customer transfer source application 10 to the customer transfer destination application 20 is made within the campaign period, and grant a reward to, for example, the user X using the user terminal 100, based on the fact that the customer transfer destination application 20 is executed or is in a state executable by the user terminal 100 within a campaign period, among information pieces indicating at least one target application that is not yet installed in the user terminal 100.

(6) For example, the reward processor 245 may perform the reward granting process in response to the customer transfer destination application 20 (an example of the second application) being executed or in a state executable by the user terminal 100, within a campaign period (an example of the first period).

Thus, only when the customer transfer destination application 20 has been executed or has been in a state executable by the user terminal 100 (for example, installed) within a campaign period, the management server 200 can determine that the customer transfer from the customer transfer source application 10 to the customer transfer destination application 20 is made within the campaign period, and grant a reward to, for example, the user X using the user terminal 100.

In addition, the reward processor 245 may determine whether the customer transfer destination application 20 has been executed by the user terminal 100 either within or outside of the campaign period, depending on whether a timing at which the installation notification acquisitor 241 (an example of the first information acquisitor) has acquired the installation notification information (an example of the first information) corresponding to the customer transfer destination application 20 (an example of the second application) is within the campaign period (an example of the first period).

For example, when the timing at which the installation notification acquisitor 241 (an example of the first information acquisitor) has acquired the installation notification information (an example of the first information) corresponding to the customer transfer destination application 20 (an example of the second application) is within the campaign period (an example of the first period), the reward processor 245 may determine that the customer transfer destination application 20 has been executed by the user terminal 100 within the campaign period.

Thus, the management server 200 can determine whether or not the timing at which the customer transfer destination application 20 is executed by the user terminal 100 is within the campaign period, based on the acquisition timing of the installation notification information on the customer transfer destination application 20 that has been transmitted from the user terminal 100.

(7) The reward processor 245 may perform the reward granting process, based on the fact that the customer transfer destination application 20 (an example of the second application) is executed or is in a state executable by the user terminal 100 within the campaign period (an example of the first period), and the reward granting condition which has been set in the customer transfer destination application 20 is satisfied.

In this manner, since the reward is to be granted, based on the fact that the reward granting condition which has been set in the customer transfer destination application 20 is satisfied, the management server 200 can grant a reward if the customer transfer destination application 20 is not only installed or executed (for example, launched), but is also used.

(8) For example, the application manager 221 manages information regarding a campaign period (an example of the first period) that has been set for a plurality of specific applications among a plurality of target applications which are management targets. If any target application of a plurality of target applications has been executed by the user terminal 100 (an example of the terminal device), the installation notification acquisitor 241 (an example of the first information acquisitor) acquires the installation notification information (an example of the first information) that is transmitted from the user terminal 100, in response to the target application being executed by the user terminal 100. Further, the list notifier 242 (an example of the second information notifier) transmits the application list (an example of the second information) including information indicating at least one target application of which installation notification information is not acquired from the user terminal 100, to the user terminal 100, by receiving a request based on the target application (first application, customer transfer source application 10) that is executed by the user terminal 100, among a plurality of target applications.

Then, when the campaign period is set for the target application (an example of the second application, customer transfer destination application 20), among target applications that are indicated by the application list transmitted from the list notifier 242, in response to the list notifier 242 transmitting the application list, the reward processor 245 performs the reward granting process based on the fact that the customer transfer destination application 20 (an example of the second application) is executed or is in a state executable by the user terminal 100 within the campaign period.

Meanwhile, when a campaign period is not set in the target application (an example of the second application or the customer transfer destination application 20) selected from among target applications indicated by the application list transmitted from the list notifier 242, the reward processor 245 performs the reward granting process, based on the fact that the customer transfer destination application 20 (an example of the second application) is executed or is in a state executable by the user terminal 100.

Thus, if a campaign period is not set in the customer transfer destination application 20, when the customer transfer source application 10 has been executed or has been in a state executable by the user terminal 100 (for example, installed) regardless of the campaign period, the management server 200 performs the reward granting process (for example, a normal reward process). If the campaign period is set in the customer transfer destination application 20, only when the customer transfer source application 10 has been executed or has been in a state executable by the user terminal 100 (for example, installed) within the campaign period, the management server 200 can perform the reward granting process (for example, a CP reward process).

In addition, the reward granting conditions or the reward contents may be the same or different, in the reward granting process (for example, a normal reward process) when a campaign period is set in the customer transfer destination application 20, and the reward granting process (for example, a CP reward process) when a campaign period is set in the customer transfer destination application 20.

Further, the case where the campaign period is set in the customer transfer destination application 20, as described in the first embodiment, refers to, for example, a case where a campaign period is set between the customer transfer source application 10 and the customer transfer destination application 20, but the present embodiment is not limited thereto. For example, in a case of the customer transfer from a dedicated application, which is specialized in a function of the customer transfer source, to the customer transfer destination application 20, a campaign period may be set in the dedicated application. In this case, the case where a campaign period is set in the customer transfer destination application 20 may be the case where a campaign period is set in the customer transfer destination application 20, regardless of the customer transfer source. In addition, the configuration example of the customer transfer from a dedicated application, which is specialized in a function of the customer transfer source, to the customer transfer destination application 20 will be described in a ninth embodiment.

Further, the reciprocal customer transfer system 500 may be configured to perform only the reward granting process (for example, a CP reward process) when a campaign period is set in the customer transfer destination application 20, may be configured to perform only the reward granting process (for example, a normal reward process) when a campaign period is set, or may be configured to perform both reward granting processes.

(9) When the campaign period (an example of the first period) has been set for the customer transfer destination application 20 (an example of the second application), the reward processor 245 performs the CP reward process (an example of the first reward granting process) as the reward granting process described above, based on the fact that the customer transfer destination application 20 is executed or is in a state executable by the user terminal 100 within the campaign period, and the reward granting condition which has been set in the customer transfer destination application 20 is satisfied.

Meanwhile, when the campaign period (an example of the first period) has not been set for the customer transfer destination application 20 (an example of the second application), the reward processor 245 performs the normal reward process (an example of the second reward granting process) as the reward granting process described above, based on the fact that the customer transfer destination application 20 is executed or is in a state executable by the user terminal 100.

In this manner, in the CP reward process when a campaign period is set in the customer transfer destination application 20, if the customer transfer destination application 20 is not only executed or in an executable state (for example, launched), but is also used, the management server 200 can grant a reward. Meanwhile, in the normal reward process when a campaign period is not set in the customer transfer destination application 20, if the customer transfer destination application 20 is only installed or executed (for example, launched), the management server 200 can grant a reward.

(10) Even in a case where the campaign period (an example of the first period) is set in the customer transfer destination application 20 (an example of the second application), when the customer transfer destination application 20 has been executed or has been in an executable state outside of the campaign period, the reward processor 245 performs the second reward granting process.

Therefore, even if the campaign period is set in the customer transfer destination application 20, when the customer transfer destination application 20 is executed or is in an executable state outside of the campaign period, a normal reward is granted. In other words, when the campaign period is set in the customer transfer destination application 20, if a timing when the customer transfer destination application 20 is executed or is in an executable state is within the campaign period, the CP reward process can be performed; and if the timing is outside of the campaign period, the normal reward process can be performed.

In addition, in the CP reward process, a reward may be granted in response to the customer transfer destination application 20 being executed or in a state executable by the user terminal 100, within a campaign period. In other words, when a campaign period (an example of the first period) is set for the customer transfer destination application 20 (an example of the second application), the reward processor 245 may perform a CP reward process (an example of the first reward granting process) as the reward granting process described above, in response to the customer transfer destination application 20 being executed or in a state executable by the terminal device within the campaign period.

Further, in the normal reward process, a reward may be granted, based on the fact that the customer transfer destination application 20 is executed or is in a state executable by the user terminal 100, and the reward granting condition which has been set in the customer transfer destination application 20 is satisfied.

In other words, when the campaign period (an example of the first period) is not set for the customer transfer destination application 20 (an example of the second application), the reward processor 245 may perform the normal reward process (an example of the second reward granting process) as the reward granting process described above, based on the fact that the customer transfer destination application 20 is executed or is in a state executable by the user terminal 100 and the reward granting condition which has been set in the customer transfer destination application 20 is satisfied.

(11) In the reciprocal customer transfer system 500 of the present embodiment, the user terminal 100 (an example of the terminal device) is a terminal device capable of communicating with the management server 200 (an example of the management device) described above. Here, the management server 200 described above manages the customer transfer information indicating the customer transfer from the target application which is the customer transfer source and the target application which is the customer transfer destination, among a plurality of target applications, and manages the installation of the target application of the customer transfer destination, based on the customer transfer information. For example, the management server 200 manages customer transfer source information indicating the target application which is the customer transfer source and customer transfer destination information indicating the target application which is the customer transfer destination, in association with each other, as the customer transfer information indicating the customer transfer from the target application which is the customer transfer source and the target application which is the customer transfer destination, among a plurality of target applications.

The user terminal 100 (SDK 11) includes an installation notifier 103, a list requester 104 (an example of the requester), and a customer transfer information notifier 106.

The installation notifier 103 transmits the installation notification information (an example of the first information) indicating that the target application is installed, in one target application installed in the user terminal 100 (an example of the terminal device), to the management server 200. When information indicating at least one target application among a plurality of target applications is requested to the management server 200, the list requester 104 transmits customer transfer source information (for example, the application ID of the customer transfer source application 10) indicating the one target application to the management server 200, based on a first operation of one target application (for example, a customer transfer source application 10, or a first application). The customer transfer information notifier 106 transmits customer transfer destination information (for example, the application ID of the customer transfer destination application 20, or the application ID of the second application) indicating target applications selected from among target applications indicated by the information indicating at least one target application that is acquired from the management server 200, based on a second operation, to the management server 200. For example, the customer transfer information notifier 106 transmits customer transfer destination information on the target application selected based on the second operation, as the customer transfer information, to the management server 200.

In this manner, in the reciprocal customer transfer system 500 of the present embodiment, it is possible to perform customer transfer to another target application (for example, customer transfer destination application 20) such that another target application (for example, the customer transfer destination application 20) is installed from one target application (for example, the customer transfer source application 10) in the user terminal 100, by the management server 200 that manages a plurality of specific applications which are included in the target application corresponding to the reciprocal customer transfer system 500, and the user terminal 100 capable of communicating with the management server 200.

Accordingly, according to the present embodiment, it is possible to improve the convenience of the customer transfer between applications.

Here, the customer transfer information is information indicating customer transfer from the customer transfer source application 10 to the customer transfer destination application 20. Typically, the customer transfer information is information indicating the customer transfer destination application 20 (an example of the second application), among the target applications indicated by the application list that is transmitted, in response to the application list (an example of the second information) that the list notifier 242 (an example of the second information notifier) of the management server 200 has transmitted, by receiving a request based on the customer transfer source application 10 (an example of the first application) executed by the user terminal 100. For example, the application ID of the customer transfer destination application 20 may be the customer transfer information. Further, the application ID (an example of the customer transfer destination information) of the customer transfer destination application 20, in association with the application ID (an example of the customer transfer source information) of the customer transfer source application 10 may be the customer transfer information. Further, the application ID of the customer transfer destination application 20 in association with the reward user ID corresponding to the user terminal 100 may be used as the customer transfer information.

For example, the customer transfer information notifier 106 may transmit the customer transfer destination information in association with the reward user ID (an example of the unique identification information) corresponding to the user terminal 100 (an example of the terminal device), to the management server 200.

Thus, the management server 200 can specify the user terminal 100 that has transmitted the customer transfer information.

(12) Further, the management server 200 may manage information regarding the campaign period (an example of the first period) that is set for the specific application that is a part or all of the target application among a plurality of target applications. In other words, a campaign period may be set in all of the plurality of target applications, or a campaign period may be set in a part of the plurality of target applications.

When a request for information indicating at least one specific application among specific applications is made to the management server 200, based on a first operation of one specific application (for example, customer transfer source application 10) that is installed in the user terminal 100 (an example of the terminal device), the list requester 104 (an example of the requester) of the user terminal 100 (SDK 11) may transmit the customer transfer source information (for example, the application ID of the customer transfer source application 10) indicating one specific application to the management server 200. Further, the customer transfer information notifier 106 may transmit, to the management server 200, customer transfer destination information (for example, the application ID of the customer transfer destination application 20) indicating a specific application selected, based on a second operation during the campaign period, from among specific applications indicated by the information indicating at least one specific application that is acquired from the management server 200.

In this manner, in the reciprocal customer transfer system 500 of the present embodiment, it is possible to perform customer transfer destined for another specific application (an example of the customer transfer destination application 20) such that another specific application (an example of the customer transfer destination application 20) is installed from one specific application (an example of the customer transfer source application 10) in the user terminal 100, by the management server 200 that manages information regarding a campaign period that has been set for specific applications which are a part or all of the target applications of the target applications corresponding to the reciprocal customer transfer system 500 and the user terminal 100 capable of communicating with the management server 200.

(13) The function of the installation notifier 103, the function of the list requester 104 (an example of the requester), and the function of the customer transfer information notifier 106, which are described above, are executed based on the SDK 11 (an example of software) which is embedded into each of a plurality of target applications. For example, the SDK 11A which is embedded into the customer transfer source application 10 performs the function of the installation notifier 103, the function of the list requester 104, and the function of the customer transfer information notifier 106. In addition, the function of the reward granting notifier 107 described above may be performed by the SDK 11 which is embedded into each of the plurality of target applications. For example, the SDK 11B which is embedded into the customer transfer destination application 20 may perform the function of the installation notifier 103, and the function of the reward granting notifier 107. In addition, the SDK 11A and the SDK 11B may respectively have the same function, and may perform a corresponding function, depending on whether the SDK 11A and the SDK 11B are embedded into the customer transfer source application 10 or the customer transfer destination application 20.

Thus, it is possible to perform the target application corresponding to the reciprocal customer transfer system 500 of the present embodiment, by the SDK 11 being embedded into an application. Accordingly, for example, even in the existing application or a developed application, if a program of an application is updated or slightly changed so as to be embedded in the SDK 11, the application may be a target application corresponding to the reciprocal customer transfer system 500.

(14) When the reward granting condition is satisfied which has been set in the customer transfer destination application 20 (an example of the target application or specific application selected as a customer transfer destination) indicated by the customer transfer destination information, the reward granting notifier 107 of the user terminal 100 (SDK 11) transmits the above-described reward granting notification information in association with the customer transfer destination information (for example, the application ID of the customer transfer destination application 20) and the reward user ID (an example of the unique identification information) that is associated with the user terminal 100, to the management server 200.

In addition, the reward granting notification information may be associated with the reward user ID (an example of the unique identification information) associated with the user terminal 100, and the application user ID (an example of the user information) of the customer transfer destination application 20 (an example of the second application). Then, the reward granting notifier 107 of the user terminal 100 (SDK 11) may transmit the reward granting notification information which is associated with the reward user ID associated with the user terminal 100 and the application user ID of the customer transfer destination application 20 to the management server 200.

In addition, the reward granting notifier 107 may directly transmit the reward granting notification information described above to the management server 200, or may indirectly transmit the reward granting notification information to the management server 200, through the application server 300 (for example, the application server 320 corresponding to the customer transfer destination application 20). Further, the user terminal 100 may be configured not to include a reward granting notifier 107, in this case, the application server 300 (for example, application server 320 of the customer transfer destination application 20) determines whether or not the reward granting condition is satisfied which has been set corresponding to a campaign in advance, and when the reward granting condition is satisfied, the application server 300 may transmit the reward granting notification information to the management server 200.

Then, when reward granting notification information indicating that the reward granting condition is satisfied is acquired from the customer transfer destination application 20 executed by the user terminal 100 or the application server 320 (an example of the server device) corresponding to the customer transfer destination application 20, based on the fact that the reward granting condition that has been set in the customer transfer destination application 20 (an example of the second application) is satisfied, the reward processor 245 of the management server 200 performs the reward granting process based on the acquired reward granting notification information.

In this manner, when the reward granting condition that has been set in the customer transfer destination application 20 is satisfied in the user terminal 100, the management server 200 can perform the reward granting process by acquiring the reward granting notification information.

For example, the reward processor 245 of the management server 200 transmits reward granting information associated with the application user ID (an example of user information on the first application) of the customer transfer source application 10 to the customer transfer source application 10 executed by the user terminal 100 or the application server 310 (an example of the server device) corresponding to the customer transfer source application 10, based on the fact that the reward granting condition that has been set in the customer transfer destination application 20 (an example of the second application) is satisfied.

Here, the management server 200 includes an application user information acquisitor that acquires user information on the target application. For example, the application user information acquisitor acquires the application user ID (an example of user information on the first application) of the target application in association with the reward user ID (an example of the unique identification information) corresponding to the user terminal 100. In addition, the installation notification acquisitor 241 may be caused to function as the application user information acquisitor. In other words, the application user ID of the target application that has transmitted the installation notification information may be included in the installation notification information. In this manner, the function of the application user information acquisitor may be included in another function.

Thus, when the reward granting condition that has been set in the customer transfer destination application 20 is satisfied, in the user terminal 100, the management server 200 can grant a reward of the customer transfer source application 10 to the user (user X) using the user terminal 100.

In addition, as the reward granting process, an example of the process of granting the reward of the customer transfer source application 10 to the user has been described, but a process of granting a reward of the customer transfer destination application 20, instead of the customer transfer source application 10, to the user may be performed. In this case, the management server 200 may transmit the reward granting information to the application server 320 of the customer transfer destination application 20, based on, for example, the customer transfer destination application ID (ApIDto) included in the customer transfer information that is stored in the customer transfer information storage 237 and the notification destination URL (NoticeURL) included in the target application information that is stored in the target application information storage 231. In addition, as the reward granting process, a process of granting both the reward of the customer transfer source application 10 and the reward of the customer transfer destination application 20 to the user may be performed, or a process of granting a reward that can commonly be used in a plurality of target applications to the user may be performed.

Further, as the reward granting process, a process of granting a reward that can be used in another application different from the target application or a reward that can be used on a web site (for example, currency, points, or the like that can be used when goods or services are sold or purchased by communication through a communication network) to the user may be performed. In this case, since, for example, once information on the reward that has been granted to the user is managed, a predetermined process is performed, the management server 200 may transmit information on the managed reward such as a reward that can be used in another application or a reward that can be used in a web site, to a server device corresponding to another application or a server device corresponding to a website.

(15) The customer transfer information acquisitor 243 and the customer transfer information manager 223 of the management server 200 are included in the management server 200. The customer transfer information acquisitor 243 acquires customer transfer information indicating the customer transfer to the customer transfer destination application 20 (second application). The customer transfer information manager 223 manages the customer transfer information that the customer transfer information acquisitor 243 has acquired. When the customer transfer destination application 20 is executed or is in a state executable by the user terminal 100, based on a condition that the customer transfer information corresponding to the customer transfer destination application 20 is managed by the customer transfer information manager 223, the reward processor 245 performs the reward granting process described above.

Thus, when the customer transfer destination application 20 has been executed or has been in a state executable by the user terminal 100 by the present system, there is customer transfer information, such that the reciprocal customer transfer system 500 sets the customer transfer destination application 20 as a target for the reward granting process; and when the target application is installed without depending on the present system, there is no record of the customer transfer information, such that the reciprocal customer transfer system 500 can set the target application so as not to be a target for the reward granting process.

Further, when the reward granting condition that has been set in the customer transfer destination application 20 is satisfied, based on a condition that the customer transfer information corresponding to the customer transfer destination application 20 is managed by the customer transfer information manager 223, the reward processor 245 of the management server 200 may perform the reward granting process described above.

Thus, when the customer transfer destination application 20 is executed by the user terminal 100 and the reward granting condition that has been set in the customer transfer destination application 20 is satisfied, by the present system, there is customer transfer information, such that the reciprocal customer transfer system 500 sets the customer transfer destination application 20 as a target for the reward granting process; and when the target application has been installed without depending on the present system, there is no record of the customer transfer information, such that the reciprocal customer transfer system 500 can set the target application so as not to be a target for the reward granting process.

For example, the customer transfer information acquisitor 243 acquires the customer transfer information described above, in association with the reward user ID (an example of the unique identification information) associated with the user terminal 100, the application ID (an example of the identification information) of the customer transfer source application 10 (an example of the first application), and the application ID (an example of the identification information) of the customer transfer destination application 20 (an example of the second application). Then, the customer transfer information manager 223 manages the reward user ID associated with the customer transfer information, the application ID of the customer transfer source application 10, and the application ID of the customer transfer destination application 20, in association with each other, as a record of the customer transfer information.

Thus, since the user terminal 100 in which customer transfer to the customer transfer destination application 20 is performed and the customer transfer source application 10 can be specified, the management server 200 performs a reward granting process of granting a reward of the customer transfer source application 10, for the user using the user terminal 100.

In addition, the reward user ID associated with the user terminal 100, the application ID of the customer transfer source application 10, and the application ID of the customer transfer destination application 20 are included in the customer transfer information that the customer transfer information acquisitor 243 has acquired, and the customer transfer information manager 223 may associate and manage the reward user ID, the application ID of the customer transfer source application 10, and the application ID of the customer transfer destination application 20, which are included in the customer transfer information, as a record of the customer transfer information. Further, the application ID of the customer transfer destination application 20 is at least included in the customer transfer information, and the customer transfer information manager 223 manages the application ID of the customer transfer destination application 20, or the reward user ID or the application ID of the customer transfer source application 10, which is associated with the customer transfer information and is acquired as other information, with the application ID of the customer transfer destination application 20, in association with each other, as a record of the customer transfer information.

In addition, the customer transfer information manager 223 may manage the application ID (an example of the identification information) of the customer transfer destination application 20 (an example of the second application) and the reward user ID (an example of the unique identification information) associated with the user terminal 100, in association with each other, as a record of the customer transfer information.

Thus, since the user terminal 100 in which customer transfer to the customer transfer destination application 20 is performed, can at least be specified, the management server 200 can set the user using the user terminal 100 as a reward granting target. For example, when a reward other than the reward of the customer transfer source application 10 is granted, the application ID of the customer transfer source application 10 may not be associated and managed as a record of the customer transfer information.

Further, the customer transfer information manager 223 may manage the application ID (an example of the identification information) of the customer transfer destination application 20 (an example of the second application) and the application ID (an example of the identification information) of the customer transfer source application 10 (an example of the first application) in association with each other, as a record of the customer transfer information.

Thus, since the customer transfer source application 10 when customer transfer to the customer transfer destination application 20 is performed can be specified, the management server 200 can perform, for example, a reward granting process of granting a reward to the customer transfer source application 10. For example, when the reward of the customer transfer source application 10 is granted to all users or a specific user regardless of the user terminal 100 in which customer transfer is performed, the reward user ID may not be associated and managed as a record of the customer transfer information.

(16) The user terminal 100 (an example of the terminal device) is specified by the reward user ID (an example of the unique identification information) associated with the user terminal 100. If the target application that has first been installed in the user terminal 100 among the plurality of target applications is launched, the reward user ID is acquired, and stored in the user terminal 100 so as to be referable to from any target application that executed by the user terminal 100.

For example, the user terminal 100 (SDK 11) includes a unique identification information acquisitor 102. When the target application that is installed in the user terminal 100 is the target application that is first installed in the user terminal 100 among a plurality of target applications, the unique identification information acquisitor 102 acquires a reward user ID (an example of unique identification information), and stores the acquired reward user ID in the terminal storage 140 (an example of the storage) such that other target applications installed in the user terminal 100 can refer to the acquired ID.

Thus, according to the reciprocal customer transfer system 500, the user terminal 100 automatically acquires the reward user ID when the target application is first installed, and the acquired reward user ID can commonly be used by the target application which is installed subsequently. Therefore, the reward user ID is acquired without requesting the user to perform a special operation, which enables the use of the system.

(17) Specifically, the unique identification information acquisitor 102 determines whether or not the reward user ID (an example of the unique identification information) is stored in the terminal storage 140 (an example of the storage), and when it is determined that the reward user ID is not stored in the terminal storage 140, the reward user ID is acquired.

Thus, when the target application is first installed and launched, the user terminal 100 can acquire the reward user ID.

Further, as the unique identification information, in addition to the reward user ID that is generated by itself in the reciprocal customer transfer system 500a, identification numbers such as a unique device identifier (UDID) uniquely allocated to each user terminal 100, an international mobile equipment identity (IMEI), or an international mobile subscriber identity (IMSI) may be used. Further, the identification numbers may be used by being hashed or encrypted. In other words, the identification numbers may be generated or set inside or outside of the reciprocal customer transfer system 500, and may be any identification information which is unique in the user terminal 100. Further, information (for example, an advertising identifier) which is associated with each user terminal 100 by the OS function of the user terminal 100, respective pieces of information being different from each other, and is allowed to be used by each application information may be used as the unique identification information. Further, the management server 200 may acquire, for example, 100 types of parameters such as a screen resolution and width, and a time zone difference from the user terminal 100, as the unique identification information, without acquiring the ID associated with each user terminal 100 from the user terminal 100, and use an ID that is generated using a predetermined algorithm. In this case, the unique identification information may not be stored in the user terminal 100.

(18) The installation notifier 103 of the user terminal 100 (SDK 11) transmits the installation notification information (an example of the first information) in association with the application ID (an example of the identification information) of the target application installed in the user terminal 100 and the reward user ID (an example of the unique identification information) corresponding to the user terminal 100 (an example of the terminal device), to the management server 200.

The installation notification acquisitor 241 (an example of the first information acquisitor) of the management server 200 acquires install notification information in association with a reward user ID (an example of unique identification information) associated with the user terminal 100 and an application ID (an example of identification information) of a target application that has transmitted the installation notification information (an example of first information). Further, the management server 200 includes an installation information manager 222 (an example of the first information manager). The installation information manager 222 manages the reward user ID which is associated with the installation notification information and installation information (an example of the management information) which is associated with the application ID of the target application.

Thus, when a target application is installed and launched in the user terminal 100 (in other words, when a target application is executed in the user terminal 100), the management server 200 can manage the application ID of the target application and the reward user ID associated with the user terminal 100, in association with each other. Accordingly, the management server 200 can specify the target application that is installed (for example, installed and launched) in each user terminal 100.

In addition, either or both of the reward user ID (an example of the unique identification information) associated with the user terminal 100 and the application ID of the target application that transmits the installation notification information (an example of the first information) may be included in the installation notification information (an example of the first information). When one of the reward user ID and the application ID is included in the installation notification information, the other may be transmitted from the user terminal 100 to the management server 200, as information other than the installation notification information associated with the one. Further, as described above, the first information that has been described with the installation notification information as an example may be, for example, simple flag information. In this case, the reward user ID and the application ID are associated with the flag information and may be transmitted from the user terminal 100 to the management server 200 as information other than the installation notification information.

(19) Further, the management server 200 of the present embodiment includes an application user information acquisitor that acquires user information on the target application. For example, the application user information acquisitor acquires the application user ID (an example of user information on the first application) of the target application in association with the reward user ID (an example of the unique identification information) corresponding to the user terminal 100. In addition, the installation notification acquisitor 241 may be caused to function as the application user information acquisitor. In other words, the application user ID of the target application that has transmitted the installation notification information may be included in the installation notification information. In this manner, the function of the application user information acquisitor may be included in another function.

The user terminal 100 (SDK 11) includes an application user information notifier that transmits the application user ID (an example of user information on a target application) of the target application installed in the user terminal 100 in association with the reward user ID (an example of the unique identification information) corresponding to the user terminal 100, to the management server 200. In addition, the installation notifier 103 may be caused to function as the application user information notifier. In other words, the application user ID of the target application that has transmitted the installation notification information may be included in the installation notification information. In this manner, the function of the application user information acquisitor may be included in another function.

Then, the installation information manager 222 (an example of the first information manager) of the management server 200 manages the installation information (an example of the management information) and the application user ID (an example of the user information) of the target application that the application user information acquisitor acquires, in association with each other. For example, the installation information manager 222 associates and manages the application user ID of the target application that the application user information acquisitor acquires, and the application ID of the target application or the reward user ID corresponding to the user terminal 100, which is associated with the installation information.

Thus, when the target application is installed in the user terminal 100, the management server 200 can manage the application ID of the installed target application, the application user ID of the installed target application, and the reward user ID associated with the user terminal 100 in association with each other. In other words, the management server 200 can manage the application user ID of each target application that is installed in the user terminal 100 in association with the reward user ID.

(20) The application manager 221 (an example of the first reward information manager) of the management server 200 performs management by storing information indicating a link destination of a listing location of Information indicating the CP reward (an example of the first reward) that is granted through the CP reward process (an example of the first reward granting process) that is executed as the reward granting process when a campaign period (an example of the first period) is set for the customer transfer destination application 20 (an example of the second application), in the campaign participant application information storage 235. Further, the application manager 221 (an example of the second reward information manager) stores the normal reward information in which each of a plurality of target applications and information indicating a normal reward that is set in advance and is to be granted by the normal reward process (an example of the second reward granting process) in the normal reward information storage 232 and manages it.

Then, the list notifier of the management server 200 transmits an application list including information indicating a normal reward to the user terminal 100 such that information indicating a normal reward is displayed by being associated with the target application in which a campaign is not set between the customer transfer source application 10 (an example of the first application) and the target application, among a plurality of target applications. Meanwhile, the list notifier transmits an application list including information indicating the link destination to the user terminal 100 such that information indicating the link destination is displayed by being associated with the target application in which a campaign is set between the customer transfer source application 10 and the target application, among a plurality of target applications.

Thus, when the list LT of target applications based on the application list that the management server 200 has acquired is displayed on the display 120, the user terminal 100 can display information regarding a reward to be granted by a normal reward in the target application in which a campaign period is not set, and can associate and display information indicating a link destination of a listing location of information regarding a reward to be granted by a CP reward (an example of a reward) of the campaign, in the specific application in which a campaign is set.

(21) The installation guide acquisitor 244 (an example of the screen information notifier) of the management server 200 transmits information for displaying a screen capable of installing the customer transfer destination application 20 on the user terminal 100, to the user terminal 100, based on the application ID (an example of the identification information) of the customer transfer destination application 20 (an example of the second application) associated with the customer transfer information that the customer transfer information acquisitor 243 has acquired. Here, the information for displaying a screen capable of installing the customer transfer destination application 20 on the user terminal 100 is, for example, instruction information for launching the store 30 that is an application for displaying a storage page of a store site capable of installing (capable of downloading) the customer transfer destination application 20, and information including the URL (store URL) of a page of a selling site capable of downloading the target application (application store 400).

Thus, when the customer transfer destination application 20 to be subjected to customer transfer from the customer transfer source application 10 is selected, the user terminal 100 can automatically display a store page capable of installing the selected customer transfer destination application 20, without the need of the user's particular operation.

(22) It is assumed that a separate period which does not overlap the campaign period is set for a part or all of the target applications (in other words, a plurality of specific applications) in which a campaign period (an example of the first period) is set. In this case, when the CP reward process (an example of the reward granting process) corresponding to the campaign period that has been set in the customer transfer destination application 20 (an example of the second application) has already been executed in the user terminal 100, the reward processor 245 of the management server 200 does not perform the CP reward process (an example of the reward granting process) corresponding to the separate period described above.

Thus, with respect to the CP reward process for the same customer transfer destination application 20, the reciprocal customer transfer system 500 can prevent a reward due to the CP reward in another campaign from being granted again to the user who receives a reward due to the CP reward in a certain campaign. In other words, the customer transfer destination application 20 to which the reward due to the CP reward is granted does not become a target of another CP reward.

(23) In the case where the user terminal 100 has already executed at least one of the CP reward process (an example of the first reward granting process) that is executed as the reward granting process when a campaign period (an example of the first period) is set for the customer transfer destination application 20 (an example of the second application) and the normal reward process (an example of the second reward granting process) that is executed as the reward granting process when a campaign period is not set, the reward processor 245 of the management server 200 does not perform the other reward granting process.

For example, in the management server 200, the reward status included in reward achieved information on the customer transfer destination application 20 in which the normal reward process or the CP reward process is performed is already updated to "1" (achieved). Therefore, even if the reward granting notification information is acquired again from the customer transfer destination application 20, the management server 200 can treat the reward granting notification information, not as reward achieved information of which reward status can be updated to "1" (achieved), but as invalid information.

Thus, the reciprocal customer transfer system 500 prevents double rewards, which are the normal reward and the CP reward, from being granted to the same customer transfer destination application 20. In other words, the customer transfer destination application 20 to which the normal reward is granted does not become a target of the CP reward. Further, the customer transfer destination application 20 to which the CP reward is granted does not become a target of the normal reward.

(24) The application manager 221 of the management server 200 manages information regarding the campaign period (an example of the first period) that has been set for the specific application that is a part or all of the target application of a plurality of target applications, and information regarding at least an end limit of a reward granting period (an example of a second period) that ends later than the end of the campaign period including a part or all of the campaign period.

The reward processor 245 performs the reward granting process, based on the fact that the reward granting condition that has been set in the customer transfer destination application 20 is satisfied, within the reward granting period.

For example, when the reward granting condition that has been set in the customer transfer destination application 20 (an example of the second application) is satisfied, the reward granting notifier 107 of the user terminal 100 (SDK 11) transmits reward granting notification information indicating that the reward granting condition is satisfied, to the management server 200.

Then, when the reward granting notification information indicating that the reward granting condition is satisfied is acquired from the customer transfer destination application 20 (an example of the second application) within the reward granting period, the reward processor 245 of the management server 200 performs the reward granting process (for example, CP reward process) based on the acquired reward granting notification information.

Thus, even if the customer transfer destination application 20 is installed in the user terminal 100 immediately before the end of the campaign period, the reciprocal customer transfer system 500 can give the user a period in which the user tries to reach the achievement point at which a reward due to the CP reward is granted. Further, when the reward granting notification information is acquired from the user terminal 100 within a reward granting period, the management server 200 can cause a reward to be granted.

(25) A plurality of reward granting conditions may be provided corresponding to the customer transfer destination application 20 (an example of the second application). The reward granting notifier 107 of the user terminal 100 (SDK 11) transmits the reward granting notification information to the management server 200, respectively, based on the fact that a plurality of reward granting conditions are respectively satisfied. The reward processor 245 of the management server 200 performs the reward granting process (for example, a normal reward process or a CP reward process), based on the fact that a plurality of reward granting conditions are respectively satisfied.

Thus, the reciprocal customer transfer system 500 can perform the reward granting process, in response to a plurality of reward granting conditions corresponding to the customer transfer destination application 20 being respectively satisfied. In other words, the user continues to use the customer transfer destination application 20 in order to achieve a plurality of rewards that have been set in the campaign period (an example of a reward granting period) as much as possible. Therefore it is possible to increase the utilization of the customer transfer destination application 20.

(26) If a plurality of reward granting conditions are provided corresponding to the customer transfer destination application 20 (an example of the second application), when the reward granting notification information is acquired from the customer transfer destination application 20 within the reward granting period (an example of the second period), based on the fact that the plurality of reward granting conditions are respectively satisfied, the reward processor 245 of the management server 200 performs the reward granting process (for example, CP reward process) based on the acquired reward granting notification information.

Thus, even if the plurality of reward granting conditions are set in the customer transfer destination application 20, the management server 200 can grant a reward, only when a timing at which each of the plurality of reward granting conditions is satisfied (a timing at which the management server 200 acquires the reward granting notification information) is within the reward granting period.

(27) Each of the plurality of reward granting conditions is a timing reached each of a plurality of achievement points that are set in a process by the customer transfer destination application 20 (an example of the second application). The reward granting notifier 107 of the user terminal 100 (SDK 11) transmits the reward granting notification information associated with the achievement point ID (an example of the achievement point information) indicating a reached achievement point among the plurality of achievement points to the management server 200, based on the fact that each of a plurality of reward granting conditions is satisfied. Then, the reward processor 245 of the management server 200 acquires the reward granting notification information associated with the achievement point ID (achievement point information) indicating the reached achievement point among the plurality of achievement points from the customer transfer destination application 20, based on the fact that each of the plurality of reward granting conditions is satisfied, and transmits the reward granting information associated with the acquired achievement point ID (achievement point information) to the customer transfer source application 10 (an example of the first application) executed by the user terminal 100, or the application server 310 (an example of the server device) corresponding to the customer transfer source application 10.

In other words, the management server 200 transmits achievement IDs each indicating reached achievement point to the application server 310 corresponding to the customer transfer source application 10, in response to each of a plurality of achievement points of the customer transfer destination application 20 being reached, in the user terminal 100.

Thus, the reciprocal customer transfer system 500 grants a reward corresponding to each of the reached achievement points, in response to each of the plurality of achievement points that have been set in the customer transfer destination application 20 being reached.

(28) The reward granting notifier 107 of the user terminal 100 (SDK 11) may transmit the reward granting notification information associated with reach information indicating which achievement point is reached among the plurality of achievement points, based on the fact that each of a plurality of reward granting conditions is satisfied, to the management server 200. Then, the reward processor 245 of the management server 200 may acquire the reward granting notification information associated with reach information indicating which achievement point is reached among the plurality of achievement points from the customer transfer destination application 20 (an example of the second application), based on the fact that each of the plurality of reward granting conditions is satisfied, and transmit the reward granting information associated with the number of acquisitions of the reward granting notification information for each achievement, to the customer transfer source application 10 (an example of the first application) executed by the user terminal 100, or the application server 310 (an example of the server device) corresponding to the customer transfer source application 10.

In other words, the management server 200, in the reward granting information transmitted to the application server 310 corresponding to the customer transfer source application 10 when any of the plurality of achievement points is reached may not be associated with the achievement point ID, but may be associated with information indicating the number of acquisitions of the reward granting notification information (in other words, the number of times of reaching the achievement point, and information indicating which achievement point is reached). In this case, it may be determined in advance that the application server 310 and the management server 200 exchange reward granting information including the information indicating the number of times described above. Accordingly, even if information indicating the number of acquisitions of the reward granting notification information, instead of the achievement point ID, is included in the reward granting information, the reciprocal customer transfer system 500 grants a reward corresponding to each of the reached achievement points.

(29) The reward processor 245 of the management server 200 may acquire the reward granting notification information associated with reach information indicating which achievement point is reached among the plurality of achievement points from the customer transfer destination application 20 (an example of the second application), based on the fact that each of the plurality of reward granting conditions is satisfied, and transmit the reward granting information associated with the acquired reaching information, to the customer transfer source application 10 (an example of the first application) executed by the user terminal 100, or the application server 310 (an example of the server device) corresponding to the customer transfer source application 10. In other words, in the management server 200, the reward granting information transmitted to the application server 310 corresponding to the customer transfer source application 10 when any of the plurality of achievement points is reached may not be associated with the achievement point ID, or may be associated with reach information indicating that any achievement point is reached (for example, flag information simply indicating that the achievement point is reached). In this case, it may be determined in advance that the application server 310 and the management server 200 exchange reward granting information simply including the reach information. Then, the application server 310 may count the number of acquisitions of the reach information, and grant a reward according to the count result. Accordingly, even if the reward granting information is simply associated with the reach information, instead of the achievement point ID, the reciprocal customer transfer system 500 grants a reward corresponding to each of the reached achievement points.

(30) The application manager 221 of the management server 200 manages inter-application filter information (an example of the first listing prohibition information) in which a listing-prohibited-application that sets listing prohibition based on the application list (an example of the second information) and a listed-prohibited-application in which listing is prohibited, based on the application list of the listing-prohibited-application are associated with each other. When there is inter-application filter information in which the customer transfer source application 10 (an example of the first application) is set in the listed-prohibited-application, the list notifier 242 (an example of the second information notifier) of the management server 200 transmits remaining information obtained by excluding information indicated by the listing-prohibited-application from the application list, to the user terminal 100, with reference to the inter-application filter information managed by the application manager 221.

Thus, in the reciprocal customer transfer system 500, it is possible to set a relationship between target applications which do not intend to perform customer transfer to each other in the normal reward, in the management server 200. For example, if there is a target application in which a rating (an age limit) has been set among the target applications, it is possible to prevent the customer transfer from the customer transfer source application 10 in which the rating has not been set to the customer transfer destination application 20 in which the rating has been set, from being performed.

Further, when there is inter-application filter information in which the customer transfer source application 10 is set in the listing-prohibited-application, with reference to the inter-application filter information (an example of the first listing prohibition information) that the application manager 221 manages, the list notifier 242 (an example of the second information notifier) of the management server 200 transmits remaining information obtained by excluding information indicating the listed-prohibited-application from the application list to the user terminal 100.

Thus, it is possible to prohibit (block) the listing of the target applications that are respectively set in the listing-prohibited-application and the listed-prohibited-application of the inter-application filter information on the application list, with each other (in a bidirectional way).

Further, the application manager 221 of the management server 200 manages inter-application filter information (an example of the second listing prohibition information) in which only the listed-prohibited-application is registered in which listing of target applications based on the application list (an example of second information) is prohibited.

When a campaign period (an example of the first period) is not set between the listed-prohibited-application indicated by the inter-application filter information and the customer transfer source application 10 (an example of the first application), the list notifier 242 (an example of the second information notifier) of the management server 200 transmits remaining information obtained by excluding information indicated by the listed-prohibited-application from the application list, to the user terminal 100, with reference to the inter-application filter information managed by the application manager 221.

Thus, in the case of a target application which intends to participate only in a campaign in the reciprocal customer transfer system 500, it is possible to publish the customer transfer from any target application on the list LT of target applications, only during the campaign period.

(31) Further, in the embodiment, an example has been described in which since the reward user ID is included in various types of information such as the installation notification information, the list request notification information, the customer transfer information, and the reward granting notification information, these various types of information are associated with the user terminal 100 that transmits these various types of information, in the management server 200, but the present embodiment is not limited thereto. For example, when a communication session is established between the management server 200 and the user terminal 100, the established communication session and the reward user ID corresponding to the user terminal 100 may be associated. Thus, even if the reward user ID is not included in the various types of information, the various types of information that is transmitted in the established communication session may be associated with the reward user ID which is associated with the communication session.

In addition, a method of associating these various types of information with the reward user ID is an example, and is not limited as long as these various types of information and the reward user ID for specifying the user terminal 100 that transmits the various types of information in the management server 200 are associated with each other.

<With Respect to First and Second Embodiments: Part 2>

The first and second embodiments described above can be described as follows, but are not limited to the following description.

(1) In the reciprocal customer transfer system 500 of the present embodiment, the management server 200 (an example of the management device) includes an application manager 221, an installation notification acquisitor 241 (an example of the first information acquisitor), a list notifier 242 (an example of the second information notifier), and a reward processor 245.

The application manager 221 manages the information regarding a plurality of target applications which are management targets. Here, the management target refers to, for example, a target which is managed as the target application corresponding to the reciprocal customer transfer system 500.

If any target application of a plurality of target applications has been executed by the user terminal 100 (an example of the terminal device), the installation notification acquisitor 241 (an example of the first information acquisitor) acquires the installation notification information (an example of the first information) that is transmitted from the user terminal 100, in response to the target application being executed by the user terminal 100.

The list notifier 242 (an example of the second information notifier) transmits the application list (an example of the second information) including information indicating at least one target application of which installation notification information is not acquired from the user terminal 100, to the user terminal 100, by receiving a request based on the customer transfer source application 10 (an example of the first application) executed by the user terminal 100, among a plurality of target applications.

The reward processor 245 performs the reward granting processing, based on the fact that the customer transfer destination application 20 (an example of the second application) among target applications indicated by the application list that has been transmitted from the list notifier 242 is executed by the user terminal 100, in response to the list notifier 242 transmitting the application list.

Here, the target application being executed by the user terminal 100 refers to, for example, the target application being installed in the user terminal 100 and launched.

In addition, a configuration may be possible in which a part of a program for executing the target application in the user terminal 100 is installed in the user terminal 100, and the remaining part of the program is included in a device other than the user terminal 100. For example, a program for executing the target application installed in the user terminal 100 may be the minimum required program for starting the execution of the target application. Then, a configuration may be possible in which the remaining program is included in a server device (for example, an application server 300) or another terminal device (for example, another user terminal 100), which is capable of communicating with the user terminal 100.

Further, a configuration may be possible in which the entirety of the program of a target application executed by the user terminal 100 is included in a device other than the user terminal 100. In other words, a configuration may be possible in which the program for executing the target application is not installed in the user terminal 100, and is included in a server device (for example, an application server 300) or another terminal device (for example, another user terminal 100), which is capable of communicating with the user terminal 100. In other words, the target application being executed by the user terminal 100 includes a case where the target application is executed in a server device connected to the user terminal 100 through a communication network, in response to an instruction from the user terminal 100. In other words, the target application executed by the user terminal 100 may be a so-called cloud-based or a web-based application.

In this manner, the management server 200 performs the reward granting process based on the fact that the customer transfer destination application 20 is executed by the user terminal 100, among target applications which have not been installed in the user terminal 100. Therefore, the management server 200 can perform the reward granting process, if the customer transfer destination application 20 is not only installed in the user terminal 100, but is also executed by the user terminal 100. Therefore, according to the reciprocal customer transfer system 500 of the present embodiment, it is possible to avoid a situation in which customer transfer destination application 20 is only installed with a desire to get a reward but is not actually launched and used.

(2) In the management server 200, the list notifier 242 (an example of the second information notifier) transmits information capable of specifying at least one target application of which the installation notification information (an example of the first information) is not acquired from the user terminal 100 as the second information (for example, application list), to the user terminal 100, by receiving a request based on, for example, the target application (the first application, or the customer transfer source application 10) that is executed by the user terminal 100, among a plurality of target applications.

Further, as long as information indicating at least one target application of which installation notification information is not acquired from the user terminal 100 is included in the second information described with an application list as an example, a form of the information may be any form. For example, the second information may be data of an application list page that can be displayed in the user terminal 100, or information (for example, redirect instruction information) indicating a link destination of an application list page. In addition, in this application list page, information indicating a plurality of target applications may be arranged and displayed (a so-called list display) in the up-and-down direction (vertical direction), may be arranged and displayed in the left-and-right direction (horizontal direction), or may be arranged and displayed (a so-called grid display) in a square shape (a lattice shape) in the vertical and horizontal direction. Further, the second information may be data in which information indicating the target application (for example, an application name, an application icon image, an application ID, and the like) is simply included, and can be displayed in the user terminal 100.

In addition, the second information may include information indicating at least one target application of which installation notification information is already acquired from the user terminal 100, in addition to information indicating at least one target application of which installation notification information is not acquired from the user terminal 100. In this case, the second information may include information for distinguishing the information indicating at least one target application of which installation notification information is not acquired from the user terminal 100 and the information indicating at least one target application of which the installation notification information is already acquired from the user terminal 100.

In other words, the second information can refer to information capable of specifying at least one target application of which the installation notification information (an example of the first information) is not acquired from the user terminal 100.

Thus, the management server 200 can cause the user terminal 100 to specify the target application which is not executed (not launched) by the user terminal 100. Accordingly, the user terminal 100 can display the target application which is not executed (not launched) such that the user can select the target application.

(3) If any target application of a plurality of target applications has been executed by the user terminal 100 (an example of the terminal device), the installation notification acquisitor 241 (an example of the first information acquisitor) of the management server 200 acquires the installation notification information (an example of the first information) that is transmitted from the target application of the user terminal 100, in response to the target application being executed by the user terminal 100. Further, the reward processor 245 performs the reward granting process based on the fact that the installation notification information (an example of the first information) transmitted from the target application (an example of the second application, customer transfer destination application 20) is acquired, among target applications indicated by the application list (an example of the second information) transmitted from the list notifier 242, in response to the list notifier 242 transmitting the application list.

In other words, the installation notification information that the management server 200 has acquired is transmitted from the executed target application (for example, the SDK 11 embedded in the executed target application) in response to the target application corresponding to the installation notification information being executed (installed and launched) by the user terminal 100. For example, the management server 200 recognizes that the customer transfer destination application 20 is executed in the user terminal 100, by acquiring the installation notification information transmitted from the customer transfer destination application 20 (for example, SDK 11B) of the user terminal 100.

In this manner, since the installation notification information transmitted from the target application that is executed by the user terminal 100 is acquired, the management server 200 can more reliably recognize that the target application is not only installed in the user terminal 100, but is also executed by the user terminal 100. Thus, the management server 200 can perform the reward granting process, if the customer transfer destination application 20 is not only installed but is also executed in the user terminal 100.

Further, since the management server 200 can perform the same control on each of the plurality of target applications, it is possible to manage the reciprocal customer transfer between a plurality of target applications, and the reward granting process with reciprocity becomes possible. In other words, since each of the plurality of target applications can become either the customer transfer source or the customer transfer destination, the customer transfer can be made with each other between target applications. For example, when the target application is the customer transfer destination application 20, if the target application is executed, the customer transfer is made, and the reward is granted in the customer transfer source application 10 based on the fact that the customer transfer is made. Then, when the target application is the customer transfer source application 10 that performs customer transfer to another customer transfer destination application 20 that is not yet installed in the user terminal 100, the reward granting process with reciprocity is possible, such that the reward is granted in the target application based on the fact that the customer transfer is made. In addition, not all of the plurality of target applications are required to correspond to the reciprocal customer transfer, a part of target applications may correspond only to customer transfer in one direction.

In this manner, according to the reciprocal customer transfer system 500 of the present embodiment, the management server 200 acquires the installation notification information on a target application that is executed in the user terminal 100, and transmits information indicating at least one target application of which the installation notification information is not acquired to the user terminal 100. Thus, the management server 200 can transmit information indicating at least one target application which is not executed in the user terminal 100, to the user terminal 100. Further, the management server 200 can perform the reward granting process, if the customer transfer destination application 20 is not only installed in the user terminal 100, but is also executed by the user terminal 100.

In addition, as described above, the management server 200 regards the target application of which the installation notification information is not acquired from the user terminal 100, as the target application that is not executed by the user terminal 100. Therefore, if the target application is once executed by the user terminal 100 and installation notification information is acquired, even if the target application is uninstalled later, the management server 200 can recognize the target application as the target application that has already been executed by the management server 200, and exclude the target application from the target applications which are not executed. Thus, even if, for example, installation, execution (activation), and uninstallation of the same target application are repeatedly performed in the user terminal 100, the management server 200 can avoid the same target application repeatedly being a target of the reward granting process.

<With Respect to First and Second Embodiments: Part 3>

The first and second embodiments described above can be described as follows, but are not limited to the following description.

(1) In the reciprocal customer transfer system 500 of the present embodiment, the management server 200 (an example of the management device) includes an application manager 221, an installation notification acquisitor 241 (an example of the first information acquisitor, or an example of the application user information acquisitor), an installation information manager 222 (an example of the first information manager), a list notifier 242 (an example of the second information notifier), a customer transfer information acquisitor 243, a customer transfer information manager 223, and a reward processor 245. Here, the management targets refer to, for example, targets to be managed as target applications corresponding to the reciprocal customer transfer system 500.

The application manager 221 manages information regarding a plurality of target applications which are management targets.

If any target application of a plurality of target applications has been executed by the user terminal 100 (an example of the terminal device), the installation notification acquisitor 241 (an example of the first information acquisitor) acquires the installation notification information (an example of the first information) that is transmitted from the user terminal 100, in response to the target application being executed by the user terminal 100. In addition, the installation notification information is associated with the reward user ID (an example of the unique identification information) associated with the user terminal 100 and the application ID (an example of the identification information) of the target application that transmits the installation notification information.

Further, the installation notification acquisitor 241 (an example of the application user information acquisitor) acquires the application user ID of the target application (an example of the user information on the target application) of which installation notification information is transmitted.

The installation information manager 222 (an example of the first information manager) manages the reward user ID associated with the installation notification information, the application ID of the target application that has transmitted the installation notification information, and the application user ID (an example of the user information on the target application) of the target application that has transmitted the installation notification information, in association with each other, as installation information (an example of the management information).

The list notifier 242 (an example of the second information notifier) transmits the application list (an example of the second information) including information indicating at least one target application of which installation notification information is not acquired from the user terminal 100, to the user terminal 100, by receiving a request based on the customer transfer source application 10 (an example of the first application) executed by the user terminal 100, among a plurality of target applications.

The customer transfer information acquisitor 243 acquires the customer transfer information in which the application ID of the customer transfer destination application 20 (an example of the second application) among target applications indicated by the application list that has been transmitted from the list notifier 242, the reward user ID associated with the user terminal 100, and the application ID of the customer transfer source application 10 are associated, in response to the application list being transmitted. The customer transfer information is information indicating the customer transfer from the customer transfer source application 10 to the customer transfer destination application 20.

The customer transfer information manager 223 manages the customer transfer information that the customer transfer information acquisitor 243 has acquired.

When the customer transfer destination application 20 is executed by the user terminal 100, if the customer transfer information corresponding to the customer transfer destination application 20 is managed by the customer transfer information manager 223, the reward processor 245 performs the reward granting process based on the installation information that the installation information manager 222 manages.

In addition, the installation notification acquisitor 241 may acquire the installation notification information including the application user ID of the target application of which the installation notification information is transmitted. Further, the management server 200 may include an application user information acquisitor that acquires the application user ID of the target application in association with the reward user ID corresponding to the user terminal 100, separately from the installation notification acquisitor 241.

In this manner, when the customer transfer destination application 20 is executed by the user terminal 100, the management server 200 regards that the customer transfer (the customer transfer of the user X using the user terminal 100) from the customer transfer source application 10 to the customer transfer destination application 20 is made, and performs the reward granting process.

Thus, when the customer transfer destination application 20 is executed by the user terminal 100, the management server 200 can cause a reward to be granted to the user X of the customer transfer source application 10 that contributes to the execution of the customer transfer destination application 20, with reference to the installation information that the installation information manager 222 manages. Accordingly, even if user information is different between the customer transfer source application 10 and the customer transfer destination application 20, the management server 200 can specify the user X of the customer transfer source application 10 that contributes to the execution of the customer transfer destination application 20, and cause a reward to be granted to the user X of the customer transfer source application 10.

Specifically, if the customer transfer destination application 20 is executed by the user terminal 100, the management server 200 acquires the installation notification information on the customer transfer destination application 20 that has been transmitted from the user terminal 100. If the installation notification information on the customer transfer destination application 20 is acquired, the management server 200 determines whether or not the customer transfer information corresponding to the customer transfer destination application 20 is managed. Since the application ID and the reward user ID of the customer transfer destination application 20 are associated with the installation notification information, the management server 200 determines whether or not the customer transfer information which is associated with the application ID and the reward user ID of the customer transfer destination application 20 associated with the customer transfer information is managed as the customer transfer information corresponding to the customer transfer destination application 20. When it is determined that the customer transfer information corresponding to the customer transfer destination application 20 is managed, the management server 200, with reference to the managed installation information, specifies the user X of the customer transfer source application 10 by the application user ID of the customer transfer source application 10 which is associated with the application ID and the reward user ID of the customer transfer source application 10 associated with the customer transfer information, and performs the reward granting process. Accordingly, even if the customer transfer from the customer transfer source application 10 to the customer transfer destination application 20, without compatibility with each other, when the customer transfer destination application 20 is executed by the user terminal 100 and the customer transfer is made, the management server 200 can cause a reward to be granted to the user X of the customer transfer source application 10 contributing to the customer transfer.

In addition, the list notifier 242 may transmit an application list including only the target application of which the installation notification information is not acquired from the user terminal 100, to the user terminal 100, and transmit both the target application of which the installation notification information is not acquired from the user terminal 100 and the target application that has already acquired the installation notification information, to the user terminal 100.

(2) In the management server 200, the list notifier 242 may simply transmit the application list of the target application, to the user terminal 100, without depending on whether or not the target application is the target application of which the installation notification information is not acquired from the user terminal 100.

For example, the list notifier 242 (an example of the second information notifier) may transmit the application list (an example of the second information) including information indicating at least one target application among a plurality of target applications, to the user terminal 100, by receiving a request based on the customer transfer source application 10 (an example of the first application) executed by the user terminal 100, among a plurality of target applications.

Also in this case, since the installation information is managed, when the target application selected from the application list is executed in the user terminal 100, the management server 200 can determine whether or not the target application was executed by the user terminal 100 at a previous time. Then, when it is determined that the target application was not executed by the user terminal 100 at a previous time, the management server 200 performs the reward granting process, and when it is determined that the target application was executed by the user terminal 100 at a previous time, the management server 200 cannot perform the reward granting process.

(3) The reward processor 245 of the management server 200 transmits the reward granting information associated with the application user ID (an example of user information on the first application) of the customer transfer source application 10 to the customer transfer source application 10 executed by the user terminal 100, or the application server 310 (an example of the server device) corresponding to the customer transfer source application 10, based on the management information that the installation information manager 222 manages, as the reward granting process.

Thus, the customer transfer source application 10 executed by the user terminal 100 or the application server 310 can grant a reward of the customer transfer source application 10, to the user X of the user terminal 100. Accordingly, the management server 200 performs such that a reward is granted to the user X of the customer transfer source application 10 that has contributed to the customer transfer.

(4) When the customer transfer destination application 20 (an example of the second application) is executed by the user terminal 100 and the reward granting condition which has been set in the customer transfer destination application 20 is satisfied, if the customer transfer information corresponding to the customer transfer destination application 20 is managed by the customer transfer information manager 223, the reward processor 245 of the management server 200 performs the reward granting process.

In this case, if the customer transfer destination application 20 is executed by the user terminal 100, and the reward granting condition which has been set in the customer transfer destination application 20 is satisfied, the customer transfer from the customer transfer source application 10 to the customer transfer destination application 20 is made, and the reward granting process is performed.

In this manner, if the customer transfer destination application 20 is not only executed (for example, launched), but is also used, the management server 200 can grant a reward.

<With Respect to First and Second Embodiments: Part 4>

The first and second embodiments described above can be described as follows, but are not limited to the following description.

(1) In the reciprocal customer transfer system 500 of the present embodiment, the management server 200 (an example of the management device) includes an application manager 221, an installation notification acquisitor 241 (an example of the first information acquisitor), a list notifier 242 (an example of the second information notifier), and a reward processor 245.

The application manager 221 manages information regarding a plurality of target applications which are management targets. Here, the management targets refer to, for example, targets to be managed as target applications corresponding to the reciprocal customer transfer system 500.

If any target application of a plurality of target applications has been executed by the user terminal 100 (an example of the terminal device), the installation notification acquisitor 241 (an example of the first information acquisitor) acquires the installation notification information (an example of the first information) that is transmitted from the user terminal 100, in response to the target application being executed by the user terminal 100.

The list notifier 242 (an example of the second information notifier) extracts at least one target application of which installation notification information has not been acquired from the user terminal 100, among a plurality of target applications, based on the installation notification information that the installation notification acquisitor 241 has acquired, by receiving a request based on the customer transfer source application 10 (an example of the first application) executed by the user terminal 100, among a plurality of target applications. Then, the list notifier 242 transmits the application list (an example of the second information) including information indicating the extracted target application to the user terminal 100.

The reward processor 245 performs the reward granting process, based on the fact that the customer transfer destination application 20 (an example of the second application) is executed by the user terminal 100, among target applications indicated by the application list that has been transmitted from the list notifier 242, in response to the list notifier 242 transmitting the application list.

In this manner, the management server 200 acquires the installation notification information on the target application that is executed by the user terminal 100, extracts at least one target application of which the installation notification information is not acquired, and transmits the information indicating the extracted target application to the user terminal 100. Thus, the management server 200 can transmit information indicating at least one target application which is not executed by the user terminal 100, to the user terminal 100.

Further, the management server 200 can perform the reward granting process, if the customer transfer destination application 20 is not only installed in the user terminal 100, but is also executed by the user terminal 100.

In addition, as described above, the management server 200 regards the target application of which the installation notification information is not acquired from the user terminal 100, as the target application that is not executed by the user terminal 100. Therefore, if the target application is once executed by the user terminal 100 and installation notification information is acquired, even if the target application is uninstalled later, the management server 200 can recognize the target application as the target application that has already been executed by the management server 200, and exclude the target application from the target applications which are not executed. Thus, even if, for example, installation, execution (activation), and uninstallation of the same target application are repeatedly performed in the user terminal 100, the management server 200 can avoid the same target application repeatedly being a target of the reward granting process.

(2) The installation notification information (an example of the first information) is associated with the application ID (an example of the identification information) capable of identifying the target application that is executed in the user terminal 100. In other words, the target application that is executed in the user terminal 100 can directly or indirectly be identified by the installation notification information. In addition, when the associated application ID is included in the installation notification information, the management server 200 can directly identify the target application user terminal 100 that is executed by the target application, from the acquired installation notification information. Further, when the associated application ID is not included in the installation notification information, the management server 200 can indirectly identify the target application user terminal 100 that is executed by the target application, from the acquired separate application ID.

Thus, the management server 200 can identify the target application that is executed by the user terminal 100.

(3) The management server 200 further includes an installation information manager 222 (an example of the first information manager). The installation information manager 222 manages the installation notification information (an example of the first information) that the installation notification acquisitor 241 (an example of the first information acquisitor) has acquired. The list notifier 242 (an example of the second information notifier) extracts at least one target application of which installation notification information has not been acquired from the user terminal 100, among a plurality of target applications, based on the installation notification information that the installation information manager 222 manages. Then, the list notifier 242 transmits the application list (an example of the second information) including information indicating the extracted target application to the user terminal 100.

In this manner, the management server 200 manages the installation notification information on the target application that is executed by the user terminal 100, extracts at least one target application of which the installation notification information is not acquired (in other words, the installation notification information is not managed), and transmits the information indicating the extracted target application to the user terminal 100. Thus, the management server 200 can transmit information indicating at least one target application which is not executed in the user terminal 100, to the user terminal 100. Further, the management server 200 can perform the reward granting process, if the customer transfer destination application 20 is not only installed in the user terminal 100, but is also executed by the user terminal 100.

In addition, as described above, the management server 200 regards the target application of which the installation notification information is not acquired from the user terminal 100, as the target application that is not executed by the user terminal 100. Therefore, if the target application is once executed by the user terminal 100 and installation notification information is acquired, even if the target application is uninstalled later, the management server 200 can recognize the target application as the target application that has already been executed by the management server 200, and exclude the target application from the target applications which are not executed. Thus, even if for example, installation, execution (activation), and uninstallation of the same target application are repeatedly performed in the user terminal 100, the management server 200 can avoid the same target application repeatedly being a target of the reward granting process.

<With Respect to First and Second Embodiments: Part 5>

The first and second embodiments described above can be described as follows, but are not limited to the following description.

(1) In the reciprocal customer transfer system 500 of the present embodiment, the management server 200 (an example of the management device) includes an application manager 221, an installation notification acquisitor 241 (an example of the first information acquisitor), an installation information manager 222 (an example of the first information manager), a list notifier 242 (an example of the second information notifier), and a reward processor 245.

The application manager 221 manages information regarding a plurality of target applications which are management targets. Here, the management targets refer to, for example, targets to be managed as target applications corresponding to the reciprocal customer transfer system 500.

If any target application of a plurality of target applications has been executed by the user terminal 100 (an example of the terminal device), the installation notification acquisitor 241 (an example of the first information acquisitor) acquires the installation notification information (an example of the first information) that is transmitted from the user terminal 100, in response to the target application being executed by the user terminal 100.

The installation information manager 222 (an example of the first information manager) manages the installation notification information that the installation notification acquisitor 241 has acquired.

The list notifier 242 (an example of the second information notifier) transmits the application list (an example of the second information) including information indicating at least one target application of which installation notification information is not acquired from the user terminal 100, to the user terminal 100, based on the installation notification information that the installation information manager 222 manages, by receiving a request based on the customer transfer source application 10 (an example of the first application) executed by the user terminal 100, among a plurality of target applications.

The reward processor 245 performs the reward granting process, based on the fact that the customer transfer destination application 20 (an example of the second application) among target applications indicated by the application list that has been transmitted from the list notifier 242 is executed by the user terminal 100, in response to the list notifier 242 transmitting the application list.

In this manner, the management server 200 manages the installation notification information on the target application that is executed in the user terminal 100, and transmits information indicating at least one target application of which the installation notification information is not acquired (in other words, the installation notification information is not managed) to the user terminal 100. Thus, the management server 200 can transmit information indicating at least one target application which is not executed in the user terminal 100, to the user terminal 100. Further, the management server 200 performs the reward granting process, if the customer transfer destination application 20 is not only installed in the user terminal 100, but is also executed by the user terminal 100.

In addition, as described above, the management server 200 regards the target application of which the installation notification information is not acquired from the user terminal 100 (in other words, the installation notification information is not managed), as the target application that is not executed by the user terminal 100. Therefore, if the target application is once executed by the user terminal 100 and installation notification information is acquired, even if the target application is uninstalled later, the management server 200 can recognize the target application as the target application that has already been executed by the management server 200, and exclude the target application from the target applications which are not executed. Thus, even if for example, installation, execution (activation), and uninstallation of the same target application are repeatedly performed in the user terminal 100, the management server 200 can avoid the same target application repeatedly being a target of the reward granting process.

(2) The list notifier 242 (an example of the second information notifier), based on the installation notification information (an example of the first information) that the installation information manager 222 (an example of the first information manager) manages, extracts at least one target application of which installation notification information has not been acquired from the user terminal 100, among a plurality of target applications, and transmits the application list (an example of the second information) including information indicating the extracted target application to the user terminal 100.

Thus, the management server 200 can transmit information indicating at least one target application which is not executed in the user terminal 100, to the user terminal 100.

<With Respect to First and Second Embodiments: Part 6>

The first and second embodiments described above can be described as follows, but are not limited to the following description.

(1) In the reciprocal customer transfer system 500 of the present embodiment, the management server 200 (an example of the management device) includes an application manager 221, an installation notification acquisitor 241 (an example of the first information acquisitor), a list notifier 242 (an example of the second information notifier), and a reward processor 245.

The application manager 221 manages information regarding a campaign period (an example of the first period) that has been set for a part or all of a plurality of target applications which are management targets.

If any target application of a plurality of target applications has been executed by the user terminal 100 (an example of the terminal device), the installation notification acquisitor 241 (an example of the first information acquisitor) acquires the installation notification information (an example of the first information) that is transmitted from the user terminal 100, in response to the target application being executed by the user terminal 100.

The list notifier 242 (an example of the second information notifier) transmits the application list (an example of the second information) including information indicating the target application (in other words, a specific application) of which the installation notification information is not acquired from the user terminal 100 and in which at least one campaign period is set, to the user terminal 100, by receiving a request based on the customer transfer source application 10 (an example of the first application) which is executed by the user terminal 100 and in which a campaign period is set, among target applications (in other words, specific applications) in which the campaign period is set.

The reward processor 245 performs the reward granting process, based on the fact that the customer transfer destination application 20 (an example of the second application) among target applications (in other words, specific applications) indicated by the application list that has been transmitted from the list notifier 242 is executed by the user terminal 100 within the campaign period, in response to the list notifier 242 transmitting the application list.

In this manner, when a campaign period is set in the customer transfer source application 10, the management server 200 transmits information indicating the specific application in which a campaign period is set, to the user terminal 100. Then, the management server 200 performs the reward granting process, based on the fact that the customer transfer destination application 20 is executed by the user terminal 100 within the campaign period, among the specific applications in each of which a campaign period is set.

In other words, in the customer transfer from the customer transfer source application 10 participating in the same campaign to the customer transfer destination application 20, the reward granting process is performed, based on the fact that the customer transfer destination application 20 is executed by the user terminal 100 during the campaign period. Therefore, granting a reward depending on the campaign period is an incentive of the customer transfer between specific applications that participate in a campaign. For example, if the reward value is increased for the reward when a campaign period is set, as compared to the reward when a campaign period is not set, it is possible to increase the number of customer transfer (number of users). Therefore, according to the reciprocal customer transfer system 500 of the present embodiment, it is possible to enhance the reciprocal customer transfer only during the specific period, which can lead to the promotion of sale of applications with each other. In other words, this can lead to a reciprocal increase in the number of users of an application. In other words, the customer transfer increases the number of users.

Further, the management server 200 performs the reward granting process, based on the fact that the customer transfer destination application 20 is executed by the user terminal 100 within the campaign period. Therefore, according to the reciprocal customer transfer system 500 of the present embodiment, it is possible to avoid a situation in which customer transfer destination application 20 is only installed with a desire to get a reward but is not actually launched and used.

(2) The reward processor 245 determines whether or not the customer transfer destination application 20 (an example of the second application) among target applications indicated by the application list that has been transmitted from the list notifier 242 has been executed by the user terminal 100 within a campaign period, in response to the list notifier 242 (an example of the second information notifier) transmitting the application list (an example of the second information). Then, when it is determined that the customer transfer destination application 20 has been executed by the user terminal 100 within a campaign period, the reward processor 245 performs the reward granting process.

In this manner, the management server 200 can perform the reward granting process, if it is determined that the customer transfer destination application 20 has been executed by the user terminal 100 within the campaign period, through determination as to whether or not the customer transfer destination application 20 has been executed by the user terminal 100.

In addition, the reward processor 245 determines whether or not the customer transfer destination application 20 (an example of the second application) among target applications indicated by the application list that has been transmitted from the list notifier 242 has been executed by the user terminal 100 within a campaign period, in response to the list notifier 242 (an example of the second information notifier) transmitting the application list (an example of the second information), and when it is determined that the customer transfer destination application 20 has been executed by the user terminal 100 within a campaign period and the reward granting condition which has been set in the customer transfer destination application 20 is satisfied, the reward processor 245 may perform the reward granting process.

In this manner, the management server 200 can perform the reward granting process, if it is determined that the customer transfer destination application 20 has been executed by the user terminal 100 within the campaign period, through determination as to whether or not the customer transfer destination application 20 has been executed by the user terminal 100 and the reward granting condition is satisfied which has been set in the customer transfer destination application 20. Accordingly, if the customer transfer destination application 20 is not only executed (for example, launched) within a campaign period, but is also used, the management server 200 can grant a reward.

(3) The reward processor 245 determines whether or not the customer transfer destination application 20 has been executed by the user terminal 100, for example, as follows.

If the customer transfer destination application 20 (an example of the second application) is executed by the user terminal 100, the installation notification acquisitor 241 (an example of the first information acquisitor) acquires the installation notification information (an example of the first information) that has been transmitted from the user terminal 100. In this case, the reward processor 245 first determines whether or not a campaign period is set between the customer transfer source application 10 (an example of the first application) and the customer transfer destination application 20, with reference to the information regarding a campaign period (an example of the first period) that has been set for a part or all of a plurality of target applications, which are managed by the application manager 221. Then, when it is determined that a campaign period has been set between the customer transfer source application 10 and the customer transfer destination application 20, the reward processor 245 determines whether or not the sending destination application 20 has been executed by the user terminal 100 within the campaign period, by determining whether or not a timing in which the installation notification information on the customer transfer destination application 20 has been acquired is within a campaign period. In addition, it is possible to specify the customer transfer source application 10 by the application ID of the customer transfer source application 10 associated with the customer transfer information corresponding to the customer transfer destination application 20.

The determination process corresponds to the process of step SE22 of FIG. 15. For example, the reward processor 245 determines whether or not a campaign period is set between the customer transfer destination application 20 and the customer transfer source application 10, with reference to the campaign participant application information storage 235. Next, when it is determined that a campaign period has been set between the customer transfer source application 10 and the customer transfer destination application 20, the reward processor 245 determines whether or not a timing in which the installation notification information on the customer transfer destination application 20 has been acquired is within a campaign period. Then, when it is determined that the timing in which the installation notification information has been acquired is within the campaign period, the reward processor 245 determines that the customer transfer destination application 20 has been executed by the user terminal 100 within a campaign period (step SE22: YES in FIG. 15). Meanwhile, when it is determined that the timing in which the installation notification information has been acquired is not within the campaign period, the reward processor 245 determines that the customer transfer destination application 20 has not been executed by the user terminal 100 within a campaign period (step SE22: NO in FIG. 15). In addition, when a campaign period is not set between the customer transfer destination application 20 and the customer transfer source application 10, since the timing in which the installation notification information on the customer transfer destination application 20 has been acquired is not within the campaign period, the reward processor 245 determines that the customer transfer destination application 20 has not been executed by the user terminal 100 within a campaign period (step SE22: NO in FIG. 15).

In addition, in step SE22 of FIG. 15, first, the reward processor 245 first determines whether or not a campaign period has been set in the customer transfer destination application 20, next, when it is determined that the campaign period has been set in the customer transfer destination application 20, the reward processor 245 may determine whether or not a campaign period has been set between the customer transfer destination application 20 and the customer transfer source application 10. At this time, when it is determined that the campaign period has not been set in the customer transfer destination application 20, since the timing in which the installation notification information on the customer transfer destination application 20 has been acquired is not within a campaign period, the reward processor 245 may determine that the customer transfer destination application 20 has not been executed by the user terminal 100 within the campaign period.

Thus, the management server 200 can perform the reward process, depending on whether or not the customer transfer destination application 20 has been executed by the user terminal 100 within the campaign period.

In addition, in the determination process of step SE22, the management server 200 may determine whether or not the customer transfer destination application 20 has been executed by the user terminal 100, simply based on the campaign period that has been set in the customer transfer destination application 20.

For example, if the customer transfer destination application 20 (an example of the second application) is executed by the user terminal 100, the installation notification acquisitor 241 (an example of the first information acquisitor) acquires the installation notification information (an example of the first information) that has been transmitted from the user terminal 100. In that case, the reward processor 245 may determine whether or not the customer transfer destination application 20 has been executed by the user terminal 100, by determining whether or not the timing in which the installation notification information on the customer transfer destination application 20 has been acquired is within a campaign period (an example of the first period) which has been set in the customer transfer destination application 20, with reference to information regarding the campaign period (an example of the first period) that has been set for the customer transfer destination application 20 that is managed by the application manager 221.

For example, when the same campaign period is set in all of the target applications, the management server 200 determines whether or not the customer transfer destination application 20 has been executed by the user terminal 100 within the campaign period, by simply determining whether or not the timing in which the installation notification information on the customer transfer destination application 20 has been acquired is within a campaign period (an example of the first period) which has been set in the customer transfer destination application 20.

(4) The management server 200 further includes a customer transfer information acquisitor 243, and a customer transfer information manager 223. The customer transfer information acquisitor 243 acquires customer transfer information indicating customer transfer from the customer transfer source application 10 (an example of the first application) to the customer transfer destination application 20 (an example of the second application). The customer transfer information manager 223 manages the customer transfer information that the customer transfer information acquisitor 243 has acquired. When the customer transfer destination application 20 has been executed by the user terminal 100 within the campaign period (an example of the first period), the reward processor 245 performs the reward granting process, if the customer transfer information corresponding to the customer transfer destination application 20, which is associated with the information (for example, a campaign ID) indicating that a campaign period has been set, is managed by the customer transfer information manager 223.

In this manner, since the management server 200 manages the customer transfer information associated with the information (for example, a campaign ID) indicating that a campaign period has been set in the customer transfer between the specific applications participating in a campaign, when the customer transfer destination application 20 is executed by the user terminal 100 within the campaign period, the management server 200 can set the customer transfer destination application 20 as a target of the CP reward. In addition, when the customer transfer destination application 20 that does not participate in a campaign is executed by the user terminal 100, since the management server 200 manages the customer transfer information which is not associated with the information (for example, a campaign ID) indicating that a campaign period has been set, the management server 200 can set the customer transfer destination application 20 not to be a target of the CP reward (for example, it is a target of a normal reward).

In addition, the information indicating whether or not a campaign period has been set may be a campaign ID capable of identifying a campaign, but when there is no need to identify a campaign (for example, in a case of one type of campaign), as long as whether or not a campaign period has been set can be distinguished, information that cannot identify a campaign may be used.

(4-1) In the case of the customer transfer between the specific applications participating in the same campaign, the management server 200 manages the information (for example, a campaign ID) indicating that a campaign period has been set in association with the customer transfer information, for example, through the following process.

For example, the customer transfer information acquisitor 243 of the management server 200 acquires the customer transfer information indicating the customer transfer from the customer transfer source application 10 to the customer transfer destination application 20 in association with the information (for example, campaign ID) indicating that the campaign period (an example of the first period) is set. Then, the customer transfer information manager 223 manages the customer transfer information associated with the information (for example, a campaign ID) indicating that a campaign period has been set, which the acquisitor 243 has acquired.

Here, an example of a specific process will be described with reference to FIG. 14. For example, in step SA24 of FIG. 14, the list requester 104 of the SDK 11A of the customer transfer source application 10 transmits list request notification information for requesting an application list (information on the target application which is a candidate for the customer transfer destination application 20), to the management server 200. At this time, when the customer transfer source application 10 is a specific application participating in a campaign, a campaign ID is included in the list request notification information.

If the list request notification information is acquired, the list notifier 242 of the management server 200 extracts information indicating at least one target application that does not acquire installation notification information from the user terminal 100, based on the acquired list request notification information, and generates data of an application list page for displaying the list LT of the extracted target application on the user terminal 100 (step SE16 of FIG. 14). Then, the list notifier 242 transmits the redirect instruction information corresponding to the generated application list page to the user terminal 100, and redirects the application list page (step SE17 of FIG. 14). In addition, the application ID of the target application and the campaign ID of the target application participating in the same campaign as the customer transfer source application 10 are included in the application list page.

In the list LT of target applications displayed on the user terminal 100, if the customer transfer destination application 20 participating in the same campaign as the customer transfer source application 10 is selected by the user X, the customer transfer information notifier 106 of the SDK 11A of the customer transfer source application 10 transmits the customer transfer information indicating the customer transfer from the customer transfer source application 10 to the customer transfer destination application 20, to the management server 200 (step SA26 of FIG. 14). Here, for example, the application ID of the customer transfer source application 10, the application ID of the customer transfer destination application 20, the reward user ID, and the campaign ID are included in the customer transfer information.

The customer transfer information acquisitor 243 of the management server 200 acquires customer transfer information that has been transmitted from the user terminal 100 (SDK 11A). Then, the customer transfer information manager 223 stores the application ID of the customer transfer source application 10 included in the customer transfer information that the customer transfer information acquisitor 243 has acquired, the application ID of the customer transfer destination application 20, the reward user ID, and the campaign ID, in the customer transfer information storage 237, in association with each other, as a record of the customer transfer information (step SE18 of FIG. 14).

In this manner, the management server 200 acquires customer transfer information indicating the customer transfer from the customer transfer source application 10 to the customer transfer destination application 20, which participate in the same campaign in association with the information (for example, a campaign ID) indicating that a campaign period has been set. Thus, when the customer transfer destination application 20 is executed by the user terminal 100 within the campaign period, the management server 200 determines whether the customer transfer is made between the specific applications participating in the same campaign, and in the case of the customer transfer between the specific applications participating in the same campaign, the management server 200 can set the customer transfer as the target of a CP reward.

For example, in step SE25 of FIG. 15, if the reward granting notification information (achievement point reaching notification) that has been transmitted from the user terminal 100 (the SDK 11B of the customer transfer destination application 20) is acquired, the reward processor 245 of the management server 200 performs the reward granting process (CP reward process), if the customer transfer information corresponding to the customer transfer destination application 20, which is associated with the information (for example, a campaign ID) indicating that a campaign period has been set, is managed by the customer transfer information manager 223. In other words, the reward processor 245 performs the reward granting process (CP reward process), if the customer transfer information associated with the application ID, the reward user ID, and the campaign ID of the customer transfer destination application 20, which are included in the acquired reward granting information, is managed in the customer transfer information manager 223.

(4-2) In the case of the customer transfer between the specific applications participating in the same campaign, the management server 200 may manage the information (for example, a campaign ID) indicating that a campaign period has been set, in association with the customer transfer information, through the following process.

For example, the customer transfer information manager 223 of the management server 200 may manage the customer transfer information that the customer transfer information acquisitor 243 has acquired, in association with the information (for example, campaign ID) indicating that the campaign period (an example of the first period) that has been set in the customer transfer source application 10 (an example of the first application) is set.

Specifically, in step SA26 of FIG. 14, the customer transfer information that the customer transfer information notifier 106 of the SDK 11A of the customer transfer source application 10 transmits to the management server 200 may include the application ID of the customer transfer source application 10, the application ID of the customer transfer destination application 20, and the reward user ID, and may not include the campaign ID. Then, in step SE18 of FIG. 14, if the customer transfer information acquisitor 243 of the management server 200 acquires the customer transfer information that is transmitted from the user terminal 100 (SDK 11A), the customer transfer information manager 223 stores the application ID of the customer transfer source application 10, the application ID of the customer transfer destination application 20, the reward user ID, and the campaign ID that is set in the customer transfer source application 10, which are included in the customer transfer information acquired by the customer transfer information acquisitor 243, in the customer transfer information storage 237, in association with each other, as the record of the customer transfer information. In this case, the customer transfer information manager 223 acquires the campaign ID that is set in the customer transfer source application 10, for example, the campaign ID included in the list request notification information that is acquired by the list notifier 242 in step SE15 of FIG. 14. In addition, the customer transfer information manager 223 may acquire the campaign ID that is set in the customer transfer source application 10, with reference to the campaign participant application information storage 235.

In this manner, even if the information (for example, a campaign ID) indicating that a campaign period has been set and the customer transfer information is not acquired from the user terminal 100 (SDK 11A), since the campaign ID of the customer transfer source application 10 that has been acquired in advance can be used, the management server 200 can manage the customer transfer information indicating the customer transfer from the customer transfer source application 10 to the customer transfer destination application 20, participating in the same campaign, in association with the information (for example, a campaign ID) indicating that a campaign period has been set. Thus, when the customer transfer destination application 20 is executed by the user terminal 100 within the campaign period, the management server 200 can determine whether or not the customer transfer is made between the specific applications participating in the same campaign, and in the case of the customer transfer between the specific applications participating in the same campaign, the management server 200 can set the customer transfer as a target of the CP reward.

In addition, in this manner, in a method of managing the campaign ID that has been set in the customer transfer source application 10 with the customer transfer information in association with each other, it is essential to select the customer transfer destination application 20 participating in the same campaign as the customer transfer source application 10. For example, when all target applications participate in the same campaign, even if any target application is selected as the customer transfer destination application 20, the customer transfer destination application 20 participating in the same campaign as the customer transfer source application 10 is selected. Further, when a part of a plurality of target applications participate in a campaign, or when there are a plurality of campaigns, the customer transfer destination application 20 participating in the same campaign as the customer transfer source application 10 is selected by creating the application list transmitted from the management server 200 to the user terminal 100 as an application list including only target applications participating in the same campaign as the customer transfer source application 10.

For example, the list notifier 242 (an example of the second information notifier) transmits the application list (an example of the second information) including only information indicating the target application of which the installation notification information (an example of the first information) is not acquired from the user terminal 100 and in which at least one campaign period is set, to the user terminal 100 by receiving a request based on the customer transfer source application 10 (an example of the first application) in which a campaign period (an example of the first period) is set.

Thus, the management server 200 can manage customer transfer information indicating the customer transfer from the customer transfer source application 10 to the customer transfer destination application 20, both participating in the same campaign, in association with the information (for example, a campaign ID) indicating that a campaign period has been set, by the customer transfer destination application 20 participating in the same campaign as the customer transfer source application 10 being selected.

In addition, the customer transfer information manager 223 may store the application ID of the customer transfer source application 10 included in the customer transfer information that the customer transfer information acquisitor 243 has acquired, the application ID of the customer transfer destination application 20, the reward user ID, and the campaign ID that has been set in the customer transfer destination application 20, in the customer transfer information storage 237, in association with each other, as a record of the customer transfer information. In this case, the customer transfer information manager 223 may acquire the campaign ID that has been set in the customer transfer destination application 20, with reference to the campaign participant application information storage 235.

(4-3) In the case of the customer transfer between the specific applications participating in the same campaign, the management server 200 may manage the information (for example, a campaign ID) indicating that a campaign period has been set in association with the customer transfer information, through the following process.

For example, the customer transfer information manager 223 of the management server 200 may determine whether or not a campaign period is set in the customer transfer source application 10 (an example of the first application) indicated by the customer transfer information that the customer transfer information acquisitor 243 has acquired and the customer transfer destination application 20 (an example of the second application), with reference to the information regarding a campaign period (an example of the first period) that has been set for a part or all of a plurality of target applications, which are managed by the application manager 221. Then, when it is determined that a campaign period has been set between the customer transfer source application 10 and the customer transfer destination application 20, the customer transfer information manager 223 may manage the information (for example, a campaign ID) indicating that a campaign period has been set in association with the customer transfer information.

Specifically, in step SA26 of FIG. 14, the customer transfer information that the customer transfer information notifier 106 of the SDK 11A of the customer transfer source application 10 transmits to the management server 200 may include the application ID of the customer transfer source application 10, the application ID of the customer transfer destination application 20, and the reward user ID, and may not include the campaign ID. Then, in step SE18 of FIG. 14, if the customer transfer information acquisitor 243 of the management server 200 acquires the customer transfer information that is transmitted from the user terminal 100 (SDK 11A), the customer transfer information manager 223 stores the application ID of the customer transfer source application 10, the application ID of the customer transfer destination application 20, and the reward user ID, which are included in the customer transfer information, in the customer transfer information storage 237, in association with each other, as the record of the customer transfer information. Further, the customer transfer information manager 223 may determine whether or not a campaign period is set in the customer transfer source application 10 and customer transfer destination application 20, which are indicated by the application ID of the customer transfer source application 10 and the application ID of the customer transfer destination application 20 included in the customer transfer information, with reference to the campaign participant application information storage 235.

For example, when the same campaign ID is set in the customer transfer source application 10 and the customer transfer destination application 20, the customer transfer information manager 223 stores the application ID of the customer transfer source application 10, the application ID of the customer transfer destination application 20, and the reward user ID, which are included in the customer transfer information, and the campaign ID that is set between the customer transfer source application 10 and the customer transfer destination application 20 in association with each other, as a record of the customer transfer information, in the customer transfer information storage 237.

In addition, when the same campaign ID is not set in the customer transfer source application 10 and the customer transfer destination application 20, the customer transfer information manager 223 sets "null" instead of the campaign ID.

In this manner, since information (campaign participant application information) indicating whether any target application is a specific application participating in a campaign is managed, even if the customer transfer information and the campaign ID are not acquired from the user terminal 100 (SDK 11A), the management server 200 can manage the customer transfer information by the customer transfer between the specific applications participating in the same campaign and the campaign ID in association with each other. Thus, when the customer transfer destination application 20 is executed by the user terminal 100 within a campaign period, the management server 200 can determine whether or not the customer transfer is made between the specific applications participating in the same campaign, and in the case of the customer transfer between the specific applications participating in the same campaign, the management server 200 can set the customer transfer as a target of the CP reward.

(5) In the reciprocal customer transfer system 500 of the present embodiment, the management server 200 may not associate the information (for example, a campaign ID) indicating that a campaign period has been set with the customer transfer information. Then, when the customer transfer destination application 20 is executed by the user terminal 100 within a campaign period, the management server 200 may determine whether or not the customer transfer is made between the specific applications participating in the same campaign.

For example, the customer transfer information acquisitor 243 of the management server 200 acquires customer transfer information indicating customer transfer from the customer transfer source application 10 (an example of the first application) to the customer transfer destination application 20 (an example of the second application). Further, the customer transfer information manager 223 manages the customer transfer information that the customer transfer information acquisitor 243 has acquired. When the customer transfer destination application 20 has been executed by the user terminal 100 within the campaign period (an example of the first period), the reward processor 245 performs the reward granting process, if the customer transfer information associated with the customer transfer destination application 20 is managed by the customer transfer information manager 223 and a campaign period is set between the customer transfer destination application 20 and the customer transfer source application 10, which are indicated by the customer transfer information.

Specifically, in step SA26 of FIG. 14, the customer transfer information that the customer transfer information notifier 106 of the SDK 11A of the customer transfer source application 10 transmits to the management server 200 may include the application ID of the customer transfer source application 10, the application ID of the customer transfer destination application 20, and the reward user ID, and may not include the campaign ID. Then, in step SE18 of FIG. 14, if the customer transfer information acquisitor 243 of the management server 200 acquires the customer transfer information that is transmitted from the user terminal 100 (SDK 11A), the customer transfer information manager 223 stores the application ID of the customer transfer source application 10, the application ID of the customer transfer destination application 20, and the reward user ID, which are included in the customer transfer information acquired by the customer transfer information acquisitor 243, in the customer transfer information storage 237, in association with each other, as the record of the customer transfer information.

Further, if the customer transfer destination application 20 is executed by the user terminal 100, the installation notification acquisitor 241 acquires the installation notification information that has been transmitted from the user terminal 100. In this case, in step SE22 of FIG. 15, the reward processor 245 determines whether or not a campaign period is set between the customer transfer destination application 20 and the customer transfer source application 10, with reference to the campaign participant application information storage 235. Next, when it is determined that a campaign period has been set between the customer transfer source application 10 and the customer transfer destination application 20, the reward processor 245 determines whether or not the timing in which the installation notification information on the customer transfer destination application 20 has been acquired is within a campaign period. Then, when it is determined that the timing in which the installation notification information has been acquired is within the campaign period, the reward processor 245 determines that the customer transfer destination application 20 has been executed by the user terminal 100 within a campaign period (step SE22: YES in FIG. 15). Meanwhile, when it is determined that the timing in which the installation notification information has been acquired is not within the campaign period, the reward processor 245 determines that the customer transfer destination application 20 has not been executed by the user terminal 100 within a campaign period (step SE22: NO in FIG. 15). In addition, when a campaign period is not set between the customer transfer destination application 20 and the customer transfer source application 10, since the timing in which the installation notification information on the customer transfer destination application 20 has been acquired is not within the campaign period, the reward processor 245 determines that the customer transfer destination application 20 has not been executed by the user terminal 100 within a campaign period (step SE22: NO in FIG. 15).

When it is determined that the customer transfer destination application 20 has been executed by the user terminal 100 within the campaign period (an example of the first period) (step SE22: YES in FIG. 15), the reward processor 245 proceeds to the process of step SE25 of FIG. 15.

Then, in step SE25 of FIG. 15, if the reward granting notification information (achievement point reaching notification) that has been transmitted from the user terminal 100 (the SDK 11B of the customer transfer destination application 20) is acquired, the reward processor 245 determines whether or not the customer transfer information corresponding to the customer transfer destination application 20 is managed in the customer transfer information manager 223. For example, the reward processor 245 determines whether or not the application ID of the customer transfer destination application 20 included in the acquired reward granting information and the customer transfer information associated with the reward user ID (in other words, customer transfer information corresponding to the customer transfer destination application 20) are managed in the customer transfer information manager 223.

Through this determination, when it is determined that the customer transfer information corresponding to the customer transfer destination application 20 is managed, the reward processor 245 may determine whether or not a campaign period is set between the customer transfer destination application 20 and the customer transfer source application 10, with reference to the information regarding a campaign period (an example of the first period) that has been set for a part or all of a plurality of target applications, which are managed by the application manager 221. Then, the reward processor 245 may perform the reward granting process (CP reward process) if a campaign period is set between the customer transfer destination application 20 and the customer transfer source application 10, which are indicated by the customer transfer information corresponding to the customer transfer destination application 20.

For example, in the campaign participant application information stored in the campaign participant application information storage 235, the reward processor 245 determines whether or not the same campaign ID is associated with each of the application ID of the customer transfer destination application 20 and the application ID of the customer transfer source application 10. Then, when it is determined that the same campaign ID is associated with each of the application ID of the customer transfer destination application 20 and the application ID of the customer transfer source application 10, the reward processor 245 performs the reward granting process (CP reward process). Meanwhile, when it is determined that the same campaign ID is not associated with each of the application ID of the customer transfer destination application 20 and the application ID of the customer transfer source application 10, the reward processor 245 does not perform the reward granting process (CP reward process).

Thus, when the customer transfer destination application 20 participating in the same campaign as the customer transfer source application 10 is executed by the user terminal 100 within the campaign period, the management server 200 can set the customer transfer destination application 20 to a target of the CP reward. Further, when the customer transfer destination application 20 which does not participate in the same campaign as the customer transfer source application 10 is executed by the user terminal 100, the management server 200 can set the customer transfer destination application 20 not to be a target of the CP reward.

<With Respect to First and Second Embodiments: Part 7>

The first and second embodiments described above can be described as follows, but is not limited to the following description.

In the above embodiment, the management server 200 extracts or determines the specific application participating in a campaign among a plurality of target applications, but the present embodiment is not limited thereto. For example, the SDK 11A of the customer transfer source application 10 of the user terminal 100 may extract and determine the specific application participating in a campaign.

For example, in the reciprocal customer transfer system 500 of the present embodiment, the management server 200 (an example of the management device) includes an application manager 221, an installation notification acquisitor 241 (an example of the first information acquisitor), a list notifier 242 (an example of the second information notifier), and a reward processor 245, and the respective units may have the following functions.

The application manager 221 manages information regarding a campaign period (an example of the first period) that has been set for a part or all of a plurality of target applications, which are management targets.

If any target application of a plurality of target applications has been executed by the user terminal 100 (an example of the terminal device), the installation notification acquisitor 241 (an example of the first information acquisitor) acquires the installation notification information (an example of the first information) that is transmitted from the user terminal 100, in response to the target application being executed by the user terminal 100.

The list notifier 242 (an example of the second information notifier) transmits information regarding a campaign period that is managed by the application manager 221, and the application list (an example of the second information) including information indicating at least one target application (in other words, a specific application) of which the installation notification information is not acquired from the user terminal 100, to the user terminal 100, by receiving a request based on the customer transfer source application 10 (an example of the first application) which is executed by the user terminal 100 and in which a campaign period is set, among target applications (in other words, specific applications) in which the campaign period is set.

The reward processor 245 performs the reward granting process, based on the fact that the customer transfer destination application 20 (an example of the second application) among target applications (in other words, specific applications) indicated by the application list that has been transmitted from the list notifier 242 has been executed by the user terminal 100 within the campaign period, in response to the list notifier 242 transmitting the application list.

Further, the user terminal 100 (an example of the terminal device) capable of communicating with the management server 200 includes an installation notifier 103, a list requester 104, and a display controller 105, and the respective units may have the following functions. In addition, the management server 200 manages information regarding a campaign period (an example of the first period) that has been set for a part or all of a plurality of target applications, which are management targets.

The installation notifier 103 transmits the installation notification information (an example of the first information) of the target application installed in the user terminal 100 (an example of the terminal device), to the management server 200. When a request for information indicating at least one target application among a plurality of target applications is made to the management server 200, based on a first operation of one target application (for example, the customer transfer source application 10, or the first application), the list requester 104 transmits the customer transfer source information indicating one target application (for example, the application ID of the customer transfer source application 10) to the management server 200. Further, the list requester 104 acquires an application list (an example of the second information) including information indicating at least one target application for which the management server 200 does not acquire the installation notification information from the user terminal 100, in response to the request, and information regarding a campaign period that the management server 200 manages, from the management server 200.

The display controller 105 generates an application list (an example of the second information) that the list requester 104 has acquired and an application list (an example of presentation information) based on the information regarding a campaign period, and displays the list LT (an example of the display information) of a target application based on the generated application list (an example of the presentation information), on the display 120.

In this manner, the management server 200 transmits the application list and the information regarding a campaign period to the user terminal 100. Further, the user terminal 100 acquires the application ID transmitted from the management server 200, and the information regarding a campaign period, and displays the list LT of the target applications based on the acquired application list and the information regarding a campaign period. Thus, the management server 200 can distinguishably display the specific application participating in a campaign among target applications in the user terminal 100. The user terminal 100 can display the specific application participating in a campaign in a distinguishable manner or in preference to others. Further, the user terminal 100 can display only the specific application participating in a campaign.

Here, an example of a specific process will be described with reference to FIG. 14. For example, in the process of FIG. 14, if the list request notification information is acquired, the list notifier 242 of the management server 200 extracts information indicating at least one target application that does not acquire installation notification information from the user terminal 100, based on the acquired list request notification information, generates data of an application list page for displaying the list LT of the extracted target application on the user terminal 100 (step SE16 of FIG. 14), transmits the redirect instruction information corresponding to the generated application list page to the user terminal 100, and redirects the application list page (step SE17 of FIG. 14). Here, instead of the process of step SE16 and step SE17, the list notifier 242 transmits the campaign participant application information that is stored in the campaign participant application information storage 235, and an application list including information indicating at least one target application (in other words, a specific application) that does not acquire the installation notification information from the user terminal 100, to the user terminal 100.

In addition, the list notifier 242 may transmit a part or all of the campaign participant application information that is stored in the campaign participant application information storage 235, to the user terminal 100. When a part of the campaign participant application information is transmitted, the list notifier 242 may transmit, for example, the campaign participant application information on only specific application participating in the same campaign as the customer transfer source application 10, to the user terminal 100.

Instead of the process of the step SA25 of FIG. 14, if the campaign participant application information and the application list are acquired from the management server 200, the list requester 104 of the user terminal 100 (SDK 11A) generates an application list in which only specific applications participating in a campaign are extracted, or an application list in which specific applications can be distinguished from other target applications, with reference to the acquired campaign participant application information and the application list. Then, the display controller 105 displays the list LT of target applications, based on the generated application list, on the display 120. For example, the display controller 105 displays the information on only specific application, associates and displays the specific application with information indicating that a campaign is in progress, or displays the specific application in a higher position, while giving a priority to the specific application, in the list LT of target applications.

In addition, when a specific application participating in a campaign is not included in the target application acquired from the management server 200, the display controller 105 displays information indicating that there is no specific application selectable as the customer transfer destination application 20, on the display 120.

Third Embodiment

A third embodiment of the present invention will be described. First, the summary of a reciprocal customer transfer system 500a of the present embodiment will be described.

In general, with respect to installation of a target application in the user terminal 100, the target application may be installed in the reciprocal customer transfer system 500, or the target application may be installed by the user accessing the application store 400 without through in the reciprocal customer transfer system 500. Incidentally, some target applications correspond to the same system through version-updating from an old version without the SDK 11 embedded therein to a version with the SDK 11 embedded therein. In the following description, a target application without the SDK 11 embedded therein is referred to as "old-version target application".

Since the old-version target application does not have a function capable of communicating with the management server 200, even if the old-version target application is installed in the user terminal 100, it is difficult to notify the management server 200 of the installation. Therefore, the management server 200 described above recognizes that the old version has not been installed. In other words, the old-version target application is also said to be a target application before becoming a management target of the management server 200. Accordingly, in the reciprocal customer transfer system 500 of the first and second embodiments, when the target application for which installation is recommended to the user is presented, the old-version target application may be included in the list LT of target applications that is presented to the user.

Thus, in the present embodiment, a description will be given regarding an embodiment of the reciprocal customer transfer system 500a which presents to the user, the list LT of target applications, excluding the old-version target application, when the old-version target application is installed in the user terminal 100.

[Summary of Reciprocal Customer Transfer System According to Third Embodiment]

Figure 18:
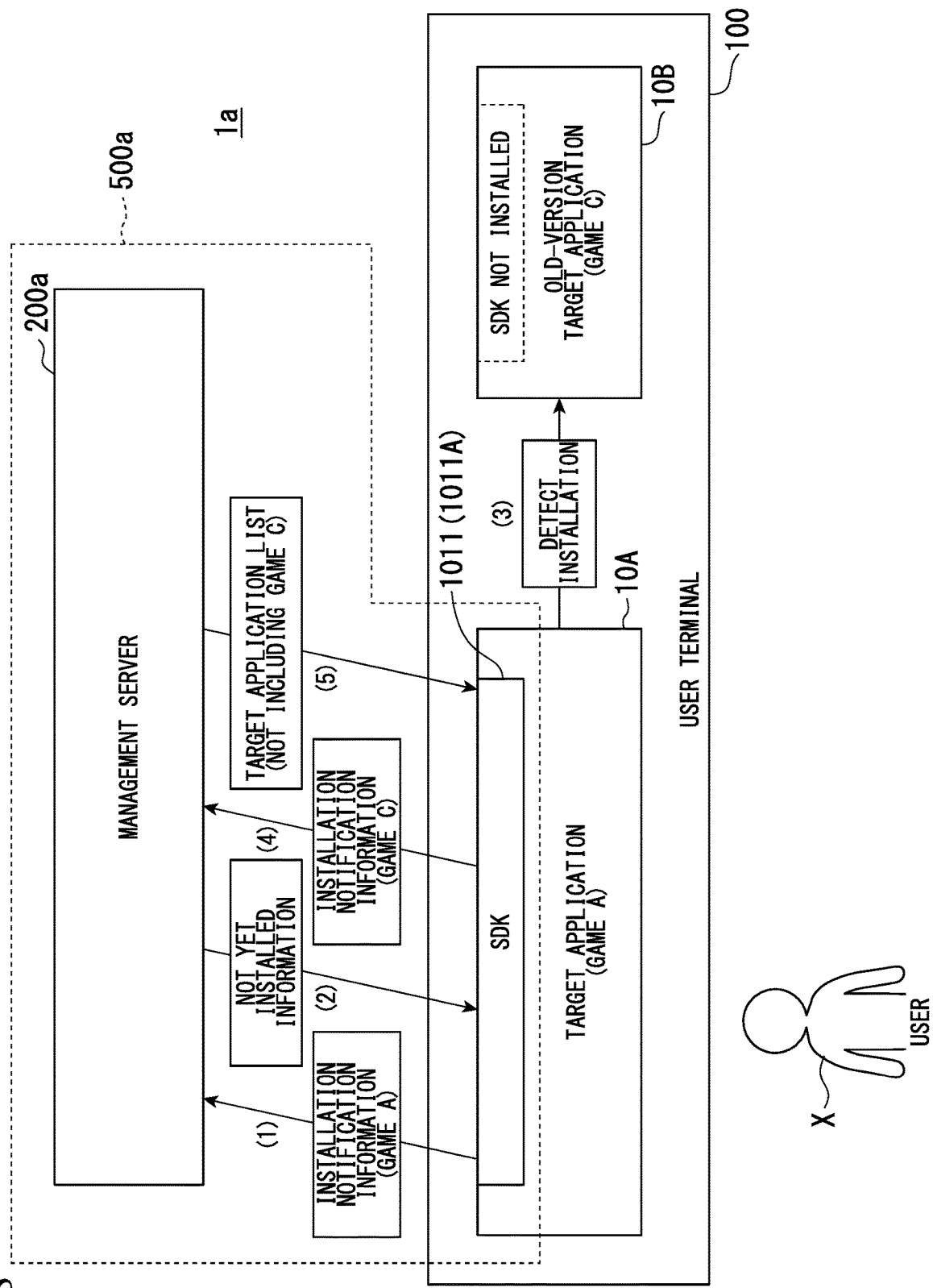
FIG. 18 is a simplified drawing describing a reciprocal customer transfer system of a third embodiment.

FIG. 18 is an explanatory diagram illustrating a summary of a reciprocal customer transfer system 500a of the third embodiment.

In FIG. 18, the network system 1a according to the present embodiment includes a management server 200a and a user terminal 100.

Here, the case where a target application 10A (for example, a game A) with a SDK 1011 corresponding to the reciprocal customer transfer system 500a and an old-version target application 10B (for example, a game C) without the SDK 11 embedded therein are installed in the user terminal 100 will be described as the summary of the reciprocal customer transfer system 500a of the present embodiment, with reference to FIG. 18.

(1) When the target application 10A is installed in the user terminal 100 and is first launched by the user X, the SDK 1011 embedded into the target application 10A transmits installation notification information (game A) indicating that the target application 10A is installed in the user terminal 100. Thus, the management server 200a manages the installation information indicating that the target application 10A is installed in the user terminal 100, based on the installation notification information that is acquired from the SDK 1011.

(2) The SDK 1011 of the target application 10A acquires not-yet-installed information indicating the target application of which the installation notification information is acquired by the management server 200a from the user terminal 100, from the management server 200a. In addition, here, the target application 10A corresponds to the customer transfer source application having the same function as that of the customer transfer source application 10 of the first and second embodiments.

(3) The SDK 1011 of the target application 10A detects (installation detection) whether or not old-version target application (for example, target application 10B) is installed in the user terminal 100, with respect to the old-version target application that has been installed in the user terminal 100, among target applications indicated by the not-yet-installed information that the management server 200a has acquired. In other words, the not-yet-installed information may indicate candidates for the "old-version target application", which are to be detected in the user terminal 100. The SDK 1011 detects whether or not "old-version target application" is installed in the user terminal 100, for example, by using the URL scheme. In addition, the details of a method of using the URL scheme will be described later.

(4) The SDK 1011 of the target application 10A transmits the installation notification information indicating that the old-version target application 10B (game C) is installed, to the management server 200a. Thus, the management server 200a manages the installation information indicating that the target application 10B is installed in the user terminal 100, based on the installation notification information (game C) that the SDK 1011 has acquired. In addition, the management server 200a may perform management such as determination as to whether the target application installed in the user terminal 100 is an old-version.

(5) When the target application to recommend the installation to the user is presented, the management server 200a transmits the application list (without including the game C), which excludes the old-version target application 10B, to the user terminal 100.

In other words, the management server 200a generates an application list of at least one target application, of which installation information on a target application that is installed and launched in the user terminal 100, or installation information on the above-described old-version target application that is installed in the user terminal 100 is not managed, among a plurality of target applications that are managed.

Then, the management server 200a transmits the generated application list to the user terminal 100. The user terminal 100 displays the list LT of target applications, that excludes the old-version target application 10B installed in the user terminal 100, as the target application for which installation is recommended to the user, on the display 120, based on the above-described application list transmitted from the management server 200a.

In this manner, even if the old-version target application is installed in the user terminal 100, the reciprocal customer transfer system 500a according to the present embodiment can present the list LT of target application, which excludes the old-version target application, to the user by displaying the list LT on the display 120.

The reciprocal customer transfer system 500a of the present embodiment will be described in detail.

In addition, since the configuration of the network system 1a and the configuration of the user terminal 100 of the third embodiment of the present invention the same as the configuration of the network system 1 of the first embodiment illustrated in FIG. 2 and the configuration of the user terminal 100 of the first embodiment illustrated in FIG. 3, the description thereof will be omitted herein.

Further, the management server 200a according to the present embodiment manages the installation information based on the installation notification information transmitted from the target application 10A installed in the user terminal 100, among a plurality of target applications which are management targets. Further, the management server 200a manages the installation information, based on the temporary installation notification information indicating that the old-version target application is installed in the user terminal 100, which transmitted from the target application 10A that detects that the old-version target application 10B is installed in the user terminal 100.

[Functional Structure of User Terminal 100 (SDK 1011) According to Third Embodiment]

Figure 19:
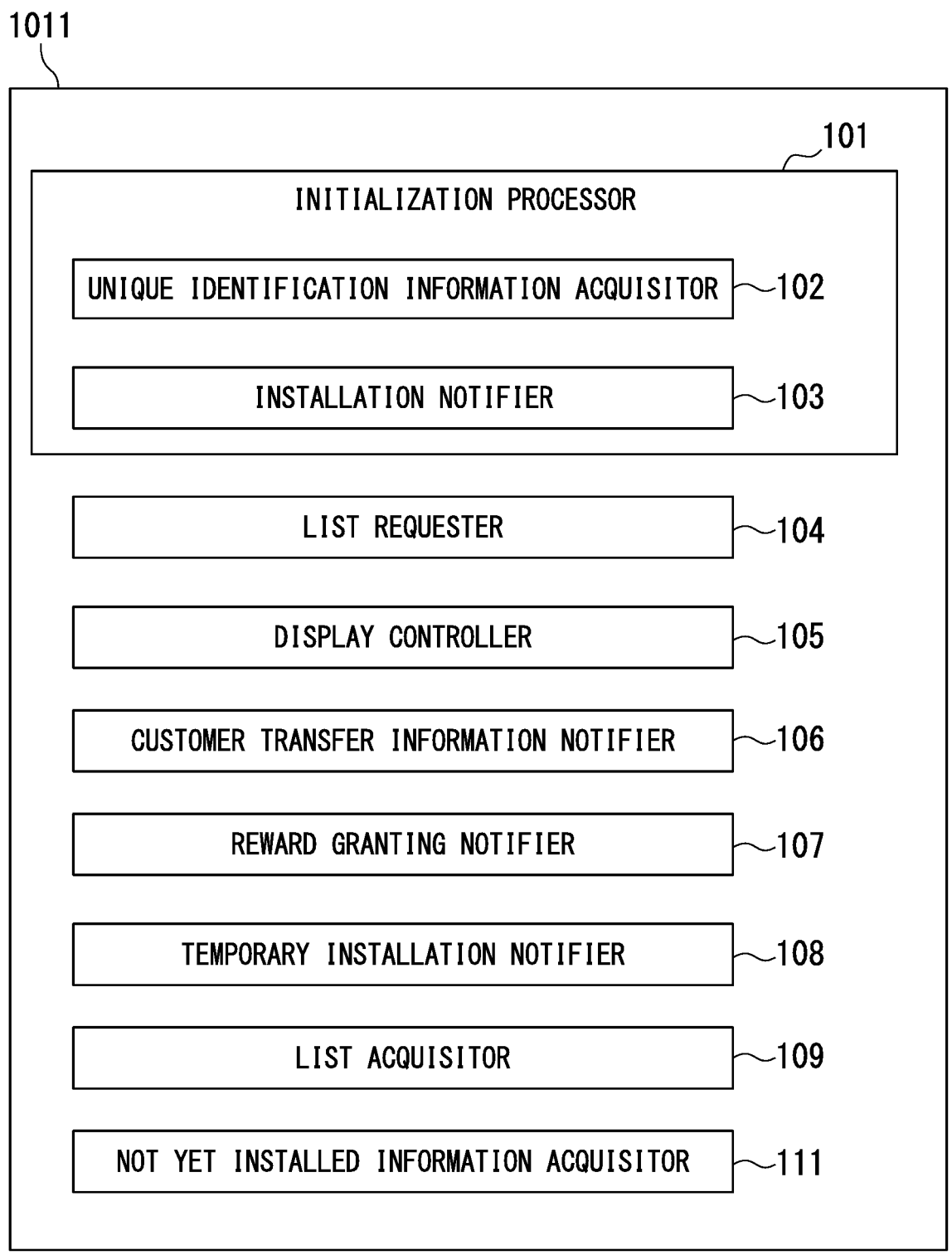
FIG. 19 shows an example of the functional configuration executed based on an SDK of a user terminal according to the third embodiment.

FIG. 19 is a configuration diagram illustrating an example of a functional structure executed based on the SDK 1011 of the user terminal 100 according to the present embodiment.

The functional structure of the reciprocal customer transfer process that the user terminal 100 (SDK 1011) executes in the reciprocal customer transfer system 500a will be described with reference to FIG. 19.

In FIG. 19, the SDK 1011 includes an initialization processor 101, a list requester 104, a display controller 105, a customer transfer information notifier 106, a reward granting notifier 107, a temporary installation notifier 108, a list acquisitor 109, and a not-yet-installed information acquisitor 111. Further, the initialization processor 101 includes a unique identification information acquisitor 102 and an installation notifier 103.

In addition, the SDK 1011 of the present embodiment is different from the first and second embodiments by including the temporary installation notifier 108, the list acquisitor 109, and the not-yet-installed information acquisitor 111. Further, in FIG. 19, the same configurations as in FIG. 5 are denoted by the same reference numerals, and a description thereof will be omitted.

The not-yet-installed information acquisitor 111 acquires not-yet-installed information indicating target applications of which installation information corresponding to the user terminal 100 is not managed in the management server 200a (installation information manager 222 described later), among a plurality of target applications, from the management server 200a. In other words, the not-yet-installed information indicates a target application of which installation notification information is not acquired from the target application 10A (an example of the first application) installed in the user terminal 100, among a plurality of target applications.

In addition, when the installation information based on the temporary installation notification information is managed in the management server 200a, the not-yet-installed information indicates a target application of which either the installation notification information or the temporary installation notification information is not acquired, from the target application 10A, among a plurality of target applications.

In addition, the application ID (ApID) of the target application indicated by the not-yet-installed information and the URL scheme corresponding to the target application are included in the not-yet-installed information that the not-yet-installed information acquisitor 111 has acquired. Here, as illustrated in FIG. 21 described later, the URL scheme corresponding to the target application is stored in association in the application ID (ApID), for example, in the target application information storage 231 of the management server 200a.

The temporary installation notifier 108 detects the old-version target application which is installed in the user terminal 100, and transmits the temporary installation notification information on the detected target application to the management server 200a. As an example of a specific process, the temporary installation notifier 108 detects the old-version target application which is installed in the user terminal 100, with the target application indicated by the not-yet-installed information that the not-yet-installed information acquisitor 111 has acquired, as a target. Then, the temporary installation notification information on the detected old-version target application is transmitted to the management server 200a. In addition, in a case of detecting the old-version target application from the target applications, it is not possible to acquire for example, internal information such as application user ID, other than the information indicating whether or not the target application is installed. Accordingly, the reward user ID corresponding to the user terminal 100 is included, but the application ID of the old-version target application is not included, in the temporary installation notification information.

Further, as an example of a specific process, when the old-version target application which is installed in the user terminal 100 is detected, the temporary installation notifier 108 uses the URL scheme that the not-yet-installed information acquisitor 111 has acquired. The temporary installation notifier 108 confirms whether or not the URL scheme corresponding to the target application can be opened (used) by using a predetermined method. When it is confirmed that the URL scheme can be opened from the result of using the method, it is detected that the old-version target application corresponding to the URL scheme is installed in the user terminal 100. Then, the temporary installation notifier 108 transmits the temporary installation notification information corresponding one or a plurality of old-version target applications that are detected to be installed in the user terminal 100, to the management server 200a.

In this manner, the URL scheme is intended to invoke an application or the specific function in the application, and is defined for each application. Therefore, it is possible to detect the application installed in the user terminal 100 by utilizing the URL scheme.

When there is a target application for which the installation information corresponding to the user terminal 100 is not managed in the management server 200a, the list acquisitor 109 acquires the application list of target applications from the management server 200a. The target application included in the application list is at least one target application of which installation information corresponding to the user terminal 100 is not managed in the management server 200a, and may be a part or all thereof. For example, only target applications satisfying a predetermined condition may be included. Here, the application list is data of an application list page representing the list LT of the target application for which installation is recommended to the user, in the user terminal 100. In addition, when there is no target application for which installation is recommended to the user (a target application could not be extracted), information for notifying the user of the fact may be included in the data.

[Configuration of Management Server 200a According to Third Embodiment]

The details of the configuration of the management server 200a according to the present embodiment will be described with reference to FIG. 20.

Figure 20:
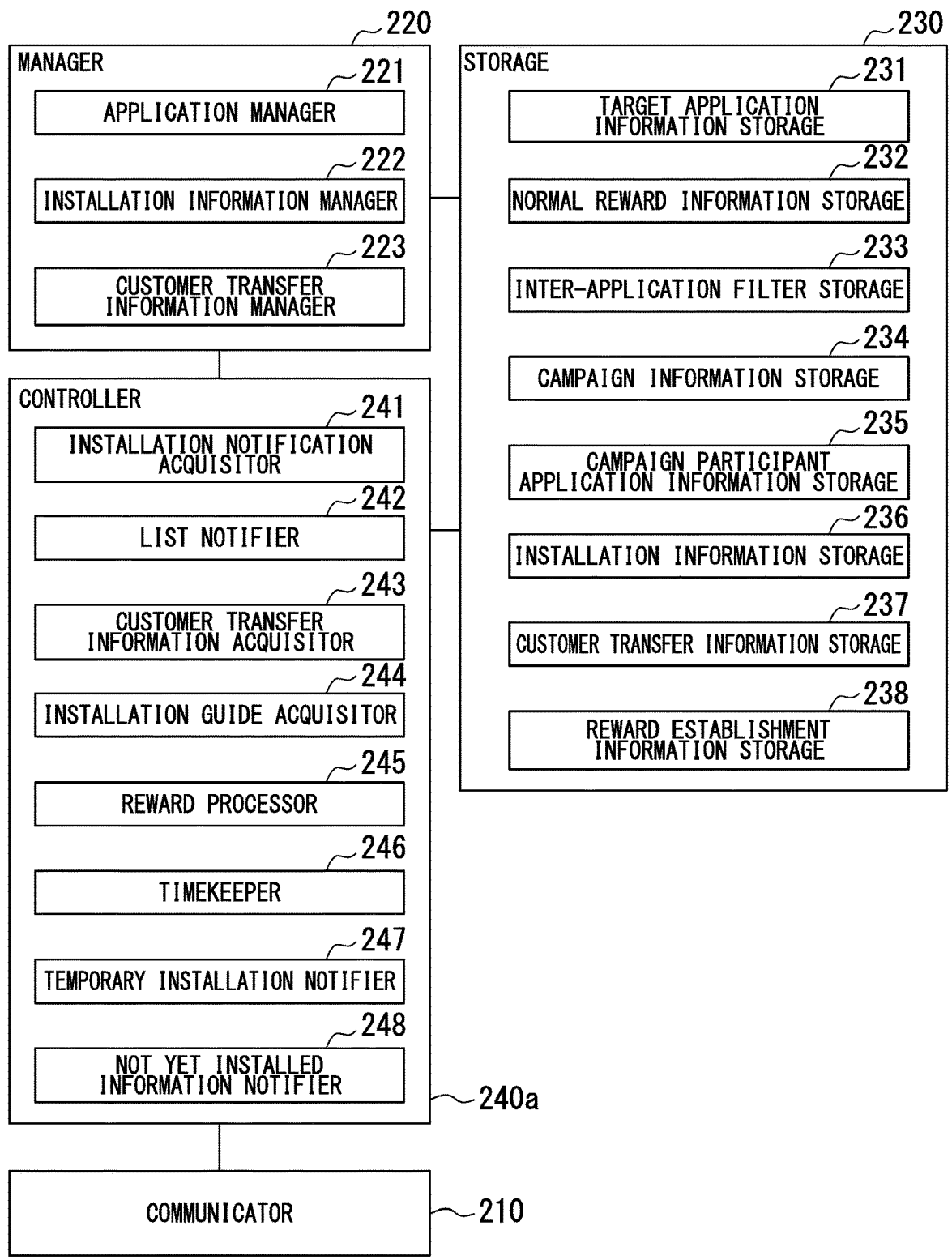
FIG. 20 shows an example of the configuration of a management server according to the third embodiment.

FIG. 20 is a configuration diagram illustrating an example of a configuration of the management server 200a according to the present embodiment. The management server 200a includes a communicator 210, a manager 220, a storage 230, and a controller 240a. In addition, in FIG. 20, the same components as in FIG. 6 are denoted by the same reference numerals, and a description thereof is omitted here.

In FIG. 20, the controller 240a includes an installation notification acquisitor 241, a list notifier 242, a customer transfer information acquisitor 243, an installation guide acquisitor 244, a reward processor 245, a timekeeper 246, a temporary installation notification acquisitor 247, and a not-yet-installed information notifier 248.

In addition, the controller 240a of the present embodiment is different from the first and second embodiments by including the temporary installation notification acquisitor 247 and the not-yet-installed information notifier 248.

Further, in the present embodiment, the data configuration of the target application information that is stored in the target application information storage 231 and the data configuration of the installation information that is stored in the installation information manager 222 are different from those in the first and second embodiments, and, here, first, the data configuration of the target application information and the data configuration of the installation information of the present embodiment will be described.

FIG. 21 is a diagram illustrating an example of target application information that is stored in the target application information storage 231 according to the present embodiment.

As illustrated in FIG. 21, the target application information storage 231 according to the present embodiment stores the target application information. In the target application information, the application ID (ApID) of a target application, a notification destination URL (NoticeURL), a store URL (ApStoreURL), a URLscheme corresponding to the above-described target application (ApURI), an application name indicating the name of the target application (ApNAME), an application description that is explanatory information regarding the target application (ApDOC), an application icon image which is an icon image indicating the target application (ApICO), and an application price (ApPRICE) are associated.

The present embodiment is different from the first and second embodiments in that the URLscheme (ApURI) is included in the target application information in the present embodiment.

FIG. 22 is a diagram illustrating an example of installation information that is stored in the installation information storage 236 according to the present embodiment.

The installation information storage 236 according to the present embodiment stores installation information, as illustrated in FIG. 22. In the installation information, a reward user ID (RewardUID), an application ID (ApID), an application user ID (ApUID), and a notification type (Ttype) are associated. In addition, the reward user ID (RewardUID), the application ID (ApID), and the application user ID (ApUID) are information included in the acquired installation notification information and temporary installation notification information. However, as described above, in the case of the old-version target application, since the application user ID (ApUID) is not included in the temporary installation notification information, the application user ID (ApUID) is set to "null" in the installation information corresponding to the old-version target application.

The present embodiment is different from the first and second embodiments in that the notification type (Ttype) is included in the target application information in the present embodiment.

Here, the notification type (Ttype) is information for distinguishing installation information that is stored based on the installation notification information by the above-described installation notifier 103 and installation information that is stored based on the temporary installation notification information by the temporary installation notifier 108. In other words, the notification type (Ttype) is information for distinguishing whether an application installed in the user terminal 100 is a target application provided with the SDK 1011 or an old-version target application that is not provided with the SDK 1011.

For example, in the example illustrated in FIG. 22, the notification type (Ttype) of "0" indicates the installation information that is stored based on the installation notification information, and the notification type (Ttype) of "1" indicates the installation information that is stored based on the temporary installation notification information. For example, in the installation information storage 236 illustrated in FIG. 22, the reward user ID (RewardUID) of "09634565", the application ID (ApID) of "001", the application user ID (ApUID) of "5288", and the notification type (Ttype) of "0" are associated and stored as the installation information. In this case, since the notification type (Ttype) is "0" in the installation information, it is indicated that the application installed in the user terminal 100 is the target application provided with the SDK 1011. Further, for example, in the installation information storage 236 illustrated in FIG. 21, the reward user ID (RewardUID) of "09634565", the application ID (ApID) of "002", the application user ID (ApUID) of "null", and the notification type (Ttype) of "1" are associated and stored as the installation information. In this case, since the notification type (Ttype) is "1" in the installation information, it is indicated that the application installed in the user terminal 100 is the old-version target application that is not provided with the SDK 1011.

Returning to FIG. 20, the configuration of the controller 240 will be described.

The not-yet-installed information notifier 248 transmits the not-yet-installed information to the SDK 1011. The not-yet-installed information notifier 248 transmits the not-yet-installed information on the target application 10A installed in the user terminal 100, with reference to, for example, information managed by the application manager 221 and the installation information manager 222. Here, the not-yet-installed information indicates the target application of which installation notification information is not acquired by the installation notification acquisitor 241 from the target application 10A installed in the user terminal 100, among a plurality of target applications. Further, the information managed by the application manager 221 and the installation information manager 222 is the target application information that is stored in the target application information storage 231 and the installation information that is stored in the installation information storage 236.

Specifically, the not-yet-installed information notifier 248 extracts a target application that is not present in the installation information stored in the installation information storage 236, from among target application information that is stored in the target application information storage 231, regardless of the notification type (Ttype). Then, the not-yet-installed information notifier 248 acquires, for example, the application ID (ApID) of the extracted target application, and the URL scheme corresponding to the target application, from the target application information storage 231, and transmits the not-yet-installed information including the acquired application ID (ApID) and the URL scheme, to the target application 10A installed in the user terminal 100.

When the old-version target application is installed in the user terminal 100, the temporary installation notification acquisitor 247 acquires temporary installation notification information indicating that the old-version target application is installed, from the target application 10A. The temporary installation notification acquisitor 247 acquires, from the target application 10A, the temporary installation notification information on the old-version target application that is installed in the user terminal 100, among the target applications that are indicated by the for example, not-yet-installed information transmitted from the not-yet-installed information notifier 248. Then, the temporary installation notification acquisitor 247 supplies the installation information manager 222 with the acquired temporary installation notification information.

In addition, when there is a target application for which installation information corresponding to the user terminal 100 is not managed in the installation information manager 222, among a plurality of target applications, the list notifier 242 of the present embodiment transmits the application list of a part of whole of the target applications (at least one target application) to the user terminal 100. The other functions of the list notifier 242 are the same as the list notifier 242 of the first and second embodiments.

In addition, the application manager 221 of the present embodiment manages information regarding a plurality of target applications which are management targets. Further, the installation information manager 222 of the present embodiment manages the installation information on the target application that is installed in the user terminal 100, based on the installation notification information and the temporary installation notification information, which are acquired from the target application 10A.

[Details of Reciprocal Customer Transfer Process According to Third Embodiment]

The operation of the reciprocal customer transfer system 500a of the present embodiment will be described.

In addition, since the basic operation of the reciprocal customer transfer system 500a of the present embodiment is the same as in the first embodiment illustrated in FIG. 14 and FIG. 15, here, the operation of the reciprocal customer transfer system 500a will be described focusing a process of generating an application list of target applications of the present embodiment, with reference to FIG. 23. The process illustrated in FIG. 23 is a detailed example of a flow of a schematic process described with reference to FIG. 18.

Here, the process on the target application 10A side installed in the user terminal 100 will be described with reference to FIG. 23.

In addition, it is assumed that the same SDK 1011A as the SDK 1011 described above is embedded into the target application 10A.

Figure 23:
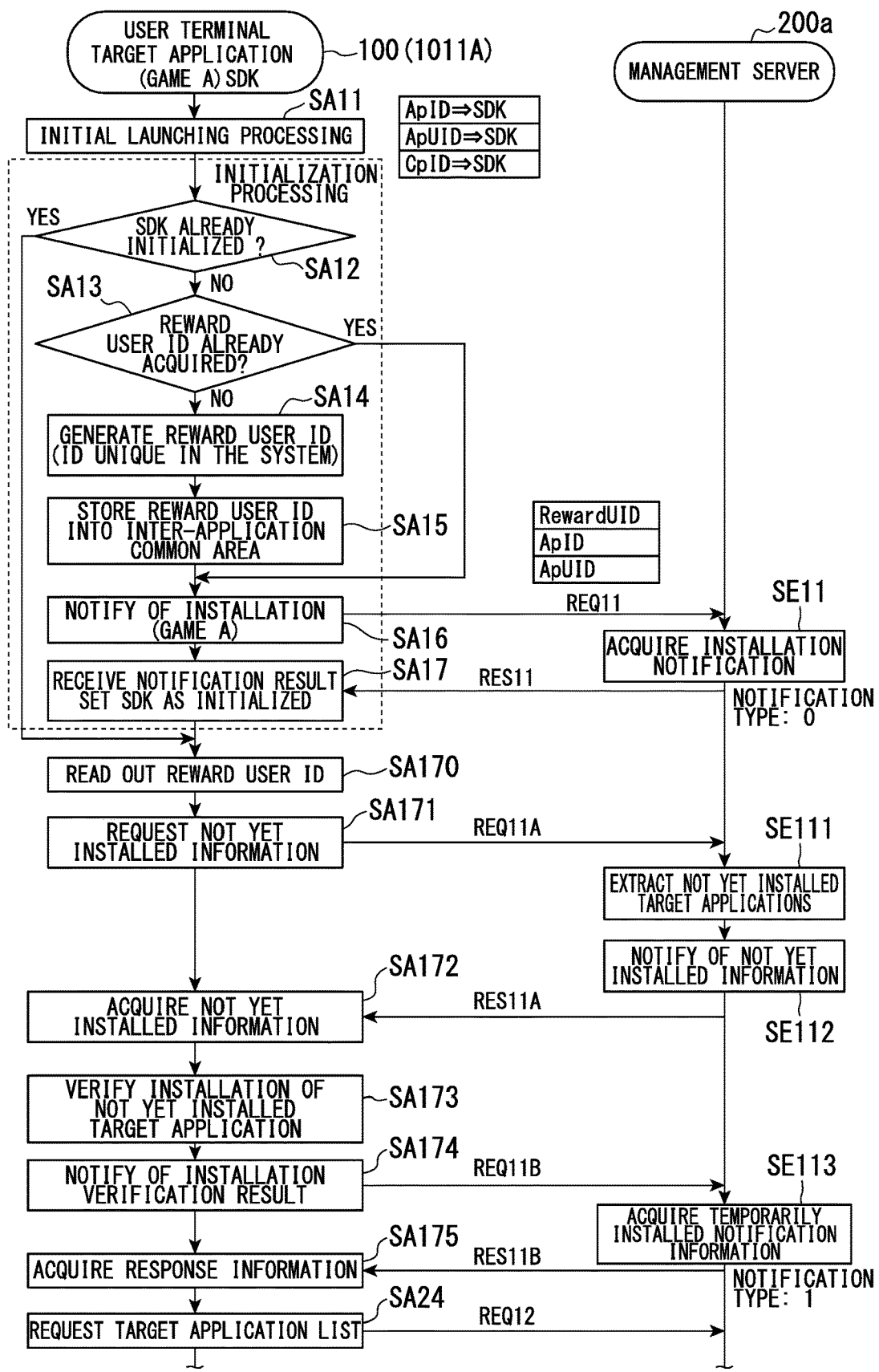
FIG. 23 is a flowchart showing an example of the operation of a reciprocal customer transfer system according to the third embodiment.

Since the process from step SA11 to step SA17 in FIG. 23 is the same as in the first embodiment illustrated in FIG. 14, here, the description thereof will be omitted.

In step SE11, the installation information manager 222 of the management server 200a stores the reward user ID (RewardUID), the application ID (ApID) of the target application 10A (game A), and the application user ID (ApUID) of the user X of the target application 10A (game A), which are included in the installation notification information that the installation notification acquisitor 241 has acquired, and the notification type (Ttype), as installation information in association with each other in the installation information storage 236. In addition, In this case, the installation information manager 222 stores the notification type (Ttype) as "0", in the installation information storage 236.

The not-yet-installed information acquisitor 111 of the SDK 1011A generates not-yet-installed information request notification information for requesting the not-yet-installed information corresponding to the reward user ID that is read from the inter-application common area of the terminal storage 140 in step SA 170. The reward user ID is included in the generated not-yet-installed information request notification information. The not-yet-installed information acquisitor 111 transmits the generated not-yet-installed information request notification information to the management server 200a (REQ11A, step SA171).

The not-yet-installed information notifier 248 of the management server 200a extracts the not-yet-installed target application, based on the not-yet-installed information request notification information transmitted from the SDK 1011A of the target application 10A (step SE111). Specifically, the not-yet-installed information notifier 248 extracts all of the not-yet-installed target applications of which installation information is not stored in the installation information storage 236 in association with the acquired reward user ID, among target application information stored in the target application information storage 231. Then, the not-yet-installed information notifier 248 acquires the application ID (ApID) corresponding to the extracted all not-yet-installed target applications and the URL scheme, from the target application information storage 231. The not-yet-installed information notifier 248 generates not-yet-installed information corresponding to the extracted all not-yet-installed target applications by including the application ID (ApID) and the URL scheme, which correspond to each target application.

The not-yet-installed information notifier 248 notifies the SDK 1011A of the generated not-yet-installed information (RES11A, step SE112). In addition, when the not-yet-installed target application was not extracted, the not-yet-installed information notifier 248 may notify of information indicating that there is no not-yet-installed target application, as the not-yet-installed information.

The not-yet-installed information acquisitor 111 of the SDK 1011A acquires the not-yet-installed information transmitted from the not-yet-installed information notifier 248 of the management server 200a (step SA172).

The temporary installation notifier 108 of SDK 1011A confirms the installation of the not-yet-installed target application included in the acquired not-yet-installed information (step SA173). Specifically, the temporary installation notifier 108 detects the target application that is installed in the user terminal 100, among not-yet-installed target applications, by using the URL scheme included in the not-yet-installed information that the not-yet-installed information acquisitor 111 has acquired. Despite the target application of which installation information not being managed in the management server 200a, the detection of the target application by using the URL scheme indicates that the old-version target application is installed in the user terminal 100. In other words, the temporary installation notifier 108 detects the old-version target application which is installed in the user terminal 100.

For example, the temporary installation notifier 108 detects the old-version target application which is installed in the user terminal 100, by using a predetermined method of confirming whether or not the URL scheme corresponding to the target application can be opened.

Further, when there is provided a function capable of detecting an application that is installed, other than the URL scheme, the temporary installation notifier 108 may use the function.

The temporary installation notifier 108 notifies the management server 200a of the result of installation confirmation (step SA174). In other words, the temporary installation notifier 108 transmits the temporary installation notification information indicating the old-version target application that is detected to be installed in the user terminal 100 to the management server 200a (REQ11B). In addition, when the old-version target application was not present in the user terminal 100, information indicating that the old-version target application was not present may be notified as the temporary installation notification information. Further, when the not-yet-installed information acquired by the not-yet-installed information acquisitor 111 indicates that the not-yet-installed target application is not present, the temporary installation notifier 108 may transmit the temporary installation notification information to the management server 200a.

The temporary installation notification acquisitor 247 of the management server 200a acquires the temporary installation notification information transmitted from the temporary installation notifier 108 of the SDK 1011A (SE113). In other words, the temporary installation notification acquisitor 247 acquires the temporary installation notification information on the old-version target application that is installed in the user terminal 100 from the SDK 1011A of the target application 10A, among target applications indicated by the not-yet-installed information transmitted from, for example, the not-yet-installed information notifier 248. Then, the temporary installation notification acquisitor 247 supplies the installation information manager 222 with the acquired temporary installation notification information.

The installation information manager 222 stores the reward user ID (RewardUID), the application ID (ApID) of the target application 10A (game A), and the application user ID (ApUID) of the user X of the target application 10A (game A), which are included in the temporary installation notification information that the temporary installation notification acquisitor 247 has acquired, and the notification type (Ttype), as installation information in association with each other, in the installation information storage 236. In addition, In this case, the installation information manager 222 sets the application user ID (ApUID) to "null" and sets the notification type (Ttype) to "1", and stores them in the installation information storage 236.

Further, the temporary installation notification acquisitor 247 transmits response information indicating that the temporary installation notification information is acquired, to the SDK 1011A (RES11B).

The temporary installation notifier 108 acquires the response information transmitted from the management server 200a (step SA175).

Since the process after the subsequent step SA24 (in addition, the process after step SE15 and the process after step SA25 are not shown) is the same as the process of step SA24 to step SA26, the process of step SE15 to step SE19, and the process of step SC11, which are illustrated in FIG. 14, a description thereof will be omitted.

In addition, in the present embodiment, in step SE15 and step SE16, when there is a target application for which installation information corresponding to the user terminal 100 is not managed in the installation information manager 222, among a plurality of target applications, the list notifier 242 extracts the application list of a part of whole of the target applications (at least one target application). Then, the list notifier 242 generates data of an application list page for displaying the list LT of target applications based on the application list of the extracted target applications on the user terminal 100. In addition, when it is not possible to extract even one target application, the list notifier 242 may include information for notifying the user of the fact, in the data. In addition, the application list of target applications may be transmitted to the user terminal 100, and the SDK 1011A of the target application 10A may generate data for displaying the list LT of target applications in the user terminal 100, based on the acquired application list.

Summary of Third Embodiment (1) As described above, in the reciprocal customer transfer system 500a of the present embodiment, the management server 200a (an example of the management device) includes an application manager 221, an installation notification acquisitor 241, a temporary installation notification acquisitor 247, an installation information manager 222, and a list notifier 242.

The application manager 221 manages the information regarding a plurality of target applications which are management targets. The installation notification acquisitor 241 acquires installation notification information indicating that the target application 10A is installed in the user terminal 100, from the target application 10A (an example of the first application) that is installed in the user terminal 100 (an example of a terminal), among a plurality of target applications. When the old-version target application is installed in the user terminal 100, the temporary installation notification acquisitor 247 acquires temporary installation notification information indicating that the target application is installed, from the target application 10A. Here, the old-version target application is any application among a plurality of target applications, and an application before becoming a management target by the application manager 221, and does not have a function capable of communicating with the management server 200a. The installation information manager 222 manages the installation information on the target application installed in the user terminal 100, based on the installation notification information and the temporary installation notification information that the target application 10A has acquired. Then, the list notifier 242 transmits the application list of at least one target application of which installation information corresponding to the user terminal 100 is not managed in the installation information manager 222, among a plurality of target applications, to the user terminal 100. In addition, it can be understood that the list notifier 242 transmits an application list of at least one target application of which either the installation notification information or the temporary installation notification information is not acquired from the target application 10A, to the user terminal 100.

Thus, for example, even if the old-version target application without the SDK 1011 embedded therein is installed in the user terminal 100, the management server 200a of the present embodiment can transmit the application list of target application, which excludes the old-version target application, to the user terminal 100. In other words, for example, in a case where the old-version target application is installed, the management server 200a of the present embodiment can prevent the target application of which the old-version is already installed in the application list of target applications, from being erroneously presented to the user. Therefore, when the target application for which installation is recommended to the user is presented, the management server 200a of the present embodiment can transmit an application list of target application that the user does not use, regardless of the version of the target application, to the user terminal 100. As a result, when the target application for which installation is recommended to the user is presented, it is possible to present the list LT of target applications that the user has not used to the user, in the user terminal 100.

(2) Further, the management server 200a of the present embodiment includes a not-yet-installed information notifier 248 that transmits the not-yet-installed information indicating target applications of which installation information corresponding to the user terminal 100 is not managed in the installation information manager 222 among a plurality of target applications, to the target application 10A (an example of the first application). The not-yet-installed information indicates candidates for the old-version target application that is to be detected in the user terminal 100.

Then, the temporary installation notification acquisitor 247 acquires the temporary installation notification information on the old-version target application that is installed in the user terminal 100 from the target application 10A, among target applications indicated by the not-yet-installed information transmitted from the not-yet-installed information notifier 248. In addition, it can be understood that the not-yet-installed information notifier 248 transmits the not-yet-installed information indicating a target application of which either the installation notification information or the temporary installation notification information is not acquired from the target application 10A, among a plurality of target applications, to the target application 10A.

Thus, since the management server 200a notifies of candidates for the old-version target application that is to be detected in the user terminal 100 as the not-yet-installed information, it is possible to clarify the candidates for the old-version target application that is to be detected in the user terminal 100. As a result, it is possible to reduce the process amount for extraction of the old-version target application, as compared to the case of extraction from all target applications. Further, the target application 10A can reduce the process time for extraction of the old-version target application, as compared to the case of extraction from all target applications.

Further, the management server 200a of the present embodiment can manage the old-version target application that is installed in the user terminal 100. As a result, the management server 200a of the present embodiment can transmit the application list of target applications, which excludes the old-version target application that is installed in the user terminal 100, to the user terminal 100. As a result, when the target application for which installation is recommended to the user is presented, it is possible to present the list LT of target applications, which excludes the old-version target application, to the user in the user terminal 100.

(3) Further, the management server 200a of the present embodiment includes a not-yet-installed information notifier 248 that transmits the not-yet-installed information indicating target applications of which installation notification information is not acquired from the target application 10A (an example of the first application) installed in the user terminal 100 among a plurality of target applications, to the target application 10A. The not-yet-installed information indicates candidates for the old-version target application that is to be detected in the user terminal 100.

Then, the temporary installation notification acquisitor 247 acquires the temporary installation notification information on the old-version target application that is installed in the user terminal 100 from the target application 10A, among target applications indicated by the not-yet-installed information transmitted from the not-yet-installed information notifier 248.

Thus, since the management server 200a notifies of candidates for the old-version target application that is to be detected in the user terminal 100 as the not-yet-installed information, it is possible to clarify the targets for the old-version target application that are to be detected in the user terminal 100. As a result, it is possible to reduce the process amount for extraction of the old-version target application, as compared to the case of extraction from all target applications. Further, the target application 10A can reduce the process time for extraction of the old-version target application, as compared to the case of extraction from all target applications.

Further, the management server 200a of the present embodiment can manage the old-version target application that is installed in the user terminal 100. As a result, the management server 200a of the present embodiment can transmit the application list of target applications, which excludes the old-version target application that is installed in the user terminal 100, to the user terminal 100. As a result, when the target application for which installation is recommended to the user is presented, it is possible to present the list LT of target applications, which excludes the old-version target application, to the user in the user terminal 100.

(4) Further, in the management server 200a of the present embodiment, the not-yet-installed information notifier 248 transmits the not-yet-installed information to target application 10A installed in the user terminal 100, by referring to the information that the application manager 221 and the installation information manager 222 manage. Here, the not-yet-installed information indicates target application of which installation information corresponding to the user terminal 100 is not managed in the installation information manager 222, among a plurality of target applications.

In addition, when temporary installation notification information on the old-version target application (an old-version game different from the game C) is acquired from the target application 10A (an example of the first application), the management server 200a of the present embodiment can cause the installation information manager 222 to associated and manage the target application that transmits the installation notification information or the temporary installation notification information and the user terminal 100 in which the target application is installed, and the not-yet-installed information notifier 248 to transmit the not-yet-installed information indicating target applications of which either installation notification information or temporary installation notification information is not acquired from the target application 10A among a plurality of target applications, to the target application 10A.

Thus, it is possible for the not-yet-installed information notifier 248 to specify the not-yet-installed information indicating target applications of which installation information corresponding to the user terminal 100 is not managed, by comparing all target applications that are extracted by referring to information that is managed by the application manager 221 that manages information regarding a plurality of target applications which are management targets, with the target application of which installation information corresponding to the user terminal 100 is managed, that is extracted by referring to information that is managed by the installation information manager 222. The not-yet-installed information indicates candidates for the old-version target application that is to be detected in the user terminal 100.

(5) Further, in the reciprocal customer transfer system 500a of the present embodiment, the user terminal 100 (an example of the terminal device) is a terminal device capable of communicating with the management server 200a. Here, the management server 200a manages the installation information on the target application that is installed in the user terminal 100, based on the installation notification information indicating the installation of the target application that has been installed in the user terminal 100, among a plurality of target applications that are management targets, and temporary installation notification information indicating that the old-version target application (an example of a target application before becoming a management target) is installed in the user terminal 100. The user terminal 100 includes an installation notifier 103, a temporary installation notifier 108, a list acquisitor 109, and a display controller 105.

The installation notifier 103 transmits the installation notification information on the target application that is installed in the user terminal 100, to the management server 200a. The temporary installation notifier 108 detects the old-version target application which is installed in the user terminal 100, and transmits the temporary installation notification information on the detected target application, to the management server 200a. The list acquisitor 109 acquires the application list of at least one target application of which installation information corresponding to the user terminal 100 is not managed in the management server 200a, from the management server 200a. In addition, it can be understood that the list acquisitor 109 acquires an application list of at least one target application of which either the installation notification information or the temporary installation notification information is not transmitted, from the management server 200a. Then, the display controller 105 displays the list LT of target applications based on the application list of the target applications that the list acquisitor 109 acquired, on the display 120. In addition, the list acquisitor 109 may acquire the list LT of target applications indicating data to be displayed based on the application list, from the management server 200a. In addition, it can be understood that the list acquisitor 109 acquires an application list of at least one target application of which either the installation notification information or the temporary installation notification information is not transmitted from the user terminal 100, from the management server 200a.

Thus, for example, when the old-version target application having the SDK 1011 embedded therein is installed in the user terminal 100, the user terminal 100 of the present embodiment can acquire an application list of target applications excluding the old-version target application, and present the list LT of target applications based on the acquired application list to the user. Therefore, the user terminal 100 of the present embodiment can transmit the application list of target applications that the user has not used, to the user terminal 100, regardless of the version of the target application. As a result, when the target application for which installation is recommended to the user is presented, it is possible to present the list LT of target applications that the user has not used, to the user in the user terminal 100.

(6) Further, the user terminal 100 of the present embodiment includes a not-yet-installed information acquisitor 111 that acquires not-yet-installed information indicating a target application of which installation information corresponding to the user terminal 100 is not managed in the management server 200a, from the management server 200a. In addition, it can be understood that the not-yet-installed information acquisitor 111 acquires the not-yet-installed information indicating a target application of which either the installation notification information or the temporary installation notification information is not transmitted from the user terminal 100, among a plurality of target applications, from the management server 200a.

Then, the temporary installation notifier 108 transmits the temporary installation notification information on the old-version target application installed in the user terminal 100 to the management server 200a, among target applications indicated by the not-yet-installed information that the not-yet-installed information acquisitor 111 has acquired.

Thus, with respect to the target application 10A of the user terminal 100 of the present embodiment, since the old-version target application that is installed in the user terminal 100 is extracted for example, from the acquired not-yet-installed information, it is possible to reduce the process amount for extraction of the old-version target application, as compared to the case of extraction from all target applications. Further, the user terminal 100 of the present embodiment can reduce the process time for extraction of the old-version target application, as compared to the case of extraction from all target applications.

(7) Further, the user terminal 100 of the present embodiment may include the not-yet-installed information acquisitor 111 that acquires, from the management server 200a, the not-yet-installed information indicating a target application of which installation notification information is not transmitted from the user terminal 100, among a plurality of target applications. Then, the temporary installation notifier 108 transmits the temporary installation notification information on the old-version target application installed in the user terminal 100 to the management server 200a, among target applications indicated by the not-yet-installed information that the not-yet-installed information acquisitor 111 has acquired.

Thus, with respect to the target application 10A of the user terminal 100 of the present embodiment, since the old-version target application that is installed in the user terminal 100 is extracted for example, from the acquired not-yet-installed information, it is possible to reduce the process amount for extraction of the old-version target application, as compared to the case of extraction from all target applications. Further, the user terminal 100 of the present embodiment can reduce the process time for extraction of the old-version target application, as compared to the case of extraction from all target applications.

(8) Further, in the present embodiment, the not-yet-installed information acquisitor 111 acquires the URL scheme, which is included in the not-yet-installed information, corresponding to the target application indicated by the not-yet-installed information. Then, the temporary installation notifier 108 detects the old-version target application that is installed in the user terminal 100, among target applications indicated by the not-yet-installed information, by using the URL scheme that the not-yet-installed information acquisitor 111 has acquired.

Thus, the user terminal 100 of the present embodiment can detect the old-version target application, by simple means for determining whether or not the URL scheme can be opened, for example, in the user terminal.

(9) Further, in the present embodiment, the application manager 221 may manage the inter-application filter information (an example of first listing prohibition information) obtained by combining the listing-prohibited-application on the side setting prohibition of listing of the target application based on the application list on the list LT and the listed-prohibited-application on the side for which listing of the target application of the listing-prohibited-application on the list LT is prohibited. In this case, when there is inter-application filter information (first listing prohibition information) in which the target application 10A is set in the listed-prohibited-application, the list notifier 242 transmits an application list of target applications excluding the listing-prohibited-application to the user terminal 100, with reference to the inter-application filter information (first listing prohibition information) managed by the application manager 221.

Further, in the present embodiment, when there is inter-application filter information in which the target application 10A is set in the listing-prohibited-application, the list notifier 242 may transmit an application list of target applications, which excludes the listed-prohibited-application, to the user terminal 100, with reference to the inter-application filter information (first listing prohibition information) managed by the application manager 221.

Further, in the present embodiment, the application manager 221 may manage inter-application filter information (second listing prohibition information) in which only the listed-prohibited-application is registered, the set-side being the side in which listing on the application list is prohibited. In this case, the list notifier 242 transmits an application list of target applications, which excludes the listed-prohibited-application, to the user terminal 100, with reference to the inter-application filter information managed by the application manager 221.

Thus, in the reciprocal customer transfer system 500a, when a target application for which installation is recommended to the user is presented, it is possible to set a relationship between target applications for which installation is not intended to be recommended, in the management server 200a. For example, if there is a target application in which a rating (an age limit) has been set, it is possible to avoid recommendation of the target application 10 in which a rating has been set, from among the target applications 10A in which a rating has not been set.

(10) Further, the management server 200a of the present embodiment includes a reward processor 245. When a predetermined reward granting condition is satisfied, of the customer transfer destination application 20 (an example of the second application) of a first embodiment which is selected by the user terminal 100 from one or a plurality of target applications included in the application list, the reward processor 245 performs a reward granting process of granting a predetermined reward, in the target application 10A (an example of the first application) corresponding to the customer transfer source application 10.

Thus, if a target application of a customer transfer destination that the user has not used is installed, when the target application is presented for which installation is recommended to the user in a reciprocal customer transfer system 500a granting a reward to the a target application of the customer transfer destination, it is possible to transmit the application list of target applications, the user has not used, which are to be reward granted targets, excluding an old-version target application, to the user terminal 100. As a result, when the target application is presented for which installation is recommended to the user, it is possible to present the list LT of target applications that the user has not used, in the user terminal 100. Further, when an old-version target application is included in the list LT of target applications, and the old-version target application is updated to a new-version target application, it is possible to prevent the management server 200a from granting a reward to the customer transfer source application 10.

(11) Further, the management server 200a of the present embodiment includes a customer transfer information acquisitor 243, and a customer transfer information manager 223. When it is determined that a predetermined reward granting condition is satisfied, if the customer transfer information for the second application is managed by the customer transfer information manager 223, the reward processor 245 may perform the reward granting process. Here, the customer transfer information acquisitor 243 acquires the customer transfer information for the second application from the target application 10A, and the customer transfer information manager 223 may manage the customer transfer information that the customer transfer information acquisitor 243 has acquired.

Thus, when the target application has been installed without depending on the present system, there is no record of the customer transfer information, such that the reciprocal customer transfer system 500a can set the target application so as not to be a target for the reward granting process.

(12) Further, a predetermined reward granting condition may be a time when the customer transfer destination application 20 (an example of the second application) is determined to be installed in the user terminal 100. Further, a predetermined reward granting condition may be a time when the customer transfer destination application 20 is determined to be installed in the user terminal 100, and a predetermined achievement is determined to be reached in the customer transfer destination application 20.

In this manner, the reciprocal customer transfer system 500a can set arbitrary reward granting conditions.

(13) Further, the application manager 221 may manage an event with a predetermined period that is set for a plurality of specific applications among a plurality of target applications. In this case, a predetermined reward granting condition is may be a time when a second application, which is a specific application, is determined to be installed in the user terminal 100 within a predetermined period, and a predetermined achievement is determined to be reached in the second application.

Thus, it is possible to set only a specific application that conducts a campaign as a reward granted target, among a plurality of target applications. Even if an old-version specific application is installed in the user terminal 100, among specific applications that conduct a campaign, when the specific application is presented for which installation is recommended to the user, it is possible to transmit an application list of specific applications, the user has not used, excluding an old-version target application, to the user terminal 100. As a result, it is possible to present a list of target applications (specific applications) conducting a campaign, that the user has not used, to the user in the user terminal 100.

(14) Further, the user terminal 100 of the present embodiment includes a reward granting notifier 107. When a predetermined reward granting condition is satisfied in a target application installed in the user terminal 100, the reward granting notifier 107 transmits reward granting notification information indicating that the predetermined reward granting condition is satisfied, to the management server 200a. Here, when a predetermined reward granting condition is satisfied, of the target application which is selected by the user terminal 100 from one or a plurality of target applications included in the application list, the management server 200a performs a reward granting process of granting a predetermined reward, in the target application.

Further, a predetermined reward granting condition may be a time when a predetermined achievement is determined to be reached in the target application installed in the user terminal 100.

Further, a plurality of a predetermined reward granting conditions are set, and the reward granting notifier 107 may transmit reward granting notification information to the management server 200a, based on the face that the plurality of reward granting condition is satisfied.

Thus, for example, in a case where the old-version target application is installed, the user terminal 100 of the present embodiment can acquire an application list of target applications that the user as a reward granted target has not used excluding the old-version target application, and present the list LT of target applications based on the acquired application list. Alternately, the user terminal 100 of the present embodiment can acquire an application list of target applications that the user as a reward granted target has not used excluding the old-version target application, and present the list LT of target applications based on the acquired application list. As a result, in a case where the old-version target application is included in the list LT of target applications and the old-version target application is updated to a target application of a new version, it is possible to prevent the management server 200*a* from granting a reward to the customer transfer source application 10.

Further, in a case where a predetermined reward granting condition is satisfied, the user terminal 100 of the present embodiment can transmit a reward granting notification information indicating that the predetermined reward granting condition is satisfied, to the management server 200*a*.

Fourth Embodiment

Next, a fourth embodiment of the present invention will be described.

In the present embodiment, a description will be given regarding an embodiment which presents to the user, the list LT of target applications, excluding the old-version target application from the application list of target applications, when an old-version target application without the SDK 11 embedded therein is installed (updated), and is different from the third embodiment. In other words, in the third embodiment, when the management server 200*a* transmits, to the user terminal 100, the application list for presenting a target application for which installation is recommended to the user, the old-version target application that is installed in the user terminal 100 is excluded from the application list. Therefore, the not-yet-installed information which is a candidate for the old-version target application is transmitted in advance to the user terminal 100, and the installation information on the old-version target application that has been installed in the user terminal 100 is acquired from candidates.

Meanwhile, in the present embodiment, the management server 200*b* (see FIG. 25) does not transmit the not-yet-installed information which is a candidate for the old-version target application to the user terminal 100 in advance. In other words, the user terminal 100 regards all target application and old-version target application which are installed in the user terminal 100 as candidates for the old-version target application, without acquiring the not-yet-installed information from the management server 200*b*, and transmits the temporary installation notification information on the old-version target application to the management server 200*b*. In addition, in this case, the target application 10A may be excluded. Then, the management server 200*b* specifies the target application that the installation information manager 222 does not manage as the old-version target application, through comparison with the information that the installation information manager 222 manages.

[Functional Structure of User Terminal 100 (SDK 2011) According to Fourth Embodiment]

Figure 24:
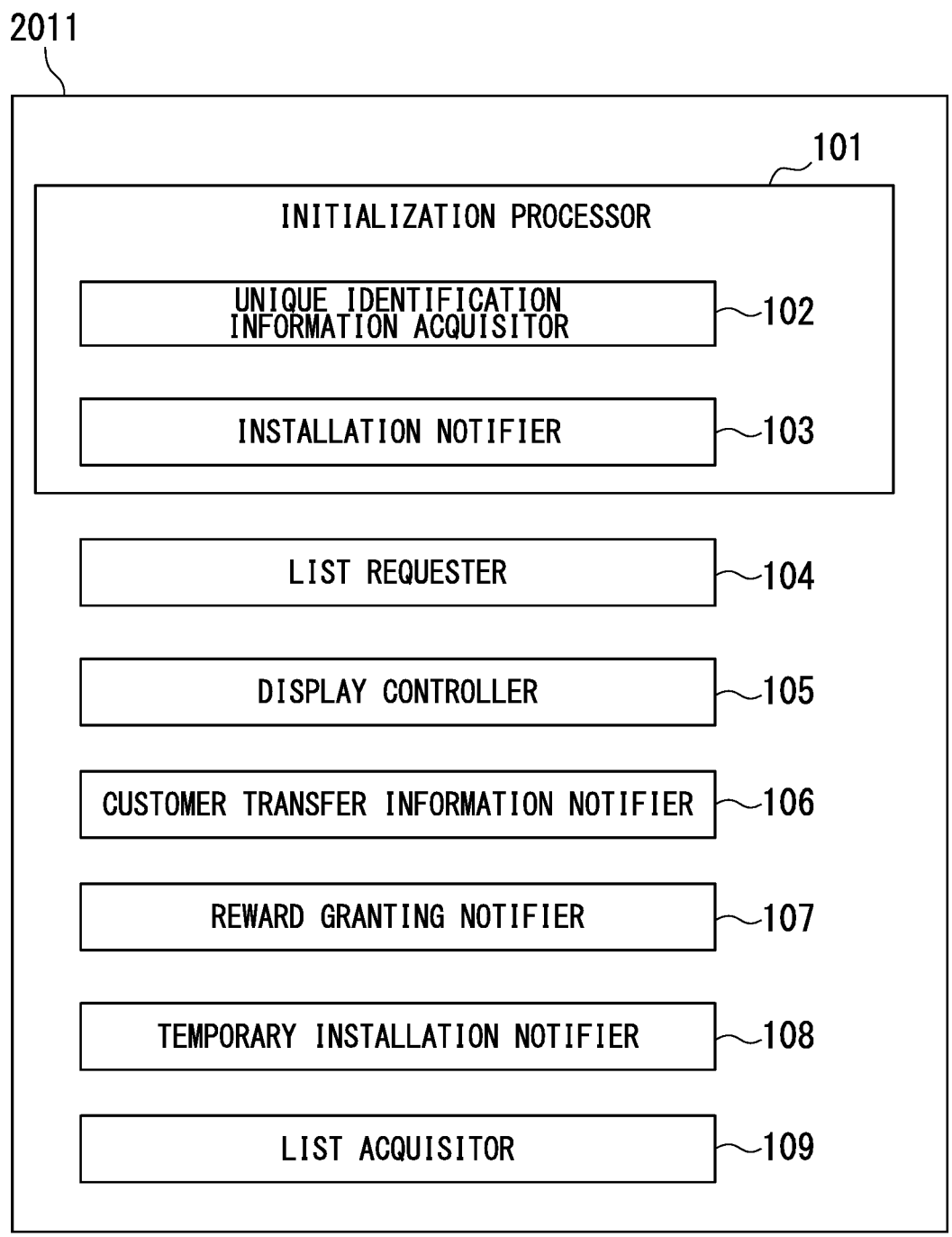
FIG. 24 shows an example of the functional configuration executed based on an SDK of a user terminal according to a fourth embodiment.

FIG. 24 is a configuration diagram illustrating an example of a functional structure executed based on the SDK 2011 of the user terminal 100 according to the present embodiment.

The functional structure of the reciprocal customer transfer process that the user terminal 100 (SDK 2011) executes in the reciprocal customer transfer system 500*a* will be described with reference to FIG. 24.

In FIG. 24, the SDK 2011 includes an initialization processor 101, a list requester 104, a display controller 105, a customer transfer information notifier 106, a reward granting notifier 107, a temporary installation notifier 108, and a list acquisitor 109. Further, the initialization processor 101 includes a unique identification information acquisitor 102, and an installation notifier 103.

The SDK 2011 of the present embodiment is different from the third embodiment by including the not-yet-installed information acquisitor 111. Further, in FIG. 24, the same configurations as in FIG. 19 are denoted by the same reference numerals, and a description thereof will be omitted.

In addition, in the present embodiment, the temporary installation notifier 108 detects the target application and the old-version target application, among applications that are installed in the user terminal 100. Then, the temporary installation notifier 108 regards the temporary installation notification information on the detected target application as the candidates for the old-version target application, and transmits the temporary installation notification information on the application to the management server 200*b*.

[Configuration of Management Server 200*b* According to Fourth Embodiment]

The configuration of the management server 200*b* according to the present embodiment will be described with reference to FIG. 25.

Figure 25:
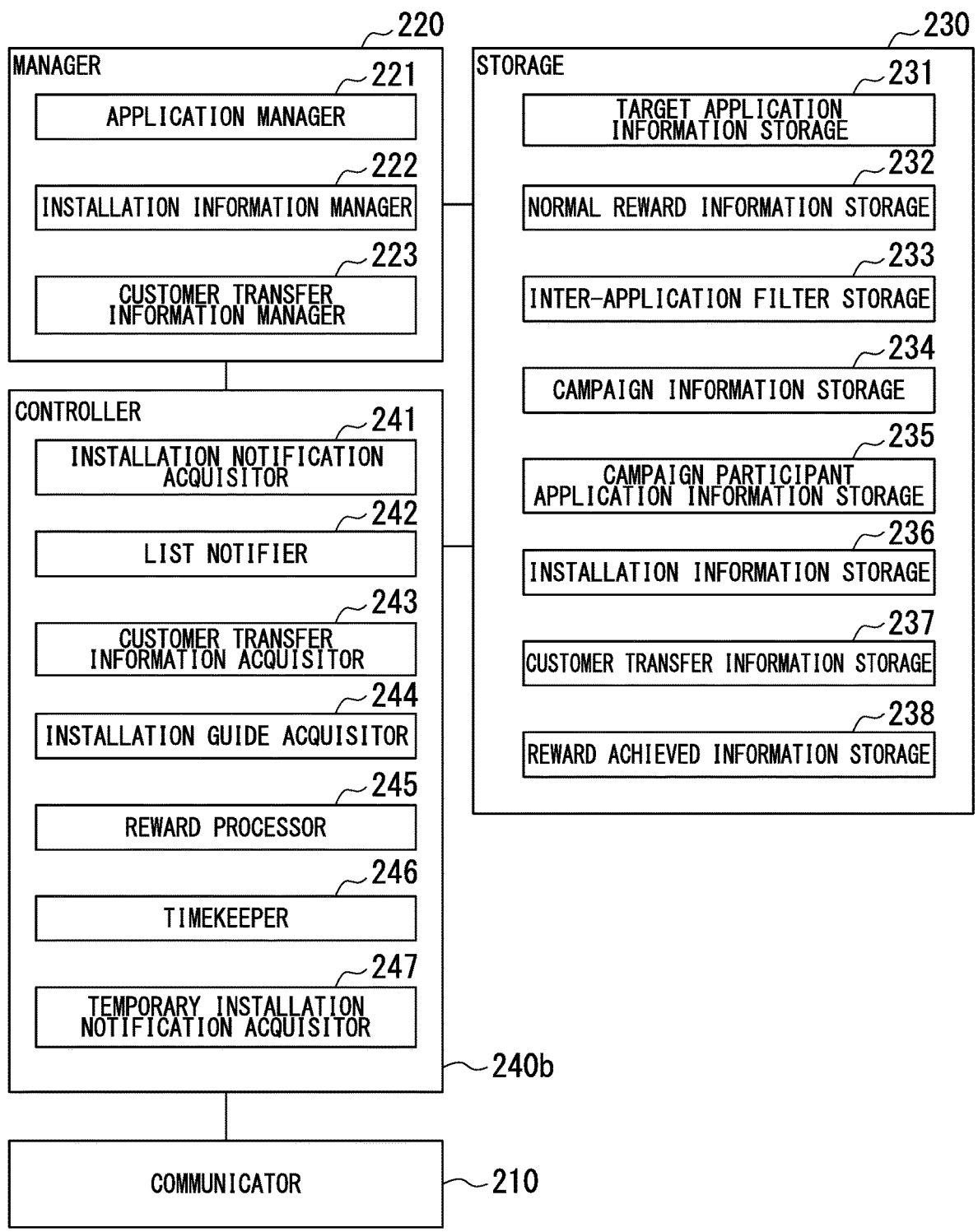
FIG. 25 shows an example of the configuration of a management server according to the fourth embodiment.

FIG. 25 is a configuration diagram illustrating the configuration of the management server 200*b* according to the present embodiment. The management server 200*b* includes a communicator 210, a manager 220, a storage 230, and a controller 240*b*. In addition, in FIG. 25, the same components as in FIG. 20 are denoted by the same reference numerals, and a description thereof is omitted here.

The controller 240*b* of the present embodiment includes an installation notification acquisitor 241, a list notifier 242, a customer transfer information acquisitor 243, an installation guide acquisitor 244, a reward processor 245, a timekeeper 246, and a temporary installation notification acquisitor 247. The controller 240*b* of the present embodiment is different from the third embodiment by not including the not-yet-installed information notifier 248.

In addition, the temporary installation notification acquisitor 247 of the present embodiment supplies the installation information manager 222 with the for example, temporary installation notification information obtained by excluding the target application managed by the application manager 221 from the temporary installation notification information that the temporary installation notifier 108 has acquired. In other words, the temporary installation notification acquisitor 247 extracts temporary installation notification information obtained by excluding the target application corresponding to the target application information stored in the target application information storage 231 from the temporary installation notification information that the temporary installation notifier 108 has acquired. Then the temporary installation notification acquisitor 247 supplies the installation information manager 222 with the extracted temporary installation notification information.

[Details of Reciprocal Customer Transfer Process Operation According to Fourth Embodiment]

The operation of the reciprocal customer transfer system 500*a* of the present embodiment will be described.

In addition, since the basic operation of the reciprocal customer transfer system 500*a* of the present embodiment is the same as in the first embodiment illustrated in FIG. 14 and FIG. 15, here, the operation of the reciprocal customer transfer system 500a will be described focusing a process of generating an application list of target applications of the present embodiment, with reference to FIG. 26.

Figure 26:
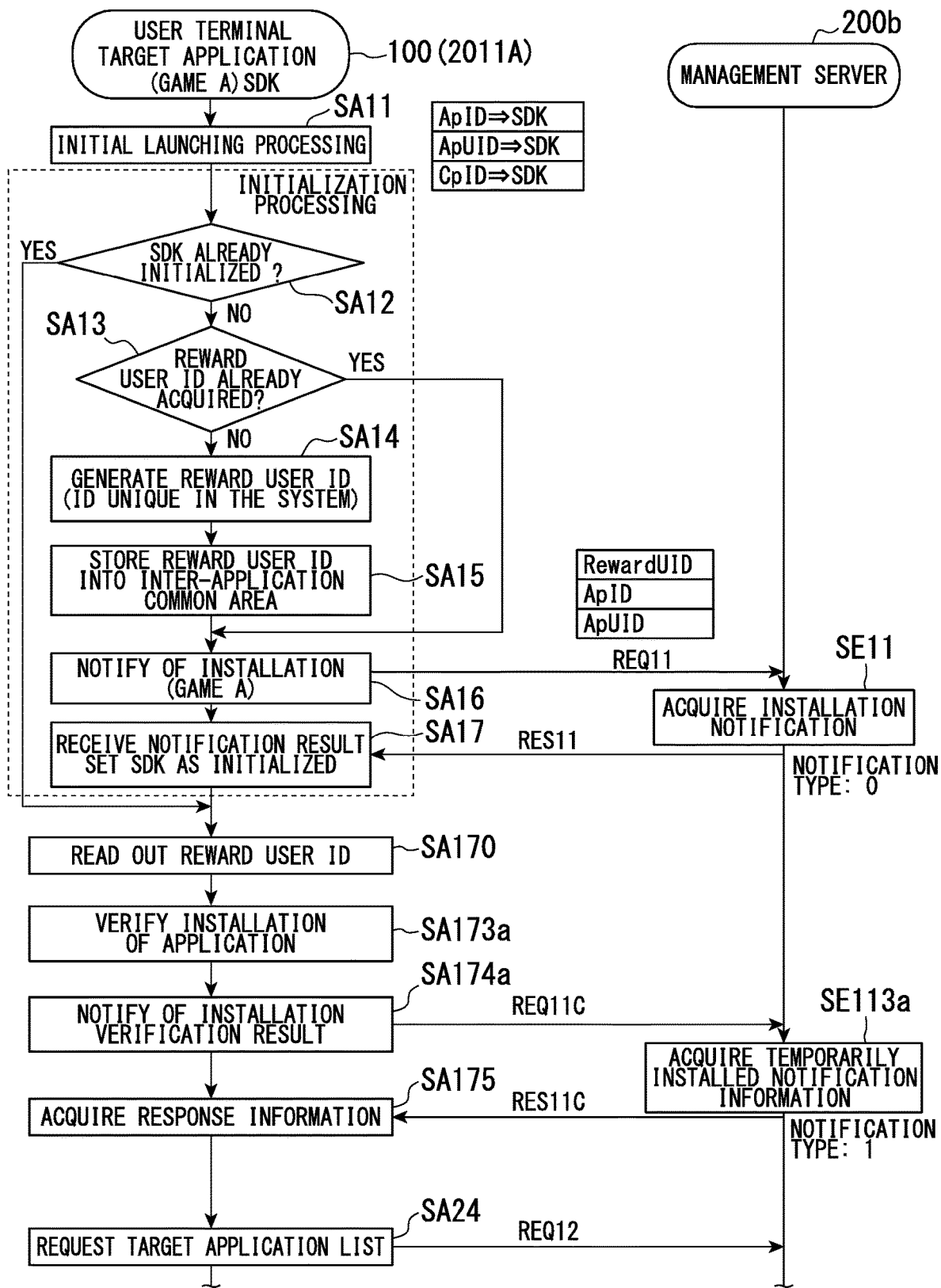
FIG. 26 is a flowchart showing an example of the operation of a reciprocal customer transfer system according to the fourth embodiment.

In addition, the process illustrated in FIG. 26 represents the process on the target application 10A side installed in the user terminal 100.

In FIG. 26, since the process of step SA11 to step SA17 is the same as in the first embodiment illustrated in FIG. 14, the description thereof will be omitted herein. In addition, it is assumed that the same SDK 2011A as the SDK 2011 described above is embedded into the target application 10A.

In step SE11, the installation information manager 222 of the management server 200b stores the reward user ID (RewardUID) included in the installation notification information that the installation notification acquisitor 241 has acquired, the application ID (ApID) of the target application 10A (game A), the application ID (ApUID) of the user X of the target application 10A (game A), and the notification type (Ttype) in association with each other, as the installation information, in the installation information storage 236. In addition, in this case, the installation information manager 222 stores notification type (Ttype) of "0" in the installation information storage 236.

The SDK 2011A reads the reward user ID from the inter-application common area of the terminal storage 140 (step SA170). Then, the temporary installation notifier 108 confirms the installation of an application in the user terminal 100 (step SA173a). In an example of a specific process, the temporary installation notifier 108 detects the target application that is installed in the user terminal 100 and the old-version target application, by using the URL scheme. For example, it is assumed that the user terminal 100 stores in advance URL scheme information in which the URL scheme and the application ID of the target application are associated, in the inter-application common area of the terminal storage 140. The temporary installation notifier 108 confirms whether or not the URL scheme corresponding to the target application present in the URL scheme information associated with the application ID can be opened (used) by using a predetermined method. When it is confirmed that the URL scheme information can be opened from the result of using the method, it is specified that the target application corresponding to the URL scheme or the old-version target application is installed in the user terminal 100. In other words, the target application of which installation is managed in the management server 200b and the old-version target application of which installation is not managed in the management server 200b are detected in a state in which the target application and the old-version target application are mixed. In other words, the temporary installation notifier 108 detects the detected target application and the old-version target application as candidates for the old-version target application, and generates the temporary installation notification information.

The temporary installation notifier 108 notifies the management server 200b of the result of installation confirmation (step SA174a, REQ11C). In other words, the temporary installation notifier 108 transmits temporary installation notification information indicating candidates for the old-version target application which is detected to be installed in the user terminal 100, to the management server 200b.

The temporary installation notification acquisitor 247 of the management server 200b acquires the temporary installation notification information transmitted from the temporary installation notifier 108 (SE113a).

The temporary installation notification information transmitted by the temporary installation notifier 108 is candidates for the old-version target application, includes the target application of which installation is managed in the management server 200b and the old-version target application of which installation is not managed in the management server 200b. Therefore, the installation information manager 222 extracts true old-version target application obtained by excluding target applications that are already stored in the installation information storage 236 from the temporary installation notification information that the temporary installation notification acquisitor 247 has acquired. In addition, there is a case where the true old-version target application cannot be extracted. This case represents that the old-version target application of which installation is not managed in the management server 200b is not present in the user terminal 100.

The installation information manager 222 stores the extracted old-version target application in the installation information storage 236 by associating it with the reward user ID (RewardUID), the application ID (ApID) of the target application 10B (game C), and the application user ID (ApUID) of the user X of the target application 10B, which are included in the temporary installation notification information, and the notification type (Ttype). In addition, In this case, the installation information manager 222 stores the application user ID (ApUID) and the notification type (Ttype) in the installation information storage 236, by setting the application user ID (ApUID) to "null", and setting the notification type (Ttype) to "1".

Further, the temporary installation notification acquisitor 247 transmits the response information indicating the acquisition of the temporary installation notification information, to the user terminal 100 (SDK 2011A) (RES11C).

Since the process of the subsequent step SA175 is the same as in the third embodiment illustrated in FIG. 23, a description thereof will be omitted.

Further, since the process after step SA24 (in addition, the process after step SE15 and the process after step SA25 are not shown) is the same as the process of step SA24 to step SA26, the process of step SE15 to step SE19, and the process of step SC11, which are illustrated in FIG. 14, a description thereof will be omitted.

In addition, in the present embodiment, in step SE15 and step SE16, the list notifier 242 extracts the application list of at least one target application 10B (game C) of which either the installation notification information or the temporary installation notification information is not acquired, from the target application 10A (game A). Then, the list notifier 242 generates data of an application list page for displaying the list LT of target applications based on the application list of the extracted target applications, as the list LT of target applications for which installation is recommended to the user on the user terminal 100. In addition, when the target application to recommend install to the user is not present (the target application could not be extracted), the list notifier 242 may include information for notifying the user of the fact, in the data.

Summary of Fourth Embodiment

As described above, in the reciprocal customer transfer system 500a of the present embodiment, the temporary installation notifier 108 of the user terminal 100 detects the application and old-version target application (an example of target application before becoming the management target), which have been installed in the user terminal 100, and transmits the temporary installation notification information on the detected target application as the candidates for the old-version target application, to the management server 200b.

Thus, as in the third embodiment, the management server 200b does not transmit the not-yet-installed information which is a candidate for the old-version target application to the user terminal 100, and can extract the old-version target application that is not managed from among the candidates for the old-version target application and add the extracted old-version target application as a management target. Accordingly, it is possible to manage the target application that is installed in the user terminal 100, regardless of the version of the target application. Therefore, when a target application is presented for which installation is recommended to the user, similarly to the third embodiment, the user terminal 100 of the present embodiment can present the list LT of target applications that the user has not used, regardless of the version of the target application.

Further, when there is provided a function capable of detecting an application that is installed, excluding the URL scheme, the temporary installation notifier 108 may use the function. Further, when it is possible to acquire the application ID of the application, the temporary installation notifier 108 may transmit temporary installation notification information including the application ID of the detected application to the management server 200b. Further, the temporary installation notifier 108 transmits temporary installation notification information obtained by replacing the application ID with the application name of the detected application to the management server 200b, and the management server 200b may convert the application name into the application ID and registers the converted application ID.

Fifth Embodiment

Next, a fifth embodiment of the present invention will be described.

In the present embodiment, a description will be given regarding an embodiment which presents to the user, the list LT of target applications, excluding the old-version target application when an old-version target application without the SDK 11 embedded therein is installed (updated), and is different from the third and fourth embodiments. In other words, in the third and fourth embodiments, when the management server 200a (200b) transmits, to the user terminal 100, the application list for presenting a target application for which installation is recommended to the user, the old-version target application that is installed in the user terminal 100 is excluded from the application list.

Meanwhile, in the present embodiment, the management server 200 transmits the old-version target application to the user terminal 100, without excluding it from the application list of target applications. Then, the user terminal 100 excludes the old-version target application from the application list. Thus, the user terminal 100 presents the list LT of target applications, which excludes the old-version target application, to the user.

[Functional Structure of User Terminal 100 (SDK 3011) According to Fifth Embodiment]

Figure 27:
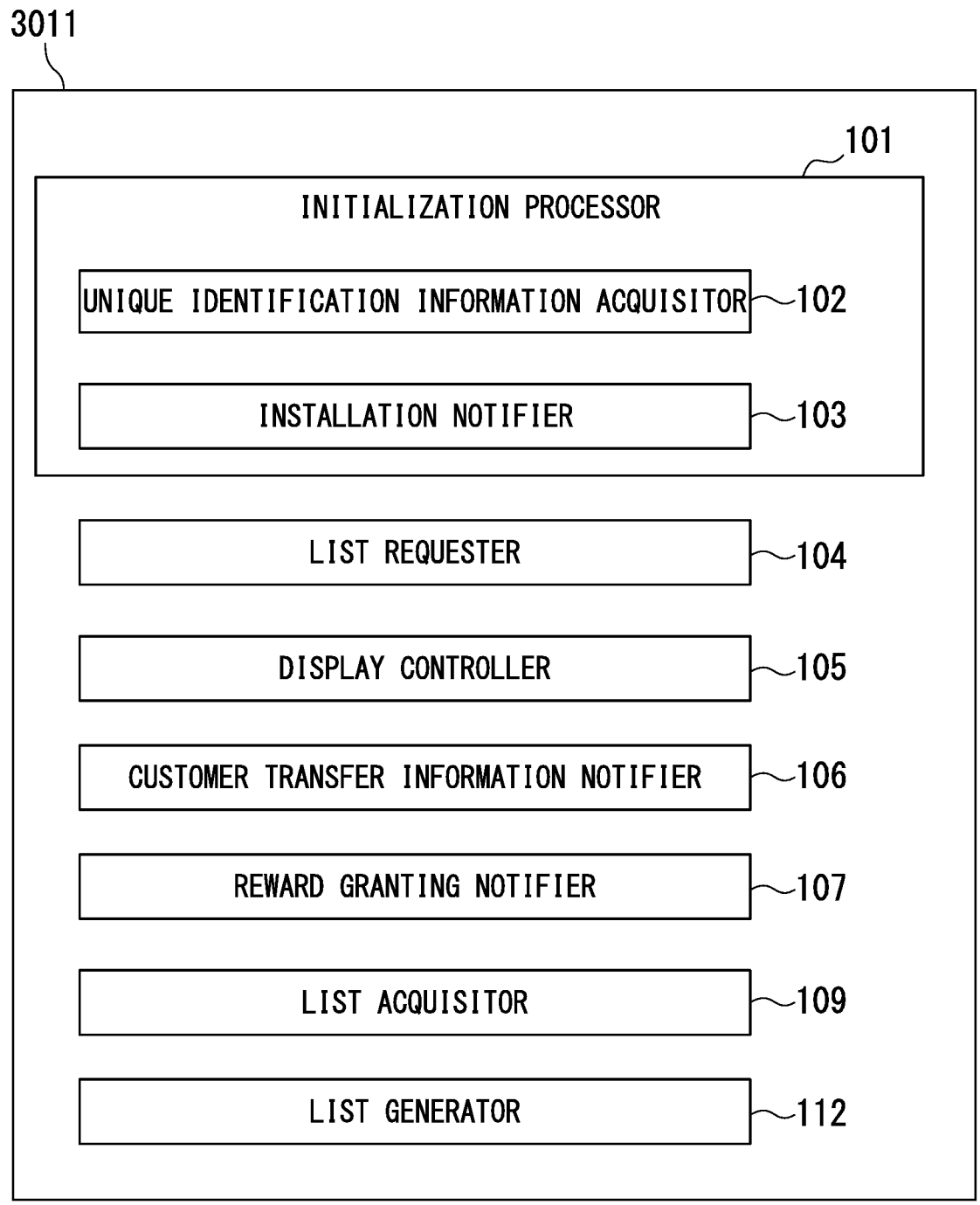
FIG. 27 shows an example of the functional configuration executed based on an SDK of a user terminal according to a fifth embodiment.

FIG. 27 is a configuration diagram illustrating an example of a functional structure executed based on the SDK 3011 of the user terminal 100 according to the present embodiment.

The functional structure of the reciprocal customer transfer process that the user terminal 100 (SDK 3011) executes in the reciprocal customer transfer system 500a will be described with reference to FIG. 27.

In FIG. 27, the SDK 3011 includes an initialization processor 101, a list requester 104, a display controller 105, a customer transfer information notifier 106, a reward granting notifier 107, a list acquisitor 109, and a list generator 112. Further, the initialization processor 101 includes a unique identification information acquisitor 102 and an installation notifier 103.

The SDK 3011 of the present embodiment is different from the third embodiment by not including the temporary installation notifier 108 and the not-yet-installed information acquisitor 111 and by including the list generator 112. Further, in FIG. 27, the same configurations as in FIG. 19 are denoted by the same reference numerals, and a description thereof will be omitted.

In addition, the list acquisitor 109 of the present embodiment acquires the application list of at least one target application of which installation information corresponding to the user terminal 100 is not managed in the management server 200, and the installation information is not transmitted, from the management server 200. Further, the list acquisitor 109 acquires the application list of target applications and the URL scheme corresponding to the target application included in the application list of target applications.

The list generator 112 generates a list LT of target applications in which the old-version target application that is installed in the user terminal 100 is excluded from among the target applications included in the application list of target applications that the list acquisitor 109 has acquired. Specifically, the list generator 112 specifies the old-version target application installed in the user terminal 100 among target applications that are included in the application list, by using the URL scheme that the list acquisitor 109 has acquired. The list generator 112 regenerates the application list of target applications in which the old-version target application installed in the user terminal 100 specified by using the URL scheme is excluded among target applications that are included in the application list.

Further, the configuration of the management server 200 of the present embodiment is the same as that of the management server 200 of the first embodiment illustrated in FIG. 6, and thus the description thereof will be omitted herein.

[Details of Reciprocal Customer Transfer Process Operation According to Fifth Embodiment]

The operation of the reciprocal customer transfer system 500a of the present embodiment will be described.

In addition, since the basic operation of the reciprocal customer transfer system 500a of the present embodiment is the same as in the first embodiment illustrated in FIG. 14 and FIG. 15, here, the operation of the reciprocal customer transfer system 500a will be described focusing a process of generating an application list of target applications of the present embodiment, with reference to FIG. 28.

Figure 28:
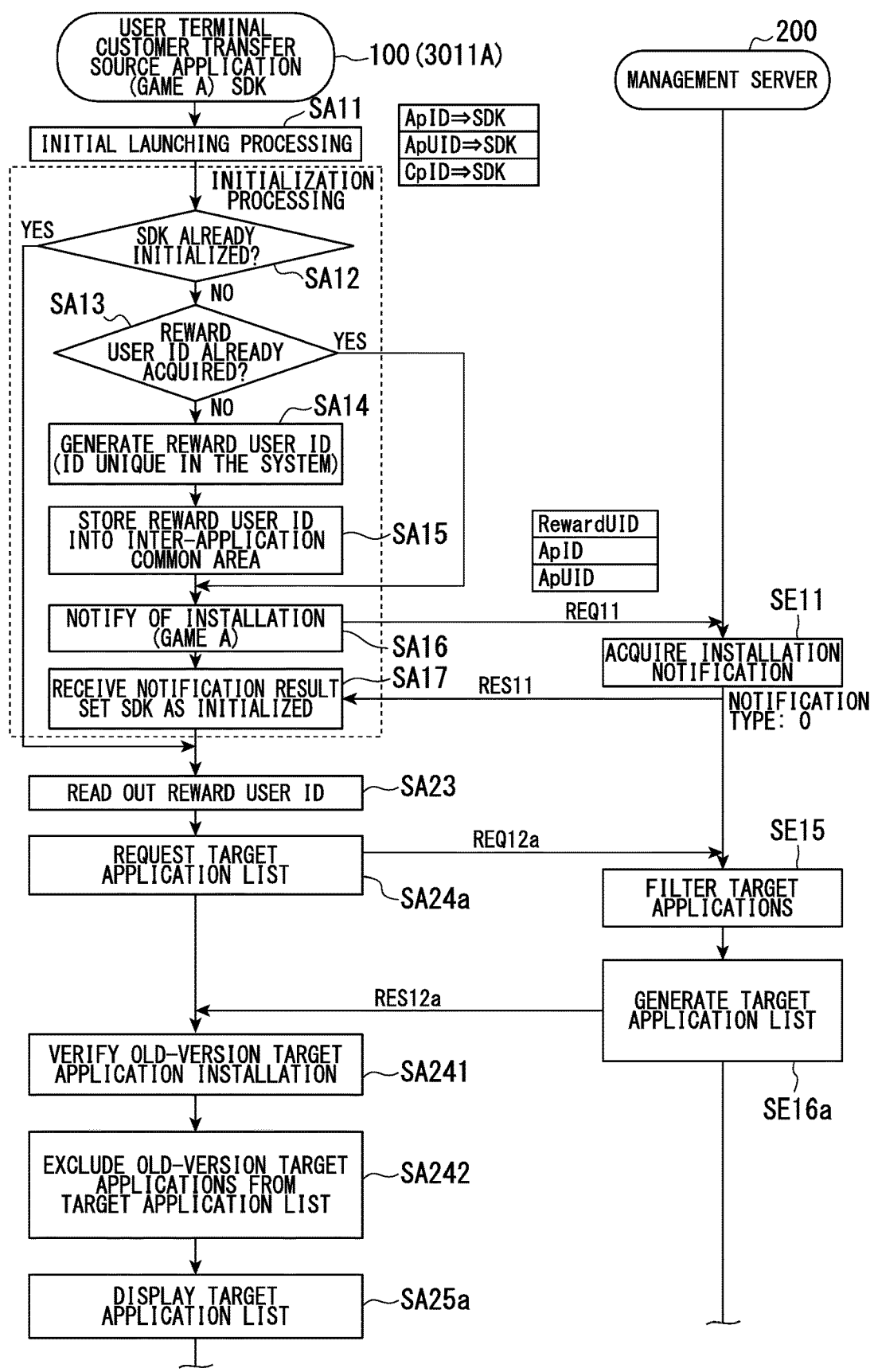
FIG. 28 is a flowchart showing an example of the operation of a reciprocal customer transfer system according to the fifth embodiment.

In addition, the process illustrated in FIG. 28 represents the process on the target application 10A side which is installed in the user terminal 100. Further, it is assumed that the same SDK 3011A as the SDK 3011 described above is embedded into the target application 10A.

In FIG. 28, since the process of step SA11 to step SA17, the process of step SA23, the process of step SE11, and the process of step SE15 are the same as in the first embodiment illustrated in FIG. 14, the description thereof will be omitted herein.

In step SA24a, the list requester 104 transmits list request notification information for requesting the application list of at least one target application of a plurality of target applications, to the management server 200 (REQ12a).

Further, in step SE16a, the list notifier 242 of the management server 200 generates the application list of target applications, and transmits the generated application list to the user terminal 100 (RES12a). Here, the list notifier 242 generates the application list of at least one target application of which installation information corresponding to the user terminal 100 is not managed. In addition, the list notifier 242 may include the URL scheme corresponding to the target application in the application list. In other words, the list notifier 242 transmits the application list and the URL scheme corresponding to the target application included in the application list to the user terminal 100, and the list acquisitor 109 of the user terminal 100 acquires the application list and the URL scheme.

The list generator 112 of the SDK 3011A recognizes the installation of the old-version target application (step SA241). Specifically, the list generator 112 specifies the old-version target application which is installed in the user terminal 100, among target applications, by using the URL scheme included in the application list that the list acquisitor 109 has acquired. In other words, the list generator 112 detects the old-version target application which is installed in the user terminal 100, among target applications that are included in the application list.

For example, the list generator 112 detects the old-version target application which is installed in the user terminal 100, by using the URL scheme included in the application list.

The list generator 112 deletes the old-version target application from the application list of target applications (step SA242). In other words, the list generator 112 generates the application list of target applications in which the old-version target application which is installed in the user terminal 100, detected by using the URL scheme, is deleted from among target applications that are included in the application list.

The display controller 105 of the SDK 3011A displays the list LT of target applications based on the application list of the target applications that the list generator 112 generates, on the display 120 (step SA25a).

Further, since the process after step SA26 (in addition, the process after step SE17 and the process after step SA26 are not shown) is the same as the process of step SA26, the process of step SE17 to step SE19, and the process of step SC11, which are illustrated in FIG. 14, a description thereof will be omitted.

Summary of Fifth Embodiment

As described above, in the reciprocal customer transfer system 500a of the present embodiment, the user terminal 100 (an example of the terminal device) is a terminal device capable of communicating with the management server 200. Here, the management server 200 manages the installation information on the target application installed in the user terminal 100, based on the installation notification information indicating the installation of the target application that is installed in the user terminal 100 among a plurality of target applications which are management targets. The user terminal 100 includes an installation notifier 103, an installation notifier 103, a list acquisitor 109, a list generator 112, and a display controller 105. The installation notifier 103 transmits the installation notification information on the target application installed in the user terminal 100 to the management server 200. The list acquisitor 109 acquires the application list of at least one target application of which installation information corresponding to the user terminal 100 is not managed in the management server 200, from the management server 200. The list generator 112 regenerates the application list in which the old-version target application (an example of the target application before becoming a management target) installed in the user terminal 100 is excluded among target applications that are included in the application list that the list acquisitor 109 has acquired. Then, the display controller 105 displays the list LT of target applications based on the application list that the list generator 112 generates, on the display 120.

Thus, for example, even when the old-version target application having the SDK3011 embedded therein is installed in the user terminal 100, the user terminal 100 of the present embodiment can present, to the user, the list LT of target applications based on the application list of target applications excluding the old-version target application. In other words, similarly to the third and fourth embodiments, the user terminal 100 can present the list LT of target applications that the user has not used to the user, regardless of the version of the target application.

Further, in the present embodiment, the list acquisitor 109 acquires the application list and the URL scheme corresponding to the target application included in the application list. Then, the list generator 112 detects the old-version target application which is installed in the user terminal 100, among target applications that are included in the application list, by using the URL scheme that the list acquisitor 109 has acquired.

Thus, the user terminal 100 of the present embodiment can detect the old-version target application, by simple means for determining whether or not the URL scheme can be opened, for example, in the user terminal.

[Display Example of List of Target Applications]

Figure 29:
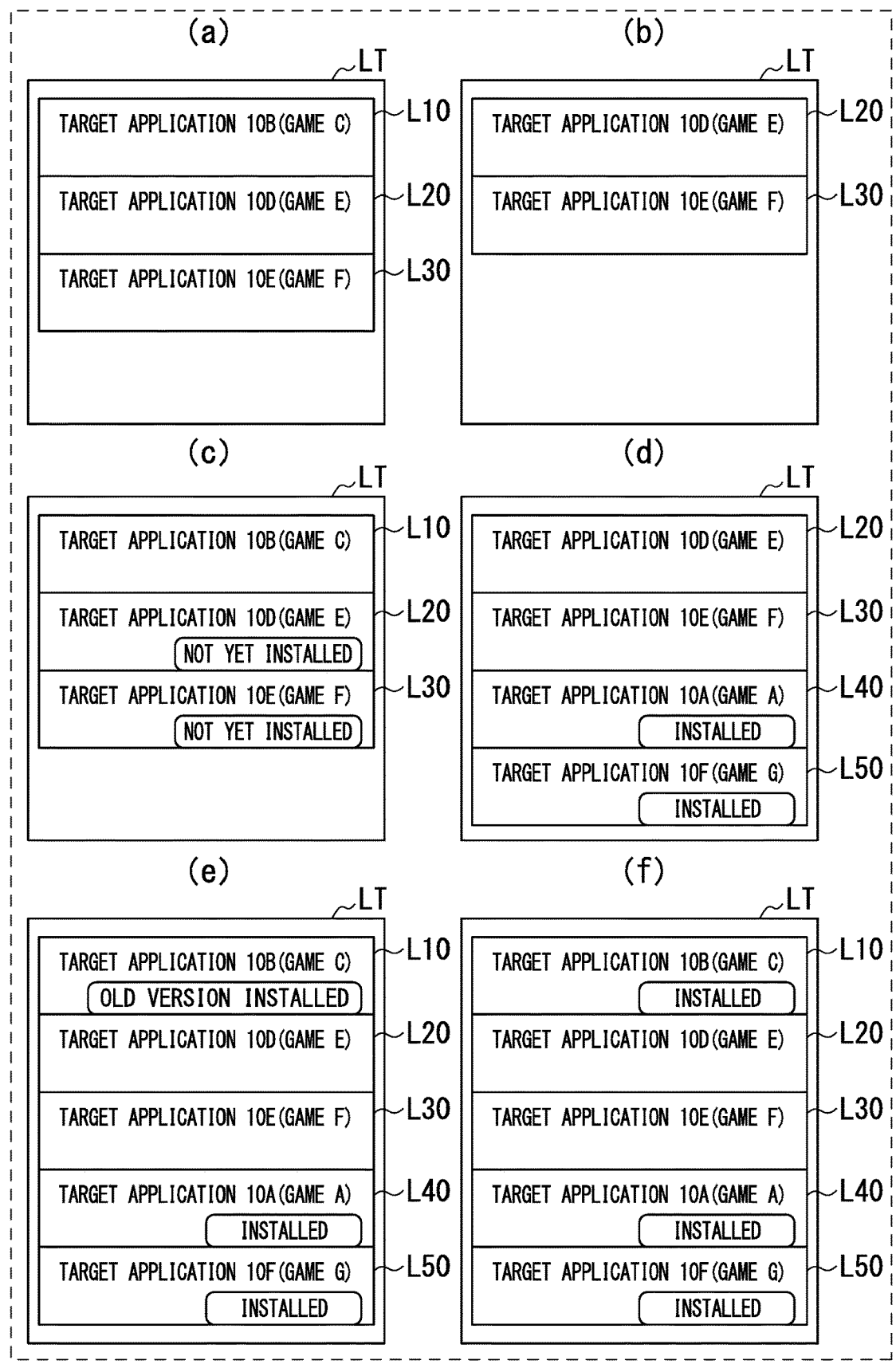
FIG. 29 shows an example of a target application list display according to the fifth embodiment.

Hereinafter, with reference to FIG. 29, a description will be given regarding a display example of a list LT of target applications that are generated by the user terminal 100 so as to be displayed on the display 120, in the reciprocal customer transfer system 500a of the present embodiment. FIG. 29 is a diagram illustrating a display example of a list LT of target applications according to the present embodiment.

Here, it is assumed that a target application 10A (game A) which is a customer transfer source, an old-version target application 10B (game C), and a target application 10F (game G) are installed in the user terminal 100. Here, it is assumed that when the target application 10A (game A) and the target application 10F (game G) are launched in the user terminal 100, respective pieces of installation notification information are transmitted to the management server 200. Accordingly, the management server 200 manages installation information indicating that the target application 10A (game A) and the target application 10F (game G) are installed in the user terminal 100. In addition, a target application 10D (game E) and a target application 10E (game F) are examples of target applications that are not installed in the user terminal 100. In other words, the management server 200 does not manage the installation information on the target application 10B (game C), the target application 10D (game E), and the target application 10E (game F), corresponding to the user terminal 100.

FIGS. 29a, 29b, and 29c each illustrates a display example of the list LT of target applications that is generated based on the application list, when information indicating at least one target application for which installation information corresponding to the user terminal 100 is not managed in the management server 200 is included in the application list that the user terminal 100 has acquired from the management server 200, but information indicating a target application for which installation information corresponding to the user terminal 100 is managed in the management server 200 is not in the application list.

First, FIG. 29A illustrates a display example when the user terminal 100 generates the list LT of target applications indicated by the acquired application list. Here, the target applications indicated by the application list are the target application 10B (game C), the target application 10D (game E), and the target application 10E (game F), for which installation information corresponding to the user terminal 100 is not managed in the management server 200. In the list LT of target applications illustrated in FIG. 29A, information (L10) indicating the target application 10B (game C), information (L20) indicating the target application 10D (game E), and information (L30) indicating the target application 10E (game F) are displayed as information indicating target applications which have not been installed in the user terminal 100 (in other words, candidates for target applications which are customer transfer destinations). Here, the old version of the old-version target application 10B (game C) is installed in the user terminal 100, but the installation information on the target application 10B (game C) corresponding to the user terminal 100 is not managed in the management server 200, such that the information indicating the target application 10B (game C) is also displayed as the target application which has not been installed in the user terminal 100.

FIG. 29B illustrates a display example when the user terminal 100 generates the list LT of target applications in which the old-version target application is excluded from target applications indicated by the acquired application list. In the list LT of target applications illustrated in FIG. 29b, information (L20) indicating the target application 10D (game E), and information (L30) indicating the target application 10E (game F) are displayed as information indicating target applications which have not been installed in the user terminal 100 (in other words, candidates for target applications which are customer transfer destinations), while the target application 10B (game C) of which the old version has been installed is excluded from the target application 10B (game C), the target application 10D (game E), and the target application 10E (game F).

FIG. 29C illustrates a display example when the user terminal 100 generates the list LT of target applications in which the old-version target application is distinguishable from among target applications indicated by the acquired application list. For example, the list generator 112 of the user terminal 100 may generate the list LT of target applications by which the user can distinguish the old-version target application installed in the user terminal 100 that is detected by using the URL scheme, among target applications indicated by the acquired application list. In the list LT of target applications illustrated in FIG. 29c, the information (L10) indicating the target application 10B (game C), the information (L20) indicating the target application 10D (game E), and information (L30) indicating the target application 10E (game F) are displayed, and information indicating that the target application is not yet installed (here, "not yet installed") is denoted as information indicating target applications which have not been installed in the user terminal 100 (in other words, candidates for target applications which are customer transfer destinations), in the information (L20) indicating the target application 10D (game E) and the information (L30) indicating the target application 10E (game F).

Accordingly, the user terminal 100 can generate the list LT of target applications by which the user can distinguish the target application of which old version is installed in the user terminal 100, among target applications indicated by the acquired application list, and present the list LT.

In addition, information indicating that the old version has been installed may be denoted in the information (L10) indicating the target application 10B (game C).

Further, information indicating at least one target application of which installation information is managed, and distinction information for distinguishing a target application of which installation information is managed and a target application of which installation information is not managed may further be included in the application list acquired from the management server 200.

FIGS. 29d, 29e, and 29f each illustrates a display example of the list LT of target applications that is generated based on the application list, when information indicating at least one target application of which installation information corresponding to the user terminal 100 is not managed, information indicating at least one target application of which installation information corresponding to the user terminal 100 is managed, and distinction information for distinguishing a target application of which installation information is not managed and a target application of which installation information is managed, in the management server 200 are included in the application list that the user terminal 100 has acquired from the management server 200.

FIG. 29D illustrates a display example when the user terminal 100 generates the list LT of target applications in which the old-version target application is excluded from target applications indicated by the acquired application list. Here, the target application 10B (game C) of which the old version has been installed is excluded from the target application 10A (game A), the target application 10B (game C), target application 10D (game E), the target application 10E (game F), and the target application 10F (game G). Accordingly, information (L20) indicating the target application 10D (game E), information (L30) indicating the target application 10E (game F), information (L40) indicating the target application 10A (game A), and information (L50) indicating the target application 10F (game G) are displayed in the list LT of target applications illustrated in FIG. 29d. Further, information indicating that the target application is installed (here, "installed") is denoted in each of the information (L40) indicating the target application 10A (game A), and the information (L50) indicating the target application 10F (game G). In other words, the information (L20) indicating the target application 10D (game E) and the information (L30) indicating the target application 10E (game F) is displayed as information indicating a target application which has not been installed in the user terminal 100 (in other words, candidates for target applications which are customer transfer destinations). Here, the user terminal 100 generates the information indicating that the target application is installed (here, "installed"), based on the distinction information included in the application list.

Thus, the user terminal 100 can generate the list LT of target applications in which a target application of which installation information is managed and a target application of at least which installation information is not managed can be distinguished from each other, among target applications indicated by the acquired application list, and present the list LT to the user.

FIG. 29E illustrates a display example when the user terminal 100 generates the list LT of target applications in which the old-version target application is not excluded from target applications indicated by the acquired application list. The list LT of target applications illustrated in FIG. 29e is different from the list LT of applications illustrated in FIG. 29d, in that information (L10) indicating the target application 10B (game C) is further displayed in the list LT of FIG. 29e. Further, information indicating that the old version of the target application 10B (game C) is installed (here, "old-version installed") is denoted in the information (L10) indicating the target application 10B (game C).

Thus, the user terminal 100 can generate the list LT of target applications in which a target application of which installation information is managed and a target application of which at least installation information is not managed can be distinguished from each other, among target applications indicated by the acquired application list, and present the list LT to the user. Further, the user terminal 100 can present the list LT of target applications in such a manner that the user can distinguish the target application of which old version has been installed in the user terminal 100.

In addition, information for distinguishing the target application of which old version has been installed maybe displayed in the list LT of target applications illustrated in FIG. 29E. For example, as illustrated in FIG. 29F, information indicating that the target application is installed (here, "installed") may be denoted in the information (L10) indicating the target application 10B (game C).

Thus, the user terminal 100 can generate the list LT of target applications in which a target application of which installation information is managed and a target application of which at least installation information is not managed can be distinguished from each other, among target applications indicated by the acquired application list, and present the list LT to the user.

In addition, in the lists LT of the target applications illustrated in FIGS. 29d, 29e, and 29, instead of or in addition to denoting information indicating that the target application is installed (here, "installed"), in information indicating the target application that is installed in the user terminal 100, information indicating that the target application is not yet installed (here, "not yet installed") may be denoted in information indicating the target application that is not yet installed in the user terminal 100.

Sixth Embodiment

Next, a sixth embodiment of the present invention will be described. In the third, fourth, and fifth embodiments, embodiments have been described in which when the old-version target application without the SDK 11 embedded therein is installed in the user terminal 100, the list LT of target application, excluding the installed old-version target application, is presented. In the present embodiment, an aspect will be described in which when there is an target application that is not launched, among the target applications installed in the user terminal 100, the list LT of target applications, excluding the target application that is not launched, is presented to the user.

For example, even if the target application is downloaded from a store site and is installed in the user terminal 100, if the target application is not launched (not executed), the installation notification information cannot be transmitted to the management server 200. Therefore, the management server 200 recognizes that the target application that is not launched as not being installed in the user terminal 100, similarly to the case of the old-version target application. Accordingly, for example, when the target application is presented to the user for which installation is recommended to the user, there is the target application that is installed but not launched in the user terminal 100 in the list LT of target applications that is presented to the user.

Thus, in the present embodiment, an aspect will be described which presents the list LT of target applications excluding the target application that is not launched, among the target applications installed in the user terminal 100, by using the same process as in the case of excluding the old-version target applications described in the third, fourth, and fifth embodiments.

[Summary of Reciprocal Customer Transfer System According to Sixth Embodiment]

Figure 30:
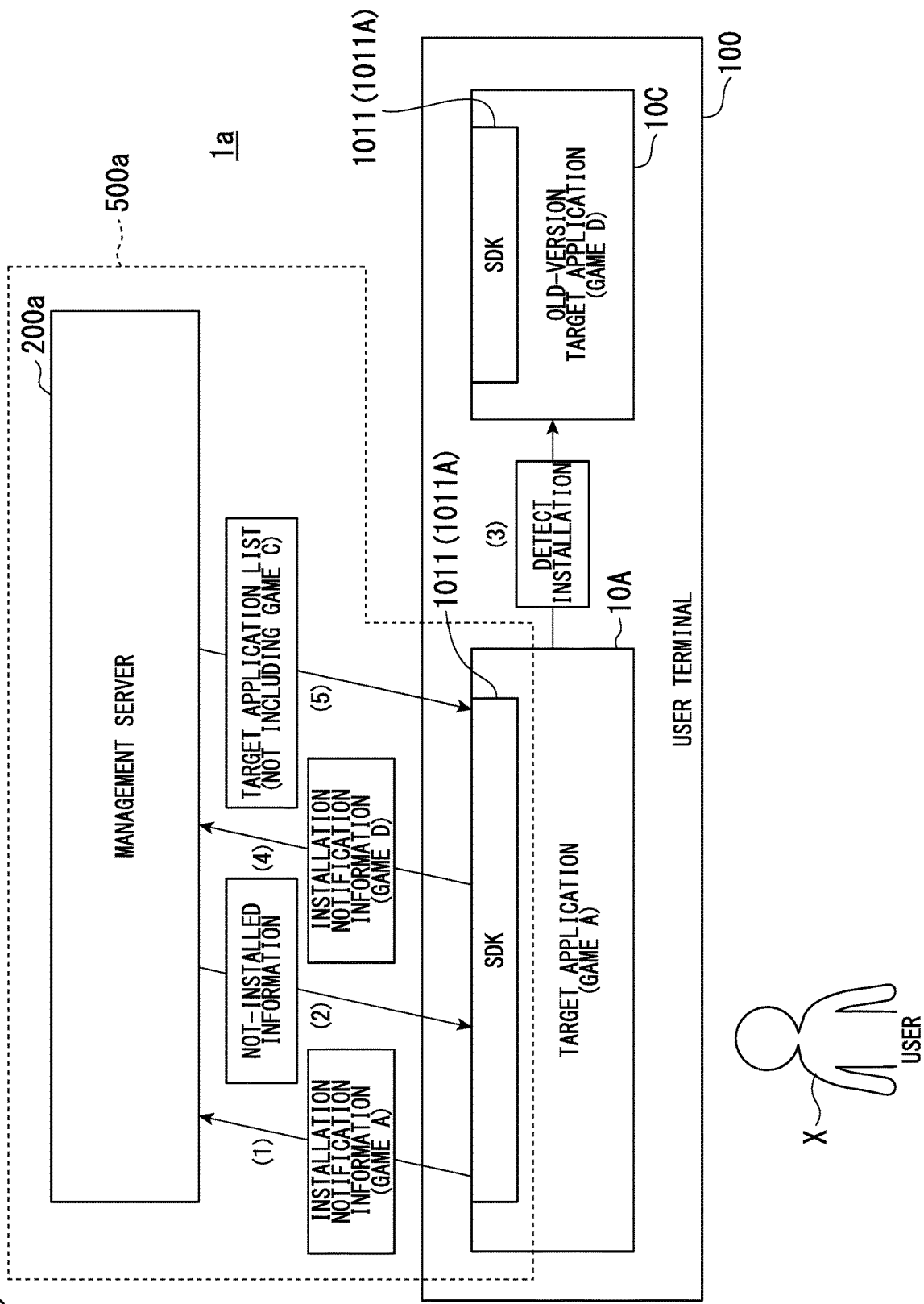
FIG. 30 is a simplified drawing describing a reciprocal customer transfer system according to a sixth embodiment.

FIG. 30 is an explanatory diagram illustrating a summary of a reciprocal customer transfer system 500a of the present embodiment.

Similarly to the configuration illustrated in FIG. 18, the network system 1a illustrated in FIG. 30 includes a management server 200a and a user terminal 100. Here, the configuration of the present embodiment is different from the configuration illustrated in FIG. 18, in that a target application 10C (for example, a game D) provided with the SDK 1011 corresponding to the reciprocal customer transfer system 500a, instead of the old-version target application 10B (for example, game C), is installed in the user terminal 100 in the present embodiment. In addition, in FIG. 30, the portion corresponding to each process in FIG. 18 is denoted by the same reference numeral, and a description thereof will be omitted.

The summary of the reciprocal customer transfer system 500a of the present embodiment will be described with reference to FIG. 30.

(1) When the target application 10A is installed in the user terminal 100 and is first launched by the user X, the SDK 1011 embedded into the target application 10A transmits installation notification information (game A) indicating that the target application 10A is installed in the user terminal 100. Thus, the management server 200a manages the installation information indicating that the target application 10A is installed in the user terminal 100, based on the installation notification information that is acquired from the SDK 1011.

Meanwhile, since the target application 10C is installed in the user terminal 100 but is not launched, the SDK 1011 embedded into the target application 10C does not transmit the installation notification information to the management server 200. In other words, since the installation notification information indicating that the target application 10C is installed in the user terminal 100 is not acquired, the management server 200a recognizes that the target application 10C is not installed in the user terminal 100.

(2) The SDK 1011 target application 10A acquires the not-yet-installed information indicating the target application of which the installation notification information is not acquired by the management server 200a from the user terminal 100. In addition, the target application 10A corresponds to the customer transfer source application having the same function as that of the customer transfer source application 10 of the first and second embodiments.

(3) The SDK 1011 of the target application 10A detects (installation detection) whether or not a target application (for example, target application 10C) that is installed in the user terminal 100 but not launched, among target applications indicated by the not-yet-installed information that the management server 200a has acquired, is installed in the user terminal 100. In other words, the not-yet-installed information may indicate candidates for the "target application that is installed in the user terminal 100 but not launched", which are to be detected in the user terminal 100. The SDK 1011 detects whether or not "target application that is installed in the user terminal 100 but not launched" is installed in the user terminal 100, for example, by using the URL scheme. Here, the SDK 1011 detects that the target application 10C is installed in the user terminal 100, as "a target application that is installed in the user terminal 100 but not launched" among target applications indicated by the not-yet-installed information.

(4) The SDK 1011 of the target application 10A transmits the installation notification information indicating that the target application 10C (game D) is installed, to the management server 200a. Thus, the management server 200a manages the installation information indicating that the target application 10C is installed in the user terminal 100, based on the installation notification information (game D) that the SDK 1011 has acquired. In addition, the management server 200a may perform management such as determination as to whether the target application installed in the user terminal 100 is launched.

(5) When the target application to recommend the installation to the user is presented, the management server 200a transmits the application list (without including the game C), which excludes the old-version target application 10C, to the user terminal 100.

In other words, the management server 200a generates an application list of at least one target application, in which the installation information on the target application that is installed and launched in the user terminal 100 or and the installation information on the target application that is installed but not launched in the user terminal 100 is not managed, among a plurality of target applications that are managed.

Then, the management server 200a transmits the generated application list to the user terminal 100. The user terminal 100 displays the list LT of target applications, excluding the target application 10C, as the target application for which installation is recommended to the user, on the display 120, based on the above-described application list transmitted from the management server 200a.

In this manner, even when there is a target application that is installed in the user terminal 100 but is not launched, the reciprocal customer transfer system 500a according to the present embodiment can present the list LT of target applications, excluding the target application that is not launched, to the user by displaying the list LT on the display 120.

In addition, "the target application that is installed but not launched in the user terminal 100" and "the old-version target application that is installed in the user terminal 100", which are described in the third, fourth and fifth embodiments, do not transmit the installation notification information to the management server 200a due to different reasons, but the target applications are the same in that they do not transmit the installation notification information, despite being installed in the user terminal 100. Therefore, both the target application that is installed but not launched in the user terminal 100 and the old-version target application are included in the target application indicated by the not-yet-installed information. Then, a process of detecting the target application that is installed but not launched in the user terminal 100, from among the target applications indicated by the not-yet-installed information is a process of detection, for example, by using the URL scheme, similarly to a process of detecting the old-version target application.

Accordingly, even in the present embodiment, in a case where the old-version target application is installed in the user terminal 100, it is possible to exclude the old-version target application from the not-yet-installed information. Further, the old-version target application is installed in the user terminal 100 and there is the target application that is installed but not launched in the user terminal 100, it is possible to exclude either old-version target application or the target application that is not launched, from among the not-yet-installed information.

The configuration and the process of the present embodiment will be described in detail.

Respective configurations and processes described in the third, fourth, and fifth embodiments can be applied for the configuration and the process of the present embodiment.

Hereinafter, the configuration and the process of the present embodiment employing respective configurations and processes described in the third, fourth, and fifth embodiments will be described as a first example to a third example.

First Example of Configuration and Process of Sixth Embodiment

For example, the configuration and the process of the third embodiment that are described with reference to FIG. 19 to FIG. 23 may be employed as the configuration and the process of the present embodiment.

The functional structure illustrated in FIG. 19 may be employed as the functional structure that is executed based on the SDK 1011 of the user terminal 100 of the present embodiment. The SDK 1011 includes an initialization processor 101, a list requester 104, a display controller 105, a customer transfer information notifier 106, a reward granting notifier 107, a temporary installation notifier 108, a list acquisitor 109, and a not-yet-installed information acquisitor 111. In the present embodiment, in the functional structure of the SDK 1101 illustrated in FIG. 19, the temporary installation notifier 108 detects the target application that is installed but not launched in the user terminal 100. Then, the temporary installation notifier 108 transmits the temporary installation notification information indicating that the detected target application is installed in the user terminal 100, to the management server 200a.

Specifically, when the target application that is installed but not launched in the user terminal 100 is detected, the temporary installation notifier 108 performs detection by using the URL scheme that the not-yet-installed information acquisitor 111 has acquired, for example, similarly to a process of detecting the old-version target application.

In addition, in a case where it is possible to acquire information indicating the target application that is installed in the user terminal 100, by the function of an OS, without using the URL scheme, the temporary installation notifier 108 may detect the target application that is installed but not launched in the user terminal 100, from among the target applications indicated by the not-yet-installed information that the not-yet-installed information acquisitor 111 has acquired, by using the information indicating the installed target application.

Further, differently from the old-version target application, the SDK 1011 is embedded into the target application that has not been launched. Therefore, the SDK 1011 has a function of detecting the target applications that are installed in the user terminal 100, and the not-yet-installed information acquisitor 111 may detect the target application that is installed but not launched in the user terminal 100, from among the target applications indicated by the not-yet-installed information that the not-yet-installed information acquisitor 111 has acquired.

Further, in the present embodiment, in the configuration of the management server 200a illustrated in FIG. 20, when there is a target application that is installed in the user terminal 100 but is not launched, the temporary installation notification acquisitor 247 acquires the temporary installation notification information indicating that the target application, that is not launched, is installed in the user terminal 100, from the target application 10A. For example, the temporary installation notification acquisitor 247 acquires the temporary installation notification information on the target application that is installed but not launched in the user terminal 100, among target applications indicated by the not-yet-installed information transmitted from the not-yet-installed information notifier 248, from the target application 10A. Then, the temporary installation notification acquisitor 247 supplies the installation information manager 222 with the acquired temporary installation notification information.

The installation information manager 222 stores the installation information on the target application that is installed but not launched in the user terminal 100 in the installation information storage 236, based on the temporary installation notification information that the temporary installation notification acquisitor 247 has acquired. Since the installation information stored in the installation information storage 236 is, for example, the installation information that is stored based on the temporary installation notification information, similarly to the installation information on the old-version target application illustrated in FIG. 22, the notification type (Ttype) is stored as "1". In addition, the notification type (Ttype) of the target application that is installed but not launched in the user terminal 100 may be a notification type (for example, "2") other than "0" and "1", so as to be distinguished from the old-version target application.

Further, for example, the process illustrated in FIG. 23 may be applied as the process according to the present embodiment.

For example, in the process of step SA173, the temporary installation notifier 108 of the SDK 1011A of the target application 10A detects the target application that is installed but not launched in the user terminal 100, among not-yet-installed target applications, by using the URL scheme included in the not-yet-installed information that the not-yet-installed information acquisitor 111 has acquired. Then, the temporary installation notifier 108 notifies the management server 200a of the result of installation confirmation (step SA174). In other words, the temporary installation notifier 108 transmits the temporary installation notification information indicating the target application that is determined to be installed in the user terminal 100 but not launched, similarly to the temporary installation notification information indicating the old-version target application, to the management server 200a. In addition, when there is no target application that is not launched in the user terminal 100, information indicating that there is no target application, that is not launched in the user terminal 100, may be notified of, as the temporary installation notification information.

Thus, the management server 200a can manage the installation information on the target application that is installed but not launched in the user terminal 100 (step SE113a).

Further, since the process after step SA24 (in addition, the process after step SE15 and the process after step SA25 are not shown) is the same as the process of step SA24 to step SA26, the process of step SE15 to step SE19, and the process of step SC11, which are illustrated in FIG. 14, as described with reference to FIG. 23, a description thereof will be omitted.

For example, in step SE15 and step SE16, the list notifier 242 of the management server 200a extracts an application list including information indicating at least one target application of which installation information corresponding to the user terminal 100 is not managed in the installation information manager 222, among a plurality of target applications. Then, the list notifier 242 generates data of an application list page for displaying the list LT of target applications based on the application list of the extracted target applications on the user terminal 100. In addition, when even one target could not be extracted, the list notifier 242 may include information for notifying the user of the fact, in the data. In addition, the application list of target applications may be transmitted to the user terminal 100, and the SDK 1011A of the target application 10A may generate data for displaying the list LT of target applications in the user terminal 100, based on the acquired application list.

Thus, the management server 200a can transmit an application list of target applications excluding the target application that is installed but not launched in the user terminal 100, to the user terminal 100. Accordingly, the user terminal 100 can present a list LT of target applications excluding the target application that is installed but not launched in the user terminal 100, to the user.

In addition, both an old-version target application and the target application that is not launched may similarly be detected, among the target applications that are installed in the user terminal 100, and excluded from the application list.

Second Example of Configuration and Process of Sixth Embodiment

For example, the configuration and the process of the fourth embodiment that are described with reference to FIG. 24 to FIG. 26 may be employed as the configuration and the process of the present embodiment.

For example, in the configuration of the reciprocal customer transfer system 500a of the present embodiment, the functional structure that is executed based on the SDK 2011 of the user terminal 100 illustrated in FIG. 24 and the structure of the management server 200b illustrated in FIG. 25 may be employed.

The SDK 2011 is different from the configuration of the SDK 1101 illustrated in FIG. 19 which is described in the first example described above, by including the not-yet-installed information acquisitor 111. Further, the management server 200b is different from the configuration of the management server 200a illustrated in FIG. 20 which is described in the first example described above, by including the not-yet-installed information notifier 248.

In other words, the user terminal 100 may regard all target applications installed in the user terminal 100 as candidates for the target application that is not launched, without acquiring the not-yet-installed information from the management server 200b, and transmit the temporary installation notification information on the target application that is not launched, to the management server 200b. In addition, in this case, the target application 10A may be excluded. Then, the management server 200b specifies the target application that is not managed by the installation information manager 222, as the target application that is not launched, through comparison with the information that the installation information manager 222 manages.

Further, the process illustrated in FIG. 26 may be employed as the process according to the present embodiment.

For example, in step SA173a, the temporary installation notifier 108 of the SDK 2011A of the target application 10A may detect the target application that is installed in the user terminal 100, by using the URL scheme. Here, the temporary installation notifier 108 detects the target application that is launched and the target application that is not launched, among target applications that have been installed in the user terminal 100. Then, in step SA174a, the temporary installation notifier 108 may transmit temporary installation notification information indicating the detected target application, to the management server 200b.

Thus, similarly to the first example described above, the management server 200a can manage the target application that is installed but not launched in the user terminal 100. Further, the management server 200a can transmit the application list of target applications excluding the target application that is installed but not launched in the user terminal 100, to the user terminal 100. Thus, the user terminal 100 can provide the user with the list LT of target applications excluding the target application that is installed but not launched in the user terminal 100.

In addition, also in the second example, among the target applications that are installed in the user terminal 100, similarly, either the old-version target application or the target application that is not launched may be detected and excluded from the application list.

Third Example of Configuration and Process of Sixth Embodiment

For example, the configuration and the process of the fifth embodiment that are described with reference to FIG. 27 and FIG. 28 may be employed as the configuration and the process of the present embodiment.

For example, in the configuration of the reciprocal customer transfer system 500a of the present embodiment, the functional structure that is executed based on the SDK 3011 of the user terminal 100 illustrated in FIG. 27 may be employed. The SDK 3011 is different from the configuration of the SDK 1101 illustrated in FIG. 19 which is described in the first example described above, by not including the temporary installation notifier 108 and the not-yet-installed information acquisitor 111 and by including the list generator 112. In the present embodiment, the list generator 112 may generate an application list in which the target application that is installed but not launched in the user terminal 100 is excluded from among the target applications included in the application list of target applications that the list acquisitor 109 has acquired.

In other words, in the present embodiment, the management server 200 may transmit the target application that is installed but not launched in the user terminal 100, while not excluding the target application from the application list of target applications, to the user terminal 100. Then, the user terminal 100 generates a application list obtained by excluding the target application that is installed but not launched in the user terminal 100 from the application list that is acquired from the management server 200 (regeneration), and may present the list LT of target applications based on the generated application list, to the user.

Further, the process illustrated in FIG. 28 may be applied as a process according to the present embodiment.

For example, in step SA241, the list generator 112 of the SDK 3011A of the target application 10A may confirm the target application that is installed but not launched in the user terminal 100. Specifically, the list generator 112 may specify the target application that is installed but not launched in the user terminal 100 among target applications, by using the URL scheme included in the application list that the list acquisitor 109 has acquired. In other words, the list generator 112 may detect the target application that is installed but not launched in the user terminal 100, among target applications that are included in the application list.

Then, in step SA242, the list generator 112 may delete the target application that is installed but not launched in the user terminal 100 from the application list of target applications. In other words, the list generator 112 may regenerate the application list of target applications, excluding the target application that is installed but not launched in the user terminal 100, which are detected by using the URL scheme, from among the target applications that are included in the application list.

Further, in step SA25a, the display controller 105 of the SDK 3011A may display the list LT of target applications on the display 120, based on the application list of target applications that is generated by the list generator 112.

Thus, the user terminal 100 can present the list LT of target applications excluding the target application that is installed but not launched in the user terminal 100, to the user.

In addition, also in the third example, both the old-version target application and the target application that is not launched are similarly detected and deleted from among the target applications that are installed in the user terminal 100.

In addition, the display example illustrated in FIG. 29 may be applied as a display example of the list LT of target applications in the present embodiment. For example, since "old-version target application" means "target application that is installed but not launched" in the display example of the list LT of target applications illustrated in FIG. 29, similarly, they can be applied.

With Respect to Third to Sixth Embodiments

The third to sixth embodiments described above can be described as follows, but are not limited to the following description.

(1) In the reciprocal customer transfer system 500a, the management server 200a (an example of the management device) includes an application manager 221, an installation notification acquisitor 241 (an example of the first information acquisitor), a temporary installation notification acquisitor 247 (an example of the third information acquisitor), an installation information manager 222, and a list notifier 242 (an example of the second information notifier).

The application manager 221 manages information regarding a plurality of target applications which are management targets. The installation notification acquisitor 241 acquires installation notification information (an example of the first information) which has been transmitted from the user terminal 100, in response to the execution of the target application 10A (an example of the first application) among the plurality of target applications by the user terminal 100. The temporary installation notification acquisitor 247 acquires temporary installation notification information (an example of the third information) indicating that another application (for example, an old-version target application 10B or a target application 10C) which is a target application excluding the target application 10A among the plurality of target applications is installed in the user terminal 100, from the target application 10A. The installation information manager 222 (an example of the installation information manager) manages installation information indicating which target application is installed in the user terminal 100, based on the installation notification information that the installation notification acquisitor 241 has acquired and the temporary installation notification information that the temporary installation notification acquisitor 247 has acquired. Then, the list notifier 242 transmits an application list (second information) including information indicating at least one target application for which installation information corresponding to the user terminal 100 is not managed in the installation information manager 222, among the plurality of target applications, based on the installation information that the installation information manager 222 manages, to the user terminal 100. Here, the installation information corresponding to the user terminal 100 is referred to as, for example, installation notification information that is transmitted from the user terminal 100, in response to the execution of the target application by the user terminal 100.

In addition, the management server 200a (an example of the management device) may at least include an application manager 221, an installation notification acquisitor 241 (an example of the first information acquisitor), a temporary installation notification acquisitor 247 (an example of the third information acquisitor), and a list notifier 242 (an example of the second information notifier). Then, the list notifier 242 may transmit an application list (second information) including information indicating at least one target application for which either the installation notification information (an example of the first information) or the temporary installation notification information (an example of the third information) is not acquired from the user terminal 100, to user terminal 100.

Thus, when the application list indicating target applications that do not acquire the installation notification information corresponding to the user terminal 100 is transmitted to the user terminal 100, the management server 200a of the present embodiment can transmit, to the user terminal 100, the application list of target applications, which is obtained by excluding the target applications that are installed in the user terminal 100 from target applications that do not acquire the installation notification information. Thus, according to the present embodiment, it is possible to present the list LT of proper target applications for which installation is recommended to the user, to the user.

(2) Here, a plurality of target applications includes an old-version target application that is supplied as being installable by the user terminal 100 and as a before-management target by the application manager 221 of the management server 200a, and becomes the management target after supply.

Thus, another application as a target application that is installed in the user terminal 100 other than the target application 10A, for example, may be an old-version target application that is installed in the user terminal 100 as a before-management target by the application manager 221, among a plurality of target applications.

The old-version target application (an example of another application) is a target application that is installed in the user terminal 100, and does not have a function of transmitting installation notification information (an example of the first information) to the management server 200, among a plurality of target applications. In addition, the function of transmitting the installation notification information to the management server 200 is, for example, the function of the SDK 1011 (2011, 3011). In other words, for example, the SDK 1011 (2011, 3011) is not embedded into the old-version target application.

Thus, for example, even if the old-version target application without the SDK 1011 (2011, 3011) embedded therein is installed in the user terminal 100, the management server 200a of the present embodiment can transmit the application list of target applications, excluding the old-version target application, to the user terminal 100. Therefore, according to the present embodiment, it is possible to present the list LT of target applications that the user has not used to the user. In other words, according to the present embodiment, it is possible to present the list LT of appropriate target application for which installation is recommended to the user.

(3) In addition, another application described above may be a target application installed in the user terminal 100, among a plurality of target applications, and does not transmit the installation notification information (an example of the first information) from the user terminal 100 to the management server 200a, in other words, a target application for which the installation notification acquisitor 241 (an example of the first information acquisitor) of the management server 200a does not acquire the installation notification information.

Thus, for example, even if there is a target application that is installed in the user terminal 100 but is not launched, the management server 200a of the present embodiment can transmit the application list of the target applications, excluding the target application that is installed but not launched, to the user terminal 100. Therefore, according to the present embodiment, it is possible to present the list LT of target application, excluding the installed target application. In other words, according to the present embodiment, it is possible to present the list LT of appropriate target application for which installation is recommended to the user.

(4) Further, the management server 200a includes a not-yet-installed information notifier 248 (an example of the fourth information notifier) that transmits, to the user terminal 100, not-yet-installed information (an example of the fourth information) indicating a target application of which installation information (an example of the first information) corresponding to the user terminal 100 is not managed in the installation information manager 222, among a plurality of target applications. It can be said that the not-yet-installed information indicates candidates for the old-version target application that is to be detected in the user terminal 100, or candidates for the target application that is installed but not launched.

Then, the temporary installation notification acquisitor 247 (an example of the third information acquisitor) acquires the temporary installation notification information (an example of the third information) indicating the above-described another application that is installed in the user terminal 100, among the target applications indicated by the not-yet-installed information transmitted from the not-yet-installed information notifier 248, from the target application 10A (an example of the first application).

In addition, the not-yet-installed information notifier 248 may transmit not-yet-installed information (an example of the fourth information) indicating the target application for which the installation notification acquisitor 241 (an example of the first information acquisitor) has not acquired installation notification information (an example of the first information) from the target application 10A (an example of the first application), to the user terminal 100.

Further, the not-yet-installed information notifier 248 may transmit the not-yet-installed information indicating the target application of which both the installation notification information and the temporary installation notification information are not acquired from the target application 10A, among a plurality of target applications, to the user terminal 100.

Thus, since the management server 200a notifies of the candidates for the old-version target application that is to be detected in the user terminal 100, or the candidates for the target application that is installed but not launched, as the not-yet-installed information, it is possible to clarify the target that is to be detected as the old-version target application or the target application that is installed but not launched in the user terminal 100. As a result, it is possible to reduce the process amount for extraction of the old-version target application or the target application that is installed but not launched, as compared to the case of extraction from all target applications. Further, the target application 10A can reduce the process time for extraction of the old-version target application, or the target application that is installed but not launched, as compared to the case of extraction from all target applications.

Further, the management server 200a of the present embodiment can manage the old-version target application installed in the user terminal 100 or the target application that is installed but not launched. As a result, the management server 200a of the present embodiment can transmit, to the user terminal 100, the application list of target applications, excluding the old-version target application installed in the user terminal 100 or the target application that is installed but not launched. As a result, when presenting the target application for which installation is recommended to the user, it is possible to present the list LT of target applications, excluding the old-version target application installed in the user terminal 100 or the target application that is installed but not launched.

(5) Further, the not-yet-installed information notifier 248 (an example of the fourth information notifier) of the management server 200a transmits the not-yet-installed information (an example of the fourth information) to the user terminal 100, based on information regarding the plurality of target applications that is managed by the application manager 221 and the installation information that is managed by the installation information manager 222. Here, the not-yet-installed information indicates target application of which installation information corresponding to the user terminal 100 is not managed in the installation information manager 222, among the plurality of target applications.

Thus, the not-yet-installed information notifier 248 is able to specify the not-yet-installed information indicating target applications of which installation information corresponding to the user terminal 100 is not managed, by comparing all target applications that are extracted with reference to the information that is managed by the application manager 221 that manages information regarding a plurality of target applications which are management targets with the a target application of which installation information corresponding to the user terminal 100 is managed which is extracted with reference to the installation information that is managed by the installation information manager 222. It can be said that the not-yet-installed information indicates candidates for the old-version target application that is to be detected in the user terminal 100, or the target application that is installed but not launched.

In addition, when temporary installation notification information on the old-version target application (an old-version game different from the game C) or the target application that is installed but not launched (a target application different from the game D) is acquired from the target application 10A (an example of the first application), the installation information manager 222 in the management server 200a may associate and manage the target application that transmits the installation notification information or the temporary installation notification information with the user terminal 100 in which the target application is installed. Then, the not-yet-installed information notifier 248 may transmit the not-yet-installed information indicating target applications of which both the installation notification information and the temporary installation notification information are not acquired from the target application 10A among a plurality of target applications, to the target application 10A.

(6) Further, in the reciprocal customer transfer system 500a, the user terminal 100 (an example of the terminal device) is a terminal device capable of communicating with the management server 200a. Here, the management server 200a manages the installation information indicating which target application is installed in the user terminal 100, based on the installation notification information (an example of the first information) indicating that the target application is installed in the user terminal 100 and the temporary installation notification information (an example of another piece of installation notification information, or an example of the third information) indicating that another application, that is a target application other than the target application, is installed in the user terminal 100, from the target applications installed in the user terminal 100 among a plurality of target applications which are management targets.

The user terminal 100 includes an installation notifier 103, a temporary installation notifier 108 (an example of another installation notifier), a list acquisitor 109 (an example of the acquisitor), and a display controller 105. The installation notifier 103 transmits the installation notification information on the target application installed in the user terminal 100 (an example of the terminal device), to the management server 200a. The temporary installation notifier 108 detects another application installed in the user terminal 100, and transmits another piece of installation notification information (for example, temporary installation notification information) on the detected another application to the management server 200a. Here, another application includes both the old-version target application installed in the user terminal 100 and the target application that is installed but not launched. Further, another piece of installation notification information includes both the temporary installation notification information on the old-version target application and the temporary installation notification information on the target application that is installed but not launched. Then, the list acquisitor 109 acquires the application list (an example of the application notification information, an example of the second information) including information on at least one target application of which installation information corresponding to the user terminal 100 is not managed in the management server 200a, from the management server 200a. Then, the display controller 105 displays the list LT (an example of the display information) of the target application based on the application list that the list acquisitor 109 has acquired, on the display 120.

In addition, it can be understood that the list acquisitor 109 acquires the application list including at least target application that does not transmit both the installation notification information and the temporary installation notification information (an example of another piece of installation notification information) from the user terminal 100, from the management server 200*a*.

Thus, for example, when the old-version target application is installed in the user terminal 100, or, there is a target application that is installed in the user terminal 100 but is not launched, the user terminal 100 of the present embodiment acquires the application list of target applications, excluding the old-version target application or the target application that is not launched, and can present the list LT of target applications based on the acquired application list. Therefore, the user terminal 100 of the present embodiment can transmit the application list of target applications that are not installed in the user terminal 100, to the user terminal 100, regardless of the version of the target application. As a result, when presenting the target application for which installation is recommended to the user, it is possible to present the list LT of target applications that are not installed in the user terminal 100, to the user. In other words, according to the present embodiment, it is possible to present the list LT of appropriate target application for which installation is recommended to the user.

(7) Further, the user terminal 100 includes a not-yet-installed information acquisitor 111 that acquires not-yet-installed information indicating a target application of which installation information corresponding to the user terminal 100 (an example of the terminal device) is not managed in the management server 200*a*, from the management server 200*a*.

Then, the temporary installation notifier 108 transmits the temporary installation notification information on another application (for example, an old-version target application or a target application that is installed but not launched) installed in the user terminal 100 to the management server 200*a*, among target applications indicated by the not-yet-installed information that the not-yet-installed information acquisitor 111 has acquired.

In addition, the user terminal 100 may include the not-yet-installed information acquisitor 111 that acquires, from the management server 200*a*, the not-yet-installed information indicating a target application of which installation notification information is not transmitted from the user terminal 100 (an example of the terminal device), among a plurality of target applications.

Further, the not-yet-installed information acquisitor 111 may acquire, from the management server 200*a*, the not-yet-installed information indicating a target application of which both the installation notification information and the temporary installation notification information (an example of another piece of installation notification information) are not transmitted from the user terminal 100, among a plurality of target applications.

Thus, since the target application 10A of the user terminal 100 extracts the old-version target application that is installed in the user terminal 100 or the target application that is installed but not launched for example, from the acquired not-yet-installed information, it is possible to reduce the process amount for extraction of the old-version target application or the target application that is installed but not launched, as compared to the case of extraction from all target applications. Further, the user terminal 100 of the present embodiment can reduce the process time for extraction of the old-version target application or target application that is installed but not launched, as compared to the case of extraction from all target applications.

(8) The temporary installation notifier 108 (an example of another installation notifier) detects another application (for example, the old-version target application or the target application that is installed but not launched) that is installed in the user terminal 100, among target applications indicated by the not-yet-installed information, by using a function included in the user terminal 100 (an example of the terminal device).

Here, the function included in the user terminal 100 is, for example, a function of an OS of the user terminal 100, which detects a target application installed in the user terminal 100, by using the URL scheme corresponding to the target application. For example, the not-yet-installed information acquisitor 111 acquires the URL scheme, included in the not-yet-installed information, corresponding to the target application indicated by the not-yet-installed information, from the management server 200*a*. Then, the temporary installation notifier 108 detects another application installed in the user terminal 100, among target applications indicated by the not-yet-installed information, by using the URL scheme that the not-yet-installed information acquisitor 111 has acquired, by the function of an OS of the user terminal 100.

Thus, the user terminal 100 can detect another application (for example, the old-version target application or the target application that is installed but not launched) that is installed in the user terminal 100, by simple means for determining whether or not the URL scheme can be opened, for example, in the user terminal 100.

In addition, the function included in the user terminal 100 is not limited to the function of detecting the target application installed in the user terminal 100, by using the URL scheme. For example, when it is possible to acquire information indicating the target application of which the OS is installed in the user terminal 100, without using the URL scheme, the temporary installation notifier 108 may detect another application which is installed in the user terminal 100, among target applications indicated by the not-yet-installed information that the not-yet-installed information acquisitor 111 has acquired, by acquiring information indicating the installed target application.

(9) Further, the temporary installation notifier 108 (an example of another installation notifier) of the user terminal 100 may transmit the temporary installation notification information (an example of another piece of installation notification information) to the management server 200*b*, without acquiring the not-yet-installed information from the management server 200*b*.

For example, the temporary installation notifier 108 detects the target application and old-version target application (an example of the target application installed in the terminal device before it becomes a management target) that is installed in the user terminal 100 (an example of the terminal device). Then, the temporary installation notifier 108 transmits the temporary installation notification information on the detected target application, as the candidates for another application (for example, the old-version target application or the target application that is installed but not launched) to the management server 200*b*.

Thus, for example, as the third embodiment, the management server 200*b* can extract the old-version target application or the target application that is installed but not launched from among applications that are installed in the user terminal 100, without transmitting the not-yet-installed information which is candidates for the old-version target application or the target application that is installed but not launched, to the user terminal 100, and can add the extracted one as a management target.

(10) The application manager 221 of the management server 200*a* (200*b*) manages inter-application filter information (an example of the first listing prohibition information) in which a listing-prohibited-application that sets listing prohibition based on the application list (an example of the second information) and a listed-prohibited-application in which listing is prohibited, based on the application list of the listing-prohibited-application are associated with each other. When there is inter-application filter information in which the target application 10A (an example of the first application) is set in the listed-prohibited-application, the list notifier 242 (an example of the second information notifier) of the management server 200a (200b) transmits remaining information obtained by excluding information indicated by the listing-prohibited-application from the application list, to the user terminal 100, with reference to the inter-application filter information managed by the application manager 221.

Further, when there is inter-application filter information in which the target application 10A (an example of the first application) is set in the listing-prohibited-application, the list notifier 242 (an example of the second information notifier) transmits remaining information obtained by excluding information indicating the listed-prohibited-application from the application list to the user terminal 100, with reference to the inter-application filter information (an example of the first listing prohibition information) that the application manager 221 manages.

Thus, in the reciprocal customer transfer system 500a, when a target application for which installation is recommended to the user is presented, it is possible to set a relationship between target applications for which installation is not intended to be recommended, in the management server 200a. For example, if there is a target application in which a rating (an age limit) has been set, it is possible to recommend the target application 10 in which a rating has been set, from the target application 10A in which a rating has not been set.

(11) Further, the management server 200a (200b) may include a reward processor 245. Then, when a predetermined reward granting condition is satisfied, in the customer transfer destination application 20 (an example of the second application) described in the first embodiment among one or a plurality of target applications indicated by the application list (an example of the second information), the reward processor 245 may perform a reward granting process of granting a reward to the user using the user terminal 100. Here, the customer transfer destination application 20 described in the first embodiment is, for example, a target application selected from among one or a plurality of target applications indicated by the application list (an example of the second information).

Thus, in the reciprocal customer transfer system 500a in which if the target application of the customer transfer destination that the user has not used is installed, a reward is granted to the target application of the customer transfer source, when the target application for which installation is recommended to the user is presented, it is possible to transmit an application list excluding the old-version target application or the target application that is installed but not launched, to the user terminal 100.

(12) Further, the management server 200a (200b) may include the customer transfer information acquisitor 243 that acquires the customer transfer information indicating the customer transfer to the customer transfer destination application 20 (an example of the second application) and the customer transfer information manager 223 that manages the customer transfer information that the customer transfer information acquisitor 243 has acquired, which are described in the first embodiment. Here, the customer transfer information acquisitor 243 may acquire the customer transfer information on the customer transfer destination application 20 from, for example, the target application 10A. Then, when a predetermined reward granting condition that has been set in the customer transfer destination application 20 is satisfied, based on a condition that the customer transfer information corresponding to the customer transfer destination application 20 is managed by the customer transfer information manager 223, the reward processor 245 may perform the reward granting process.

Thus, when the target application has been installed without depending on the present system, there is no record of the customer transfer information, such that the reciprocal customer transfer system 500a can set the target application so as not to be a target for the reward granting process.

Here, a case where a predetermined reward granting condition is satisfied may be a case where the customer transfer destination application 20 (an example of the second application) has been executed or has been in a state executable by the user terminal 100. Further, a case where a predetermined reward granting condition is satisfied may be a case where the customer transfer destination application 20 has been executed or has been in a state executable by the user terminal 100, and a predetermined achievement is reached in the customer transfer destination application 20. In this manner, it is possible to set arbitrary reward granting condition in the reciprocal customer transfer system 500a.

Further, the application manager 221 of the management server 200a (200b) may manage information on a predetermined period that has been set for a plurality of specific applications among a plurality of target applications. In this case, a case where a predetermined reward granting condition is satisfied may be a case where the customer transfer destination application 20 (an example of the second application) is a specific application and the customer transfer destination application 20 has been executed by the user terminal 100 or has been in a state executable within the predetermined period. Further, the case where the predetermined reward granting condition is satisfied may be a case where the customer transfer destination application 20 is a specific application, the customer transfer destination application 20 has been executed by the user terminal 100 within a predetermined period or has been in an executable state, and a predetermined achievement is reached in the customer transfer destination application 20. In this manner, it is possible to set a specific application that performs a campaign among the plurality of target applications, as a reward granted target.

(13) Further, the user terminal 100 may include the reward granting notifier 107. When a predetermined reward granting condition is satisfied, in the target application installed in the user terminal 100 (an example of the terminal device), the reward granting notifier 107 transmits the reward granting notification information indicating that the predetermined reward granting condition is satisfied, to the management server 200a (200b). Here, when a predetermined reward granting condition is satisfied, in the target application among one or a plurality of target applications indicated by the application list (an example of the second information or an example of the application notification information), the management server 200a (200b) performs a reward granting process of granting a reward in the target application.

In addition, the target application among one or a plurality of target applications indicated by the application list (an example of the application notification information) is a target application that is selected from the list LT of target applications (an example of the display information) indicated based on the application list, for example, in the user terminal 100.

In this manner, in the reciprocal customer transfer system 500a, since the user terminal 100 transmits the reward granting notification information to the management server 200a (200b) when a predetermined reward granting condition is satisfied, if for example, a target application selected from the application list (for example, the customer transfer destination application 20 of the first embodiment) is installed and used, a reward is to be granted to the user (for example, user X) using the target application.

In addition, the case where a predetermined reward granting condition is satisfied may be the case where a predetermined achievement is determined to be reached in the target application installed in the user terminal 100 (an example of the terminal device).

Further, a plurality of predetermined reward granting conditions are provided, and the reward granting notifier 107 may transmit the reward granting notification information to the management server 200a (200b), respectively, based on the fact that each of the plurality of reward granting conditions is satisfied.

(14) Further, as described in the fifth embodiment, the user terminal 100 may generate the list LT of target applications to be presented to the user (for example, a screen list-displaying information indicating the target application), for example, based on the application list acquired from the management server 200 of the first embodiment.

For example, in the reciprocal customer transfer system 500a, the user terminal 100 (an example of the terminal device) is a terminal device capable of communicating with the management server 200. Here, the management server 200 manages the installation information on the target application installed in the user terminal 100, based on the installation notification information indicating the installation of the target application installed in the user terminal 100, for example, among a plurality of target applications which are management targets. In addition, the installation notification information is an example of the first information, and as long as the installation notification information is information that is transmitted from the user terminal 100 to the management server 200 in response to the execution of the target application installed in the user terminal 100, the installation notification information is not particularly limited.

The user terminal 100 includes an installation notifier 103, an installation notifier 103, a list acquisitor 109 (an example of the acquisitor), a list generator 112 (an example of the generator), and a display controller 105. The installation notifier 103 transmits the installation notification information on the target application installed in the user terminal 100 (an example of the terminal device) to the management server 200. The list acquisitor 109 acquires an application list (an example of the application notification information, or an example of the second information) including information indicating at least one target application of which installation information corresponding to the user terminal 100 is not managed in the management server 200, from the management server 200. The list generator 112 generates the application list (an example of the presentation information) based on the application list that the list acquisitor 109 has acquired. Then, the display controller 105 displays the list LT of target applications (an example of display information) based on the application list (an example of presentation information) that is generated by the list generator 112, on the display 120.

Thus, the user terminal 100 generates the list LT of target applications excluding the target application (in other words, the target application that is executed by the user terminal 100) of which installation information corresponding to the user terminal 100 is managed by the management server 200, and can present the list LT to the user.

Further, the list generator 112 (an example of the generator) of the user terminal 100 may detect whether or not the target application indicated by the application list that the list acquisitor 109 has acquired is another application (for example, the old-version target application or the target application that is installed but not launched) that is installed in the user terminal 100, by the function included in the user terminal 100.

Here, the function included in the user terminal 100 is, for example, a function of an OS of the user terminal 100, which detects a target application installed in the user terminal 100, by using the URL scheme corresponding to the target application. In addition, the function included in the user terminal 100 is not limited to the function of detecting the target application installed in the user terminal 100 using the URL scheme, and the user terminal 100 may acquire information indicating the target application that is installed in the user terminal 100, without using the URL scheme. In addition, another target application installed in the user terminal 100 may include another target application that is installed in the user terminal 100 and launched, in addition to the old-version target application or the target application that is installed but not launched.

Then, the list generator 112 may regenerate an application list (an example of presentation information) excluding above-described another target application (for example, the old-version target application or the target application that is installed but not launched), among target applications indicated by the application list.

Thus, the user terminal 100 can present the list LT of target applications excluding the target application that is installed in the user terminal 100. For example, even if the old-version target application (in other words, the target application of which installation information is not managed by the management server 200) is installed in the user terminal 100, the user terminal 100 can present the list LT of target applications excluding the old-version target application. Further, even if there is a target application that is installed but not launched (in other words, the target application of which installation information is managed by the management server 200) in the user terminal 100, the user terminal 100 can present the list LT of target applications excluding the target application that is not launched, to the user.

Further, the list generator 112 (an example of the generator) of the user terminal 100 may regenerate an application list (an example of the presentation information) by which the user can distinguish another target application (for example, the old-version target application or the target application that is installed but not launched) installed in the user terminal 100, among target applications indicated by the application list, based on a result determined by using the function included in the user terminal 100.

Thus, the user terminal 100 can present, to the user, the list LT of target applications in which the target application installed in the user terminal 100 is distinguishable from among target applications (target applications of which installation information is managed in the management server 200) indicated by the application list acquired from the management server 200. For example, even if the old-version target application (in other words, the target applications of which installation information is managed in the management server 200) is installed in the user terminal 100, the user terminal 100 can present the list LT of target applications in which the old-version target application is distinguishable, to the user. Further, even if there is a target application that is installed in the user terminal 100 but not launched (in other words, the target applications of which installation information is not managed in the management server 200), it is possible to present the list LT of target applications in which the target application that is not launched is distinguishable, to the user. Therefore, the user terminal 100 can present information indicating a target application which has not been installed in the user terminal 100 (in other words, candidates for target applications which are customer transfer destinations) in a distinguishable manner.

(15) Further, an application list (an example of the second information, or an example of the application notification information) that the list acquisitor 109 (an example of the acquisitor) of the user terminal 100 has acquired may include information indicating at least one target application of which installation information is managed in the management server 200, and distinction information for distinguishing a target application of which installation information is not managed and a target application of which installation information is managed.

In other words, information indicating at least one target application of which installation information corresponding to the user terminal 100 (an example of the terminal device) is not managed, information indicating at least one target application of which installation information is managed, and distinction information for distinguishing a target application of which installation information is not managed and a target application of which installation information is managed, in the management server 200, may be included in the application list (an example of the second information, or an example of the application notification information) that the list acquisitor 109 has acquired.

Then, the list generator 112 (an example of the generator) may regenerate an application list (an example of the presentation information) in which a target application of which installation information is not managed can be distinguished from at least a target application of which installation information is managed, included in the acquired application list, based on distinction information included in the application list that the list acquisitor 109 has acquired.

Therefore, the user terminal 100 can present the list LT of target applications in which at least one target application of which installation information is not managed (for example, the target application that is not installed in the user terminal 100) and at least one target application of which installation information is managed (for example, the target application that is installed in the user terminal 100 and launched) can be distinguished.

For example, when generating an application list excluding another target application installed in the user terminal 100 (for example, the old-version target application or the target application that is installed but not launched) from among the target applications indicated by the application list, the list generator 112 may generate the application list such that the target application of which installation information is managed can be distinguished from at least the target application of which installation information is not managed.

Thus, in a case where the old-version target application is installed, or there is a target application that is installed but not launched, the user terminal 100 can present, to the user, the list LT of target applications in which the target applications (in other words, the target application that is not installed in the user terminal 100) excluding the old-version target application or the target application that is installed but not launched from at least one target application of which installation information is not managed and at least one target application of which installation information is managed (for example, the target application that is installed in the user terminal 100 and launched) can be distinguished. Therefore, the user terminal 100 can present information indicating a target application which has not been installed in the user terminal 100 (in other words, candidates for target applications which are customer transfer destinations).

Further, when generating an application list in which another target application that is installed in the user terminal 100 (for example, the old-version target application or the target application that is installed but not launched) can be distinguished from target applications indicated by the application list, the list generator 112 may generate the application list such that the target application of which installation information is managed can be distinguished from at least the target application of which installation information is not managed.

Thus, in a case where the old-version target application is installed, or there is a target application that is installed but not launched, the user terminal 100 can present, to the user, the list LT of target applications in which the old-version target application or the target application that is installed but not launched can be distinguished, and at least one target application of which installation information is managed (for example, the target application that is installed in the user terminal 100 and launched) can be distinguished, from at least one target application of which installation information is not managed. Therefore, the user terminal 100 can present, to the user, information indicating a target application which has not been installed in the user terminal 100 (in other words, candidates for target applications which are customer transfer destinations).

In addition, since the old-version target application or the target application that is installed but not launched and at least one target application of which installation information is managed (for example, the target application that is installed in the user terminal 100 and launched) are not a target application which has not been installed in the user terminal 100 (in other words, candidates for target applications which are customer transfer destinations), they may not be presented in a distinguishable manner from each other.

In addition, the list notifier 242 (an example of the second information notifier) of the management server 200*a* (200*b*) may transmit, to the user terminal 100, an application list (an example of the second information, or an example of the application notification information) including information including at least one target application of which installation information corresponding to the user terminal 100 is not managed in the installation information manager 222, information including at least one target application of which installation information corresponding to the user terminal 100 is managed in the installation information manager 222, and distinction information for distinguishing a target application of which installation information is not managed and a target application of which installation information is managed.

In other words, the application list (an example of the second information, or an example of the application notification information) that the list acquisitor 109 (an example of the acquisitor) of the user terminal 100 has acquired may include information indicating at least one target application of which installation information corresponding to the user terminal 100 (an example of the terminal device) is not managed and information indicating at least one target application of which installation information is managed, in the management server 200a (200b), and distinction information for distinguishing a target application of which installation information is not managed and a target application of which installation information is managed.

In this manner, the user terminal 100 presents the list LT of target applications to the user such that the user can distinguish (discriminate) the target application of which installation information is not managed by the management server 200a (200b) among target applications indicated by the application list, by transmitting, to the user terminal 100, distinction information for distinguishing whether or not the management server 200a (200b) manages the installation information corresponding to the user terminal 100.

(16) In addition, in the reciprocal customer transfer system 500a, the management server 200a (an example of the management device) may be configured to include an application manager 221, an information acquisitor, an installation information manager 222 (installation information manager), and a list notifier 242 (an example of the second information notifier).

In this configuration, the application manager 221 manages the information regarding a plurality of target applications which are management targets.

The information acquisitor acquires information indicating the target application installed in the user terminal 100, among a plurality of target applications, from the user terminal 100. Here, the information acquisitor may be configured to acquire information indicating the application installed in the user terminal 100, which is detected in the user terminal 100, and may be a method such as a detection method in the user terminal 100. For example, the detection method by the user terminal 100 may be a method of detecting information indicating the application installed in the user terminal 100, by the function of an OS of the user terminal 100, or a method of performing detection based on the following recording, when there are installation recording or execution recording of target applications installed in the user terminal 100 (for example, recording by a resident application that records the process of the user terminal 100, recording using a Cookie, or the like). Further, the information acquisitor may be the installation notification acquisitor 241 (an example of the first information acquisitor) or the temporary installation notification acquisitor 247 (an example of the third information acquisitor).

Further, the installation information manager 222 manages installation information indicating which target application is installed in the user terminal 100, based on information indicating a target application installed in the user terminal 100, that is acquired by the information acquisitor described above. Then, the list notifier 242 transmits, to the user terminal 100, the application list (an example of the second information) including information indicating at least one target application of which installation information corresponding to the user terminal 100 is not managed in the installation information manager 222, among a plurality of target applications, based on the installation information that the installation information manager 222 manages.

In this manner, since the management server 200a transmits the application list indicating at least one target application that does not manage the installation information corresponding to the user terminal 100, to the user terminal 100, it is possible to notify the user terminal 100 of the target application that is not installed in the user terminal 100.

Seventh Embodiment

Next, a seventh embodiment of the present invention will be described. First, the summary of a reciprocal customer transfer system 500b of the present embodiment will be described.

In the reciprocal customer transfer system 500 (500a) described above, the management server 200 (200a, 200b) manages the installed target application in association with the reward user ID (RewardUID) associated with the user terminal 100. Therefore, if the same user uses separate user terminals 100, the user is determined to separate users. For example, in a case where the user changes the model of the user terminal 100, in the reciprocal customer transfer system 500 (500a) described above, although a target application was used in the user terminal 100 before model change, the target application is presented to the user, for example, as the target application which is a reward granting target, in the user terminal 100 after model change. In this manner, in the reciprocal customer transfer system 500 (500a) described above, in a case where the model of the user terminal 100 is changed or the same user uses a plurality of user terminals 100, a target application which is not a target for which installation is recommended to the user may be presented to the user, as a target for which installation is recommended.

Thus, in the present embodiment, a description will be given regarding an embodiment of the reciprocal customer transfer system 500b which presents a list LT of appropriate target applications, excluding a target application which is not a target for which installation is recommended to the user, even in a case where the model of the user terminal 100 is changed or the same user uses a plurality of user terminals 100.

[Summary of Reciprocal Customer Transfer System According to a Seventh Embodiment]

Figure 31:
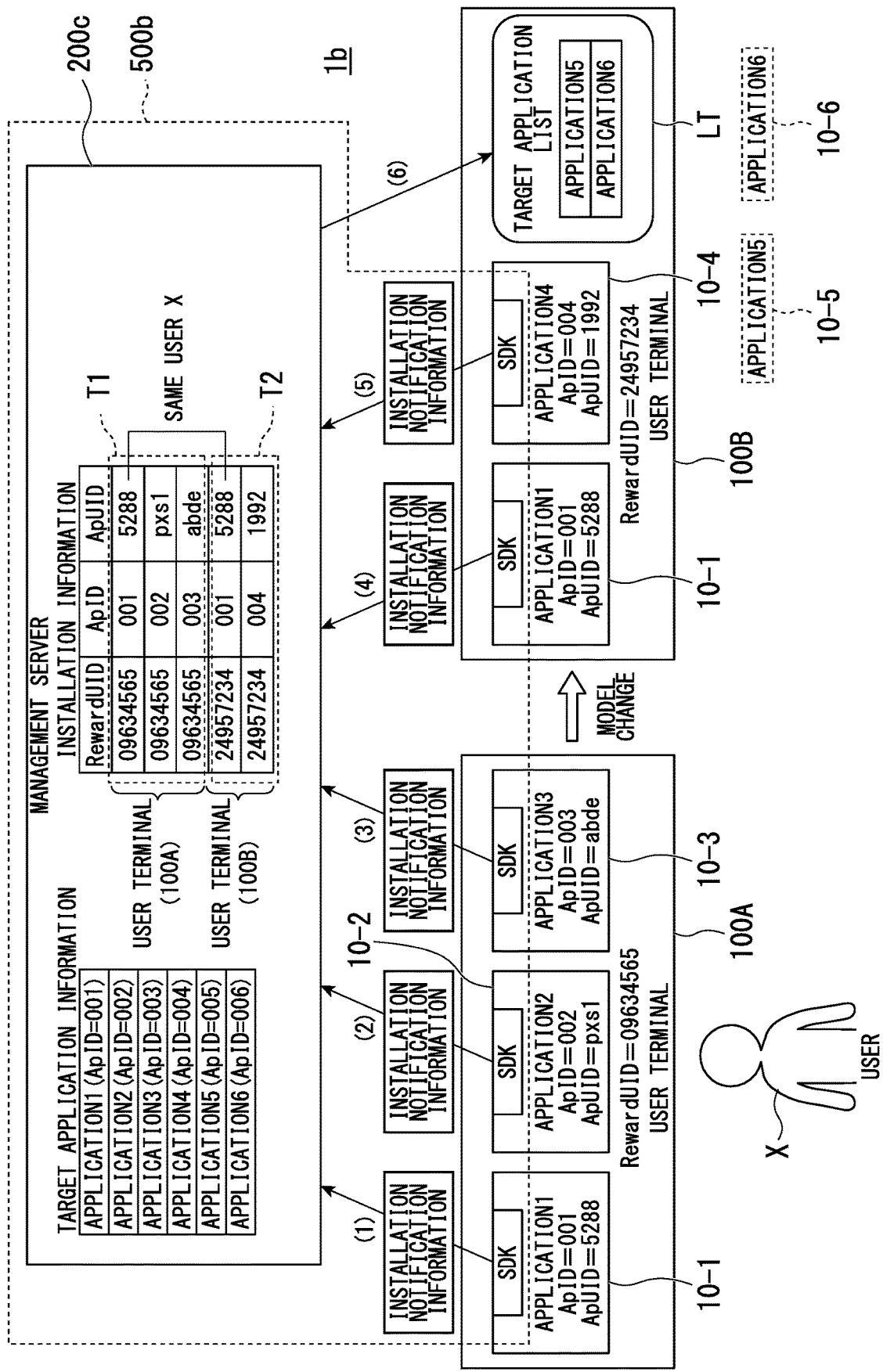
FIG. 31 is a simplified drawing describing a reciprocal customer transfer system according to a seventh embodiment.

FIG. 31 is a diagram illustrating a summary of a reciprocal customer transfer system 500b of the seventh embodiment.

In FIG. 31, a network system 1b according to the present embodiment includes a management server 200c and a user terminal 100, similarly to the first to fifth embodiments. In addition, in FIG. 31, the user terminal 100A represents the user terminal 100 before the user X changes a model, and has target applications 10-1 to 10-3 (application 1 to application 3) installed therein. Further, the user terminal 100B represents the user terminal 100 after the user X changes a model, and has a target application 10-1 (application 1) and a target application 10-4 (application 4) installed therein. In addition, target applications that have not been installed in the user terminal 100A and the user terminal 100B will be described as a target application 10-5 (application 5) and a target application 10-6 (application 6). In addition, when there is no particular distinction, the target application 10-5 and the target application 10-6 will be described as the target application 10 by omitting "-1" and "-2".

Further, in FIG. 31, the management server 200c, as target application information on the reciprocal customer transfer system 500b, stores "application 1 (ApID=001)" to "application 6 (ApID=006)".

Here, with reference to FIG. 31, the summary of the reciprocal customer transfer system 500b of the present embodiment will be described as an example in which the user X changes a model from the user terminal 100A to the user terminal 100B.

First, when each target application is installed and first launched, the user terminal 100A before model change transmits installation notification information corresponding to each target application, to the management server 200c, as illustrated in (1) to (3). In addition, the installation notification information includes, for example, a reward user ID (RewardUID), an application ID (ApID), and an application user ID (ApUID).

The management server 200c acquires the installation notification information corresponding to each target application, and stores the installation notification information as installation information. Here, through (1) to (3), the installation information T1 corresponding to the user terminal 100A is stored in the management server 200c.

Next, it is assumed that the user X changes the model from the user terminal 100A to the user terminal 100B. When each target application is installed and first launched, the user terminal 100B after model change transmits installation notification information corresponding to each target application, to the management server 200c, as illustrated in (4) and (5). Thus, installation information T2 corresponding to the user terminal 100B is stored in the management server 200c.

For example, when the management server 200c acquires list request notification information from a target application 10-1 installed in the user terminal 100B, the management server 200c determines whether or not the application user ID (ApUID) that has been included in the installation information T2 corresponding to the user terminal 100B is included in the installation information corresponding to other user terminal 100, and when the application user ID (ApUID) is included in the installation information corresponding to other user terminal 100, it is determined that the user terminal 100B is the user terminal 100 of the same user X. Here, since "5288" of the application user ID (ApUID) included in the installation information T2 is included in the installation information T1 corresponding to the user terminal 100A, the management server 200c determines that the user terminal 100A and the user terminal 100B are the user terminal 100 of the same user X, and associates "09634565" with "24957234", of the reward user ID (RewardUID). Thus, the installation information T1 and the installation information T2 are associated with each other. Then, the management server 200c generates an application list of target applications for which installation is recommended to the user and the generated application list of target applications to the user terminal 100B, for example, as illustrated in (6), based on the installation information T1 and the installation information T2 which are associated with each other. In this example, since "application 5 (ApID=005)" and "application 6 (ApID=006)" among target applications stored as target application information are not included in the installation information T1 or the installation information T2, the management server 200c transmits an application list of target applications indicating "application 5 (ApID=005)" and "application 6 (ApID=006)" to the user terminal 100B.

As a result, the user terminal 100B displays the list LT of target applications.

In this manner, in the present embodiment, the management server 200c associate and manages the reward user IDs (RewardUID) of the separate user terminals 100, based on the application user ID (ApUID).

The reciprocal customer transfer system 500b according to the present embodiment will be described in detail.

In addition, since the configuration of the network system 1b and the configuration of the user terminal 100, according to the seventh embodiment of the present invention are the same as the configuration of the network system 1 of the first embodiment illustrated in FIG. 2 and the configuration of the user terminal 100 of the first embodiment illustrated in FIG. 3, the description thereof will be omitted herein. Further, since the functional structure of the user terminal 100 (SDK 11) of the present embodiment is the same as in the first embodiment illustrated in FIG. 5, the description thereof will be omitted herein.

[Configuration of Management Server 200c According to Seventh Embodiment]

The details of the configuration of the management server 200c according to the present embodiment will be described with reference to FIG. 32.

Figure 32:
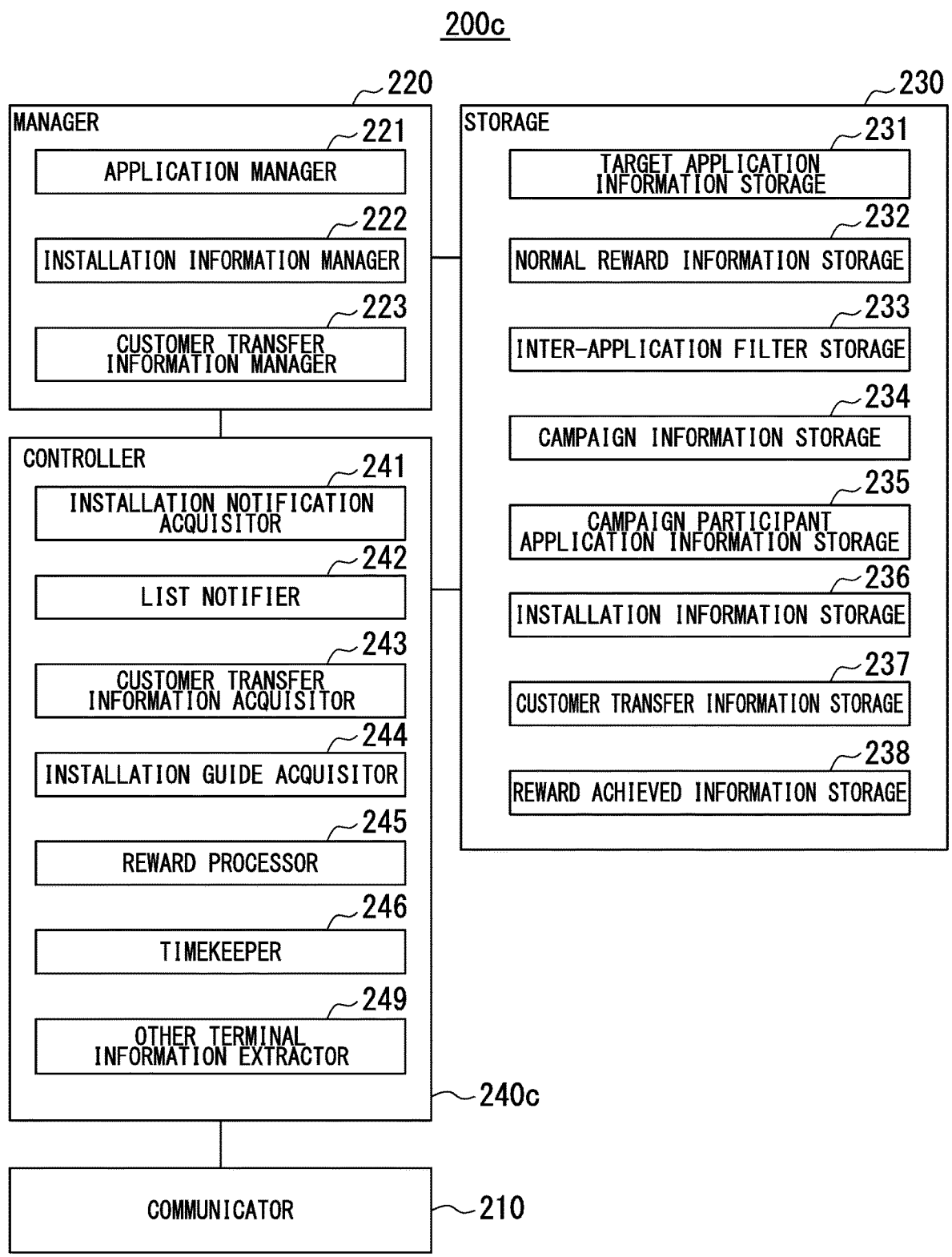
FIG. 32 shows an example of the configuration of a management server according to the seventh embodiment.

FIG. 32 is a configuration diagram illustrating an example of a configuration of the management server 200c according to the present embodiment. The management server 200c includes, as described with reference to FIG. 4, a communicator 210, a manager 220, a storage 230, and a controller 240c. In addition, in FIG. 32, the same components as in FIG. 6 are denoted by the same reference numerals, and a description thereof is omitted here.

Here, installation information stored in the installation information storage 236 will be described with reference to FIG. 33.

FIG. 33 is a diagram illustrating an example of information stored in the installation information storage 236 according to the present embodiment, and is the same as the installation information illustrated in FIG. 31.

In FIG. 33, the installation information storage 236 stores installation information in which a reward user ID (RewardUID), an application ID (ApID), and an application user ID (ApUID) are associated. Further, the installation information T1 corresponds to the user terminal 100A before model change, and the installation information T2 corresponds to the user terminal 100B after model change.

If returning to FIG. 32, the controller 240c includes an installation notification acquisitor 241, a list notifier 242, a customer transfer information acquisitor 243, an installation guide acquisitor 244, a reward processor 245, a timekeeper 246, and other terminal information extractor 249.

In addition, the controller 240c of the present embodiment is different from the first and second embodiments by including another terminal information extractor 249.

In addition, the installation information manager 222 of the present embodiment associates and manages the reward user ID (an example of the unique identification information) specifying the user terminal 100 in which the target application (an example of the first application) that has transmitted the installation notification information is installed and the application ID (an example of the identification information) of the target application, and associates and manages the reward user ID and the association information. Here, the association information is information for associating the user terminals 100 of the same user with each other. Here, for example, the application user ID is used as the association information, based on the fact that the same application user ID is set in the same application of the same user, even in different user terminals 100 (the user terminal 100A and the user terminal 100B). In the present embodiment, the installation information manager 222 manages the reward user ID and the application user ID of a target application in association with each other.

Further, the installation notification information includes, for example, the reward user ID, and the application ID and the application user ID of the target application. Therefore, for example, as illustrated in FIG. 33, the installation information manager 222 stores the reward user ID, the application ID, and the application user ID in the installation information storage 236, in association with each other, and associates and manages the reward user ID, the application ID, and the application user ID.

The other terminal information extractor 249 extracts other reward user ID associated with the reward user ID, by using the association information that is associated with the reward user ID for specifying the user terminal 100 in which the target application that has transmitted the installation notification information is installed, by querying the installation information manager 222 about the installation notification information.

As described above, it is possible to associate different reward user IDs, by using the fact that the same application user ID is set in the same application that is installed in both user terminals 100 (the user terminal 100A and the user terminal 100B) which are different from each other. Thus, the other terminal information extractor 249 uses the application user ID as an example of the user information on the target application, as association information, as a first extraction method.

Specifically, the other terminal information extractor 249 extracts other associated reward user IDs, other than the reward user ID, associated with the application user ID of the target application that is associated with the reward user ID specifying the user terminal 100 in which a target application is installed. In addition, if the application user IDs are unique from each other between a plurality of target applications corresponding to the reciprocal customer transfer system 500b and it is guaranteed that the application user ID of a certain target application is not used in other target applications, only the application user ID may be used as association information, but if the uniqueness is not guaranteed, a set of the application ID and the application user ID of the target application may be used as the association information. In other words, the other terminal information extractor 249 extracts the application user ID matching a set of the application ID and the application user ID corresponding to the target application that is installed in the user terminal 100, or a set of the application ID and the application user ID, from among installation information pieces stored in the installation information storage 236, and extracts other reward user ID (the reward user ID other than that of the user terminal 100) associated with the extracted application user ID.

In this manner, the other terminal information extractor 249 uses the application ID of the target application associated with the reward user ID specifying the user terminal 100 in which the target application is installed, or a set of the application ID and the application user ID, as the association information.

However, the same application may not be used in the different user terminals 100 (the user terminal 100A and the user terminal 100B). For example, the target application (for example, a target application 10-4) that was not used in the old terminal (the user terminal 100A) may be used in the new terminal (the user terminal 100B). In this case, it is difficult to use association using the application user ID of the target application. Thus, the application user ID of other target application (for example, a target application 10-1) installed in the same user terminal 100 (the user terminal 100B) is intended to be used. In other words, the other terminal information extractor 249 may use the application user ID of the other target application (for example, a target application 10-1) associated with the same reward user ID as the application user ID of the target application (for example, the target application 10-4), as the association information, as a second extraction method. Specifically, the other terminal information extractor 249 extracts the application user ID of other target application associated with the same reward user ID as the application user ID of the target application, from among the installation information pieces stored in the installation information storage 236. Further, the other terminal information extractor 249 extracts the application user ID matching the application user ID of the extracted other target application, from among the installation information pieces stored in the installation information storage 236, and extracts other reward user ID (a reward user ID other than that of the user terminal 100) associated with the extracted application user ID. Even in this example, not only the application ID but also a set of the application ID and the application user ID may be used.

In this manner, the other terminal information extractor 249 uses the application user ID of other target application associated with the same reward user ID as the application user ID of the target application, or a set of the application ID and the application user ID of other target application associated with the same reward user ID as a set of the application ID and the application user ID of a target application, as the association information.

In addition, when it was not able to extract other reward user ID (reward user ID other than that of the user terminal 100) by the first extraction method, the other terminal information extractor 249 may perform extraction by a second extraction method. Further, only the first extraction method may be used. In addition, when only the first extraction method is used, the target application that has been installed in the old terminal (user terminal 100A) may be included in the list LT of target applications that the user has not used, present to the user.

In addition, the list notifier 242 of the present embodiment transmits an application list of at least one target application of which installation notification information is not acquired from among the target applications 10 that are installed in the user terminal 100 having a target application installed therein or in other user terminal 100 that is specified by the other reward user ID extracted by the other terminal information extractor 249, to the user terminal 100. In other words, the list notifier 242 transmits an application list obtained by excluding the target application installed in the user terminal 100 after model change (the user terminal 100B), the target application installed in the user terminal 100 before model change (the user terminal 100A) from the target applications managed by the application manager 221, to the user terminal 100.

[Details of Reciprocal Customer Transfer Process Operation According to Seventh Embodiment]

The operation of the reciprocal customer transfer system 500b of the present embodiment will be described.

In addition, since the basic operation of the reciprocal customer transfer system 500b of the present embodiment is the same as in the first embodiment illustrated in FIG. 14 and FIG. 15, here, the operation of the reciprocal customer transfer system 500b will be described focusing a process of generating an application list of target applications of the present embodiment, with reference to FIG. 34. In addition, an example described herein will be described assuming the same state as in FIG. 31. Further, an example described herein will be described assuming that the installation information stored in the installation information storage 236 is in a state illustrated in FIG. 32.

In addition, here, the process on the target application (for example, target application 10-1) side installed in the user terminal 100 (user terminal 100B) will be described with reference to FIG. 34. Further, in the process illustrated in FIG. 34, a description will be made assuming the target application includes the SDK 11 of the first and second embodiments.

Figure 34:
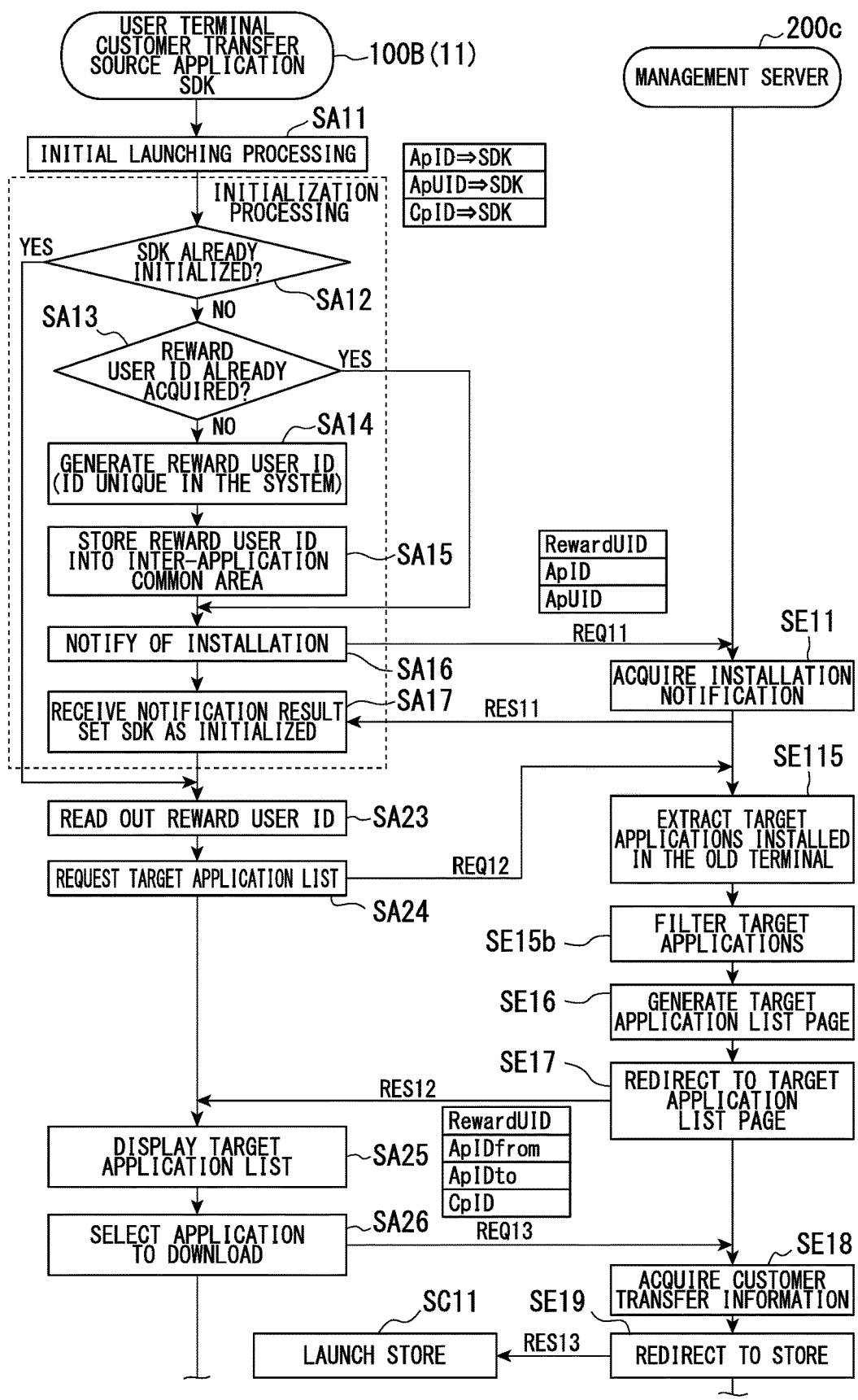
FIG. 34 is a flowchart showing an example of the operation of a reciprocal customer transfer system according to the seventh embodiment.

In FIG. 34, since the process from step SA11 to step SA24, and the process of step SE11 is the same as the first embodiment illustrated in FIG. 14, the description thereof will be omitted herein.

If the list requester 104 transmits the list request notification information to the management server 200c (REQ12) in step SA24, the other terminal information extractor 249 of the management server 200c extracts the target application that has been installed in the old terminal (user terminal 100A) in step SE115. In addition, the list request notification information includes the application ID of at least target application and the application user ID of the reward user ID corresponding to the user terminal 100B.

For example, when the management server 200c acquires the list request notification information from the target application 10-1 installed in the user terminal 100E illustrated in FIG. 31, according to the above-described first extraction method, the other terminal information extractor 249 extracts the target application that has been installed in the user terminal 100A, as follows.

The other terminal information extractor 249 acquires the reward user ID ("24957234") included in the list request notification information and the application ID ("001"). Next, a set of the application user ID ("5288") corresponding to the application ID ("001") associated with the reward user ID ("24957234") and the application ID ("001") is acquired. The other terminal information extractor 249 extracts the installation information associated with other reward user ID including the acquired application user ID ("5288") and the application ID ("001").

The other terminal information extractor 249 specifies the reward user ID ("09634565") associated with the extracted installation information. In addition, the other terminal information extractor 249 may store a set of the reward user ID in which the specified reward user ID ("09634565") and the reward user ID ("24957234") are associated in the storage 230.

The other terminal information extractor 249 extracts the target application corresponding to the application ID associated with the specified reward user ID ("09634565") as the target application that is installed in the old terminal (user terminal 100A). For example, the other terminal information extractor 249 extracts target applications 10-1 to 10-3 (application 1 to application 3) illustrated in FIG. 31.

Further, for example, when the user X acquires the list request notification information from the target application 10-4 illustrated in FIG. 31, the other terminal information extractor 249 extracts the target application that has been installed in the user terminal 100A, as follows, by combining the above-described first extraction method and the second extraction method.

The other terminal information extractor 249 acquires the reward user ID ("24957234") included in the list request notification information and the application ID ("004"). Next, a set of the application user ID ("1922") corresponding to the application ID ("004") associated with the reward user ID ("24957234") and the application ID ("004") are acquired. The other terminal information extractor 249 extracts the installation information associated with other reward user ID including a set of the acquired application user ID ("1922") and the application ID ("004"). In this case, there is no installation information including the application user ID ("1922"). Accordingly, the other terminal information extractor 249 acquires a set of the application user ID ("5288") and the application ID ("001") of another target application (target application 10-1), from the installation information T2 associated with the reward user ID ("24957234").

The other terminal information extractor 249 extracts the installation information associated with other reward user ID including a set of the acquired application user ID ("5288") and the application ID ("001"). The other terminal information extractor 249 specifies the reward user ID ("09634565") associated with the extracted installation information.

The other terminal information extractor 249 extracts the target application corresponding to the application ID associated with the specified reward user ID ("09634565") as the target application that is installed in the old terminal (user terminal 100A). For example, the other terminal information extractor 249 extracts the target applications 10-1 to 10-3 (application 1 to application 3) illustrated in FIG. 31.

The list notifier 242 of the management server 200c performs a filtering process of a target application (step SE15b). The list notifier 242 generates an application list of at least one target application that does not acquire installation notification information from either the target application 10 installed in the user terminal 100 or the target application 10 installed in the other user terminal 100 that is specified by the other reward user ID extracted by the other terminal information extractor 249. In other words, the list notifier 242 generates an application list of target applications obtained by excluding the installation information T1 associated with the reward user ID ("09634565") corresponding to the user terminal 100A and the installation information T2 associated with the reward user ID ("24957234") corresponding to the user terminal 100B, from the target application information managed by the application manager 221. For example, in the example illustrated in FIG. 31, the list notifier 242 generates an application list of target applications indicating the target application 10-5 (the application 5) and the target application 10-6 (the application 6).

Since the process after step SA16 is the same as the process of step SA25, the process of step SA26, the process of step SE16 to step SE19, and the process of step SC11, which are illustrated in FIG. 14, a description thereof will be omitted.

Summary of Seventh Embodiment (1) As described above, in the reciprocal customer transfer system 500b of the present embodiment, the management server 200c (an example of the management device) includes an application manager 221, an installation notification acquisitor 241, an installation information manager 222, an other terminal information extractor 249, and a list notifier 242. The application manager 221 manages information regarding a plurality of target applications which are management targets. The installation notification acquisitor 241 acquires installation notification information indicating that the target application is installed, from the target application 10-1 (an example of the first application) that is installed in the user terminal 100 (an example of the terminal device), from a plurality of target applications. The installation information manager 222 associates and manages the reward user ID (an example of the unique identification information) for specifying the user terminal 100 in which the target application 10-1, which has transmitted the installation notification information, is installed, and the application ID of the target application 10-1, and associates and manages the reward user ID and the association information (for example, the application user ID). The other terminal information extractor 249 extracts other reward user ID associated with the reward user ID, by using the association information that is associated with the reward user ID for specifying the user terminal 100 in which the target application 10-1 that has transmitted the installation notification information is installed, by querying the installation information manager 222 about the installation notification information. The list notifier 242 transmits an application list of at least one target application (for example, the target application 10-5 (the application 5), and the target application 10-6 (the application 6)) that does not acquire installation notification information from either the target application 10 installed in the user terminal 100 or the target application 10 installed in the other user terminal 100 that is specified by the other reward user ID extracted by the other terminal information extractor 249, to the user terminal 100.

Thus, for example, in a case where the model of the user terminal 100 is changed, the management server 200c of the present embodiment can associate and manage the target application installed in the user terminal 100 before model change (the user terminal 100A) and the target application installed in the user terminal 100 after model change (user terminal 100B). Therefore, after model change of, for example, the user terminal 100, in a case where the management server 200c presents a target application that is recommended for the user to install, it is possible to present a list LT of target applications that the user has not used, to the user. In other words, in a case where the model of the user terminal 100 is changed or the same user uses a plurality of user terminals 100, the management server 200c can suppresses that the target application that has already been installed in other user terminal 100 of the same user is presented to the user as an application list of the target application for which installation is recommended to the user.

(2) Further, in the present embodiment, the installation information manager 222 associates and manages the reward user ID specifying the user terminal 100 (an example of the terminal device), the application ID (an example of the identification information) of the target application (an example of the first application), and the application user ID (an example of the user information). Then, the other terminal information extractor 249 uses the application user ID of the target application as the association information.

Thus, since the management server 200c of the present embodiment uses an application user ID that is information managed by the management server 200c, it is possible to associate reward user IDs of different user terminals 100 by simple means, as compared to the case of adding new information as association information.

(3) Further, in the present embodiment, as the first extraction method described above, the other terminal information extractor 249 extracts other reward user ID that is associated with the application user ID of the target application associated with the reward user ID specifying the user terminal 100 having the target application (an example of the first application) installed therein, other than the reward user ID.

Thus, the management server 200c of the present embodiment can associate the reward user IDs of different user terminals 100, by using the application user ID.

(4) Further, in the present embodiment, the other terminal information extractor 249 uses the application user ID of other target application associated with the reward user ID (an example of the unique identification information) associated with the application user ID of the target application (an example of the first application), as association information.

Thus, even when it was not able to extract other reward user ID associated with the reward user ID by using the application user ID of the target application as the second extraction method described above, the management server 200c of the present embodiment can associate the reward user IDs of different user terminals 100 by using the application user ID of other target application, (5) Further, in the present embodiment, the other terminal information extractor 249 uses the application ID associated with the reward user ID (an example of the unique identification information) specifying the user terminal 100 (an example of the terminal device) having the target application (an example of the first application) installed therein and the application user ID of the target application.

Thus, since both the application ID and the application user ID are used as the association information, for example, when the same application user ID is used in different target applications, it is possible to prevent the management server 200c of the present embodiment from erroneously determining the users of the different target applications as the same user.

(6) Further, in the present embodiment, the installation notification information includes the reward user ID (an example of the unique identification information) for specifying the user terminal 100 (an example of the terminal device), and the application ID (an example of the identification information) of the target application (an example of the first application). Then, the installation information manager 222 manages the reward user ID for specifying the user terminal 100 that the installation notification acquisitor 241 has acquired, and the application ID of the target application, in association with each other.

Thus, the management server 200c of the present embodiment can perform management based on the reward user ID of the target application that has been installed in the user terminal 100 and the application ID of the target application.

(7) Further, the management server 200c of the present embodiment includes an application user information acquisitor that acquires the application user ID (an example of the user information) of the target application (an example of the first application) in association with the reward user ID (an example of the unique identification information) for specifying the user terminal 100. In addition, the installation notification acquisitor 241 may be caused to function as the application user information acquisitor. In other words, the application user ID of the target application that has transmitted the installation notification information may be included in the installation notification information. In this manner, the function of the application user information acquisitor may be included in another function. Then, the installation information manager 222 manages the application user ID of the target application that the application user information acquisitor acquires and the reward user ID for specifying the user terminal 100, in association with each other.

Thus, when the target application is installed in the user terminal 100, the management server 200c can associate and manage the application ID of the installed target application, the application user ID of the installed target application, and the reward user ID associated with the user terminal 100. In other words, the management server 200c can manage the application user ID for each target application installed in the user terminal 100 in association with the reward user ID.

(8) Further, the management server 200c of the present embodiment includes a reward processor 245. In a case where a predetermined reward granting condition is determined to be satisfied, of the target application 10-5 or 10-6 (an example of the second application) selected in the user terminal 100 from one or a plurality of target applications included in the application list, the reward processor 245 performs a reward granting process of granting a predetermined reward in the target application 10-1 or 10-4 (an example of the first application).

Thus, in a case where a predetermined reward granting condition is satisfied, the management server 200c of the present embodiment can grant a predetermined reward in a target application 10-1 or 10-4. Here, the management server 200c of the present embodiment generates an application list of target applications which are reward granting targets, and transmits the generated application list to the user terminal 100. In other words, in a case where the model of the user terminal 100 is changed or the same user uses a plurality of user terminals 100, the management server 200c of the present embodiment transmits an application list excluding target applications which are reward granting targets, to the user terminal 100. Therefore, even in a case where the model of the user terminal 100 is changed or the same user uses a plurality of user terminals 100, the management server 200c of the present embodiment can present an appropriate application list of target applications which are reward granting targets. Thus, in a case where the model of the user terminal 100 is changed or the same user uses a plurality of user terminals 100, the management server 200c of the present embodiment can suppresses that the target application which is not a reward granting target is presented to the user as a target application which is the reward granting target.

In addition, in the present embodiment, the installation information storage 236 forms the association between the reward user ID (RewardUID) and the application ID (ApID), and the association between the reward user ID (RewardUID) and the application user ID (ApUID) as a single data table, but may divide the associations and form two data tables as illustrated in FIG. 35. In other words, the installation information storage 236 may separately form the association between the reward user ID (RewardUID) and the application ID (ApID) as a first data table, and the association between the application user ID (ApUID) and the application user ID (ApUID) as a second data table. In this case, data which is a main element associating both data tables is to correspond to the respective data tables.

In the example illustrated in FIG. 35, the installation information storage 236 stores the first data table and the second data table. The installation information storage 236 associates and stores, for example, the installation ID (InstID), the reward user ID (RewardUID), the application ID (ApID), the notification type (Ttype), as main elements, as the first data table. Further, the installation information storage 236 associates and stores, for example, the installation ID (InstID), the application ID (ApID), and the application user ID (ApUID), as main elements, as the second data table.

Further, in the present embodiment described above, the case of using the application user ID as the association information has been described, but the present embodiment is not limited thereto. The management server 200c may use, for example, a cooperation code (for example, such as an e-mail address) entered by the user, as the association information. In this case, since the other terminal information extractor 249 associate reward user IDs matching the cooperation code that has been entered by the user, it is possible to associate the reward user IDs of different user terminals 100.

Eighth Embodiment

Next, an eighth embodiment of the present invention will be described. First, the summary of a reciprocal customer transfer system 500c of the present embodiment will be described.

The reciprocal customer transfer system 500 (500a) described above associates and manages one reward user ID and one user terminal 100. Therefore, when a change in the reward user ID occurs even in the same user terminal 100, the user terminal 100 before change and the user terminal 100 after change are determined to different user terminals 100.

Here, the case where a change in the reward user ID occurs refers to, for example, a case where the user is allowed to change the reward user ID and the user changes the reward user ID, a case where the reward user ID is changed due to a circumstance or by a process of the reciprocal customer transfer system 500c, a case where the reward user ID is changed due to a circumstance or by a process other than that of the reciprocal customer transfer system 500c, or the like.

For example, in a case where there is information (hereinafter, referred to as ID information) that is associated with each user terminal 100, respective information pieces being different from each other, by the OS function of the user terminal 100 and allowed to be used by each application, it is possible to use the ID information as the reward user ID. The ID information may be, for example, advertising identifier (Advertising Identifier).

Here, if the user is allowed to change the ID information and the user changes the ID information, the reward user ID is changed. In addition, a telephone number that is set in the user terminal 100, an e-mail address that the user uses in the user terminal 100 or the like may be used as the reward user ID, and in this case, when the telephone number, the e-mail address, or the like is changed, the reward user ID is changed.

When the reward user ID is changed, in the reciprocal customer transfer system 500 (500a) described above, despite of the same user terminal 100, for example, after the reward user ID is changed, the target application that was used before the reward user ID is changed may be presented as a target application which is a reward granting target, to the user. In this manner, in the reciprocal customer transfer system 500 (500a) described above, when the reward user ID is changed in the user terminal 100, the target application for which installation is not recommended to the user may be presented to the user, as the target application for which installation is recommended.

Thus, in the present embodiment, a description will be given regarding an embodiment of the reciprocal customer transfer system 500c which presents to the user, a list LT of appropriate target applications, excluding a target application which is not a target for which installation is recommended to the user, even in a case where the reward user ID is changed in the user terminal 100.

[Summary of Reciprocal Customer Transfer System According to an Eighth Embodiment]

Figure 36:
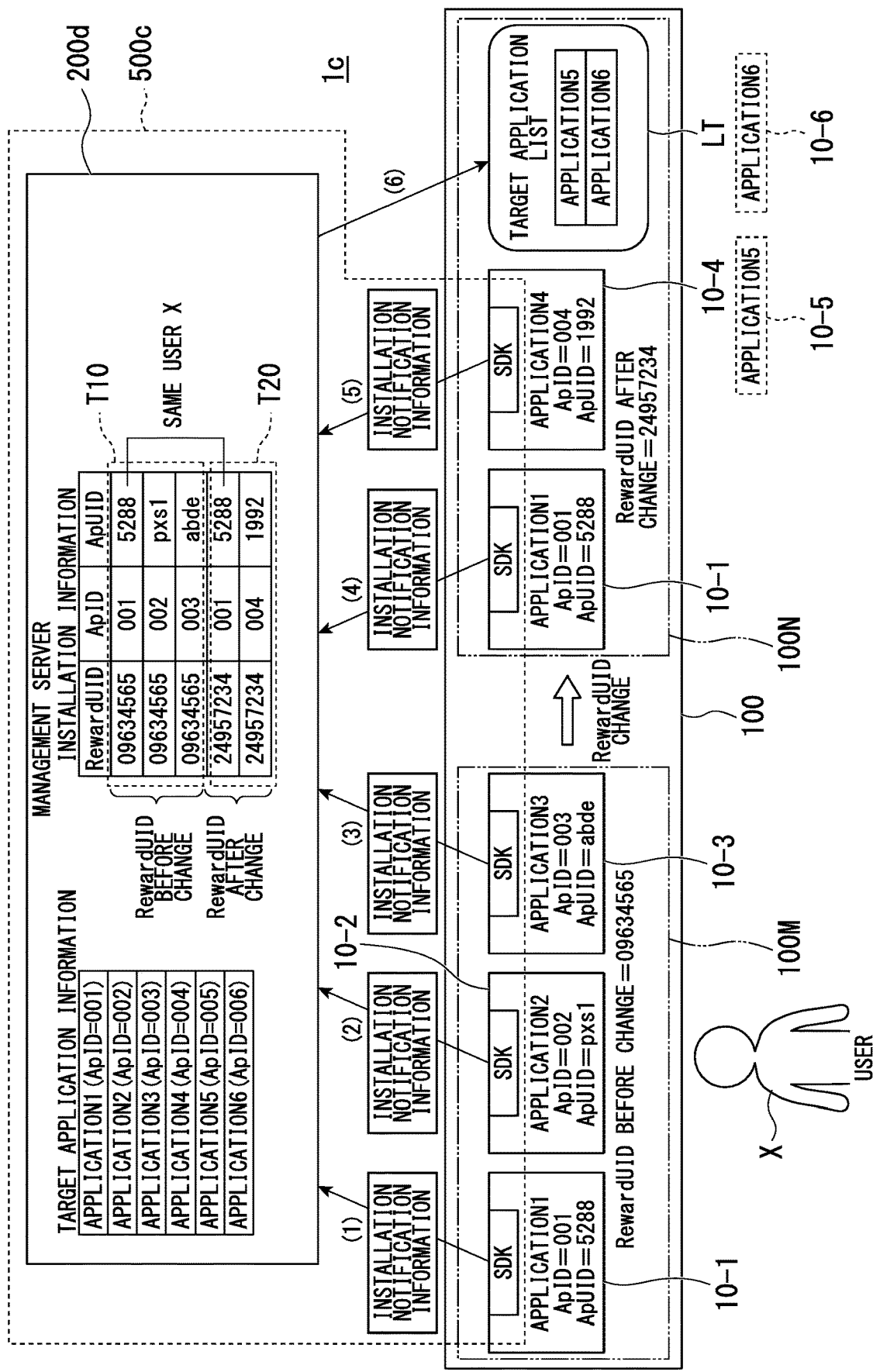
FIG. 36 is a simplified drawing describing a reciprocal customer transfer system according to an eighth embodiment.

FIG. 36 is a diagram illustrating a summary of a reciprocal customer transfer system 500c of the present embodiment.

In FIG. 36, the basic configuration of a network system 1c according to the present embodiment is the same as the configurations of the first to seventh embodiments, and includes a management server 200d and a user terminal 100. FIG. 36 illustrates that target applications 10-1 to 10-4 (the application 1 to the application 4) are installed in the user terminal 100 before the change or after the change of the reward user ID. It is seen that the target applications 10-1 to 10-3 (the application 1 to the application 3) represented in an area denoted by a symbol 100M are installed and launched before the change of the reward user ID, and has transmitted the installation notification information to the management server 200d. Meanwhile, it is seen that the target application 10-4 (the application 4) represented in an area denoted by a symbol 100N is installed and launched after the change of the reward user ID, and has transmitted the installation notification information to the management server 200d. Further, the target applications 10-1 (application) represented in the area denoted by a symbol 100N conveniently indicates that the target application 10-1 (application 1), that has been installed before the change of the reward user ID, is launched after the change of the reward user ID, and has transmitted the installation notification information to the management server 200d. In addition, it is assumed that the target applications 10-2 and 10-3 (the application 2 and the application 3), that have been installed before the change of the reward user ID, are not launched even once after the change of the reward user ID, and do not transmit the installation notification information to the management server 200d.

In addition, target applications that have not been installed in the user terminal 100 even before or after the change of the reward user ID will be described as a target application 10-5 (application 5) and a target application 10-6 (application 6). In addition, when there is no particular distinction, the target application 10-5 and the target application 10-6 will be described as the target application 10 by omitting "-1" and "-2".

Further, in FIG. 36, the management server 200d, as target application information on the reciprocal customer transfer system 500c, stores "application 1 (ApID=001)" to "application 6 (ApID=006)".

Here, with reference to FIG. 36, the summary of the reciprocal customer transfer system 500c of the present embodiment will be described as an example in which the user X changes a reward user ID in the user terminal 100.

First, when respective target applications 10-1 to 10-3 are launched installation and first launched before the change of the reward user ID, the user terminal 100 transmits the installation notification information corresponding to the respective target applications 10-1 to 10-3 to the management server 200d, as indicated by (1) to (3). In addition, the installation notification information transmitted in (1) to (3) includes, for example, the reward user ID (RewardUID) before change, the application ID (ApID), and the application user ID (ApUID).

The management server 200d acquires installation notification information corresponding to the respective target applications 10-1 to 10-3, and stores the acquired installation notification information as the installation information.

Here, the installation information T10 corresponding to the reward user ID before change is stored in the management server 200d, by (1) to (3).

It is assumed that the user X changes the reward user ID (RewardUID) in the user terminal 100. Then, after the change of the reward user ID (RewardUID), the user terminal 100 transmits the installation notification information corresponding to the installed target application 10-1 before the change as indicated by (4), to the management server 200d. For example, after the change of the reward user ID (RewardUID), when the target application 10-1 is first launched, the user terminal 100 transmits the installation notification information corresponding to the target application 10-1, to the management server 200d. In addition, a process in which the target application installed before the change of the reward user ID transmits the installation notification information after the change of the reward user ID will be described later with reference to FIG. 38.

Further, if the target application 10-4 is installed in the user terminal 100 after the change of the reward user ID (RewardUID), when the target application 10-4 is first launched, the user terminal 100 transmits the installation notification information corresponding to the target application 10-4 to the management server 200d, as indicated by (5).

The installation notification information transmitted in (4) and (5) includes, for example, the reward user ID (RewardUID) after change, the application ID (ApID), and the application user ID (ApUID).

The management server 200d acquires the installation notification information corresponding to the target application 10-1 and the installation notification information corresponding to the target application 10-4, and stores the acquired installation notification information as installation information. Here, the installation information T20 corresponding to the reward user ID (RewardUID) after change is stored in the management server 200d, by (4) and (5).

For example, when the list request notification information transmitted is from the target application 10-1 after the reward user ID of the user terminal 100 of the user X is changed, the management server 200d determines whether or not the application user ID (ApUID) that is included in the installation information T20 corresponding to the reward user ID after change is included in the installation information corresponding to other reward user ID. Then, when the application user ID (ApUID) is included in the installation information corresponding to other reward user ID, the management server 200d determines that the installation information is stored by the installation notification information that is acquired from the same user terminal 100 of the user X (the user terminal 100 that has transmitted the list request notification information described above).

Here, "5288" of the application user ID (ApUID) included in the installation information T20 is included in the installation information T10 corresponding to other reward user ID (RewardUID) (in other words, installation information T10 corresponding to the reward user ID (RewardUID) before change). Therefore, the management server 200d determines the installation information T10 and the installation information T20, including "5288" of the same application user ID (ApUID) to installation information on the same user terminal 100 of the user X, and associates "09634565" of the reward user ID (RewardUID) before change with "24957234" of the reward user ID (RewardUID) after change.

Thus, the management server 200d associates the installation information T10 and the installation information T20.

Then, the management server 200*d* generates the application list of target applications for which installation is recommended to the user, based on the installation information T10 and the installation information T20 which are associated with each other, and transmits for example, the generated application list of target applications, to the user terminal 100, as indicated in (6). In the example, since "application 5 (ApID=005)" and "application 6 (ApID=006)" among target applications stored as the target application information are not included in the installation information T10 or the installation information T20, the management server 200*d* transmits the application list of target applications indicating "application 5 (ApID=005)" and "application 6 (ApID=006)" to the user terminal 100.

As a result, the user terminal 100 displays the list LT of target applications.

In this manner, in the present embodiment, the management server 200*d* associates and manages the reward user ID (RewardUID) before change and the reward user ID (RewardUID) after change of the same user terminal 100, based on the application user ID (ApUID), as the reward user ID (RewardUID) of the same user terminal 100. Then, the management server 200*d* determines the user terminals 100 respectively corresponding to the reward user ID (RewardUID) before change and the reward user ID (RewardUID) after change, to the same user terminal 100, and transmits the application list indicating at least one target application of which the installation notification information is not acquired from the user terminal 100, to the user terminal 100.

Thus, the user terminal 100 can present to the user X, a list LT of appropriate target applications, excluding a target application (in other words, a target application that is installed in the user terminal 100) which is not a target for which installation is recommended to the user.

The reciprocal customer transfer system 500 according to the present embodiment will be described in detail.

Since the configuration of the network system 1*c* and the configuration of the user terminal 100 according to the present embodiment and are the same as the configuration of the network system 1 of the first embodiment illustrated in FIG. 2 and the configuration of the user terminal 100 of the first embodiment illustrated in FIG. 3, the description thereof will be omitted herein. Further, since the functional structure of the user terminal 100 (SDK 11) of the present embodiment is the same as in the first embodiment illustrated in FIG. 5, the description thereof will be omitted herein.

In addition, the method of associating and managing two types of reward user IDs (RewardUID) before and after the change based on the application user ID (ApUID), as described with reference to FIG. 36 is the same as the method of associating and managing the reward user ID (RewardUID) before model change and the reward user ID (RewardUID) after model change based on the application user ID (ApUID), which is described in the above seventh embodiment.

Accordingly, the configuration of the reciprocal customer transfer system 500*c* according to the present embodiment may the same as the configuration of the reciprocal customer transfer system 500*b* according to the seventh embodiment. In other words, the configuration of the management server 200*d* provided in the reciprocal customer transfer system 500*c* may be the same as the management server 200*c* according to the seventh embodiment illustrated in FIG. 32.

[Configuration of Reciprocal Customer Transfer System 500*c* According to Eighth Embodiment]

Figure 37:
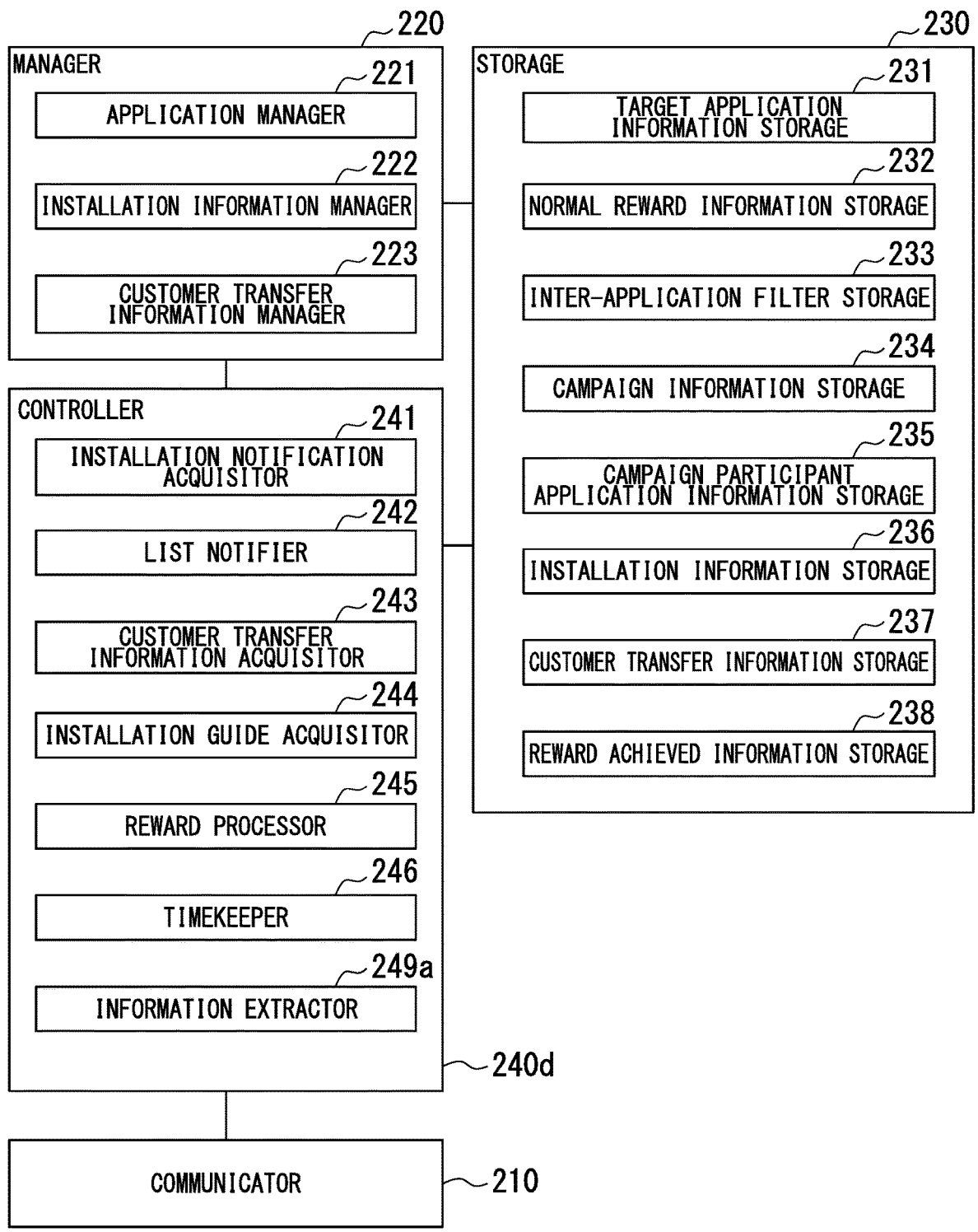
FIG. 37 is a simplified drawing describing a management server according to the eighth embodiment.

FIG. 37 is a configuration diagram illustrating an example of a configuration of the management server 200*d* according to the present embodiment. The configuration of the management server 200*d* according to the present embodiment will be described in detail, with reference to FIG. 37.

The management server 200*d* includes a communicator 210, a manager 220, a storage 230, and a controller 240*d*. In addition, in FIG. 37, the same components as in FIG. 32 are denoted by the same reference numerals, and a description thereof is omitted here. The configuration of the management server 200*d* illustrated in FIG. 37 is different from the configuration of the management server 200*c* illustrated in FIG. 32, by including an information extractor 249*a* instead of the other terminal information extractor 249. Here, since the configuration of the management server 200*d* may be the same as the configuration of the management server 200*c* illustrated in FIG. 32, as described above, it is possible to apply the functions provided in the other terminal information extractor 249, as the functions provided in the information extractor 249*a*.

For example, similarly to the other terminal information extractor 249 illustrated in FIG. 32, the information extractor 249*a* according to the present embodiment extracts the reward user ID associated with the association information, based on the reward user ID and the association information (for example, user information on the target application) which are included in the installation information that the installation information managed by the manager 222. Thus, the information extractor 249*a* of the present embodiment extracts the reward user ID before change of the user terminal 100 that is specified by the reward user ID after change.

In other words, in the seventh embodiment, the other terminal information extractor 249 extracts the reward user ID (RewardUID) before model change and the reward user ID (RewardUID) after model change, by extracting the reward user ID associated with the association information. In contrast, in the present embodiment, the information extractor 249*a* extracts the reward user ID before change and the reward user ID (RewardUID) after change of the same user terminal 100, by extracting the reward user ID associated with the association information, by the same function as the function included in the other terminal information extractor 249.

The user information (for example, the application user ID) of the target application may be used, as the above-described association information described above, as described as the first extraction method in the seventh embodiment.

Specifically, the information extractor 249*a* may extract other reward user ID that is associated with the application user ID of the target application associated with the reward user ID specifying the user terminal 100 having the target application installed therein, other than the reward user ID.

For example, the information extractor 249*a* may use the application user ID of the target application (for example, the target application 10-1) that transmits the installation notification information even after the change of the reward user ID, among target applications installed before the change of the reward user ID. Then, the information extractor 249*a* may extract the reward user ID before change of the same user terminal 100, by extracting other reward user ID associated with the application user ID associated with the reward user ID after change, other than the reward user ID after change.

In addition, the target application (for example, the target application 10-4) that was not installed before the change of the reward user ID may be included in the target application installed in the user terminal 100. In this case, it is not possible to extract the reward user ID before change by using the application user ID of the target application (for example, target application 10-4). Therefore, the application user ID of other target application (for example, the target application 10-1) associated with the same reward user ID as the application user ID of the target application (for example, the target application 10-4) may be used, as the above-described association information, as described as the second extraction method in the seventh embodiment.

In addition, only the application user ID of the target application may be used, or as set of the application ID and the application user ID of the target application may be used, as the above-described association information.

In addition, similarly to the other terminal information extractor 249 according to the seventh embodiment, the information extractor 249a according to the present embodiment may extract the reward user ID before model change and the reward user ID after model change.

Further, the list notifier 242 of the present embodiment transmits the application list indicating at least one target application that does not acquire the installation notification information from the user terminal 100 corresponding to the reward user ID that is extracted by the information extractor 249a, to the user terminal 100. For example, the list notifier 242 transmits an application list of at least one target application that does not acquire the installation notification information from the user terminal 100 corresponding to the reward user ID before change or the reward user ID after change, to the user terminal 100 corresponding to the reward user ID after change. In other words, the list notifier 242 transmits to the user terminal 100, the application list of at least one target application, obtained by excluding the target application that is installed in the user terminal 100 after the change of the reward user ID and the target application that is installed in the user terminal 100 before the change of the reward user ID, from among a plurality of target applications that are managed by the application manager 221.

[Details of Reciprocal Customer Transfer Process Operation According to Eighth Embodiment]

Since the basic operation of the reciprocal customer transfer system 500c of the present embodiment is the same as in the first embodiment illustrated in FIG. 14 and FIG. 15, the operation of a process of generating an application list of target applications of the present embodiment will be described.

In the operation of the process of generating the application list in the reciprocal customer transfer system 500c of the present embodiment, in the process of step SE115 illustrated in FIG. 34, a process in which the information extractor 249a extracts the target application installed in the user terminal 100 of the user X before the change of the reward user ID is performed, instead of the process in which the other terminal information extractor 249 extracts the target application installed in the old terminal of the user X (the user terminal 100A before model change).

In addition, the specific process of step S115 that is performed by the information extractor 249a in the present embodiment is the same as the process that is performed by the other terminal information extractor 249 in the seventh embodiment, and is a process of extracting the reward user ID associated with the association information (for example, the application user ID).

For example, the information extractor 249a extracts the reward user ID before change of the user terminal 100 according to the first extraction method described above, and extracts the target application installed before the change of the reward user ID. In addition, the information extractor 249a may extract the reward user ID before change of the user terminal 100 according to the second extraction method, or may extract the reward user ID before change of the user terminal 100 by combining the first extraction method and the second extraction method.

[Example of Transmission Process of Installation Notification Information According to Eighth Embodiment]

In the present embodiment, a description will be given regarding a process of transmitting the installation notification information on the target application that was installed in the user terminal 100 before the change of the reward user ID, to the management server 200d after the change of the reward user ID.

The transmission process of the installation notification information is performed in the initialization process described with reference to FIG. 14, for example, in the first embodiment. In the initialization process illustrated in FIG. 14, when the target application is installed in the user terminal 100 and launched, if the initialization process is completed by transmitting the installation notification information on the target application from the user terminal 100 to the management server 200, the process of transmitting the installation notification information is not performed from the subsequent launching of the target application. Therefore, even if the reward user ID of the user terminal 100 is changed thereafter, in the process illustrated in FIG. 14, it is not possible to transmit the installation notification information from the user terminal 100 after change.

Thus, in the present embodiment, when the reward user ID of the user terminal 100 is changed, even if there is a target application that has transmitted the installation notification before change, a process of transmitting again the installation notification information from the user terminal 100 to the management server 200d is performed.

Figure 38:
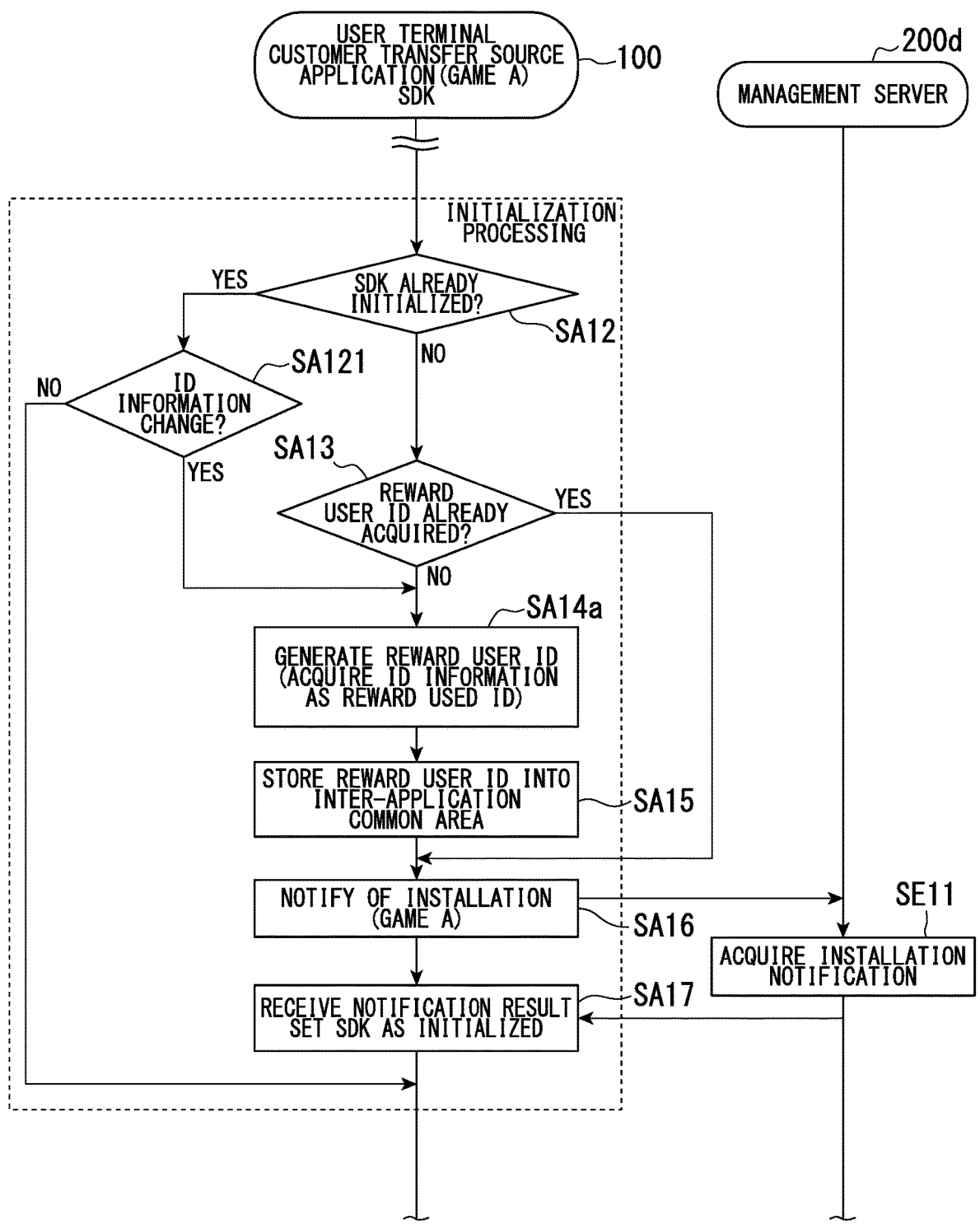
FIG. 38 is a flowchart showing an example of initialization processing according to the eighth embodiment.

FIG. 38 is a flowchart illustrating an example of initialization process according to the present embodiment. FIG. 38 illustrates another embodiment of the initialization process (step SA11 to SA17) illustrated in FIG. 14, and the initialization process is the same as the respective processes illustrated in FIG. 14, except for the process relating to the initialization process, and thus the illustration will be omitted.

In the initialization process illustrated in FIG. 38, a description will be given regarding a case in which the ID information that is associated with each user terminal 100, respective information pieces being different from each other, by the OS function of the user terminal 100 is stored in the terminal storage 140, and the ID information is used as the reward user ID. In addition, the ID information may be set, for example, by the OS, and stored in the terminal storage 140, or may be set by the user and stored in the terminal storage 140, in response to the instruction of the OS after the OS is launched. Further, it is assumed that the user is allowed to change the ID information by the OS.

Hereinafter, with reference to FIG. 38, when the reward user ID is changed, in the initialization process, a process of transmitting again the installation notification information to the management server 200d. In addition, the process corresponding to the respective processes of FIG. 38 and FIG. 14 are denoted by the same reference numerals, and a description thereof is omitted here.

The initialization processor 101 of the SDK 11K determines whether or not the initialization process has been completed, in the initialization process (step SA12). When it is determined that the initialization process has not been completed (step SA12: NO), the unique identification information acquisitor 102 of the SDK 11A determines whether or not the reward user ID has been acquired with reference to the terminal storage 140 (step SA13).

When it is determined that the reward user ID has not been acquired (step SA13: NO), the unique identification information acquisitor 102 generates and acquires the reward user ID corresponding to the user terminal 100. Here, the unique identification information acquisitor 102 acquires the ID information associated with the user terminal 100 as the function of an OS, as the reward user ID with reference to the terminal storage 140 (step SA14a). Then, the unique identification information acquisitor 102 stores the acquired ID information as the reward user ID, in the inter-application common area of the terminal storage 140 (step SA15).

Meanwhile, when it is determined that the reward user ID has been acquired (step SA13: YES), the unique identification information acquisitor 102 reads the reward user ID from the terminal storage 140, and process proceeds to step SA16.

Subsequently, the installation notifier 103 of the SDK 11A transmits the installation notification information indicating that the customer transfer source application 10 (game A) is installed in the user terminal 100, to the management server 200d (step SA16). Here, the installation notification information includes the reward user ID (RewardUID) corresponding to the user terminal 100, the application ID (ApID) of the installed customer transfer source application 10 (game A), and the application user ID (ApUID) of the user X that is registered in the customer transfer source application 10 (game A).

The installation notification acquisitor 241 of the management server 200d acquires the installation notification information that has been transmitted from the user terminal 100 (SDK 11A), and transmits response information (notification result) indicating the acquisition to the user terminal 100 (SDK 11A). Further, the installation information manager 222 of the management server 200d stores the reward user ID (RewardUID) included in the installation notification information that the installation notification acquisitor 241 has acquired, the application ID (ApID) of the customer transfer source application 10 (game A), and the application ID (ApID) of the user X of the customer transfer source application 10 (game A) in association with each other, as the installation information, in the installation information storage 236 (step SEM.

If the initialization processor 101 of the SDK 11A acquires the response information (notification result) transmitted from the management server 200d, a flag indicating the completion of initialization is set and the initialization process is ended (step SA17).

Meanwhile, when it is determined that the initialization process has been completed in step SA12 (step SA12: YES), the unique identification information acquisitor 102 determines whether or not the ID information is changed, by comparing the ID information and the reward user ID (RewardUID) which are stored in the terminal storage 140 (step S121). When it is determined that the ID information is not changed, based on the fact that the ID information and the reward user ID (RewardUID), which are stored in the terminal storage 140, match each other (step S121: NO), the initialization processor 101 ends the initialization process.

Meanwhile, when it is determined that the ID information is changed, based on the fact that the ID information and the reward user ID (RewardUID), which are stored in the terminal storage 140, do not match each other (step S121: YES), the unique identification information acquisitor 102 acquires the ID information after change as the reward user ID (step SA14a), and stores the acquired ID information in the inter-application common area of the terminal storage 140 as the reward user ID after change (step SA15). In addition, when the reward user ID after change is stored in the terminal storage 140, the unique identification information acquisitor 102 may store the reward user ID after change, instead of the reward user ID before change, or may store the reward user ID after change in a distinguishable manner, while remaining the reward user ID before change.

Then, the installation notifier 103 transmits the installation notification information indicating the customer transfer source application 10 (game A) is installed in the user terminal 100, to the management server 200d (REQ11, step SA16). Here, the installation notification information may include the reward user ID (RewardUID) after change corresponding to the user terminal 100, the application ID (ApID) of the installed customer transfer source application 10 (game A), and the application user ID (ApUID) of the user X that is registered in the customer transfer source application 10 (game A).

The management server 200d acquires the installation notification information transmitted from the user terminal 100 after the change of the reward user ID, associates the reward user ID (RewardUID) after change included in the acquired installation notification information, the application ID (ApID) of the customer transfer source application 10 (game A), and the application user ID (ApUID) of the user X of the customer transfer source application 10 (game A), and stores the associated IDs in the installation information storage 236 as the installation information (for example, the installation information T20 illustrated in FIG. 36) (step SE11).

Thus, when the reward user ID is changed, the user terminal 100 can transmit the installation notification information on the target application that has been installed before the change and has transmitted the installation notification information, after the change. Therefore, when the reward user ID is changed in the user terminal 100, the management server 200d can associate and manage the reward user ID before change and the reward user ID after change, based on the application user ID of the target application that transmits the installation notification information, respectively, before the change and after the change.

In addition, when the target application that has been installed in the user terminal 100 is first launched, if it is determined that the reward user ID has been acquired in step SA13, the unique identification information acquisitor 102 may compare the ID information and the reward user ID (RewardUID) which are stored in the terminal storage 140, and may perform a process based on the comparison result. For example, when the ID information and the reward user ID (RewardUID), which are stored in the terminal storage 140, do not match, the installation notifier 103 may transmit the installation notification information, with the ID information as the reward user ID (RewardUID), to the management server 200d.

Thus, if the target application that has been installed in the user terminal 100 is first launched, even when the reward user ID has been acquired, and the ID information before change is still stored as the reward user ID in the terminal storage 140, despite the change of the ID information, the user terminal 100 can transmit the installation notification information with the ID information after change as the reward user ID, to the management server 200d. Further, when the target application is first launched, the ID information after change is not to be stored as the reward user ID in the terminal storage 140, such that it is possible to transmit the installation notification information on at least one target application, among the target application that has been installed before the change and has transmitted the installation notification information.

In addition, when the target application that has been installed in the user terminal 100 is launched, the initialization processor 101 may control so as to transmit the installation notification information each time. In this case, the management server 200*d* may acquire the installation notification information before the change of the reward user ID and the installation notification information after the change of the reward user ID from the user terminal 100 and manage it.

With Respect to Seventh and Eighth Embodiments

The above-described seventh and eighth embodiments can be described as follows, but are not limited thereto.

(1) In the reciprocal customer transfer system 500*b* of the seventh embodiment, the management server 200*b* (an example of the management device) includes an application manager 221, an installation notification acquisitor 241, an installation information manager 222, an other terminal information extractor 249, and a list notifier 242. Further, in the reciprocal customer transfer system 500*c* of the eighth embodiment, the management server 200*c* (an example of the management device) includes an application manager 221, an installation notification acquisitor 241, an installation information manager 222, an information extractor 249*a*, and a list notifier 242. As described above, the function that the information extractor 249*a* has and the function that the other terminal information extractor 249 has can be the same, the configuration of the management server 200*d* of the eighth embodiment may be the same as the configuration of the management server 200*c* of the seventh embodiment. In the following description, a configuration of both the management server 200*c* and the management server 200*d* having the configuration of the management server 200*d* will be described.

The application manager 221 manages information regarding a plurality of target applications which are management targets. The installation notification acquisitor 241 (an example of the first information acquisitor) acquires the installation notification information (an example of the first information) that is transmitted from the user terminal 100 in response to the target application 10-1 (an example of the first application) being executed by the user terminal 100, among a plurality of target applications, and the reward user ID (an example of the unique identification information) associated with the user terminal 100, from the user terminal 100. The installation information manager 222 (an example of the information manager) manages the reward user ID associated with the user terminal 100 that the installation notification acquisitor 241 has acquired and association information, in association with each other. The information extractor 249*a* (an example of the extractor) extracts the reward user ID associated with the association information, based on the reward user ID and the association information that the installation information manager 222 manages. The list notifier 242 (an example of the second information notifier) transmits an application list (an example of the second information) including information indicating at least one target application (for example, the target application 10-5 (the application 5), and the target application 10-6 (the application 6)) of which installation notification information is not acquired from the user terminal 100 corresponding to the reward user ID that is extracted by the information extractor 249*a*, to the user terminal 100 in which the target application 10-1 is executed.

For example, the information extractor 249*a* (an example of the extractor) of the management server 200*d* extracts a plurality of reward user IDs (an example of the unique identification information) associated with the association information. The list notifier 242 (an example of the second information notifier) transmits an application list (an example of the second information) including information indicating at least one target application (for example, the target application 10-5 (the application 5), and the target application 10-6 (the application 6)) of which installation notification information (an example of the first information) is not acquired from the user terminal 100 corresponding to each of a plurality of reward user IDs that are extracted by the information extractor 249*a*, to the user terminal 100 in which the target application 10-1 is executed.

Thus, the management server 200*d* (200*c*) of the present embodiment can associate and manage a plurality of reward user IDs. In addition, the number of the reward user IDs associated with the association information is not limited to a plurality of numbers, but the number of the reward user IDs may be one.

Specifically, the information extractor 249*a* (an example of the extractor) of the management server 200*d* may extract first unique identification information that is a reward user ID associated with the user terminal 100 in which the target application 10-1 (first application) is executed, and second unique identification information that was associated with the user terminal 100 in which the target application 10-1 (first application) is executed before the first unique identification information is associated, as a plurality of reward user IDs (an example of the unique identification information) associated with the association information.

Then, the list notifier 242 (an example of the second information notifier) may transmit an application list (an example of the second information) including information indicating at least one target application (for example, the target application 10-5 (the application 5), and the target application 10-6 (the application 6)) of which installation notification information (an example of the first information) is not acquired from the user terminal 100 corresponding to the first unique identification information or the second unique identification information, that is extracted by the information extractor 249*a*, to the user terminal 100 corresponding to the first unique identification information.

Thus, for example, when the reward user ID of the user terminal 100 is changed, the management server 200*d* (200*c*) can associate and manage the target application that is installed and launched (executed) in the user terminal 100 before the change of the reward user ID, and the target application that is installed and launched (executed) in the user terminal 100 after the change of the reward user ID. Therefore, for example, when the target application for which installation is recommended to the user is presented after the reward user ID of the user terminal 100 is changed, the management server 200*d* (200*c*) can present the list LT of target applications that the user has not used, to the user. In other words, after the reward user ID of the user terminal 100 is changed, the management server 200*d* (200*c*) can suppresses that the target application that is installed and launched (executed) in the user terminal 100 before the change of the reward user ID is presented to the user as a list LT of the target application for which installation is recommended to the user. Accordingly, according to the present embodiment, it is possible to present a list LT of appropriate target applications for which installation is recommended to the user.

(2) Further, the information extractor 249a (an example of the extractor) of the management server 200d may extract first unique identification information that is a reward user ID associated with the user terminal 100 in which the target application 10-1 (first application) is executed, and second unique identification information that is a reward user ID associated with another user terminal 100 different from the user terminal 100 corresponding to the first unique identification information, as a plurality of reward user IDs (an example of the unique identification information) associated with the association information.

Then, the list notifier 242 (an example of the second information notifier) may transmit an application list (an example of the second information) including information indicating at least one target application (for example, the target application 10-5 (the application 5), and the target application 10-6 (the application 6)) of which installation notification information (an example of the first information) is not acquired from the user terminal 100 corresponding to the first unique identification information or the second unique identification information, that is extracted by the information extractor 249a, to the user terminal 100 corresponding to the first unique identification information.

Thus, for example, when the model of the user terminal 100 is changed, the management server 200d (200c) can associate and manage the target application that is installed and launched (executed) in the user terminal 100 before model change (user terminal 100A), and the target application that is installed and launched (executed) in the user terminal 100 after model change (user terminal 100B). Therefore, for example, after model change of the user terminal 100, in a case where the management server 200d (200c) presents a target application that is recommended for the user to install, it is possible to present a list LT of target applications that the user has not used, to the user. In other words, in a case where the model of the user terminal 100 is changed or the same user uses a plurality of user terminals 100, the management server 200d (200c) can suppresses that the target application that has already been installed in other user terminal 100 of the same user is presented to the user as an application list of the target application for which installation is recommended to the user.

(3) The installation information manager 222 (an example of the information manager) associates and manages the reward user ID associated with the user terminal 100 (an example of the unique identification information) and the application user ID of the target application (an example of the first application) (an example of the user information). Then, the information extractor 249a (an example of the extractor) may use the application ID of the target application, as the association information.

Thus, since the management server 200d (200c) of the present embodiment uses an application user ID that is information managed by the management server 200d (200c), it is possible to associate a plurality of reward user IDs by simple means, as compared to the case of adding new information as association information.

For example, the information extractor 249a (an example of the extractor) extracts other reward user ID that is associated with the application user ID of the target application associated with the reward user ID corresponding to the user terminal 100 having the target application (an example of the first application) installed therein, other than the reward user ID.

Thus, the management server 200d (200c) can associate the reward user IDs of the same user terminal 100 before the change and after the change, or the reward user IDs of different user terminals 100, by using the application user ID.

(4) Further, the information extractor 249a (an example of the extractor) may use the application user ID of other target application associated with the reward user ID (an example of the unique identification information) associated with the application user ID (an example of the user information) of the target application (an example of the first application), as association information.

Thus, even when it was not able to extract other reward user ID associated with the reward user ID by using the application user ID of the target application as the second extraction method described above, the management server 200d (200c) can associate the reward user IDs of the same user terminal 100 before the change and after the change, or the reward user IDs of different user terminals 100, by using the application user ID of other target application.

(5) Further, the information extractor 249a (an example of the extractor) may use the application user ID (an example of identification information for identifying the first application) of the target application associated with the reward user ID (an example of the unique identification information) associated with the user terminal 100 in which the target application (an example of the first application) is executed and the application user ID (an example of the user information) of the target application, as the association information.

Thus, since both the application ID and the application user ID are used as the association information, for example, when the same application user ID as the application user ID of the first user of a certain target application is used as the application user ID of other target application of the second user different from the first user, it is possible to prevent the management server 200d (200c) of the present embodiment from erroneously determining the users as the same user.

(6) Further, the application user ID (an example of the user information) of the target application (an example of the first application) is information for identifying the user using the target application executed by the user terminal 100. The management server 200d may include, for example, an application user information acquisitor that acquires the application user ID (an example of the user information) of the target application (an example of the first application) in association with the reward user ID (an example of the unique identification information) associated with the user terminal 100. In addition, the installation notification acquisitor 241 may be caused to function as the application user information acquisitor. In other words, the application user ID of the target application that has transmitted the installation notification information may be included in the installation notification information. In this manner, the function of the application user information acquisitor may be included in another function.

Then, the installation information manager 222 may associate and manage the application user ID of the target application that the application user information acquisitor acquires and the reward user ID associated with the user terminal 100.

Thus, when the target application is executed by the user terminal 100, the management server 200d (200c) can associate and manage the application ID of the executed target application, the application user ID of the executed target application, and the reward user ID associated with the user terminal 100. In other words, the management server 200d (200c) can associate and manage the application user ID and the reward user ID for each target application executed by the user terminal 100.

In addition, when the user information is used as the association information, using the application user ID is an example, but the present embodiment is not limited thereto. For example, the user information used as the association information may be information capable of identifying the user of the target application, and may be a user name, a nickname of the user, a handle name (alias), a user image and the like.

(7) Further, the installation notification acquisitor 241 (an example of the first information acquisitor) of the management server 200d may acquire the application ID (an example of the identification information) of the target application (an example of the first application) in association with the reward user ID (an example of the unique identification information) associated with the user terminal 100. Then, the installation information manager 222 (an example of the information manager) manages the application ID of the target application that the installation notification acquisitor 241 has acquired in association with the reward user ID associated with the user terminal 100.

Thus, the management server 200d (200c) can manages which target application is executed by the user terminal 100, based on the reward user ID and the application ID of the target application.

(8) Further, the management server 200d includes the reward processor 245. When a predetermined reward granting condition is satisfied, of the target applications 10-5 and the 10-6 (an example of the second application) among one or a plurality of target applications indicated by the application list (an example of the second information), the reward processor 245 performs a reward granting process of granting a reward to the user (for example, the user X) using the user terminal 100. Here, the target applications 10-5 and 10-6 (an example of the second application) are, for example, the target application selected in the user terminal 100, among one or a plurality of target applications indicated in the application list.

Thus, in a case where a predetermined reward granting condition is satisfied, the management server 200d (200c) can grant a predetermined reward in the target applications 10-1 and 10-4.

Ninth Embodiment

A ninth embodiment of the present invention will be described. In the first embodiment, a description has been made regarding the case of the customer transfer process of the customer transfer from the customer transfer source application 10 in which the SDK 11 (SDK 11A) is embedded into the target application installed in the user terminal 100 to the customer transfer destination application 20 that is not installed in the user terminal 100. In the present embodiment, a description will be given an example of customer transfer from a dedicated application, which is specialized in a function of the customer transfer source, instead of the customer transfer source application 10, to the customer transfer destination application 20.

[Summary of Reciprocal Customer Transfer System According to the Ninth Embodiment]

Figure 39:
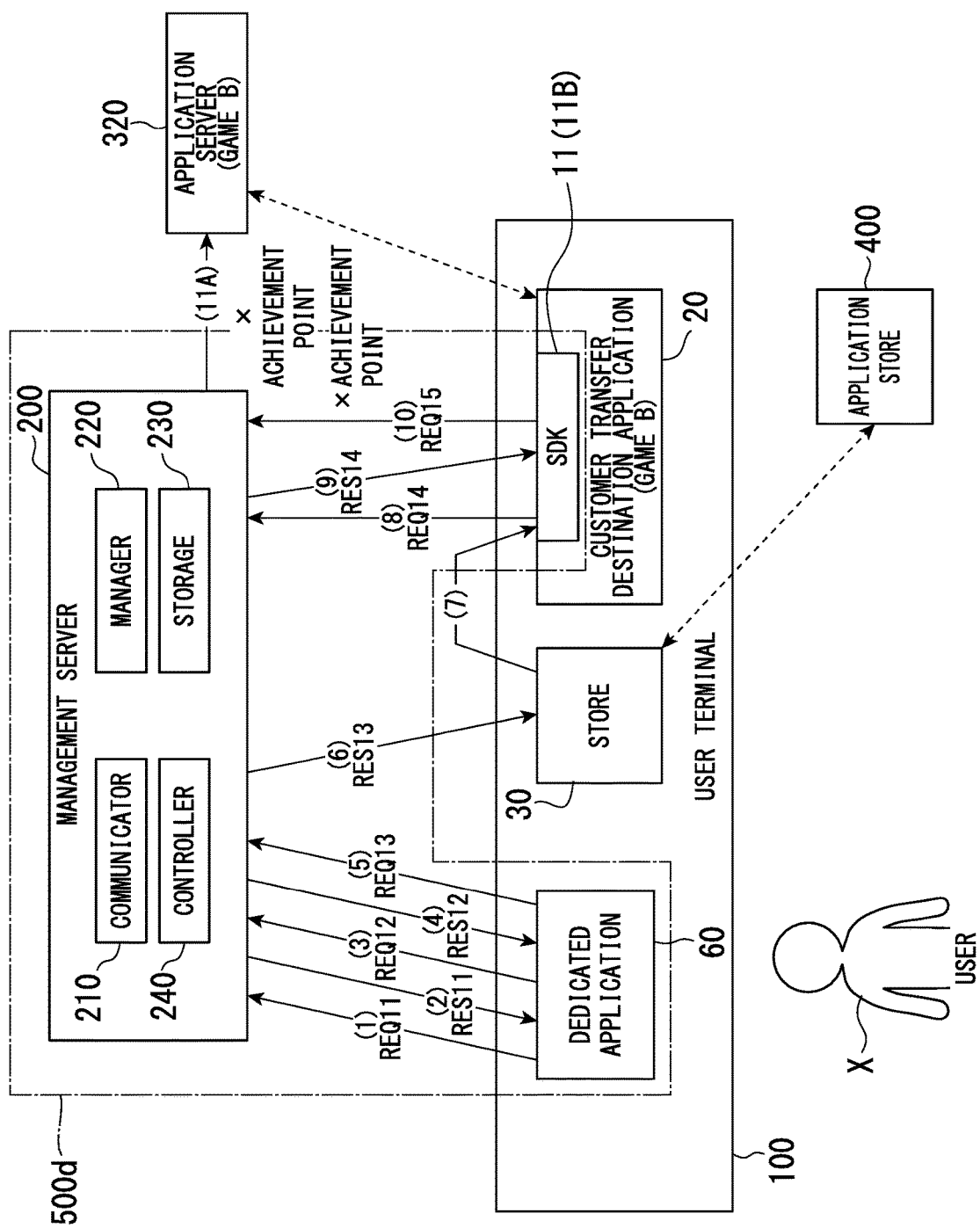
FIG. 39 generally describes a reciprocal customer transfer system according to a ninth embodiment.

FIG. 39 is an explanatory diagram illustrating the summary of the reciprocal customer transfer system 500d of the present embodiment. Similarly to the first embodiment, the network system 1d according to the present embodiment includes the management server 200 and the user terminal 100. In FIG. 39, the portion corresponding to each portion in FIG. 4 is denoted by the same reference numeral, and a description thereof will be omitted.

The reciprocal customer transfer system 500d illustrated in FIG. 39 is different from the reciprocal customer transfer system 500 illustrated in FIG. 4, by replacing the customer transfer source application 10 with a dedicated application having a function of customer transfer to the customer transfer destination application 20 (hereinafter, referred to as "dedicated application 60"). The dedicated application 60 is supplied, for example, from the application store 400 to the user terminal 100 so as to be installable (can be downloaded). FIG. 39 illustrates an example in which the dedicated application 60 is installed in the user terminal 100, and the customer transfer is performed from the dedicated application 60 to the customer transfer destination application 20.

The dedicated application 60 includes, for example, the function of the SDK 11A that is described in the first embodiment. In this manner, since the dedicated application 60 that is installed in the user terminal 100 has the function of the SDK 11A, the reciprocal customer transfer system 500d can perform the customer transfer process from the dedicated application 60 to the customer transfer destination application 20, similarly to the customer transfer process from the customer transfer source application 10 to the customer transfer destination application 20.

In addition, here, since the customer transfer source is the dedicated application 60, in this example, the reward of the customer transfer destination application 20 (game B) rather than the reward of the customer transfer source is granted to the user X. The management server 200 transmits the reward granting information to the application server 320 corresponding to the customer transfer destination application 20 (game B), as indicated by (11A).

For example, in a normal period in which a campaign is not in progress in the customer transfer destination application 20 (game B), the management server 200 determines that the customer transfer destination application 20 (game B) is installed in the user terminal 100 and transmits the reward granting information to the application server 320 corresponding to the customer transfer destination application 20 (game B). Further, if a campaign is in progress in the customer transfer destination application 20 (game B), for example, when the reward granting notification information is acquired indicating that the reward granting condition is satisfied in the customer transfer destination application 20 (game B) having the user terminal 100 installed therein, the management server 200 transmits the reward granting information to the application server 320 corresponding to the customer transfer destination application 20 (game B).

In addition, a campaign being in progress in the customer transfer destination application 20 (game B) may be a campaign being in progress by the customer transfer destination application 20 participating in the same campaign with the customer transfer source (here, the dedicated application 60), or a campaign being in progress by the customer transfer destination application 20 alone participating in a campaign.

[Functional Structure of User Terminal 100 (Dedicated Application 60) According to Ninth Embodiment]

Figure 40:
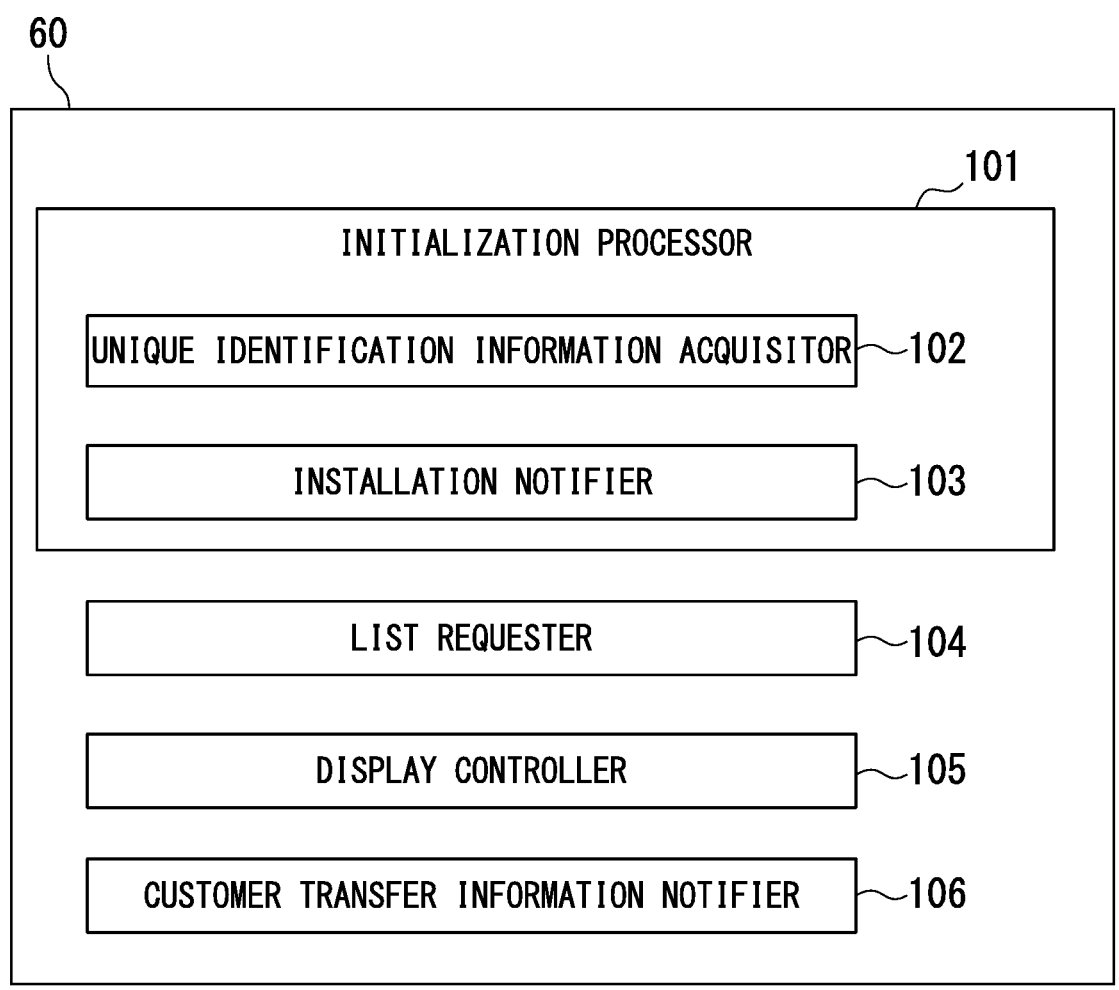
FIG. 40 shows an example of the functional configuration executed based on a dedicated application in a user terminal according to the ninth embodiment.

FIG. 40 is a configuration diagram illustrating an example of a functional structure that the terminal controller 150 executes based on the dedicated application 60, in the user terminal 100 according to the present embodiment.

The dedicated application 60 includes an initialization processor 101, a list requester 104, a display controller 105, and a customer transfer information notifier 106. Here, since the dedicated application 60 may include only a functional structure of at least customer transfer source (for example, a functional structure of the SDK 11A) among the functional structure of the SDK 11 illustrated in FIG. 5, the dedicated application 60 may not include a specific reward granting notifier 107 as the functional structure of the customer transfer destination.

In addition, the dedicated application 60 may have a configuration into which the SDK 11A is embedded.

Through this configuration, similarly to the customer transfer source application 10 with the SDK 11A embedded therein, the dedicated application 60 can perform a process of transmitting the customer transfer information regarding the customer transfer destination application 20 that is selected from the list LT of target applications to the management server 200.

Further, the dedicated application 60 does not become the application of the customer transfer destination. Therefore, the management server 200 may not manage whether or not the dedicated application 60 is installed in the user terminal 100. Therefore, since the dedicated application 60 may not transmit the installation notification information to the management server 200, the dedicated application 60 may be configured not to include the installation notifier 103 illustrated in FIG. 40.

[Operation Example of Reciprocal Customer Transfer Process of Ninth Embodiment]

The operation of the customer transfer process by the reciprocal customer transfer system 500d according to the present embodiment will be described. The customer transfer process by the reciprocal customer transfer system 500d may be the same process as the customer transfer process according to the first embodiment described with reference to FIG. 14, by the dedicated application 60 performing the process of the customer transfer source application 10.

In addition, the customer transfer process by the reciprocal customer transfer system 500d may perform a process that is partially different from the customer transfer process according to the first embodiment. For example, as described above, since the dedicated application 60 is the customer transfer source, a process may be possible in which the management server 200 does not manage whether or not the dedicated application 60 is installed.

Figure 41:
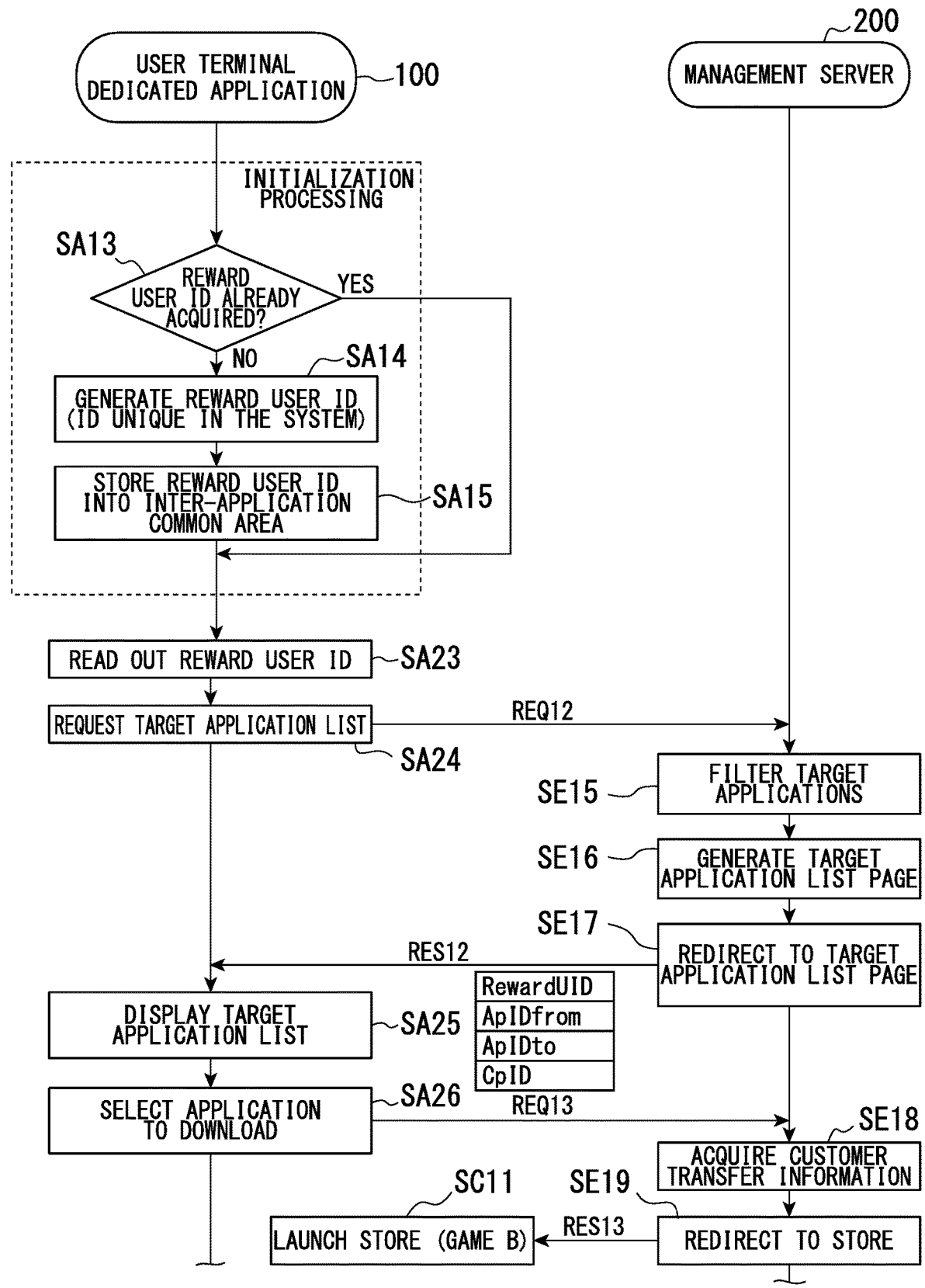
FIG. 41 is a flowchart showing an example of the operation of a reciprocal customer transfer system according to the ninth embodiment.

FIG. 41 is a flowchart illustrating an example of an operation of the customer transfer process according to the present embodiment. The example illustrated in FIG. 41 is an example in which instead of the customer transfer source application 10, the dedicated application 60 executes the process that is executed by the customer transfer source application 10 illustrated in FIG. 14, and the management server 200 does not manage whether or not the dedicated application 60 is installed in the user terminal 100. In FIG. 41, the part corresponding to each progress illustrated in FIG. 14 is denoted by the same reference numerals, and thus the description thereof will appropriately be omitted.

If the dedicated application 60 is installed and launched in the user terminal 100, the initialization processor 101 of the dedicated application 60 performs an initialization process. The initialization process illustrated in FIG. 41 is a process of acquiring a reward user ID, and a process of transmitting the installation notification information to the management server 200 is not performed. For example, the unique identification information acquisitor 102 of the dedicated application 60 determines whether or not the reward user ID is already acquired in the initialization process, with reference to the terminal storage 140 (step SA13). Then, when the reward user ID is not already acquired, the unique identification information acquisitor 102 generates and acquires the reward user ID (step SA14), stores it in an inter-application shared area of the terminal storage 140 (step SA15), and ends the initialization process.

In other words, before the dedicated application 60 is installed, when a certain target application is installed, the reward user ID that is acquired when the target application is installed is used in the reciprocal customer transfer system 500d. Meanwhile, before the dedicated application 60 is installed, when a certain target application is not installed, the reward user ID that is used in the reciprocal customer transfer system 500d is acquired when the dedicated application 60 is installed and launched.

A process after the above-described initialization process is the same as the process described with reference to FIG. 14, and the customer transfer information on the customer transfer to the customer transfer destination application 20 is transmitted from the dedicated application 60 to the management server 200. Accordingly, in the reciprocal customer transfer system 500 according to the present embodiment, since the dedicated application 60 is the customer transfer source, similarly to the first embodiment, the management server 200 can manage the recording of the customer transfer information for the customer transfer destination application 20.

In addition, in the present embodiment, since the customer transfer source is the dedicated application 60, when for example, a reward of the customer transfer source is not granted, the customer transfer source may not be specified. Therefore, in the present embodiment, the customer transfer information may not include the application ID of the dedicated application 60 for identifying the customer transfer source, and may include the application ID (ApID) and the reward user ID (RewardUID) of at least customer transfer destination application 20 (game B).

As described above, the reciprocal customer transfer system 500d of the present embodiment performs the customer transfer process from the dedicated application 60 to the customer transfer destination application 20, with the dedicated application 60 as the customer transfer source, it is possible to perform the customer transfer to the customer transfer destination application 20, similarly to the reciprocal customer transfer system 500 described in the first embodiment. In addition, in the case of the customer transfer from the dedicated application 60 to the customer transfer destination application 20, the customer transfer destination application 20 can also be a customer transfer source but, the dedicated application 60 does not become a customer transfer destination. Therefore, with respect to the dedicated application 60, a one-way customer transfer process to the customer transfer destination application 20 is possible.

In addition, a configuration of using the dedicated application 60 according to the present embodiment as the customer transfer source can also be applied to the second to ninth embodiments.

For example, in the second embodiment, based on a request from the dedicated application 60 that is installed in the user terminal 100, the management server 200 may perform a process (filtering process) of selecting a target application included in the application list transmitted to the user terminal 100 based on a predetermined condition.

Further, in the third to fifth embodiments, the target application 10A illustrated in FIG. 18 may be a dedicated application, which is specialized in a function of the customer transfer source. Further, in the sixth embodiment, the target application 10A illustrated in FIG. 30 may be a dedicated application, which is specialized in a function of the customer transfer source. For example, similarly to the dedicated application 60, the above-described dedicated application may be configured to include only the functional structure as at least customer transfer source. Therefore, the above-described dedicated application may be configured to exclude the specific reward granting notifier 107 as the functional structure of the customer transfer destination, for example, from the functional structure of the SDK 1011 illustrated in FIG. 19. Further, the above-described dedicated application may be configured to exclude the specific reward granting notifier 107 as the functional structure of the customer transfer destination, for example, from the functional structure of the SDK 2011 illustrated in FIG. 24. Further, the above-described dedicated application may be configured to exclude the specific reward granting notifier 107 as the functional structure of the customer transfer destination, for example, from the functional structure of the SDK 3011 illustrated in FIG. 27. In addition, the above-described dedicated application may be configured to exclude the installation notifier 103, similarly to the dedicated application 60.

Further, in the seventh and eighth embodiments, the dedicated application 60 may be installed in the user terminal 100.

For example, in the seventh embodiment, the management server 200c may transmit the application list indicating at least one target application that has not acquired the installation notification information from the user terminal 100B after model change and the user terminal 100A before model change, based on a request from the dedicated application 60 that is installed in the user terminal 100B after model change, to the user terminal 100B. In this case, for example, according to the second extraction method described in the above-described seventh embodiment, the management server 200c may associate the reward user ID of the user terminal 100B after model change and the reward user ID of the user terminal 100A before model change, by using the application user ID of any target application that has been installed in both the user terminal 100B after model change and the user terminal 100A before model change.

Further, in the eighth embodiment, when the reward user ID corresponding to the user terminal 100 is changed, the management server 200d transmits the application list of at least one target application that has not acquired the installation notification information after the change of the reward user ID and before the change of the reward user ID, based on a request from the dedicated application 60 that is installed in the user terminal 100, to the user terminal 100. In this case, for example, according to the second extraction method described in the above-described eighth embodiment, the management server 200d may associate the reward user ID after change and the reward user ID before change, by using the application user ID of any target application that has transmitted the installation notification information after the change of the reward user ID and before the change of the reward user ID.

Modification Example of the First to Ninth Embodiments

Hitherto, embodiments of the invention have been described in detail with reference to the accompanying drawings, but the specific configuration is not limited to the embodiments described above, and a change in the design, and the like without departing from the scope of this invention are also included. For example, the functions described in the first to ninth embodiments described above may be combined arbitrarily. In addition, in the following description, the management servers 200, 200a, 200b, 200c, and 200d are simply described as "management server 200" when there is no particular distinction.

(1) In the above embodiment, an example has been described in which the communicator 210 (an example of the transceiver) of the management server 200 directly communicates the installation notification information (an example of the first information), the application list (an example of the second information, or an example of the application notification information), the list request notification information, the customer transfer information (for example, customer transfer source information or customer transfer destination information), the instruction information (an example of information for displaying an installable screen on the user terminal 100), or the reward granting notification information, to the user terminal 100. Similarly, an example has been described in which the terminal communicator 130 (transceiver) of the user terminal 100 directly communicates the installation notification information, the application list, the list request notification information, the customer transfer information, the instruction information, or the reward granting notification information, to the management server 200.

Here, the communicator 210 (transceiver) of the management server 200 may directly perform communication with the user terminal 100, after establishing a communication session through the customer transfer source application 10 (an example of the first application) or the customer transfer destination application 20 (an example of the second application), and each application server 300 (an example of the server device) corresponding thereto. Similarly, the terminal communicator 130 (transceiver) of the user terminal 100 may directly perform communication with the management server 200, after establishing a communication session through the customer transfer source application 10 (installed target application) or the customer transfer destination application 20 (selected target application), and each application server 300 (server device) corresponding thereto.

In addition, when the user terminal 100 directly performs communication with the management server 200, a communication session may be established as necessary. In other words, there may be both a case of directly communicating with the management server 200 prior to establishing the communication session, and a case of directly communicating with the management server 200 after establishing the communication session.

For example, the installation notification information may directly be communicated to the management server 200 prior to establishing the communication session, and the other information may directly be communicated to the management server 200 after establishing the communication session. By doing so, as the customer transfer destination application 20 which is a target of a normal reward, and an application that does not include the application server 320 corresponding to the customer transfer destination application 20, in other words, an application operating in a stand-alone manner in the user terminal 100 can be treated as a target application. In other words, when transmitting the installation notification information indicating that the application operating in a stand-alone manner is installed, the user terminal 100 can directly perform communication with the management server 200, without performing a process of establishing the communication session through the application server 300.

FIG. 17 is a flowchart illustrating an operation of an establishment process of a communication session. The establishment process of the communication session (communication session establishment process) is performed in a case where the customer transfer source application 10 or the customer transfer destination application 20 is launched in the user terminal 100, and the SDK 11A and the SDK 11B first perform communication with the management server 200, for example, during an initialization process described with reference to FIG. 14 and FIG. 15. FIG. 17 illustrates the establishment process of the communication session which is performed during the initialization process illustrated in FIG. 14. In addition, the establishment process of the communication session can similarly be performed also during the initialization process illustrated in FIG. 15. In FIG. 17, the portion corresponding to each process in FIG. 14 is denoted by the same reference numeral, and a description thereof will be omitted. In addition, it is assumed that a communication session has already been established between the user terminal 100 and the application server 310.

If the reward user ID is already acquired in the process of steps SA12, SA13, SA14, and SA15 and the installation notification information is already notified in the process of steps SA16 and SA17, the initialization processor 101 of the SDK 11A transmits a one-time token acquisition request information for requesting acquisition of a one-time token to the application server 310 (step SA21). If the one-time token acquisition request information is acquired from the user terminal 100 (SDK 11A), the application server 310 transmits one-time token generation request information based on the acquired one-time token acquisition request information to the management server 200 (step SF11). If the one-time token generation request information is acquired from the application server 310, the management server 200 generates a one-time token, and transmits the generated one-time token to the application server 310 (step SE12). If the one-time token is acquired from the management server 200, the application server 310 transmits the acquired one-time token to the user terminal 100 (SDK 11A) (step SF12). If the one-time token is acquired from the application server 310, the initialization processor 101 of the SDK 11A transmits session establishment request information including the acquired one-time token to the management server 200 (step SA22). If the session establishment request information is acquired from the user terminal 100 (SDK 11A), when the one-time token included in the acquired session establishment request information is correct information (when matching the one-time token that has been transmitted to the user terminal 100 (SDK 11A)), the management server 200 establishes a communication session and thus communication by the reciprocal customer transfer system 500 is allowed (step SE13). The process described with reference to FIG. 14 will be performed later. In addition, when the one-time token included in the session establishment request information acquired from the user terminal 100 (SDK 11A) is not correct information, the management server 200 regards it as a communication error, and thus communication by the reciprocal customer transfer system 500 is not allowed. Further, when the management server 200 cannot acquire the session establishment request information from the user terminal 100 (SDK 11A), of course, communication by the reciprocal customer transfer system 500 is not allowed.

In this manner, since communication is initiated in the reciprocal customer transfer system 500 after the communication session is established, it is possible to improve security in the network system 1 including the reciprocal customer transfer system 500.

In addition, a part of the installation notification information (an example of the first information), the application list (an example of the second information, an example of application notification information), the list request notification information, the customer transfer information (for example, customer transfer source information or customer transfer destination information), the instruction information (an example of information for displaying an installable screen on the user terminal 100), or the reward granting notification information may not be directly communicated from the user terminal 100 to the management server 200, but rather may be communicated from the user terminal 100 through the application server 300 (an example of the server device) corresponding to the customer transfer source application 10 (an example of the first application) or the customer transfer destination application 20 (an example of the second application). In other words, the communicator 210 (transceiver) of the management server 200 may communicate the installation notification information, the application list, the list request notification information, the customer transfer information, the instruction information, or the reward granting notification information to the user terminal 100 through the application server 300 corresponding to the customer transfer source application 10 or the customer transfer destination application 20, or may directly communicate it to the user terminal 100.

Further, the communicator 210 (transceiver) of the management server 200 may communicate the installation notification information, the application list, the list request notification information, the customer transfer information, the instruction information, or the reward granting notification information to the user terminal 100, through the application server 300 corresponding to the customer transfer source application 10 or the customer transfer destination application 20. Similarly, the terminal communicator 130 (transceiver) of the user terminal 100 may perform communication with the management server 200 through the application server 300 corresponding to the customer transfer source application 10 (installed target application) or the customer transfer destination application 20 (selected target application).

In this manner, even if the user terminal 100 and the management server 200 perform communication through the application server 300, the reciprocal customer transfer system 500 can perform the same customer transfer process and reward process as in the first embodiment and the second embodiment, and achieve the same effect.

(2) In the above embodiment, an example has been described in which the installation notification information including the application user ID (ApUID) is transmitted from the user terminal 100 (SDK 11) to the management server 200, but the present embodiment is not limited thereto. For example, the application server 300 may transmit the application user ID in association with the reward user ID to the management server 200, in the communication session establishment process. Specifically, in step SA21, the initialization processor 101 of the SDK 11A notifies the application server 300 of the reward user ID when the one-time token acquisition request information is transmitted to the application server 300. Further, the application server 300 transmits the reward user ID, the application ID and the application user ID to the management server 200. The installation information manager 222 of the management server 200 causes the application user ID acquired from the application server 300 to be stored, as the application user ID (ApUID) corresponding to the installation information, corresponding to the acquired reward user ID and the application ID, among installation information pieces stored in the installation information storage 236. In this manner, since the application user ID is not transmitted from the user terminal 100 (SDK 11) but rather is transmitted from the application server 300, it becomes unnecessary for the user terminal 100 (SDK 11) to manage the application user ID.

As stated above, when the application server 300 transmits the application user ID in association with the reward user ID to the management server 200 in the communication session establishment process, only after the user information is registered in the installed target application, the communication session establishment process can be performed. However, the registration of the user information does not need to be directly involved in the transmission of the installation notification information indicating the installation of the target application installed in the user terminal 100 to the management server 200. Accordingly, the user terminal 100 intends to transmit the installation notification information to the management server 200, regardless of whether or not the user information is registered in the installed target application. Accordingly, when the user terminal 100 transmits the installation notification information, the installation notification information is transmitted before the communication session is establishment.

(3) In the above embodiment, an example has been described in which the reward processor 245 performs the CP reward process, based on the fact that the reward granting notification information is acquired from the SDK 11B of the customer transfer destination application 20 of the user terminal 100, but the present embodiment is not limited thereto. For example, the CP reward process may be performed based on the fact that the reward granting notification information is acquired from application server 320 corresponding to the customer transfer destination application 20. In this case, the reward granting notification information (achievement point reaching notification) may include the application ID and the application user ID of the customer transfer destination application 20, the campaign ID, and the achievement point ID (RewardSpotID).

For example, the reward processor 245 of the management server 200 acquires reward granting notification information (achievement point reaching notification) that has been transmitted from the application server 320. The reward processor 245 specifies installation information corresponding to the application ID and the application user ID of the customer transfer destination application 20, from the identification information stored in the installation information storage 236, and reverses the reward user ID corresponding to the specified installation information. Then, the reward processor 245 sets an achievement point ID (RewardSpotID) that is included in the acquired reward granting notification information, in association with the reward management ID corresponding to the customer transfer information, based on the fact that the recording of the reversed reward user ID and the customer transfer information on the customer transfer destination application 20 is managed by the customer transfer information manager 223, generates reward achieved information having a reward status of a flag "0" (not notification), and stores it in the reward achieved information storage 238. The subsequent processes are the same as in the above embodiments. In this manner, since the reward granting notification information (achievement point reaching notification) is transmitted from the application server 320, it is possible to reduce a processing burden of the user terminal 100 (SDK 11B).

(4) In the above embodiment, an example has been described in which when the target application is first installed, the reward user ID is generated as unique identification information (unique identification information which is unique to the reciprocal customer transfer system 500) for enabling unique identification of the user terminal 100 having the target application installed therein, but the present embodiment is not limited thereto. For example, a terminal identification number or a telephone number (for example, in the case of a smart phone) that is set uniquely to the user terminal 100 may be used as the reward user ID. However, generating and using the reward user ID without using personal information such as the terminal identification number or the telephone number as in the present embodiment can increase security properties. Further, since the unique identification information which is unique to the reciprocal customer transfer system 500 is employed as the reward user ID, without using the terminal identification number or the telephone number, even when the user terminal 100 (terminal device) that the user owns is changed through replacement, the reward ID is migrated to the user terminal 100 after the change through a predetermined procedure, and thus it is possible to use the reciprocal customer transfer system 500 while maintaining the state of the user terminal 100 before the change.

Further, a process of displaying an application list page of step SA25 in FIG. 14 and a process of transmitting customer transfer information when a target application is selected to be downloaded from the application list may be executed by another application (for example, a browser) that has been installed in the user terminal 100 being launched, which is not related to the process of the SDK 11, instead of the process executed by the SDK 11. For example, data of the application list page that is redirected to the user terminal 100 from the management server 200 by the browser is generated and transmitted to the user terminal 100, such that the browser may be launched in the user terminal 100 so as to display the application list page. Further, the application ID (ApID) of the customer transfer source application 10 (game A) included in the list request notification information is transmitted by being included in the data of the application list page, such that the customer transfer information including the application ID (ApID) of the customer transfer destination application 20 (game B), the application ID (ApID) of the customer transfer source application 10 (game A), and the reward user ID (RewardUID), which are selected in the application list page may be transmitted from the above-described browser to the management server 200.

Further, similarly to the normal reward process, the CP reward process may also be performed based on the fact that the customer transfer destination application 20 is installed. In this case, the customer transfer destination application 20 may install the reward granting condition of the customer transfer destination application 20 in the user terminal 100.

Further, if a first achievement point is achieved by the customer transfer destination application 20 being installed, all specific applications which perform a campaign may not perform the sending of the reward granting notification information corresponding to the achievement of the achievement point, from the customer transfer destination application 20. In this case, the management server 200 performs a reward granting process similar to the normal reward and transmits reward granting information including a campaign ID to the application server 310, such that a reward due to the CP reward corresponding to the normal reward is granted from the application server 310. Specifically, the process of steps SE23 to 24 may be performed in either the CP reward or the normal reward, without performing the determination process of step SE22 in the flowchart of FIG. 15.

(5) In the above embodiment, a game has been described as an example of the target application corresponding to the reciprocal customer transfer system 500, but the target application is not limited to the game, and any application other than the game may be used.

Further, the storage 230 of the management server 200 may be provided in a server device different from the management server 200. Each piece of information stored in each unit provided in the storage 230 may be managed, by the manager 220 or the controller 240 of the management server 200 performing communication with the storage 230 provided in a server device different from the management server 200 over a network NW.

Further, the management server 200 and the application server 300 may be integrated so as to constitute a server device.

Further, in the embodiment, the case has been described in which the SDK 1011 (2011, 3011) includes the list requester 104 and the list acquisitor 109, which have different configurations, but a configuration may be possible in which the list requester 104 includes the list acquisitor 109 and the list requester 104 functions as the list acquisitor 109. Further, the case has been described in which the SDK 1011 (2011, 3011) includes the installation notifier 103 and the temporary installation notifier 108, which have different configurations, but a configuration may be possible in which the installation notifier 103 includes the temporary installation notifier 108, and the installation notifier 103 functions as the temporary installation notifier 108.

Further, in the third and fourth embodiments, the case has been described in which the not-yet-installed information acquisitor 111 of the SDK 1011A transmits the not-yet-installed information request notification information including the reward user ID, to the management server 200a, but the present embodiment is not limited thereto. For example, the not-yet-installed information acquisitor 111 may transmit the not-yet-installed information request notification information including the application ID of the target application, without including the reward user ID, to the management server 200. In this case, the not-yet-installed information notifier 248 of the management server 200 extracts all target applications other than the application ID of the target application, from among the target application information stored in the target application information storage 231, and may transmit the application ID (ApID) corresponding to the extracted target application, and the URL scheme (ApURI), as the not-yet-installed information, to the user terminal 100.

(6) A program for implementing the function of the manager 220, the controller 240 (240a, 240b, 240c, and 240d), the SDK 11 (1011, 2011, and 3011), or the dedicated application 60, which is described above, is stored in a computer-readable storage medium, and the process of each unit described above may be executed by reading the program stored in this storage medium into a computer system and executing the program. Here, "reading the program stored in this storage medium into a computer system and executing the program" includes installing the program in the computer system. "Computer system" referred to herein is intended to include an OS and hardware such as peripheral devices. Further, "computer system" may include a plurality of computer devices which are connected through a network including a communication line such as the Internet, WAN, LAN, and a dedicated line. Further, "computer-readable storage medium" refers to a portable medium such as a flexible disk, a magneto-optical disk, a ROM, and a CD-ROM, or a storage device such as a hard disk built into the computer system. In this manner, a storage medium storing the program may be a non-transitory storage medium such as a CD-ROM. Further, the storage medium also includes a storage medium which is provided in an inside or an outside of a computer system, which is accessible from the distribution server in order to deliver the program. The program code stored in storage medium of the delivery server may be different from the program code of a form executable by the terminal device. In other words, a format stored in the distribution server is not limited as long as the program code can downloaded from a distribution server and installed in a form executable by the terminal device. In addition, a configuration is possible in which a program is divided into a plurality of programs, and the plurality of programs are combined in a terminal device after being downloaded at different timings, or there may be different distribution servers that respectively distribute the divided programs. Further, it is assumed that "computer-readable storage medium" includes a medium that holds a program for a fixed time, such as a volatile memory (RAM) inside a computer system which is a server or a client when the program is transmitted through a network. Further, the program may implement a part of the above-described functions. Further, the program may be a so-called differential file (a differential program) that can be implemented by combining the above-described functions with a program already stored in a computer system.

Further, a part or all of the above-described functions may be implemented as an integrated circuit such as a large scale integration (LSI). The respective functions described above may be formed into separate processors, or a part or all of the respective functions may be integrated and formed into a processor. Further, a circuit integration method is not limited to the LSI, and may be implemented by a dedicated circuit or a general-purpose processor. Further, if an integrated circuit technology replacing the LSI appears due to advances in semiconductor technology, an integrated circuit according to the technology may be used.

The systems and methods in the above-described embodiments may be deployed in part or in whole through a machine that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A management device comprising:
   an application manager configured to manage a set of application-related information which is related to a plurality of target applications which are subject to management, wherein a software development kit is embedded in each game application of the plurality of target game applications, and wherein user information is independently set for each game application;
   a first information acquisitor configured to acquire a first information which has been transmitted from a terminal in response to that any target application included in the plurality of target applications has been executed by the terminal;
   a first information notifier configured to transmit, to the terminal, a second information upon receipt of a request based on a first target application which has been executed by the terminal, the first target application being included in the plurality of target applications, the second information indicating at least one target application for which the first information has not been acquired from the terminal by the first information acquisitor; and
   a reward processor configured to perform a reward-granting process, based on that a second target application has been executed by the terminal or has become executable by the terminal, the second target application being included in the at least one target application which is indicated by the second information, the second information having been transmitted by the first information notifier, wherein the reward processor is further configured to refrain from notifying an unique identifier identifying the terminal to a server responsible for a reward granted game application which has not yet been installed into the terminal until the reward granted game application is installed into the terminal, where the reward granted game application is the second target application, which causes the reward processor to perform the reward-granting process when the reward granted game application is installed in the terminal and executed or when the reward granted game application is installed in the terminal and is in an executable state, and wherein the reward processor of the management device is further configured to associate the unique identifier identifying the terminal with each of a first identification information of the first target application, which has been executed by the terminal and a second identification information of the reward granted game application which has not yet been installed into the terminal and centrally manage the associated the unique identifier identifying the terminal, the first identification information of the first target application, and the second identification information of the reward granted game application in a temporary manner within the management device prior to the installation of the reward granted game application into the terminal.

2. The management device according to claim 1,
wherein the reward processor is configured to perform the reward-granting process, based on that the second target application has been executed by the terminal or has become executable by the terminal.

3. The management device according to claim 1,
wherein the reward processor is configured to perform the reward-granting process, based on that the second target application has been executed by the terminal or has become executable by the terminal, and further based on that a reward-granting condition, which is set on the second target application, has been satisfied.

4. The management device according to claim 1,
wherein the reward processor is configured to determine that the second target application has been executed by the terminal, based on that the first information acquisitor has acquired the first information which is associated with the second target application.

5. The management device according to claim 1,
wherein the application manager is configured to manage information related to a first time period which is set on at least one of the plurality of target applications,
wherein the first information notifier is configured to transmit, to the terminal, the second information upon receipt of the request based on the first target application which has been executed by the terminal, the first target application being included in the at least one target application on which the first time period is set, the second information indicating the at least one target application, for which the first information has not been acquired from the terminal by the first information acquisitor, and
wherein the reward processor is configured to perform the reward-granting process, based on that the second target application has been executed by the terminal or has become executable by the terminal in the first time period, the second target application being indicated by the second information which has been transmitted by the first information notifier.

6. The management device according to claim 5,
wherein the reward processor is configured to perform the reward-granting process, based on that the second target application has been executed by the terminal or has become executable by the terminal in the first time period.

7. The management device according to claim 5,
wherein the reward processor is configured to perform the reward-granting process, based on that the second target application has been executed by the terminal or has become executable by the terminal in the first time period, and further based on that a reward-granting condition, which is set on the second target application, has been satisfied.

8. The management device according to claim 5,
wherein the reward processor is configured to determine that the second target application has been executed by the terminal in the first time period, based on that the first information acquisitor acquired the first information at a timing in the first time period, the first information is associated with the second target application.

9. The management device according to claim 3,
wherein the reward processor is configured to perform the reward-granting process based on a reward-granting notification information indicating that the reward-granting condition set on the second target application has been satisfied, in a case that the reward processor has acquired the reward-granting notification information either from the second target application which has been executed by the terminal or from a server which is adaptable to execute the second target application.

10. The management device according to claim 1,
wherein the first information acquisitor is configured to acquire the first information associated with a unique terminal identifier and with an application identifier, the unique terminal identifier identifies the terminal, and the application identifier identifies, amongst the plurality of target applications, any target application for which the first information has been transmitted, and
wherein the management device further comprises:
a first information manager configured to manage a management information which is associated with the unique terminal identifier associated with the first information and the application identifier identifying the target application.

11. The management device according to claim 10, further comprising:
an application user information acquisitor configured to acquire an user information of any target application included in the plurality of target applications, and
wherein the first information manager is configured to manage the user information in association with the management information.

12. The management device according to claim 1, further comprising:
an application user information acquisitor configured to acquire an user information of any target application included in the plurality of target applications, and
wherein the reward processor is configured to transmit, to the first target application or to a server adaptable to the first target application, a reward-granting information, based on that the reward-granting condition set on the second target application has been satisfied, the reward-granting information is associated with the user information of the first target application, and the first target application has been executed by the terminal.

13. The management device according to claim 1, further comprising:
a customer transfer information acquisitor configured to acquire a customer transfer information indicating a customer transfer to the second target application; and
a customer transfer information manager configured to manage the customer transfer information acquired by the customer transfer information acquisitor,
wherein the reward processor is configured to perform the reward-granting process, under a condition that the customer transfer information associated with the second target application is managed by the customer transfer information manager, in case that the second target application has been executed by the terminal or has become executable by the terminal.

14. The management device according to claim 3, further comprising:
a customer transfer information acquisitor configured to acquire a customer transfer information indicating a customer transfer to the second target application; and
a customer transfer information manager configured to manage the customer transfer information acquired by the customer transfer information acquisitor,
wherein the reward processor is configured to perform the reward-granting process, under a condition that the customer transfer information associated with the second target application is managed by the customer transfer information manager, in case that a reward-granting condition, which is set on the second target application, has been satisfied.

15. The management device according to claim 13, wherein the customer transfer information manager is configured to manage, as a record of the customer transfer information, an identification information of the second target application associated with a unique terminal identifier identifying the terminal.

16. The management device according to claim 13, wherein the customer transfer information manager is configured to manage, as a record of the customer transfer information, an identification information of the second target application associated with an application identifier identifying the first target application.

17. The management device according to claim 13, wherein the customer transfer information acquisitor is configured to acquire the customer transfer information associated with a unique terminal identifier identifying the terminal, associated with a first application identifier identifying the first target application, and associated with a second application identifier identifying the second target application, and
wherein the customer transfer information manager is configured to manage the unique terminal identifier, the first application identifier and the second application identifier as a record of the customer transfer information.

18. The management device according to claim 17, further comprising:
a screen information notifier configured to transmit, to the terminal, a screen information which can be used for the terminal to display a screen, the screen allowing installation of the second target application.

19. The management device according to claim 7, wherein the reward processor is configured to be prohibited from performing the reward-granting process in another time period which does not overlap the first time period, the other time period having been set on at least a part of the target applications on which the first time period has been set, under a condition that that the at least part of the target applications has been executed by the terminal in the first time period.

20. The management device according to claim 7, wherein the application manager is configured to manage information related to at least an end of a second time period, the second time period ends after the first time period ends, and the second time period includes a part or all of the first time period, and
wherein the reward processor is configured to perform the reward-granting process, based on that the reward-granting condition was satisfied in the second time period.

21. The management device according to claim 7, wherein the application manager is configured to manage information related to at least an end of a second time period, the second time period ends after the first time period ends, and the second time period includes a part or all of the first time period, and
wherein the reward processor is configured to perform the reward-granting process, based on a reward-granting notification information indicating that the reward-granting condition has been satisfied, in case that the reward processor acquired the reward-granting notification information from the second target application in the second time period.

22. The management device according to claim 20, wherein a plurality of reward-granting conditions is set on the second target application, and
wherein the reward processor is configured to perform the reward-granting process, based on that any one of the plurality of reward-granting conditions was satisfied in the second time period.

23. The management device according to claim 21, wherein a plurality of reward-granting conditions is set on the second target application, and
wherein the reward processor is configured to perform the reward-granting process based on the reward-granting notification information, in case that the reward processor has acquired, in the second time period from the second target application, the reward-granting notification information based on that any one of the plurality of reward-granting conditions was satisfied.

24. The management device according to claim 23, wherein the plurality of reward-granting conditions include respective timings of reaching to a plurality of achievement points during the processes of the second target application, and
wherein the reward processor is configured to acquire, from the second target application, the reward-granting notification information associated with an achievement point information which indicates a reached achievement point included in the plurality of achievement points, based on that the reward-granting condition was satisfied, and
wherein the reward processor is configured to transmit, to the first application executed by the terminal or a server adaptable to the first application, the reward-granting notification information associated with the achievement point information.

25. The management device according to claim 23, wherein the plurality of reward-granting conditions include respective timings of reaching to a plurality of achievement points during the processes of the second target application, and
wherein the reward processor is configured to acquire, from the second target application, the reward-granting notification information associated with a reach information which indicates that a reach is made to any one of the plurality of achievement points, based on that the reward-granting condition was satisfied, and wherein the reward processor is configured to transmit, to the first application executed by the terminal or a server adaptable to the first application, a reward-granting information every time the reward processor acquires the reward-granting notification information associated with the reach information, where the reward-granting information is related to the number of acquisition times that the reward processor has acquired the reward-granting notification information associated with the reach information.

26. The management device according to claim 1,
wherein the plurality of reward-granting conditions include respective timings of reaching to a plurality of achievement points during the processes of the second target application, and wherein the reward processor is configured to acquire, from the second target application, the reward-granting notification information associated with a reach information which indicates that a reach is made to any one of the plurality of achievement points, based on that the reward-granting condition was satisfied, and wherein the reward processor is configured to transmit, to the first application executed by the terminal or a server adaptable to the first application, the reward-granting notification information associated with the achievement point information.

27. The management device according to claim 1,
wherein the terminal is identified by a unique terminal identifier,
wherein the unique terminal identifier is acquired by the terminal upon execution by the terminal of a first-installed target application which had first been installed in the terminal, the first-installed target application is included in the plurality of target applications, the unique terminal identifier is stored in the terminal where the unique terminal identifier is browsable to every target application which has been executed by the terminal.

28. The management device according to claim 1, further comprising:
a transceiver configured to transmit and receive at least one of the first information and the second information to and from the terminal directly or through a server adaptable to the first target application or another server adaptable to the second target application.

29. The management device according to claim 28,
wherein the transceiver is configured to communicate directly with the terminal after the transceiver has established a communication session to the first target application or the second target application through the respective server.

30. A management method implemented by a management device, the method comprising:
managing a set of application-related information which is related to a plurality of target applications which are subject to management, wherein a software development kit is embedded in each game application of the plurality of target game applications, and wherein user information is independently set for each game application;
acquiring a first information which has been transmitted from a terminal in response to that any target application included in the plurality of target applications has been executed by the terminal;
transmitting, to the terminal, a second information upon receipt of a request based on a first target application which has been executed by the terminal, the first target application being included in the plurality of target applications, the second information indicating at least one target application for which the first information has not been acquired from the terminal;
performing a reward-granting process, based on that a second target application has been executed by the terminal or has become executable by the terminal, the second target application being included in the at least one target application which is indicated by the second information, the second information having been transmitted;
refraining from notifying an unique identifier identifying the terminal to a server responsible for a reward granted game application which has not yet been installed into the terminal until the reward granted game application is installed into the terminal, where the reward granted game application is the second target application, which performs the reward-granting process when the reward granted game application is installed in the terminal and executed or when the reward granted game application is installed in the terminal and is in an executable state, and
associating within the management device, the unique identifier identifying the terminal with each of a first identification information of the first target application, which has been executed by the terminal and a second identification information of the reward granted game application which has not yet been installed into the terminal, and centrally managing the associated the unique identifier identifying the terminal, the first identification information of the first target application, and the second identification information of the reward granted game application in a temporary manner within the management device prior to the installation of the reward granted game application into the terminal.

31. A non-transitory computer readable storage medium that stores a computer program to be executed by a computer to perform a management method comprising:
managing a set of application-related information which is related to a plurality of target applications which are subject to management, wherein a software development kit is embedded in each game application of the plurality of target game applications, and wherein user information is independently set for each game application;
acquiring a first information which has been transmitted from a terminal in response to that any target application included in the plurality of target applications has been executed by the terminal;
transmitting, to the terminal, a second information upon receipt of a request based on a first target application which has been executed by the terminal, the first target application being included in the plurality of target applications, the second information indicating at least one target application for which the first information has not been acquired from the terminal;
performing a reward-granting process, based on that a second target application has been executed by the terminal or has become executable by the terminal, the second target application being included in the at least one target application which is indicated by the second information, the second information having been transmitted;

refraining from notifying an unique identifier identifying the terminal to a server responsible for a reward granted game application which has not yet been installed into the terminal until the reward granted game application is installed into the terminal, where the reward granted game application is the second target application, which performs the reward-granting process when the reward granted game application is installed in the terminal and executed or when the reward granted game application is installed in the terminal and is in an executable state, and associating within the management device, the unique identifier identifying the terminal with each of a first identification information of the first target application, which has been executed by the terminal and a second identification information of the reward granted game application which has not yet been installed into the terminal, and centrally managing the associated the unique identifier identifying the terminal, the first identification information of the first target application, and the second identification information of the reward granted game application in a temporary manner within the management device prior to the installation of the reward granted game application into the terminal.

32. A management device comprising:

an application manager configured to manage a set of application-related information which is related to a plurality of target applications which are subject to management, wherein a software development kit is embedded in each game application of the plurality of target game applications, and wherein user information is independently set for each game application;

a first information acquisitor configured to acquire a first information which has been transmitted from a terminal in response to that any target application included in the plurality of target applications has been executed by the terminal;

a first information notifier configured to transmit, to the terminal, a second information upon receipt of a request based on a first target application which has been executed by the terminal, the first target application being included in the plurality of target applications, the second information indicating at least one target application for which the first information has not been acquired from the terminal by the first information acquisitor; and a reward processor configured to perform a reward-granting process, based on that a second target application has been executed by the terminal, the second target application being included in the at least one target application which is indicated by the second information, the second information having been transmitted by the first information notifier, wherein the reward processor is further configured to refrain from notifying an unique identifier identifying the terminal to a server responsible for a reward granted game application which has not yet been installed into the terminal until the reward granted game application is installed into the terminal, where the reward granted game application is the second target application, which causes the reward processor to perform the reward-granting process when the reward granted game application is installed in the terminal and executed, and wherein the reward processor of the management device is further configured to associate the unique identifier identifying the terminal with each of a first identification information of the first target application, which has been executed by the terminal and a second identification information of the reward granted game application which has not yet been installed into the terminal and centrally manage the associated the unique identifier identifying the terminal, the first identification information of the first target application, and the second identification information of the reward granted game application in a temporary manner within the management device prior to the installation of the reward granted game application into the terminal.

33. A management device comprising:

an application manager configured to manage a set of application-related information which is related to a plurality of target applications which are subject to management, wherein a software development kit is embedded in each game application of the plurality of target game applications, and wherein user information is independently set for each game application;

a first information acquisitor configured to acquire a first information which has been transmitted from a terminal in response to that any target application included in the plurality of target applications has been executed by the terminal;

a first information notifier configured to transmit, to the terminal, a second information upon receipt of a request based on a first target application which has been executed by the terminal, the first target application being included in the plurality of target applications, the second information allowing for determining at least one target application for which the first information has not been acquired from the terminal by the first information acquisitor; and a reward processor configured to perform a reward-granting process, based on that a second target application has been executed by the terminal, the second target application being included in the at least one target application which is indicated by the second information, the second information having been transmitted by the first information notifier, wherein the reward processor is further configured to refrain from notifying an unique identifier identifying the terminal to a server responsible for a reward granted game application which has not yet been installed into the terminal until the reward granted game application is installed into the terminal, where the reward granted game application is the second target application, which causes the reward processor to perform the reward-granting process when the reward granted game application is installed in the terminal and executed, and wherein the reward processor of the management device is further configured to associate the unique identifier identifying the terminal with each of a first identification information of the first target application, which has been executed by the terminal and a second identification information of the reward granted game application which has not yet been installed into the terminal and centrally manage the associated the unique identifier identifying the terminal, the first identification information of the first target application, and the second identification information of the granted game application in a temporary manner within the management device prior to the installation of the reward granted game application into the terminal.

34. The management device according to claim 33, wherein the first information acquisitor is configured to acquire the first information which has been transmitted from any target application included in the plurality of target applications, in case that the target application has been executed by the terminal, and wherein the reward processor is configured to perform a reward-granting process, based on that the first information acquisitor has acquired the first information which had been transmitted from the second target application in the terminal.

35. A management device comprising:

an application manager configured to manage a set of application-related information which is related to a plurality of target applications which are subject to management, wherein a software development kit is embedded in each game application of the plurality of target game applications, and wherein user information is independently set for each game application;

a first information acquisitor configured to acquire a first information which has been transmitted from any target application included in the plurality of target applications in response to that the target application has been executed by a terminal;

a first information notifier configured to transmit, to the terminal, a second information upon receipt of a request based on a first target application which has been executed by the terminal, the first target application being included in the plurality of target applications, the second information indicating at least one target application for which the first information has not been acquired from the terminal by the first information acquisitor; and a reward processor configured to perform a reward-granting process, based on that the first information acquisitor has acquired the first information which had been transmitted from the second target application being included in the at least one target application, the at least one target application being indicated by the second information, the second information having been transmitted by the first information notifier, wherein the reward processor is further configured to refrain from notifying an unique identifier identifying the terminal to a server responsible for a reward granted game application which has not yet been installed into the terminal until the reward granted game application is installed into the terminal, where the reward granted game application is the second target application, which causes the reward processor to perform the reward-granting process when the reward granted game application is installed in the terminal and executed, and wherein the reward processor of the management device is further configured to associate the unique identifier identifying the terminal with each of a first identification information of the first target application, which has been executed by the terminal and a second identification information of the reward granted game application which has not yet been installed into the terminal and centrally manage the associated the unique identifier identifying the terminal, the first identification information of the first target application, and the second identification information of the reward granted game application in a temporary manner within the management device prior to the installation of the reward granted game application into the terminal.

36. A management device comprising:

an application manager configured to manage a set of application-related information which is related to a plurality of target applications which are subject to management, wherein a software development kit is embedded in each game application of the plurality of target game applications, and wherein user information is independently set for each game application;

a first information acquisitor configured to acquire a first information which has been transmitted from a terminal in response to that any target application included in the plurality of target applications has been executed by the terminal;

a first information notifier configured to extract, based on the first information from the plurality of target applications, at least one target application for which the first information has not been acquired by the first information acquisitor from the terminal, upon receipt of a request based on a first target application which has been executed by the terminal and which is included in the plurality of target applications, the first information notifier being configured to transmit, to the terminal, a second information indicating the at least one target application extracted; and a reward processor configured to perform a reward-granting process, based on that a second target application has been executed by the terminal, the second target application being included in the at least one target application which is indicated by the second information, the second information having been transmitted by the first information notifier, wherein the reward processor is further configured to refrain from notifying an unique identifier identifying the terminal to a server responsible for a reward granted game application which has not yet been installed into the terminal until the reward granted game application is installed into the terminal, where the reward granted game application is the second target application, which causes the reward processor to perform the reward-granting process when the reward granted game application is installed in the terminal and executed, and wherein the reward processor of the management device is further configured to associate the unique identifier identifying the terminal with each of a first identification information of the first target application, which has been executed by the terminal and a second identification information of the reward granted game application which has not yet been installed into the terminal and centrally manage the associated the unique identifier identifying the terminal, the first identification information of the first target application, and the second identification information of the reward granted game application in a temporary manner within the management device prior to the installation of the reward granted game application into the terminal.

37. The management device according to claim 36, wherein the first information is associated with an application identification information identifying the at least one target application in the terminal.

38. The management device according to claim 36, further comprising:

a first information manager configured to manage the first information that the first information acquisitor has acquired;

wherein the first information notifier is configured to extract the at least one target application for which the first information has not been acquired by the first information acquisitor from the terminal, based on the first information managed by the first information manager, the first information notifier being configured to transmit, to the terminal, the second information indicating the at least one target application extracted.

39. A management device comprising:

an application manager configured to manage a set of application-related information which is related to a plurality of target applications which are subject to management, wherein a software development kit is embedded in each game application of the plurality of target game applications, and wherein user information is independently set for each game application;

a first information acquisitor configured to acquire a first information which has been transmitted from a terminal in response to that any target application included in the plurality of target applications has been executed by the terminal;

a first information manager configured to manage the first information that the first information acquisitor has acquired;

a first information notifier configured to transmit, to the terminal, a second information, based on the first information managed by the first information manager, upon receipt of a request based on a first target application which has been executed by the terminal, the first target application being included in the plurality of target applications, the second information indicating at least one target application for which the first information has not been acquired from the terminal by the first information acquisitor; and a reward processor configured to perform a reward-granting process, based on that a second target application has been executed by the terminal, the second target application being included in the at least one target application which is indicated by the second information, the second information having been transmitted by the first information notifier, wherein the reward processor is further configured to refrain from notifying an unique identifier identifying the terminal to a server responsible for a reward granted game application which has not yet been installed into the terminal until the reward granted game application is installed into the terminal, where the reward granted game application is the second target application, which causes the reward processor to perform the reward-granting process when the reward granted game application is installed in the terminal and executed, and wherein the reward processor of the management device is further configured to associate the unique identifier identifying the terminal with each of a first identification information of the first target application, which has been executed by the terminal and a second identification information of the reward granted game application which has not yet been installed into the terminal and centrally manage the associated the unique identifier identifying the terminal, the first identification information of the first target application, and the second identification information of the reward granted game application in a temporary manner within the management device prior to the installation of the reward granted game application into the terminal.

40. The management device according to claim 39, wherein the first information notifier is configured to extract, from the plurality of target applications, the at least one target application for which the first information has not been acquired by the first information acquisitor from the terminal, based on the first information managed by the first information manager, the first information is being configured to transmit, to the terminal, the second information indicating the at least one target application extracted.

41. A management device comprising:

an application manager configured to manage information related to a first time period which is set on at least one target application of the plurality of target applications which are subject to management, wherein a software development kit is embedded in each game application of the plurality of target game applications, and wherein user information is independently set for each game application;

a first information acquisitor configured to acquire a first information which has been transmitted from a terminal in response to that any target application included in the plurality of target applications has been executed by the terminal;

a first information notifier configured to transmit, to the terminal, a second information upon receipt of a request based on a first target application which has been executed by the terminal, the first target application being included in the at least one target application on which the first time period is set, the second information indicating the at least one target application, for which the first information has not been acquired from the terminal by the first information acquisitor; and a reward processor configured to perform a reward-granting process, based on that a second target application has been executed by the terminal in the first time period, the second target application being included in the at least one target application indicated by the second information which has been transmitted by the first information notifier, wherein the reward processor is further configured to refrain from notifying an unique identifier identifying the terminal to a server responsible for a reward granted game application which has not yet been installed into the terminal until the reward granted game application is installed into the terminal, where the reward granted game application is the second target application, which causes the reward processor to perform the reward-granting process when the reward granted game application is installed in the terminal and executed, and wherein the reward processor of the management device is further configured to associate the unique identifier identifying the terminal with each of a first identification information of the first target application, which has been executed by the terminal and a second identification information of the reward granted game application which has not yet been installed into the terminal and centrally manage the associated the unique identifier identifying the terminal, the first identification information of the first target application, and the second identification information of the reward granted game application in a temporary manner within the management device prior to the installation of the reward granted game application into the terminal.

42. The management device according to claim 41,
wherein the reward processor is configured to determine whether the second target application, which is included in the at least one target application indicated by the second information which has been transmitted by the first information notifier, has been executed by the terminal in the first time period, and
wherein the reward processor is configured to perform the reward-granting process in case that the reward processor is configured to determine that the second target application has been executed by the terminal in the first time period.

43. The management device according to claim 41,
wherein the reward processor is configured to determine whether the second target application, which is included in the at least one target application indicated by the second information which has been transmitted by the first information notifier, has been executed by the terminal in the first time period, and
wherein the reward processor is configured to perform the reward-granting process in case that the reward processor is configured to determine that the second target application has been executed by the terminal in the first time period, and that a reward-granting condition, which is set on the second target application, has been satisfied.

44. The management device according to claim 36,
wherein the reward processor is configured to refer information related to the first time period which has been set on the second target application managed by the application manager, in case that the first information acquisitor has acquired the first information which was transmitted from the terminal in response to that the second target application has been executed by the terminal, and
wherein the reward processor is configured to determine, based on the information related to the first time period, whether or not a timing that the first information acquisitor has acquired the first information is in the first time period set on the second target application, to determine whether or not the second target application has been executed by the terminal in the first time period.

45. The management device according to claim 41,
wherein the reward processor is configured to refer information related to the first time period which has been set on at least a part of the plurality of target applications managed by the application manager, in case that the first information acquisitor has acquired the first information which was transmitted from the terminal in response to that the second target application has been executed by the terminal, and
wherein the reward processor is configured to determine, based on the information related to the first time period, whether or not the first time period is set on each of the first target application and the second target application, and
wherein the reward processor is configured to determine whether a timing that the first information acquisitor has acquired the first information is in the first time period, to determine whether or not the second target application has been executed by the terminal in the first time period, in case that the reward processor has determined that the first time period is set on each of the first target application and the second target application.

46. The management device according to claim 41, further comprising:
a customer transfer information acquisitor configured to acquire a customer transfer information indicating a customer transfer from the first target application to the second target application; and
a customer transfer information manager configured to manage the customer transfer information acquired by the customer transfer information acquisitor,
wherein the reward processor is configured to perform the reward-granting process, under a condition that the customer transfer information manager manages the customer transfer information, which is associated with the second target application and associated with information indicating that the first time period is set.

47. The management device according to claim 46,
wherein the customer transfer information acquisitor is configured to acquire the customer transfer information associated with information indicating that the first time period is set, and
wherein the customer transfer information manager is configured to manage the customer transfer information acquired by the customer transfer information acquisitor, the customer transfer information is associated with the information indicating that the first time period is set.

48. The management device according to claim 46,
wherein the customer transfer information manager is configured to manage the customer transfer information acquired by the customer transfer information acquisitor, the customer transfer information is associated with the information indicating that the first time period is set on the first target application.

49. The management device according to claim 48,
wherein the first information notifier is configured to transmit, to the terminal, the second information upon receipt of the request based on the first target application on which the first time period is set, the second information which includes only information indicating at least one target application, for which the first information has not been acquired from the terminal by the first information acquisitor, the first time period is set on the at least one target application.

50. The management device according to claim 46,
wherein the customer transfer information manager is configured to refer information related to the first time period which has been set on at least a part of the plurality of target applications managed by the application manager, and
wherein the customer transfer information manager is configured to determine, based on the information related to the first time period, whether or not the first time period is set on each of the first target application and the second target application which are both indicated by the customer transfer information that the customer transfer information acquisitor has acquired, and
wherein the customer transfer information manager is configured to manage the customer transfer information associated with the information indicating the first time period, in case that the customer transfer information manager has determined that the first time period is set on each of the first target application and the second target application.

51. The management device according to claim 41, further comprising:
- a customer transfer information acquisitor configured to acquire a customer transfer information indicating a customer transfer from the first target application to the second target application; and
- a customer transfer information manager configured to manage the customer transfer information acquired by the customer transfer information acquisitor,
- wherein the reward processor is configured to perform the reward-granting process, under conditions that the customer transfer information manager manages the customer transfer information, which is associated with the second target application and that the first time period is set on the second target application and the first target application that the customer transfer information indicates, in case that the second target application was executed by the terminal in the first time period.

52. The management device according to claim 51, wherein the reward processor is configured to refer information related to the first time period which has been set on at least a part of the plurality of target applications managed by the application manager, to determine whether or not the first time period is set on each of the first target application and the second target application.

* * * * *